(12) United States Patent
Duva et al.

(10) Patent No.: US 8,577,016 B1
(45) Date of Patent: Nov. 5, 2013

(54) METHODS AND SYSTEMS FOR PROCESSING AND MANAGING TELEPHONIC COMMUNICATIONS USING RING POOLS

(71) Applicant: RingRevenue, Inc., Santa Barbara, CA (US)

(72) Inventors: Robert J. Duva, Santa Barbara, CA (US); Colin D. Kelley, Santa Barbara, CA (US); Jason S. Spievak, Santa Barbara, CA (US); David S. Trandal, Santa Barbara, CA (US)

(73) Assignee: Ringrevenue, Inc., Santa Barbara, CA (US)

( * ) Notice: Subject to any disclaimer, the term of this patent is extended or adjusted under 35 U.S.C. 154(b) by 0 days.

(21) Appl. No.: 13/828,623

(22) Filed: Mar. 14, 2013

Related U.S. Application Data

(63) Continuation-in-part of application No. 13/563,493, filed on Jul. 31, 2012, now Pat. No. 8,401,172, which is a continuation of application No. 13/455,845, filed on Apr. 25, 2012, now Pat. No. 8,238,540, which is a continuation-in-part of application No. 12/552,905, filed on Sep. 2, 2009.

(60) Provisional application No. 61/095,255, filed on Sep. 8, 2008, provisional application No. 61/107,269, filed on Oct. 21, 2008, provisional application No. 61/161,654, filed on Mar. 19, 2009.

(51) Int. Cl.
*H04M 3/00* (2006.01)
*H04M 5/00* (2006.01)

(52) U.S. Cl.
USPC ............ 379/265.09; 379/265.01; 379/266.01; 379/266.07; 379/201.01

(58) Field of Classification Search
USPC ............ 379/265.09, 265.01, 266.01, 266.07, 379/201.01
See application file for complete search history.

(56) References Cited

U.S. PATENT DOCUMENTS

| | | | |
|---|---|---|---|
| 5,651,054 | A | 7/1997 | Dunn et al. |
| 5,956,343 | A | 9/1999 | Cornes et al. |
| 6,256,381 | B1 | 7/2001 | Donaghue, Jr. |
| 7,444,148 | B1 | 10/2008 | Cook |
| 7,783,029 | B2 | 8/2010 | Whitecotten et al. |
| 7,792,273 | B2 | 9/2010 | Fano et al. |
| 7,818,195 | B2 | 10/2010 | Coon et al. |
| 7,894,587 | B1 | 2/2011 | Laurinavichus |
| 8,145,212 | B2 | 3/2012 | Lopresti et al. |
| 2002/0110234 | A1* | 8/2002 | Walker et al. ............ 379/266.01 |

(Continued)

*Primary Examiner* — Quynh Nguyen
(74) *Attorney, Agent, or Firm* — Knobbe, Martens, Olson & Bear LLP

(57) ABSTRACT

An online and offline communication processing and tracking using data processing and data/voice networks is described. A phone address from a phone address number pool is automatically assigned to a first entity. A call quality rating is determined and recorded. A call from a caller directed to the phone address is received at a call bridging system coupled to at least one network, wherein the call is associated with call signaling information. Based at least in part on the call quality associated with the caller call, the caller call is assigned to a first location in a call queue. An outbound call is generated from the call bridging system and the inbound and the outbound calls are bridged. One or more parameters of the bridged call are compared to the call quality rating. An indication is recorded regarding the successful bridging of the calls in association with an entity identifier.

20 Claims, 74 Drawing Sheets

(56) References Cited

U.S. PATENT DOCUMENTS

| | | |
|---|---|---|
| 2004/0028213 A1 | 2/2004 | Goss |
| 2005/0047580 A1* | 3/2005 | Mow et al. ............... 379/265.09 |
| 2005/0152338 A1 | 7/2005 | Chen et al. |
| 2005/0265322 A1 | 12/2005 | Hester |
| 2006/0184617 A1 | 8/2006 | Nicholas et al. |
| 2007/0088851 A1 | 4/2007 | Levkovitz et al. |
| 2007/0116227 A1 | 5/2007 | Vitenson et al. |
| 2007/0211881 A1 | 9/2007 | Parker-Stephen |
| 2007/0242626 A1 | 10/2007 | Altberg et al. |
| 2007/0248220 A1 | 10/2007 | Crandell et al. |
| 2007/0288312 A1 | 12/2007 | Wang |
| 2008/0004968 A1 | 1/2008 | Nakao |
| 2008/0011823 A1 | 1/2008 | Patel et al. |
| 2008/0037534 A1 | 2/2008 | Shina |
| 2008/0126476 A1 | 5/2008 | Nicholas et al. |
| 2008/0267388 A1 | 10/2008 | Odinak et al. |
| 2009/0046704 A1 | 2/2009 | Sternam |
| 2009/0122728 A1 | 5/2009 | Aaltonen et al. |
| 2009/0147778 A1 | 6/2009 | Wanless et al. |
| 2009/0262917 A1 | 10/2009 | Delacey et al. |
| 2009/0299820 A1 | 12/2009 | Wang et al. |
| 2010/0002685 A1 | 1/2010 | Shaham et al. |
| 2010/0002865 A1 | 1/2010 | Kennedy et al. |
| 2010/0049679 A1 | 2/2010 | Phillips |

* cited by examiner

FIG. 4

RingRevenue — Track calls like clicks.

Home | Campaigns | Reports | Account | Help | Logout

Quick Stats [All ▼]

| Call Quality | # Calls | % Calls | Cost |
|---|---|---|---|
| High | 26 | 36% | $130.00 |
| Medium | 32 | 44% | $96.00 |
| Low | 14 | 19% | $14.00 |
| No Payout | 0 | 0% | $0.00 |
| Total | 72 | 100% | $240.00 |

Notifications

☑ Welcome to the pay-per-call beta trial!  Oct 20
☑ You have 1 advertiser campaign expiring within 30 days  Oct 20
☑ You have 1 affiliate campaign application approval

Recent Calls

| Affiliate | Campaign | Media Type | Commission | Quality | City | State | Caller ID | Duration | Date/Time |
|---|---|---|---|---|---|---|---|---|---|
| Where2Getit | Outback Steakhouse Gift Cards | Internet | $1.00 | Low | Danbury | CT | 209-240-18** | 0:32 | 10/15/2008 - 05:46:51 |
| Where2Getit | Outback Steakhouse Gift Cards | Internet | $3.00 | Medium | Chicago | IL | 773-508-40** | 0:17 | 10/09/2008 - 05:59:57 |
| Where2Getit | Outback Steakhouse Santa Barbara | Internet | $3.00 | Medium | | | 883-063-40** | 0:10 | 09/16/2008 - 04:03:14 |
| Where2Getit | Outback Steakhouse Santa Barbara | Internet | $3.00 | Medium | Santa Barbara | CA | 805-680-12** | 8:20 | 09/16/2008 - 03:24:09 |
| Where2Getit | Outback Steakhouse Santa Barbara | Internet | $1.00 | Low | | | 241-879-22** | 0:10 | 09/16/2008 - 02:25:37 |
| Where2Getit | Outback Steakhouse Santa Barbara | Internet | $1.00 | Low | Merion Station | PA | 610-667-42** | 10:00 | 09/16/2008 - 03:30:13 |
| Where2Getit | Outback Steakhouse Santa Barbara | Internet | $1.00 | Low | Santa Barbara | CA | 805-680-12** | 8:20 | 09/15/2008 - 09:21:36 |
| Where2Getit | Outback Steakhouse | Internet | $1.00 | Low | Santa | CA | 805-680-12** | 8:20 | 09/15/2008 - 09:21:36 |

RingRevenue | Track calls like clicks. | Home | Campaigns | Reports | Account | Help | Logout

Edit Campaign

Step
- \>\> 1. Overview
- \>\> 2. Call Pricing
- \>\> 3. Target Regions
- \>\> 4. Call Treatment
- \>\> 5. Hours
- \>\> 6. Target Profile
- \>\> 7. Keywords
- \>\> 8. Creatives Step 6: Target Profile — *161*

☐ Show All Fields

☐ Gender
☐ Age
☐ Household income
☐ Marital status
☐ Education
☐ Ethnicity
☐ Calling from

*162*

[Next] [Done]

*FIG. 17*

RingRevenue | Track calls like clicks. | Home | Campaigns | Reports | Account | Help | Logout

Edit Campaign

Step
- >> 1. Overview
- >> 2. Call Pricing
- >> 3. Target Regions
- >> 4. Call Treatment
- >> 5. Hours
- >> 6. Target Profile
- >> 7. Keywords
- >> 8. Creatives

Step 6: Target Profile

☑ Show All Fields

☐ Gender — None / Low / Medium / High
- Male
- Female

☐ Age — None / Low / Medium / High
- 18-24
- 25-34
- 35-44
- 45-54
- 55-64
- 65+

☐ Household income — None / Low / Medium / High
- $0 - 30K
- $30 - 60K
- $60 - 100K
- $100K+

☐ Marital status — None / Low / Medium / High
- Married
- Single

☐ Education — None / Low / Medium / High
- No College
- College
- Gradudate School ☐ Ethnicity — None / Low / Medium / High
- Caucasian
- African American
- Asian
- Hispanic
- Other ☐ Calling from — None / Low / Medium / High
- Mobile
- Landline - Home
- Landline - Buisness

[Next] [Done]

*FIG. 18*

RingRevenue - Track Calls Like Clicks https://www.ringrevenue.com/affiliates/2

RingRevenue   Campaigns | Reports | Account | Logout

Track calls like clicks.

Notifications — 41
Welcome to the pay-per-call beta trial!
You have 1 campaign expiring within 30 days.

Quick Stats — 49

| Call Quality | # Calls | % Calls | This Month Earnings |
|---|---|---|---|
| High | 0 | - | $0.00 |
| Medium | 0 | - | $0.00 |
| Low | 0 | - | $0.00 |
| No Payout | 0 | - | $0.00 |
| Total | 0 | - | $0.00 |

Rob D's Campaigns — 42

| Status | Campaign | Category | Total Calls | Earnings | Manage Campaigns |
|---|---|---|---|---|---|
| Active | BabyFans - Direct Mail | Family> Babies | 2 | $6.00 | Numbers \| Creative Reports |
| Active | BabyFans - SAS Card | Family> Babies | 54 | $345.50 | Numbers \| Creative Reports |
| Active | Intuit Accountant | Buisness> productivity Tools | 1 | $10.00 | Numbers \| Creative Reports |
| Active | QuickBooks Point Of Sale | Buisness> productivity Tools | 1 | $25.00 | Numbers \| Creative Reports |
| Active | Top Cash Flows | Financial Services> Real Estate Service | 9 | $68.00 | Numbers \| Creative Reports |
| Active | WineSmith | Food & Drinks> Wine & Spirits | 2 | $10.00 | Numbers \| Creative Reports |

43 — 44 — 45 — 46

Apply to New Campaigns — 47

| Advertiser | Campaign | Category | Call Price | Avg. EPC | Apply ▼ |
|---|---|---|---|---|---|
| Baby Fans | | Family> Babies | $10.00 | | Apply |
| University of Phoenix | Test | Education> College | $100.00, 50.00, 10.00 | - | Apply |
| Scott Herriman Ad Pro | Save - Infastructure Test | Computer & Electronics> Computer Sup... | $0.00, 0.00, 0.00 | - | Apply |
| Outback Steakhouse | Outback Steakhouse - LA | Food & Drinks> Restaurants | $2.00, 1.00, 0.50 | - | Apply |
| Outback Steakhouse | Outback Steakhouse - SB | Food & Drinks> Restaurants | $5.00, 3.00, 1.00 | $3.38 | Apply |
| Outback Steakhouse | Outback Steakhouse Gift Cards | Food & Drinks> Restaurants | $5.00, 3.00, 1.00 | $3.00 | Apply |
| Scott Herriman Ad Pro | Production Test 866-683-1041 | Computer & Electronics> Computer Sup... | $2.00, 1.00, 1.00 | $0.26 | Apply |
| Merrill Lynch | RingRevenue - Affiliate Summit | Telecommunications> Online/Wireless | $50.00, 20.00, 5.00 | $20.00 | Apply |
| Merrill Lynch | Merrill Lynch | Financial Services> Investment | $100.00, 50.00, 20.00 | $45.45 | Apply |

RingRevenue | Track calls like clicks. | Campaigns | Reports | Account | Help | Logout

University of Phoenix: University of Phoenix

Campaign Overview

| | |
|---|---|
| Category: | Education> College |
| Start Date: | 09/30/2008 |
| Expiration Date: | Ongoing |
| Description: | Looking for campus or online university-level programs that are convenient, yet high quality? University of Phoenix provides nearby campus locations, online degree programs and flexible scheduling for working students. Our campus and online degree programs cover fields such as business and management, communications, criminal justice and security, education, general studies, nursing and health care, human services, psychology, and technology. Whether you attend class on campus or online, University of Phoenix enables you to earn your college degree without putting your life on hold. |

Call Quality & Targeting Criteria

Call quality is determined by a proprietary algorithm that evaluates calls based on targeting criteria (geography and other demographics) and call characteristics (length of call, actions by callers, etc). Below are some of the quality attributes for this campaign:

| | |
|---|---|
| Time of Call: | 24/7 Operation |
| Target Regions: | All US |
| Target Caller Profile: | Gender<br>Male - None<br>Female - None<br>Age<br>18-24 - None<br>25-34 - None<br>35-44 - None |

Campaign Pricing

Dynamic Quality Pricing Per Call (H, M, L):   $100.00, 50.00, 10.00

Campaign Creative

No Creative Available

Application and Agreement to Terms

By applying to this campaign you agree to be compensated according to the pay-per-call pricing outlined for this campaign and to make reasonable efforts to target promotions based on the call quality targeting criteria specified.

☐ I have read the terms and agree to operate within them.

[Apply]

*FIG. 22*

RingRevenue — Track calls like clicks.

Home | Campaigns | Reports | Account | Help | Logout

Campaigns

All | By Affiliate | By Promo Number    ⊕ Create A New Campaign

Campaigns By Affiliate

| Affiliate | Campaign | Category | Call Price | Experation Date | Status | Applied ▸ |
|---|---|---|---|---|---|---|
| Paul R | Save your 401K | Financial Sevices> Investment | $1.00 | 10/14/2008 | Applied | Approve — 48d |

RingRevenue — Track calls like clicks. | Account | Help | Logout

Advertiser Campaign Visibility

| Advertiser | Campaign | Visible to | |
|---|---|---|---|
| Baby Fans | BabyFans - Direct Mail | ☐ | 2 affiliates |
| Baby Fans | BabyFans - Email | ☐ | 0 affiliates |
| Baby Fans | BabyFans - SAS Card | ☐ | 4 affiliates |
| Baby Fans | Test | ☑ | all affiliates |
| H&H | H&H Test! | ☑ | all affiliates |
| Intuit | Intuit Accountant | ☑ | all affiliates |
| Intuit | QuickBooks Point Of Sale | ☑ | all affiliates |
| Intuit | Quicken 2009 | ☑ | all affiliates |
| Merrill Lynch | Merrill Lynch | ☑ | all affiliates |
| Merrill Lynch | RingRevenue - Affiliate Summit | ☑ | all affiliates |
| Outback Steakhouse | Outback Steakhouse - Santa Barbara | ☑ | all affiliates |
| Outback Steakhouse | Outback Steakhouse - LA | ☑ | all affiliates |
| Outback Steakhouse | Outback Steakhouse Gift Cards | ☑ | all affiliates |
| Outback Steakhouse | Save your 401K | ☑ | all affiliates |
| Scott Herriman Ad Pro | Production Test 866-683-1041 | ☑ | all affiliates |
| Scott Herriman Ad Pro | Save - Infastructure Test 866-683-1043 | ☑ | all affiliates |
| Top Cash Flows | Top Cash Flows | ☑ | all affiliates |
| University of Phoenix | University of Phoenix | ☑ | all affiliates |
| WineSmith | WineSmith | ☑ | all affiliates |

[Done]

*FIG. 29*

RingRevenue — Track calls like clicks.

Account | Help | Logout

Baby Fans: BabyFans - SAS Card

| Affiliate | Campaign Visible | Hidden |
|---|---|---|
| Paul R | ○ | ⊙ |
| Rob D | ○ | ⊙ |
| Rob Duva Test | ⊙ | ○ |
| Scott Herriman | ⊙ | ○ |
| Test Affiliate | ⊙ | ○ |
| Todd Wilson | ○ | ⊙ |
| WeCanSellAnyting | ⊙ | ○ |
| Where2GetIt | ⊙ | ○ |

26

[Done]

*FIG. 30*

RingRevenue

Track calls like clicks.

Account | Help | Logout

Advertiser Campaign Visibility

| Advertiser | Campaign | Visible to |
|---|---|---|
| Baby Fans | BabyFans - Direct Mail | ☐ 2 affiliates |
| Baby Fans | BabyFans - Email | ☐ 0 affiliates |
| Baby Fans | BabyFans - SAS Card | ☐ 4 affiliates |
| Baby Fans | Test | ☑ 2 affiliates |

[Done]

Promotional Methods
*Please specify any promotional restrictions below*

| Online | Allowed? | Notes |
|---|---|---|
| Content / Review Site | ✓ | |
| Discount / Coupon Site | ✓ | |
| Display | ✓ | |
| Email | ✓ | |
| Rewards / Incentive | ✓ | |
| Lead Form / Co Reg | ✓ | |
| Search | ✓ | |
| Social Media | ✗ | ✎ Must obtain prior permission |
| Software | ✓ | |
| Other | ✓ | |

4005, 4015, 4017, 4010, 4020, 4030, 4040, 4050, 4060, 4070, 4080, 4090, 4095

METHODS AND SYSTEMS FOR PROCESSING AND MANAGING TELEPHONIC COMMUNICATIONS USING RING POOLS

CROSS REFERENCE TO RELATED APPLICATIONS

This application is a continuation-in-part of U.S. patent application Ser. No. 13/563,493, filed Jul. 31, 2012, which is a continuation of U.S. patent application Ser. No. 13/455,845 filed Apr. 25, 2012, now U.S. Pat. No. 8,238,540, which is a continuation-in-part of U.S. patent application Ser. No. 12/552,905, filed Sep. 2, 2009, which claims the benefit under 35 U.S.C. 119(e) of U.S. Provisional Application No. 61/095,255 filed Sep. 8, 2008, U.S. Provisional Application No. 61/107,269, filed Oct. 21, 2008, and U.S. Provisional Application No. 61/161,654, filed Mar. 19, 2009, the contents of which are incorporated herein by reference in their entirety.

COPYRIGHT RIGHTS

A portion of the disclosure of this patent document contains material that is subject to copyright protection. The copyright owner has no objection to the reproduction by any one of the patent document or the patent disclosure, as it appears in the patent and trademark office patent file or records, but otherwise reserves all copyright rights whatsoever.

FIELD OF THE INVENTION

The present invention relates to systems and methods for communication tracking and processing, and in particular, to methods and systems for utilizing ring pools and for tracking and processing phone communications, emails and/or other correspondence information.

BACKGROUND

Certain conventional systems provide for on-line initiated calls, sometimes referred to as "click-to-call". Click-to-call provides users accessing a web page including an advertisement with a dialogue box which requests the user's phone number and occasionally other information such as name and an affiliate code the user is requested to transcribe from the website. When provided, the number is transmitted to the advertiser along with the affiliate's contact information for commission purposes. The advertiser calls the user back, and any sale is consummated over the telephone.

The foregoing conventional solution has not been well received by the online advertising community for several reasons. First, it is counter-intuitive for users to send their phone number to the advertiser, when it is the user who wants to call the advertiser. When a user wants to call an advertiser, he or she generally wants to pick up his or her phone and actually call the advertiser. He or she doesn't want to send the advertiser his or her number and wait for a call back. Users are also wary of sending their telephone number to an advertiser using these types of dialogue boxes because of online fraud. Also, by the time the call is returned, the user might have lost interest in buying the product, or had already purchased the item elsewhere. When alternative advertising models are considered (such as television and newspaper which represent the vast majority of advertising dollars spent), the click-to-call functionality cannot be used. As a result of these deficiencies, the click-to-call mechanism has limited utility.

Although there has been a significant shift in the past decade towards the purchase of goods and services online, there are still a number of products purchased over the phone. However, many of these over-the-phone purchases are prompted by advertisements and promotions on the Internet. For media buyers, it is difficult to manage and measure the return on their investment for online, offline, and/or mobile advertisements that result in calls. In many cases, revenue is lost when a promotion results in a phone call that cannot be tracked back to the media buyer or web property carrying the advertisement.

Currently, there are organizations that publish content of interest to an audience of web users. Many of these organizations and distribution partners (termed "affiliates" or "publishers"), generate revenue through advertisements displayed in association with their content. Typically, the advertisements on a web page contain only a limited amount of information but link to advertiser web sites that provide further details including a phone number. If a potential customer calls the phone number instead of making the purchase online, there are a limited number of tools available to determine which advertisements resulted in that lead. This sales/lead tracking and Return On Investment (ROI) optimization is particularly challenging when there are multiple advertisements displayed on different online advertising channels while the sales transaction takes place in another medium (e.g., wireline and wireless telephony). In the case where a single advertisement is associated with a designated phone number and a suitable call tracking solution, the ad's performance is clear; all calls to the phone number and all sales that resulted from the calls are driven by the aforementioned ad. However, it is rare that an advertising campaign only consists of a single ad and that the ad is placed in a single advertising channel. A business with a series of online, offline, and/or mobile promotions (e.g., separate media outlets) will not likely be able to determine which advertisements were the most effective if all of the advertisements drive calls to one phone number.

Similarly, over the past few years, the market for the purchase of search keywords has exploded. In this form of advertising, a purchased advertisement is included within a result page of a keyword search on a search engine. With these advertisements, it is difficult to determine which purchased keywords are the most effective, particularly if the transaction takes place in a separate medium (e.g., telephony). As with other forms of online, offline, and/or mobile advertisements, if multiple keywords are purchased, the merchant or affiliate traditionally will not be able to determine which keywords generated a positive return on investment and which did not.

SUMMARY OF INVENTION

Methods and systems are described for facilitating communication-related tracking and processing.

The present invention is also related to marketing and telecommunications, and in particular, to methods and systems which can be utilized for tracking sales/leads, optimizing and organizing advertising campaigns where phone calls and optionally phone numbers are used creatively to track and manage ad spending. For example, certain embodiments track phone calls driven by each advertisement and associate meaningful values to each call that identify the attributes of the traffic source.

A given embodiment may include some or all of the features, functionality, systems and methods described herein.

An example embodiment provides a method of call routing, the method comprising: assigning, by a marketing automation computing system, one or more phone numbers to one or more media elements within a marketing campaign, wherein a first media element of the marketing campaign comprises a web-based landing page; detecting, by the marketing automation computing system, one or more actions by a first customer prospect in association with the one or more media elements within the marketing campaign; enhancing a lead score associated with the first customer prospect based at least in part on the detected one or more actions of the first customer prospect with the one or more media elements; receiving, at the marketing automation computing system, a call directed to a first of the one or more assigned phone numbers assigned to the one or more media elements, wherein a caller identification number is included in call signaling information associated with the received call; determining, by the marketing automation computing system, based at least in part on the call signaling information associated with the received call that the call is from the first customer prospect; and routing the call directed to the first of the one or more assigned phone numbers assigned to the one or more media elements, by the marketing automation computing system, based at least in part on the lead score of the first customer prospect; and, optionally wherein the one or more media elements comprise an email; and, optionally dynamically assigning, by the marketing automation computing system, the one or more phone numbers in response to at least a first condition; and, optionally wherein the first condition comprises a display of the web landing page; and, optionally wherein the first condition comprises a display of the web landing page; and, optionally wherein the first condition comprises a display of a video on the web landing page; and, optionally wherein the first condition comprises a download; and, optionally wherein routing the call directed to the first of the one or more assigned phone numbers assigned to the one or more media elements, further comprises generating an outbound call and bridging the received call and the outbound call; and, optionally wherein the call routing is to a call center; and, optionally wherein the customer prospect is an existing customer; and, optionally wherein the call routing is to a sales agent; and, optionally detecting, by the marketing automation computing system, one or more actions by a second customer prospect in association with the one or more media elements within the marketing campaign; enhancing a lead score associated with the second customer prospect based at least in part on the detected one or more actions of the second customer prospect; receiving at the marketing automation computing system, a second call directed to the one or more assigned phone numbers wherein a caller identification number is included in call signaling information associated with the received second call; determining, by the marketing automation computing system, from the call signaling information associated with the received second call that the second call is from the second customer prospect; and routing the second call by the marketing automation computing system, based at least in part on the lead score associated with the second customer prospect.

An example embodiment provides a of call routing, the method comprising: associating, by a marketing automation computing system, one or more phone numbers with one or more media elements within a marketing campaign, wherein a first media element of the marketing campaign comprises a web-based landing page; querying a data store to determine one or more attributes associated with a customer prospect; enhancing a lead score associated with the customer prospect based at least in part on the one or more determined attributes associated with the customer prospect; receiving, at the marketing automation computing system, a call directed to the one or more assigned phone numbers, wherein a caller identification number is included in call signaling information associated with the received call; determining by the marketing automation computing system, from the call signaling information associated with the received call that the call is from the customer prospect; and routing the call by the marketing automation computing system, based at least in part on the lead score of the customer prospect; and, optionally wherein the call routing is to a call center; and, optionally wherein the data store query is a query over a data network to an external data base; and, optionally wherein a customer prospect attribute is the customer prospect's gender; and, optionally wherein a customer prospect attribute is the customer prospect's corporate title; and, optionally wherein the data store query uses as a query parameter the customer prospect's phone number; and, optionally wherein routing the call further comprises generating an outbound call and bridging the received call and the outbound call; and, optionally wherein the call routing is to a sales agent; wherein the customer prospect is an existing customer.

An example embodiment provides a system comprising: at least one computer processor; a non-transitory memory embodied with a computer program comprising instructions which when executed by the at least one computer processor performs operations comprising: assigning one or more phone numbers to one or more media elements within a marketing campaign, wherein a first media element of the marketing campaign comprises a web-based landing page; detecting one or more actions by a first customer prospect in association with the one or more media elements within the marketing campaign; enhancing a lead score associated with the first customer prospect based at least in part on the detected one or more actions of the first customer prospect with the one or more media elements; receiving a call directed to a first of the one or more assigned phone numbers assigned to the one or more media elements, wherein a caller identification number is included in call signaling information associated with the received call; determining based at least in part on the call signaling information associated with the received call that the call is from the first customer prospect; and routing the call directed to the first of the one or more assigned phone numbers assigned to the one or more media elements, by the marketing automation computing system, based at least in part on the lead score of the first customer prospect.

An example embodiment provides a method of processing calls, comprising: automatically assigning a phone address to a first entity; recording in computer readable memory call quality rating criteria; receiving at a call bridging system coupled to at least one network, a call from a caller directed to the phone address wherein the call is associated with call signaling information; based at least in part on one or more call quality indicators associated with the caller call, assigning the caller call to a first location in a call queue; generating an outbound call from the call bridging system; bridging the inbound and the outbound call; comparing parameters of the caller call and/or the bridged call to the call quality rating criteria; and recording an indication of the successful bridging of the calls in association with a first entity identifier.

An example embodiment provides a method of processing calls, comprising: assigning a phone address to an advertising campaign in response to a request received over a data network; storing in computer memory call quality rating criteria; receiving at a call bridging system coupled to at least one network, a call from a caller directed to the phone address wherein the call is associated with call signaling information; generating an outbound call from the call bridging system; bridging the inbound and the outbound call; comparing one or more parameters of the received call and/or the bridged call to the call quality rating criteria; and crediting the affiliate for the bridged call based at least in part on the comparison of the one or more parameters with the call quality rating criteria.

An example embodiment provides a method of processing call information, comprising: storing in computer readable memory call quality rating criteria; receiving at a call bridging system coupled to at least one network, a request over a data network from a user to receive a call; generating at the call bridging system a first outbound call to the user; generating a second outbound call from the call bridging system; bridging the first and second outbound calls; comparing one or more parameters of the received call and/or the bridged call to the call quality rating criteria; and crediting an affiliate for the bridged call based at least in part on the comparison of the one or more parameters with the call quality rating criteria.

An example embodiment provides a method of phone communications, comprising: creating an information object in a server system; storing the information object in computer readable memory; assigning a phone address to the information object; making available the information object from an affiliate server to an advertiser server over a data network in response to a user gesture with respect to a web page; enabling the display of the phone address to the user on an advertiser's web page; receiving at a call bridging system coupled to at least one network, a call from the user directed to the phone address, wherein the call is associated with call signaling information; generating an outbound call from the call bridging system to a number specified by the advertiser; bridging the inbound and the outbound call; and crediting the affiliate with respect to the bridged call.

An example embodiment provides a method of processing telecommunications comprising: assigning a phone address for use with an advertising campaign; receiving at a call bridging system coupled to at least one network, a call from a caller directed to the phone address; generating an outbound call from the call bridging system to a number specified in an advertising campaign; bridging the inbound and the outbound call to form a bridged call; monitoring one or more call parameters; comparing one or more call parameters against a set of threshold values that includes at least one threshold value; rejecting at least one subsequent call to the phone address based on the comparison exceeding a first threshold value; and crediting an affiliate for non-rejected bridged calls and inhibiting crediting the affiliate for rejected calls.

An example embodiment provides a method of tracking and crediting call related information, comprising: assigning a phone address for use with an advertising campaign; storing in a tangible computer readable medium call quality rating criteria; receiving at a call bridging system coupled to at least one network, a call from a caller directed to the phone address; based at least in part on the phone address called, play a selected voice prompt to the caller; generating an outbound call from the call bridging system based at least in part on a caller's response to one or more voice prompts and a phone address specified by the advertiser; bridging the inbound and the outbound call; comparing one or more parameters of the caller call and/or the bridged call to the call quality rating criteria; and crediting an affiliate for the bridged call based at least in part of the comparison.

An example embodiment provides a tangible computer-readable medium having computer-executable instructions stored thereon that, if executed by a computing device, cause the computing device to perform a method comprising: assigning a phone address to an advertising campaign in response to a request received over a data network; storing in computer memory call quality rating criteria; receiving a call from a caller directed to the phone address wherein the call is associated with call signaling information; initiating an outbound call; causing the inbound and the outbound call to be connected; comparing one or more parameters of the received call and/or the connected call to the call quality rating criteria; and crediting an affiliate for the connected call based at least in part on the comparison of the one or more parameters with the call quality rating criteria. Certain embodiments provide systems and methods for routing calls to promotional phone numbers (such as promotional phone numbers, which may be any form of phone address including numbers and/or other characters) to destination phone numbers, such as those associated with an advertiser. Optionally, promotional phone numbers may be dynamically generated and rapidly provisioned to affiliates of the advertisers.

An example embodiment provides a method of managing a pool of phone addresses, the method comprising: receiving, over a data network, at a communication management system, a first set of parameter values associated with a first user selection of a first item of information provided by a publisher for display on a terminal of the first user, wherein the first item of information is provided for display at a first location in a first user interface and the first set of parameter values includes information indicating that first location; establishing a first number pool phone address assignment by assigning, by the communication management system, a first number pool phone address from a phone address number pool to the first set of parameter values; storing in computer memory the first number pool phone address assignment; providing the assigned first number pool phone address over the data network to a first information provider associated with the first item of information, wherein at least partly in response to the first user selection of the first item of information, the assigned first number pool phone address is displayed on the terminal of the first user in association with a second item of information; receiving at the communication management system a first inbound call from the first user directed to the first number pool phone address, wherein the first inbound call is associated with first call signaling information; generating a first outbound call from the communication management system to a second phone address based at least in part on the first call signaling information; bridging the first inbound call and the first outbound call to provide a first completed call; storing an indication in memory that the publisher is to be credited with respect to the first completed call; receiving, over the data network, at the communication management system, a second set of parameter values associated with a second user selection of a third item of information provided by the publisher for display on a terminal of the second user, wherein the third item of information is provided for display at a second location and the second set of parameter values include information indicating that second location; comparing the first set of parameter values and the set of second parameter values and if the first set of parameter values does not correspond to the second set of parameter values: assigning, by the communication management system, a second number pool phone address from the phone address number pool to the second set of parameter values; storing in computer memory the second number pool phone address assignment; providing the assigned second number pool phone address over the data network to the first information provider, wherein the first information provider is associated with the third item of information, wherein at least partly in response to the second user selection of the third item of information, the assigned second number pool phone address is displayed on the terminal of the second user in association with a fourth item of information; at least partly in response to receiving at the communication management system a second inbound call from the second user directed to the assigned second number pool phone address, wherein the second inbound call is associated with second call signaling information, generating a second outbound call from the communication management system to a third phone address based at least in part on the second call signaling information; bridging the second inbound call and the second outbound call to provide a second completed call; storing an indication in memory that the publisher is to be credited with respect to the second completed call; and, optionally wherein if the first set of parameter values corresponds to the second set of parameter values, the second number pool phone address is not assigned to the second set of parameters; and, optionally wherein if the first set of parameter values corresponds to the second set of parameter values then the first location is the same as the second location; and, optionally wherein the first item of information includes the same information as the second item of information; and, optionally wherein the second user is a plurality of users; and, optionally, displaying over the data network by the communication management system a transaction report listing one or more completed calls and their associated parameter values; and, optionally wherein the second set of parameter values is a plurality of sets of parameter values and the second number pool phone address is a plurality of phone addresses; and, optionally wherein the first set of parameter values or the second set of parameter values is a set of one or more parameter values; and, optionally receiving, over the data network, at the communication management system, a third set of parameter values associated with a third user selection of a fourth item of information provided by the publisher for display on a terminal of the third user, wherein the fourth item of information is provided for display at a third location and the third set of parameter values include information indicating that third location; comparing the third set of parameter values to the first set of parameter values and the second set of parameter values, and if the third set of parameter values does not correspond to the first set of parameter values or the second set of parameter values; determining, by the communication management system, whether all phone addresses within the phone address number pool are assigned; if all phone addresses within the phone address number pool are assigned, then, further determining, for each assigned phone address in the phone address pool, a duration of time since the respective phone address was assigned to a respective set of parameters, and further determining, for each assigned phone address in the phone address pool, if the duration of time is less than a threshold time period, and at least partly in response to determining the duration of time for each of the assigned phone addresses in the phone address number pool is less than the threshold time period, assigning an overflow exceeded phone address to the third set of parameter values; at least partly in response to determining the duration of time for at least one of the assigned phone addresses in the phone address number pool is equal to or greater than the threshold time period, assigning a least active phone address of the assigned phone addresses in the phone address number pool whose duration of time is equal to or great than the threshold time period to the third set of parameter values; at least partly in response to determining that at least one phone address within the phone number pool is not assigned; assigning an unassigned address from the phone address number pool to the address to the third set of parameter values; storing in computer memory an indication as to which phone address is assigned to the third set of parameter values; wherein at least partly in response to the third user selection of the fourth item of information, the phone address assigned to the third set of parameter values is displayed on the terminal of the third user in association with a fifth item of information; receiving at the communication management system a third inbound call from the third user directed to the phone address assigned to the third set of parameter values, wherein the third inbound call is associated with third call signaling information; generating a third outbound call from the communication management system to a fourth phone address based at least in part on the third call signaling information; bridging the third inbound call and the third outbound call to provide a third completed call; and, storing an indication in memory that the publisher is to be credited with respect to the third completed call; and, optionally wherein the publisher is a publisher within a syndication of publishers; and, optionally wherein the assigned first number pool phone address and the assigned second number pool phone address are provided to the first information provider using an application programmatic interface.

An example embodiment provides a method of managing a pool of phone addresses, the method comprising: receiving, over a data network, at a communication management system, a first set of parameter values associated with a first user selection of a first item of information provided by a publisher for display on a terminal of the first user, wherein the first item of information is provided for display at a first location in a first user interface; assigning, by the communication management system, a first phone address from a phone address number pool to the first set of parameter values; storing in computer memory the first phone address assignment; receiving at the communication management system a first inbound call from the first user directed to the first phone address, wherein the first inbound call is associated with first call signaling information; generating a second outbound call from the communication management system to a second phone address based at least in part on the first call signaling information; bridging the first inbound call and the second outbound call to provide a first completed call; storing an indication in memory that the publisher is to be credited with respect to the first completed call; receiving, over the data network, at the communication management system, a second set of parameter values associated with a second user selection of a third item of information provided by the publisher for display on a terminal of the second user, wherein the third item of information is provided for display at a second location; comparing the first set of parameter values and the set of second parameter values and if the first set of parameter values does not correspond to the second set of parameter values: assigning, by the communication management system, a second phone address from the phone address number pool to the second set of parameter values; storing in computer memory the second phone address assignment, wherein if a second inbound call is received from the second user directed to the second phone address and the second inbound call is associated with a second call signaling information, then: generating a second outbound call from the communication management system to the second phone address based at least in part on the second call signaling information; bridging the second inbound call and the second outbound call to provide a second completed call; and, storing an indication in memory that the publisher is to be credited with respect to the second completed call; and, optionally receiving, over the data network, at the communication management system, a third set of parameter values associated with a third user selection of a fourth item of information provided by the publisher for display on a terminal of the third user, wherein the fourth item of information is provided for display at a third location and the third set of parameter values include information indicating the third location; comparing the third set of parameter values to the first set of parameter values and the second set of parameter values, and if the third set of parameter values does not correspond to the first set of parameter values or the second set of parameter values, determining, by the communication management system, if all phone addresses within the phone address number pool are assigned; at least partly in response to determining that all phone addresses within the phone address number pool are assigned, then determining by the communication management system, from the pool of assigned phone addresses a phone address with a least amount of associated inbound call activity, and assigning by the communication management system, the least active phone address from the phone address number pool to the third set of parameter values; at least partly in response to determining that at least one phone address within the phone address number pool is not assigned, assigning, by the communication management system, an unassigned phone address from the phone address number pool to the third set of parameter values; storing in computer memory an indication as to which phone address is assigned to the third set of parameter values; wherein at least partly in response to the third user selection of the fourth item of information, the phone address assigned to the third set of parameter values is displayed on the terminal of the third user in association with a fifth item of information; receiving at the communication management system a third inbound call from the third user directed to the phone address assigned to the third set of parameter values, wherein the third inbound call is associated with third call signaling information; generating a third outbound call from the communication management system to a fourth phone address based at least in part on the third call signaling information; bridging the third inbound call and the third outbound call to provide a third completed call; and, storing an indication in memory that the publisher is to be credited with respect to the third completed call; and, optionally wherein the first user, the second user, and the third user are the same user; and, optionally receiving, over the data network, at the communication management system, a third set of parameter values associated with a third user selection of a fourth item of information provided by the publisher for display on a terminal of the third user, wherein the fourth item of information is provided for display at a third location and the third set of parameter values include information indicating that third location; comparing the third set of parameter values to the first set of parameter values and the second set of parameter values, and if the third set of parameter values does not correspond to the first set of parameter values or the second set of parameter values: determining, by the communication management system, if all phone addresses within the phone address number pool are assigned; if all phone addresses within the phone address number pool are assigned, then, further determining, for each assigned phone address in the phone address pool, a duration of time since the respective phone address was assigned to a respective set of parameters, and further determining, for each assigned phone address in the phone address pool, if the duration of time is less than a threshold time period, and at least partly in response to determining the duration of time for each of the assigned phone addresses in the phone address number pool is less than the threshold time period, assigning an overflow exceeded phone address to the third set of parameter values; at least partly in response to determining the duration of time for at least one of the assigned phone addresses in the phone address number pool is equal to or greater than the threshold time period, assigning a least active phone address of the assigned phone addresses in the phone address number pool whose duration of time is equal to or great than the threshold time period to the third set of parameter values; at least partly in response to determining that at least one phone address within the phone number pool is not assigned, assigning an unassigned address from the phone address number pool to the address to the third set of parameter values; storing in computer memory an indication as to which phone address is assigned to the third set of parameter values; wherein at least partly in response to the third user selection of the fourth item of information, the phone address assigned to the third set of parameter values is displayed on the terminal of the third user in association with a fifth item of information; receiving at the communication management system a third inbound call from the third user directed to the phone address assigned to the third set of parameter values, wherein the third inbound call is associated with third call signaling information; generating a third outbound call from the communication management system to a fourth phone address based at least in part on the third call signaling information; bridging the third inbound call and the third outbound call to provide a third completed call; and, storing an indication in memory that the publisher is to be credited with respect to the third completed call; and, optionally wherein the communication management system further determines the third phone address based at least in part on an equal distribution of calls to two or more advertiser campaigns in a bundled campaign; and, optionally receiving from the first information provider over the data network at the communication management system information associated with a transaction associated with the bridged call; and, crediting the publisher based at least in part on the transaction; and, optionally wherein the transaction is a sale or an appointment; and, optionally receiving, over a data network, at a communication management system, a first set of parameter values associated with a first user selection of a first item of information provided for display on a terminal of the first user, wherein the first item of information is provided for display based at least in part in response to a media buyer purchase of a first adword; assigning, by the communication management system, a first phone address from a phone address number pool to the first set of parameter values; storing in computer memory the first phone address assignment; receiving at the communication management system a first inbound call from the first user directed to the first phone address, wherein the first inbound call is associated with a first call signaling information; generating a second outbound call from the communication management system to a second phone address based at least in part on the first call signaling information; bridging the first inbound call and the second outbound call to provide a first completed call; storing an indication in memory that the publisher is to be credited with respect to the first completed call; receiving, over the data network, at the communication management system, a second set of parameter values associated with a second user selection of a third item of information provided by the publisher for display on a terminal of the second user, wherein the third item of information is provided for display based at least in part in response to a media buyer purchase of a second adword; comparing the first set of parameter values and the set of second parameter values and if the first set of parameter values does not correspond to the second set of parameter values: assigning, by the communication management system, a second phone address from the phone address number pool to the second set of parameter values; storing in computer memory the second phone address assignment; receiving at the communication management system a second inbound call from the second user directed to the second phone address, wherein the second inbound call is associated with a second call signaling information; generating a second outbound call from the communication management system to the second phone address based at least in part on the second call signaling information; bridging the second inbound call and the second outbound call to provide a second completed call; and, storing an indication in memory that the publisher is to be credited with respect to the second completed call; and, optionally wherein the first adword is the same as the second adword.

Certain embodiments provide systems and methods for routing, such as routing communications associated with certain email addresses (e.g., promotional email addresses), URLs (e.g., promotional URLs), and other contact information to destination email addresses, URL'S and contact information. Certain embodiments providing systems and methods for sending SMS messages to a customer, affiliate, or advertiser are presented.

In certain example embodiments, an intuitive and user friendly interface is optionally provided that enables users to quickly and easily enter into and monitor advertising campaigns and transactions.

In certain example embodiments, a marketing and/or sales campaign is used. In a campaign, a provider of a product or service employs a collection of online and/or offline advertising practices to promote their product or service. Optionally the campaign can have a fixed or variable budget, a specified sales period (e.g., 6 months), and a target customer. Other campaign attributes are described below.

In certain example embodiments, campaign creation systems and methods are provided which enable users, such as advertisers or their agents, to generate new advertising campaigns, and enable other users, such as affiliates, to view and apply to these campaigns. In certain example embodiments, systems and methods are provided for approving campaigns. An affiliate may be an entity that is rewarded by an advertiser for a visitor or customer brought about by the affiliate's marketing efforts. For example, an affiliate may have a Website that promotes the services or products of another party. As discussed elsewhere herein, the affiliate Website may include an advertisement for another business (the advertiser), including a user interface for initiating a call or other communication with the advertiser.

In certain example embodiments, advertisers and/or third party agents of advertisers assign phone numbers for direct media placements that don't include affiliates and don't trigger commissions. Optionally, advertisers and/or third party agents track affiliate and non-affiliate campaigns using a single user interface and/or account.

In certain example embodiments, advertisers and/or third party agents of advertisers generate more than one advertising campaigns. Optionally, multiple campaigns and/or accounts can be joined or linked to simplify account access and administration (e.g., master account login with toggle access to other accounts).

In certain example embodiments, advertisers and/or third party agents of advertisers provide (e.g., upload) a collection of call records (e.g., a list of phone numbers) evaluated by the system using a collection of databases to determine expected costs of an advertising campaigns, recommended affiliate pricing of advertising campaigns, criteria to be used in establishing call quality, which advertising campaigns to target to which set of customers/users, which offer to provide which set of customers/users, media placement, etc.

In certain example embodiments, advertisers and/or third party agents of advertisers provide (e.g., upload) a collection of advertiser phone addresses (e.g., local or toll-free phone addresses) evaluated by the system using a collection of databases to determine which phone addresses will perform optimally in which campaigns. For example, a vanity toll-free number may out perform a local number (e.g., presents a larger corporate image) on a given offer. In another example, the system evaluates different toll-free vanity numbers on a given offer.

In certain example embodiments, a call price calculator and methods are provided that can be utilized to calculate and suggest call pricing values for users, such as advertisers. In certain example embodiments, systems and methods are provided for determining call quality. Call quality relates to whether a potential customer is likely to purchase goods or services from the advertiser. Thus, determining call quality may include determining the likelihood that a potential customer will purchase goods or services from the advertiser.

Certain embodiments provide systems and methods for creating interactive voice systems that sit in front of the call before transferring to the advertiser's call center. Certain embodiments provide systems and methods for using call quality to selectively direct calls to certain phone addresses or messages to terminals or to affect the place of a call in a phone queue. Certain embodiments provide systems and methods for setting which campaigns particular affiliates can view. Certain embodiments provide systems and methods for generating dynamic software code so that websites, text messages and other such displays (e.g., promotional communications) can dynamically display a promotional phone number, email, URL, and/or other contact information. Optionally, the phone number, email, URL, and/or other contact information may be different from the corresponding contact information which is considered the default for such websites, text messages, or other promotional displays.

Certain embodiments provide systems and methods for validating that an affiliate is registered with the affiliate network's website. This optionally enables an advertiser to prevent an affiliate from promoting a campaign that the advertiser does not want promoted. Certain embodiments provide systems and methods for enabling a user, such as an advertiser, to set the time or duration the affiliate promotional contact information may be used. Certain embodiments provide systems and methods for the advertiser or the affiliate to use click-to-call functionality in their websites. Certain embodiments provide systems and methods for enabling an advertiser to promote their own brand or website without an affiliate through the issuance of promotional phone numbers or other contact information by issuing the advertiser their own promotional contact information. Certain embodiments provide systems and methods for generating advertising creatives which may include the integration of promotional contact information. Optionally, the promotional contact information may be placed in the meta data of the creative, edited into the image of the creative directly, or attached to the top, bottom or side of the creative as a sidebar, hover, or slide-out.

One embodiment is a method of tracking and crediting promotional leads comprising: receiving at a call bridging system, a call from a caller directed to a phone address; generating an outbound call from the call bridging system; bridging the inbound and the outbound call; and sometimes comparing parameters of the bridged call to a call quality rating.

Another embodiment is a method of tracking and crediting promotional leads comprising: assigning a phone address; establishing a call quality rating for calls; receiving at a call bridging system coupled to at least one network, a call from a caller directed to the phone address wherein the call is associated with call signaling information; generating an outbound call from the call bridging system; bridging the inbound and the outbound call; sometimes comparing parameters of the bridged call to the call quality rating; and crediting an affiliate for the bridged call. Optionally, wherein the phone address is a toll-free phone number. Optionally, wherein the network comprises a public switched telephone network for both wireless and wireline communications and public and private data networks. Optionally, the method further comprising: recording at least a portion of the call audio; and making at least a portion of the recording available to an affiliate network or advertiser. Optionally, the method further comprising: recognizing words and/or phrases in the caller voice communication; comparing words and/or phrases from the first voice communication to a set of keywords and/or phrases; and if there is a match, storing in computer memory the detection of a keyword and/or phrase. Optionally, the method further comprising: comparing the calling party phone address in the call signaling information with the calling party phone address of previous calls in a configurable time period; and if there is a match, crediting the affiliate a default amount or an amount specified by the advertiser. Optionally, wherein the amount credited to an affiliate on a match is no credit amount.

Another embodiment is a method of tracking and crediting promotional leads in an affiliate network comprising: receiving at a call bridging system, a request from a user to receive a call; generating at the call bridging system a first outbound call to the user; generating a second outbound call from the call bridging system; bridging the first and second outbound calls; and sometimes comparing parameters of the bridged call to a call quality rating.

Another embodiment is a method of tracking and crediting promotional leads in an affiliate network comprising: establishing a call quality rating; receiving at a call bridging system coupled to at least one network, a request from a user to receive a call; generating at the call bridging system a first outbound call to the user; generating a second outbound call from the call bridging system; bridging the first and second outbound calls; comparing parameters of the bridged call to the call quality rating; and crediting an affiliate for the bridged call. Optionally, wherein the request from the user to receive a call is in response to the selection of a web page control. Optionally, wherein the network comprises a public switched telephone network for both wireless and wireline communications and public and private data networks. Optionally, the method further comprising: recording at least a portion of the call audio; and making at least a portion of the recording available to an affiliate network or advertiser. Optionally, the method further comprising: recognizing words and/or phrases in the caller voice communication; comparing words and/or phrases from the first voice communication to a set of keywords and/or phrases; and if there is a match, storing in computer memory the detection of a keyword and/or phrase. Optionally, the method further comprising: comparing the user's phone address with the calling party phone address of previous calls in a configurable time period; and if there is a match, crediting the affiliate a default amount or an amount specified by the advertiser. Optionally, wherein the amount credited to an affiliate on a match is no credit amount.

Another embodiment is a method of managing promotional leads comprising: creating an information object; assigning a phone address to the information object; exchanging the information object from an affiliate to an advertiser in response to a user gesture on a web page; and displaying the phone address to the user on an advertiser's web page.

Another embodiment is a method of managing promotional leads comprising: creating an information object in a server system; storing the information object in computer readable memory; assigning a phone address to the information object; exchanging the information object from an affiliate server to an advertiser server over a data network in response to a user gesture on a web page; and displaying the phone address to the user on an advertiser's web page. Optionally, the method further comprising: receiving at a call bridging system coupled to at least one network, a call from the user directed to the phone address, wherein the call is associated with call signaling information; generating an outbound call from the call bridging system to a number specified by the advertiser; bridging the inbound and the outbound call; and crediting the affiliate for the bridged call. Optionally, wherein the information object is an affiliate information object. Optionally, wherein the information object is web-based. Optionally, the method further comprising: receiving at a call bridging system coupled to a data and voice network, a request from the user to receive a call; generating at the call bridging system a first outbound call to the user; generating a second outbound call from the call bridging system to a number specified by the advertiser; bridging the first and second outbound calls; and crediting an affiliate for the bridged call.

Another embodiment is a method of monitoring promotional leads for fraud comprising: assigning a phone address; receiving at a call bridging system, a call from a caller directed to the phone address; generating an outbound call from the call bridging system; bridging the inbound and the outbound call to form a bridged call; monitoring call parameters; comparing one or more call parameters against a set of threshold values; and rejecting at least one subsequent call to the phone address based on the comparison exceeding a threshold value.

Another embodiment is a method of monitoring promotional leads for fraud comprising: assigning a phone address; receiving at a call bridging system coupled to at least one network, a call from a caller directed to the phone address; generating an outbound call from the call bridging system to a number specified in an advertising campaign; bridging the inbound and the outbound call to form a bridged call; monitoring call parameters; comparing one or more call parameters against a set of threshold values; rejecting at least one subsequent call to the phone address based on the comparison exceeding a threshold value; and crediting an affiliate for non-rejected bridged calls. Optionally, wherein a call parameter is the length of the call. Optionally, wherein a caller hears ring no answer, busy, or a recorded announcement if the call is rejected.

Another embodiment is a method of tracking and crediting promotional leads comprising: assigning a phone address; receiving at a call bridging system, a call from a caller directed to the phone address; play a voice prompt to the caller; generating an outbound call from the call bridging system based at least in part on the caller's response to one or more voice prompts and a phone address specified by the advertiser; and bridging the inbound and the outbound call.

Another embodiment is a method of tracking and crediting promotional leads comprising: assigning a phone address; establishing a call quality rating; receiving at a call bridging system coupled to at least one network, a call from a caller directed to the phone address; based at least in part on the phone address called, the calling party phone address, or other conditions as determined at least in part from these phone addresses; play a voice prompt to the caller; generating an outbound call from the call bridging system based at least in part on the caller's response to one or more voice prompts and a phone address specified by the advertiser; bridging the inbound and the outbound call; and crediting an affiliate for the bridged call. Optionally, wherein the caller's response is a generated dual-tone multi-frequency tone. Optionally, wherein the caller's response is a spoken command.

BRIEF DESCRIPTION OF THE FIGURES

The disclosed aspects will hereinafter be described in conjunction with the appended drawings, provided to illustrate and not to limit the disclosed aspects, wherein like designations denote the elements.

FIG. 4: is an illustration of an example embodiment of the home screen of an advertiser.

Figure 5:
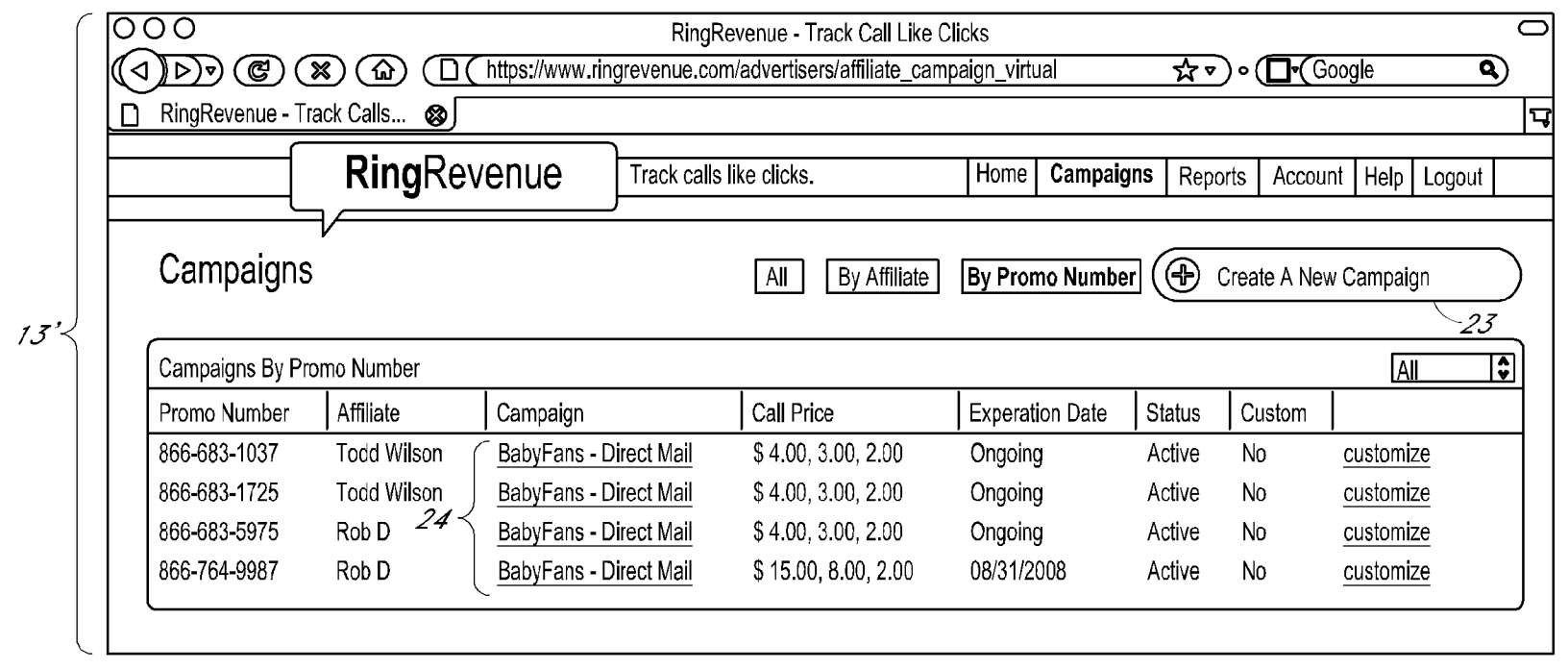

FIG. 5: is an illustration of an example embodiment for viewing various campaigns and campaign information.

FIG. 8: is an illustration of an example embodiment for viewing or modifying account settings.

Figure 10:
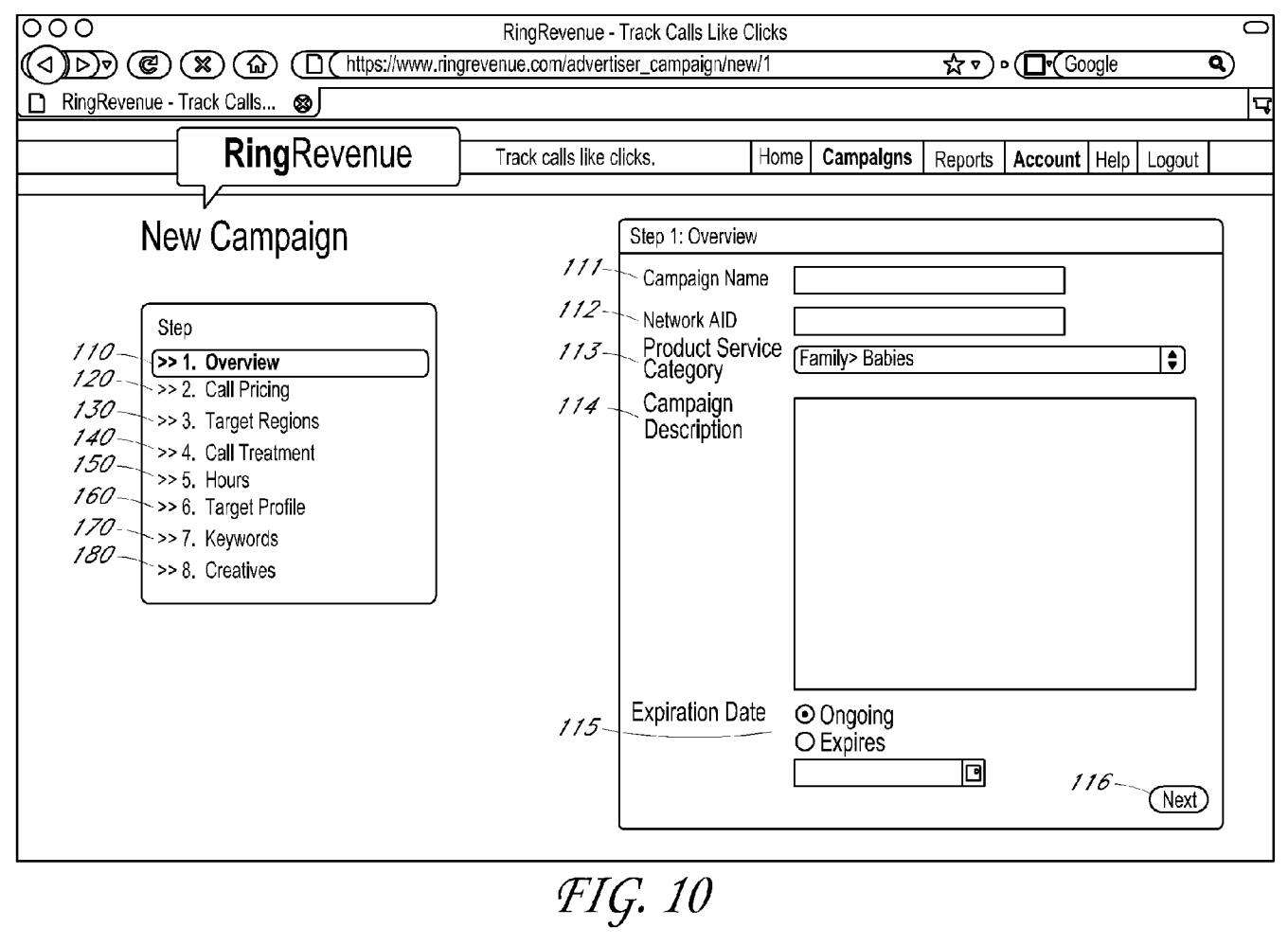

FIG. 10: is an illustration of an example embodiment for creating a new campaign which illustrates the overview submodule.

FIG. 12: is an illustration of an example embodiment for creating a new campaign which illustrates a call price calculator.

FIG. 16: is an illustration of an example embodiment for creating a new campaign which illustrates the hours of operation submodule.

FIG. 17: is an illustration of an example embodiment for creating a new campaign which illustrates the target profile submodule in a collapsed view.

FIG. 18: is an illustration of an example embodiment for creating a new campaign which illustrates the hours of operation submodule in an expanded view.

FIG. 21: is an illustration of an example embodiment of the home screen of an affiliate.

FIG. 22: is an illustration of an example embodiment which illustrates the campaign viewing module.

FIG. 23: is an illustration of an example embodiment which illustrates the campaign acceptance module.

FIG. 24: is an illustration of an example embodiment which illustrates the number selection submodule.

FIG. 28: is an illustration of an example embodiment of the home screen of the affiliate network.

FIG. 29: is an illustration of an example embodiment which illustrates the campaign visibility module of the affiliate network.

FIG. 30: is an illustration of an example embodiment which illustrates the change affiliates submodule.

FIG. 31: is an illustration of an example embodiment which illustrates the campaign visibility module of the affiliate.

FIG. 40: is an illustration of an example embodiment for configuring promotional methods associated with a campaign.

DETAILED DESCRIPTION OF PREFERRED EMBODIMENTS

Methods and systems are described for facilitating communication-related tracking and processing.

Figure 1:
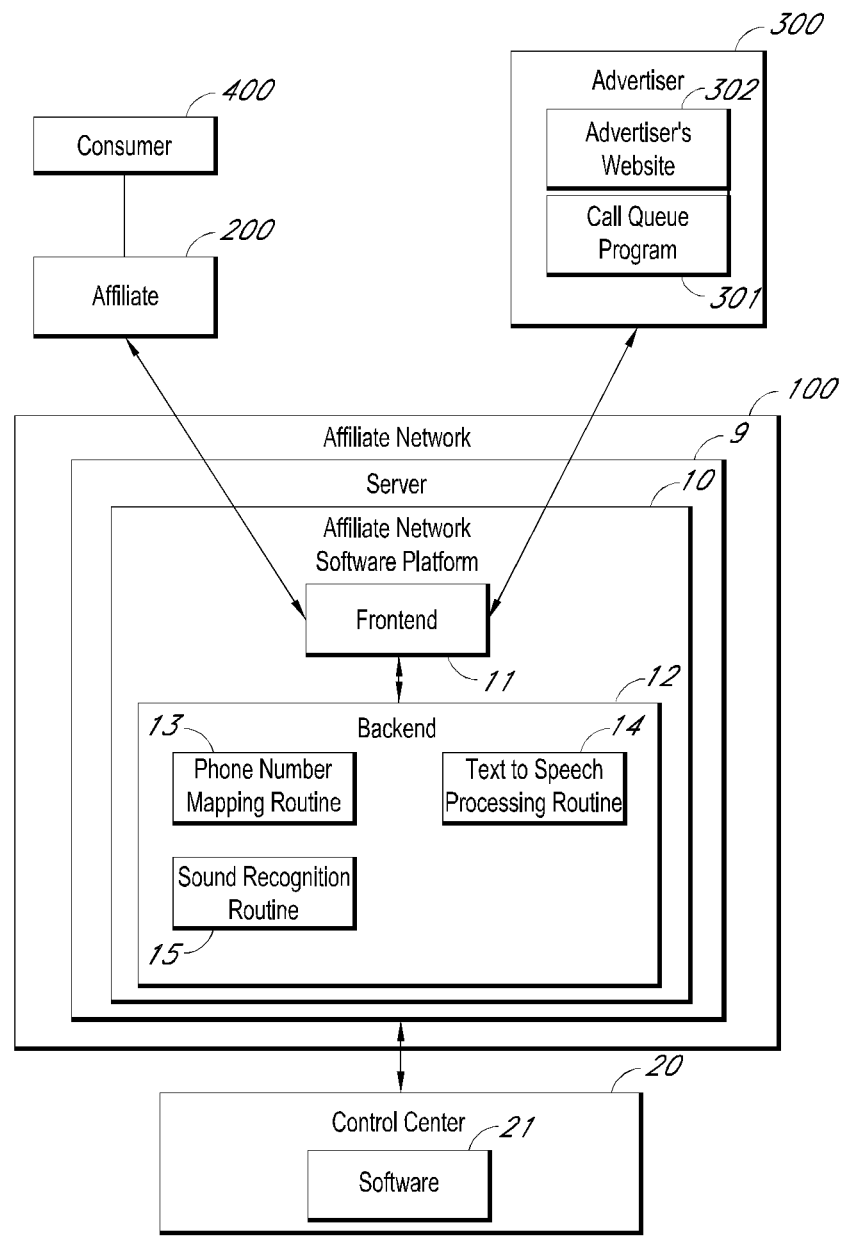
FIG. 1: illustrates an example system architecture.

FIG. 1: illustrates an example system architecture. As described herein, the illustrated system architecture can be used to facilitate telephonic, email, SMS, and other forms of communication. Certain embodiments process and track communications to facilitate online ordering of items, such as products or services. Thus, the illustrated system architecture can optionally be used to reduce the amount of revenue that would be lost by affiliates should a consumer decide to call an advertiser to make the purchase as opposed to ordering the item online via the affiliate Website. Additionally, the illustrated system architecture can optionally be used to increase the amount of revenue generated from offline or online advertising by including promotional contact information in the offline or online media.

As illustrated in FIG. 1, a consumer terminal 400 (e.g., a general purpose computer, an interactive television, a phone with data network capability, a networked game console, etc.) is coupled to an affiliate via an affiliate system 200 (which optionally hosts a website on a web server) over a network (e.g., the Internet). The affiliate system 200 is coupled over a network (e.g., the Internet) with an affiliate network via affiliate network system 100. The affiliate network system 100 includes a network interface, a server 9, and an affiliate network software platform 10 which executes on the server 9. The affiliate network software platform 10 includes a frontend 11, which communicates with the affiliate system 200 and with an advertiser system 300 (which includes a website 302 hosted on a web server, a call queue program 301, and a user terminal).

The affiliate network system 100 includes a backend 12. The backend 12 includes phone number mapping software 13, a text to speech system 14, and a sound/speech recognition system 15. The server 9 is coupled via a network to a control center system 20, which includes software 21.

Figure 3:
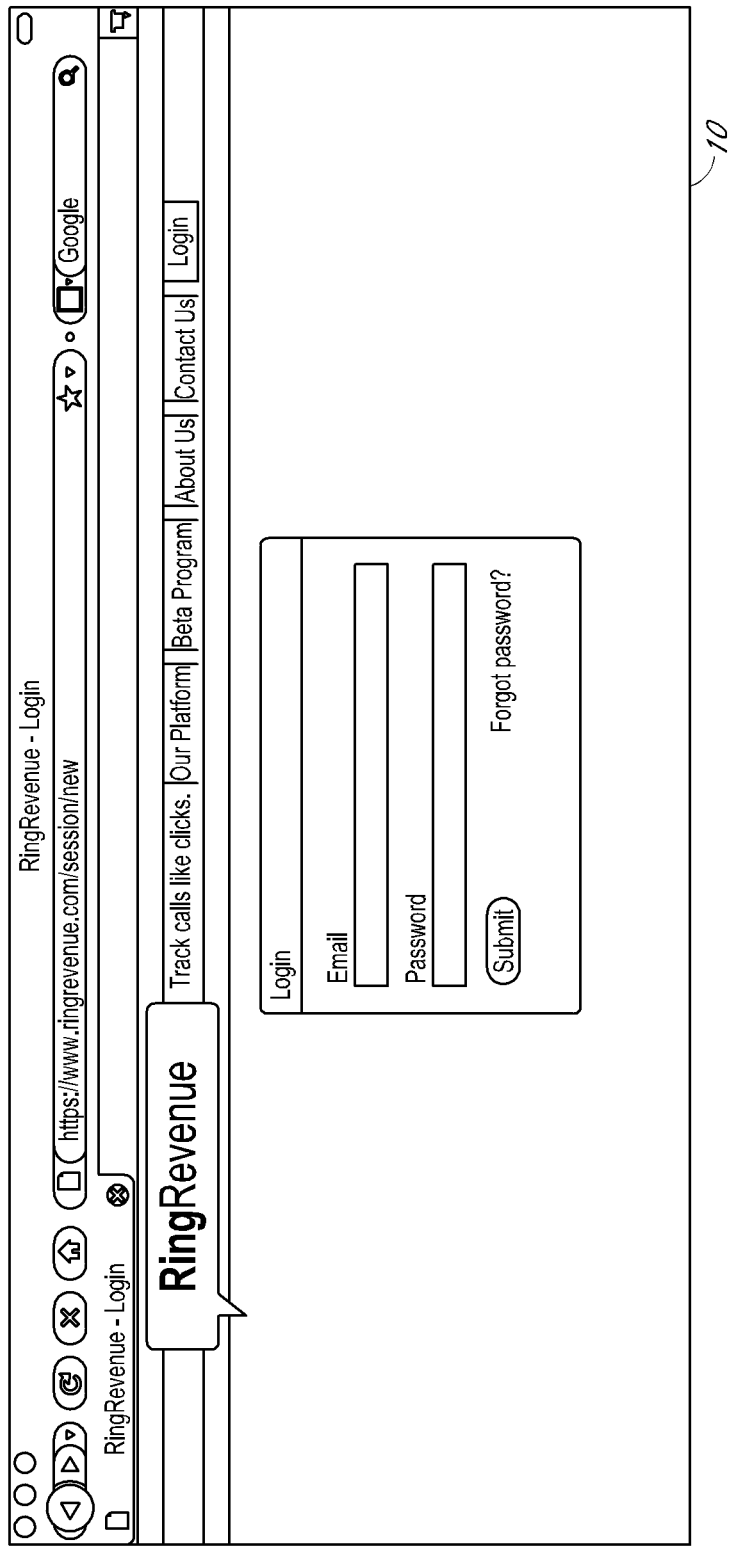
FIG. 3: is an illustration of an example embodiment of a login user interface of the software platform.
Figure 12:
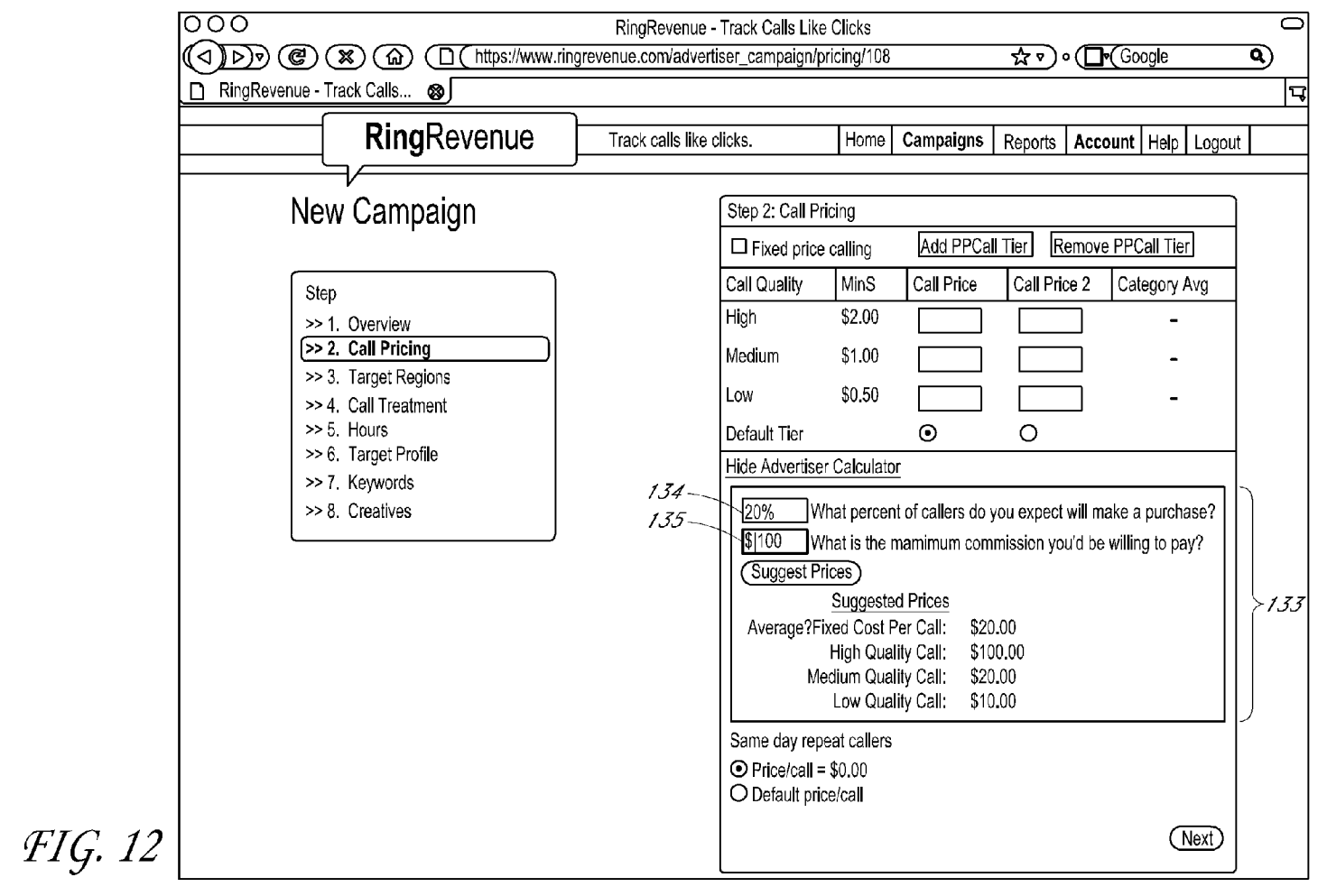
Figure 13:
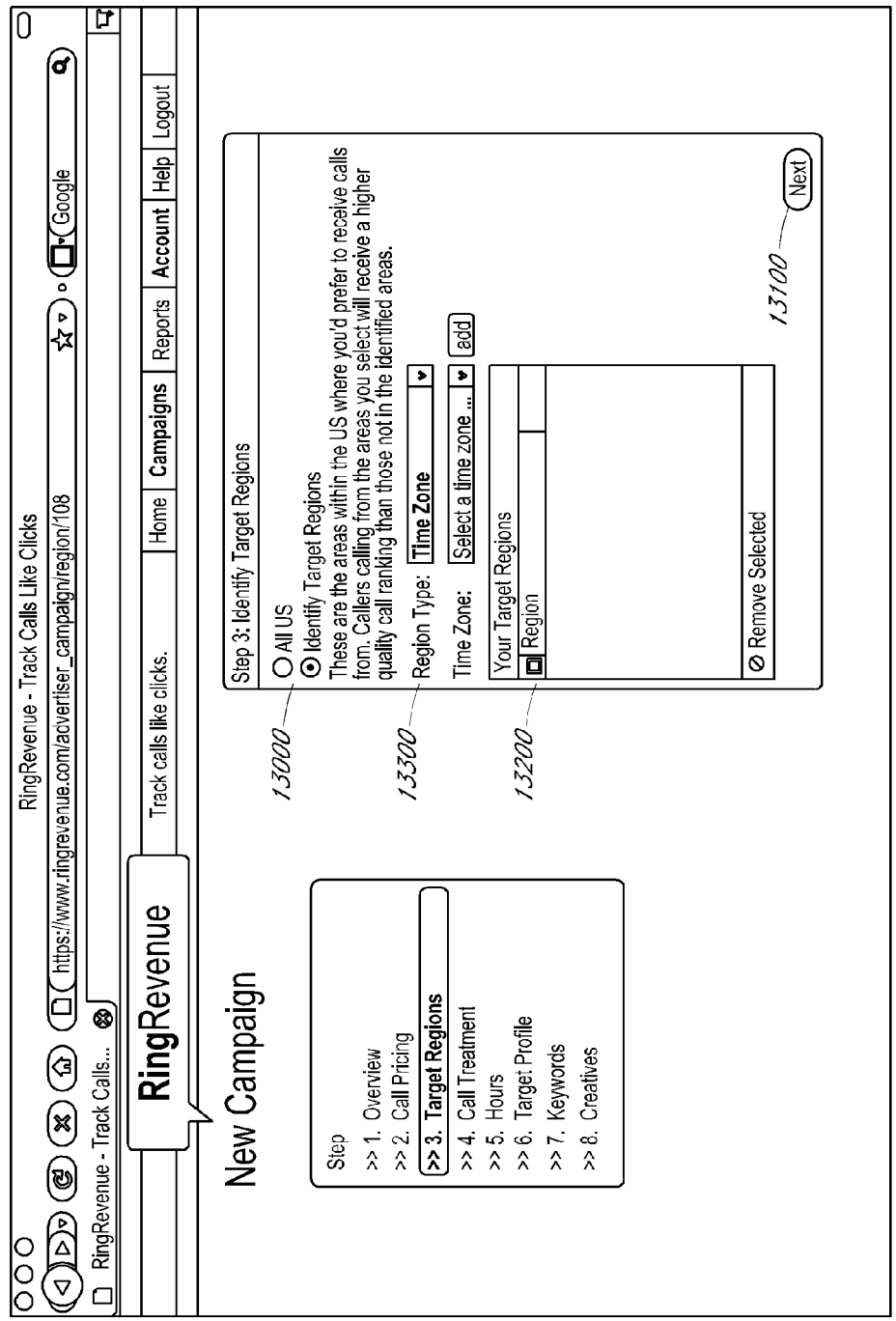
FIG. 13: is an illustration of an example embodiment for creating a new campaign which illustrates a target regions submodule.

As shown in FIGS. 1 and 3, in an example embodiment, the advertiser, via the advertiser system 300 logs into affiliate network software platform 10. The frontend software 11 is responsible for rendering the html code that the web browser of an advertiser or affiliate interprets. The backend software 12 is responsible for performing some or all of the processing, mapping, and database operations of the affiliate network website 302. The phone number mapping routine 13 included in the backend software 12 is responsible for mapping a promotional phone number to destination phone number 141 (as discussed in greater detail below with respect to FIGS. 12 & 13). The text to speech processing routine 14 is responsible for creating audio files of the text entered into the IVR routine of FIG. 15. The sound recognition routine 15 enables the backend 12 to recognize voice commands or telephone key tones for example. In the embodiment shown in FIG. 1, the control center 20 can route information, software, or permissions to the affiliate network system 100 using its own control center software 21.

Figure 28:
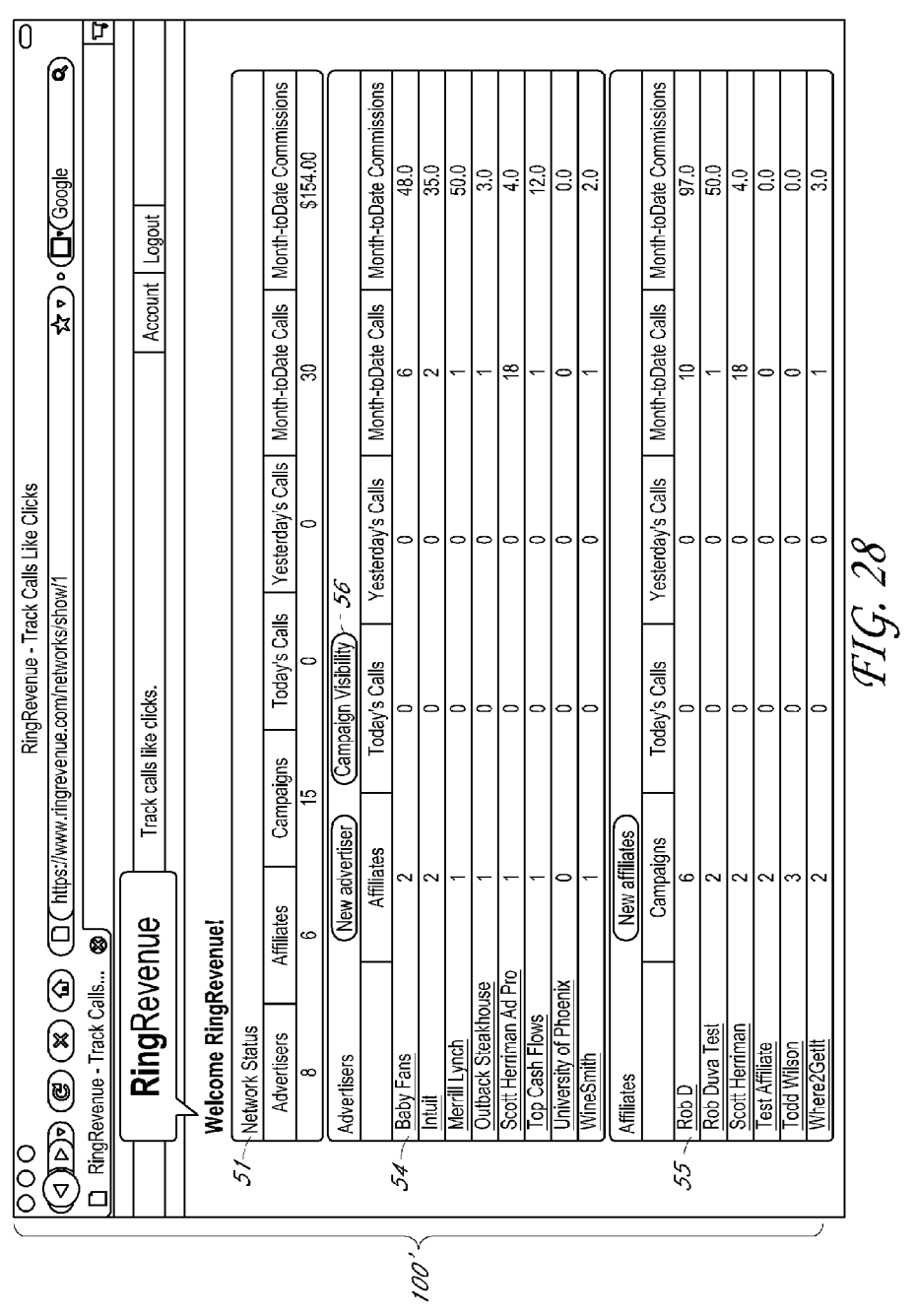

In an example embodiment, the platform software 10 and the control center software 21 run by the affiliate network system 100 and the control center 20 perform some or all of the following functions: an advertiser function, as illustrated in FIG. 4, an affiliate function, as illustrated in FIG. 21, an affiliate network system function, as illustrated in FIG. 28, and a control center 20 function (not shown.)

Figure 6:
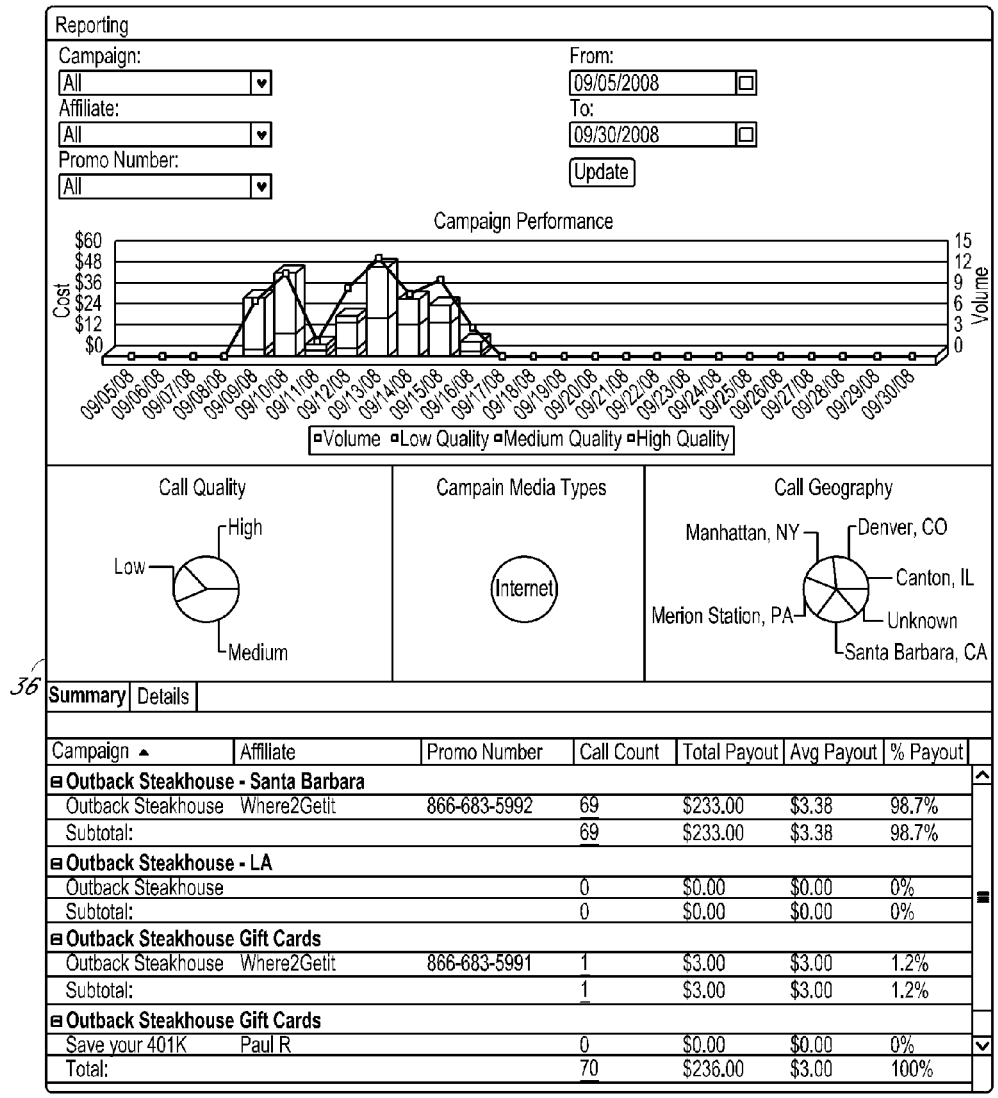
FIG. 6: is an illustration of an example embodiment for viewing advertiser report information.
Figure 9:
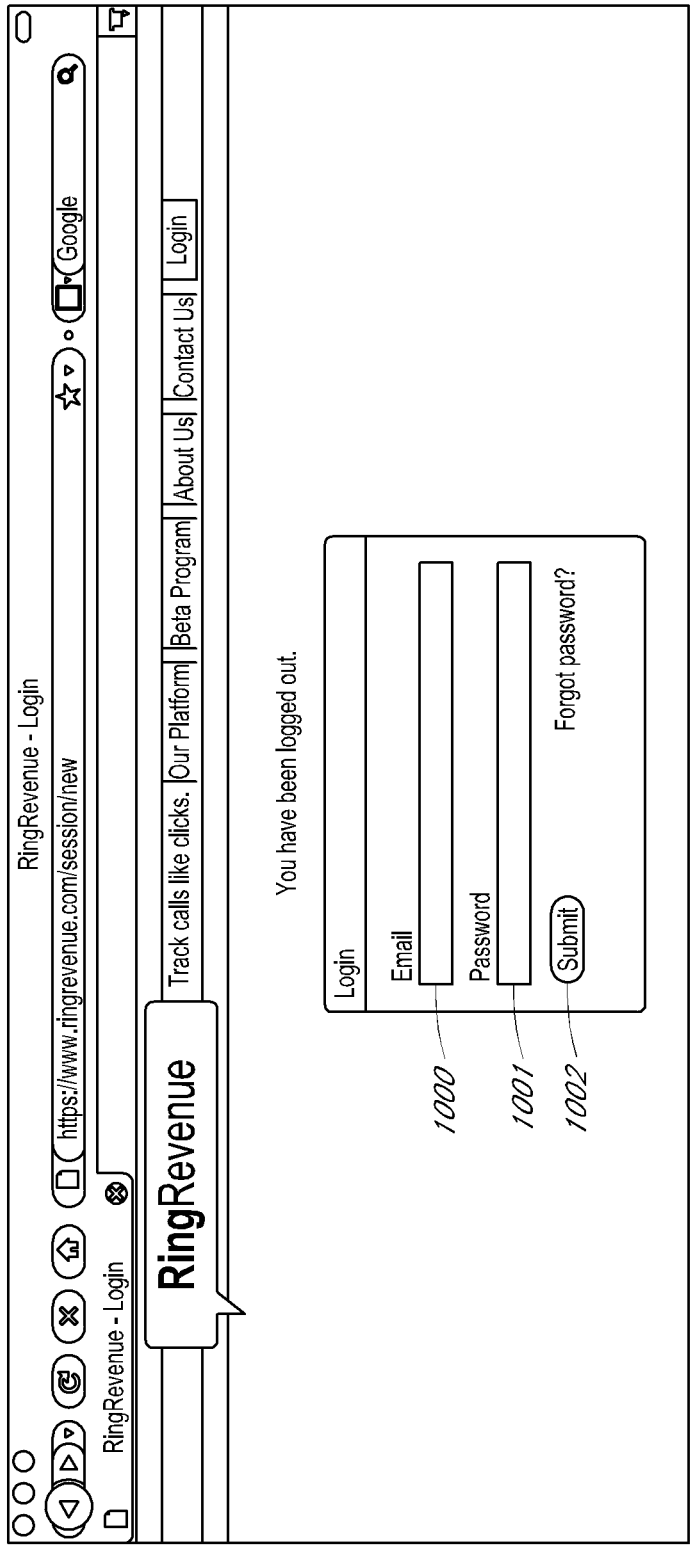
FIG. 9: is an illustration of an example embodiment for logging out of the software platform.

Once logged in, the advertiser can view various types of information on a home screen user interface 30, such as that illustrated in FIG. 4, view various campaign information (see, for example, FIG. 5) or create a new advertising campaign through the create a new campaign module 23 (see, for example, FIG. 5), view various report information with the view campaign module (see, for example, FIG. 6), modify various account information through the account information module 14' (see, for example, FIG. 8), obtain help, logout (see, for example, FIG. 9), or search for various affiliates. In some embodiments the advertiser may make use of the call queue program 301 to queue incoming calls, optionally based on the caller quality (see, for example, target profile submodule 160 FIG. 10).

Referring to FIG. 4, a home screen user interface 30 of the advertiser system 300 optionally includes a notification module 31, a recent calls module 32, and/or a quick stats module 33. Data displayed via the various user interfaces may be read from computer readable memory. The notification module 31 may be used to display a notification to the advertiser. In the embodiment shown in FIG. 4, two types of example notifications are illustrated: an expiration notice 34 and an application notice 35. Other types of notifications can be provided as well. The recent calls module 32 informs the advertiser 300 of the recent calls made by customers 400. The quick status module 33 shows information, such as the number of calls made by consumer 400, the quality of the calls, and cost of the calls (e.g., the cost to the advertiser). The data displayed via the user interface illustrated in FIG. 4 may have been transmitted via the affiliate network system 100 to the advertiser system 300.

Figure 2:
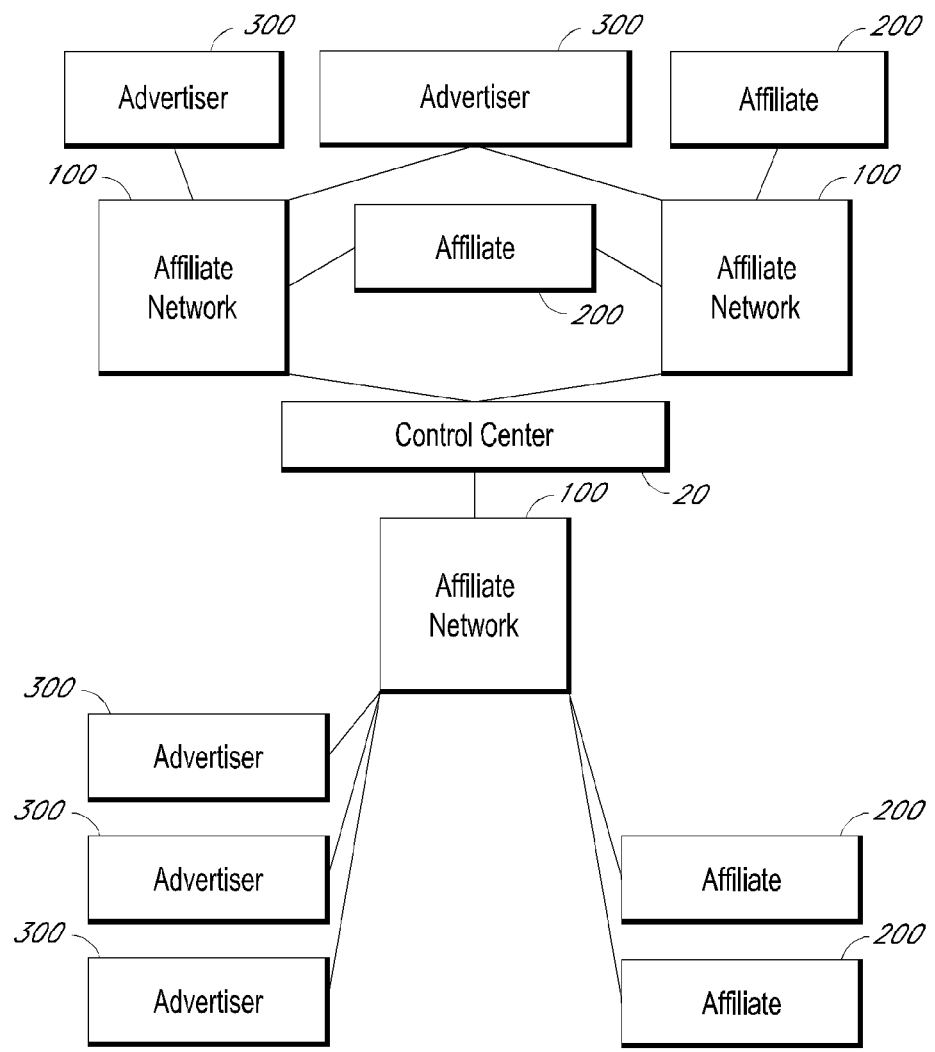
FIG. 2: is a second schematic view of an example embodiment of the relationship between the control center, affiliate network, affiliate, advertiser, and the consumer.

When the affiliate logs in via an affiliate system (e.g., including a server and user terminal), he or she is presented with a home screen user interface, an example of which is illustrated in FIG. 21. The data displayed via the user interface illustrated in FIG. 4 may have been transmitted via the affiliate network system 100 to the affiliate system (such as affiliate system 200 illustrated in FIG. 2). On the home screen 200', a notification module 41, campaign viewing module 42, a campaign application module 47, and/or a quick stats module 49 are provided. The notification module 41 can be used to inform the affiliate of new campaigns posted by advertisers 300, and transmit an alert to the affiliate system 200 if the advertiser 300 accepts the affiliate's application to the campaign. The campaign viewing module 42 allows the affiliate to view campaigns that have been applied and campaigns that have been accepted by the advertiser, as well as optionally campaigns that have been rejected.

In the example embodiment shown in FIG. 21, all the campaigns have been accepted, but the word "applied", for example, could be used to indicate campaigns that have been applied to but not accepted. The campaign application module 47 provides the affiliate the ability to view campaigns that have been made visible to the affiliate 200 via the affiliate network 100 or the advertiser 300 through the campaign visibility module 56'. Advertisers 300 and affiliate networks 100 may be provided with a campaign visibility control 56 illustrated in FIG. 28, which enables the advertiser 300 or affiliate network 100 to restrict the campaigns that affiliates 200 can view. The campaign visibility module 56' is described in more detail with respect to FIG. 29. The quick status module 49 illustrated in FIG. 21 enables the affiliate to quickly monitor the amount and nature of calls his or her promotional activity has generated as well the resulting commissions due.

When the affiliate network operator logs in the affiliate network 100 (see FIG. 1A), the operator is presented with a home screen 100', an example of which is illustrated in FIG. 28. This home screen user interface 100' may provide the affiliate network operator 100 with a view network status module 51, a view advertisers module 54, and/or a view affiliates module 55. When the affiliate network system operator click on a link (or other activation controls) in the view advertisers module 54, the new page delivered to the affiliate's computer may be the same as, or similar to the home screen user interface 30 of the advertiser 300 illustrated in FIG. 4. Similarly the affiliate can click on a link in the affiliate's module 55, and the new page delivered to the affiliate network's computer may be the same as the home screen user interface 200' of the affiliate, an example of which is illustrated in FIG. 21.

When the control center operator logs in, the control center operator is presented with a home screen user interface (not shown) which enables the control center operator to view the home screen user interfaces of the various affiliate networks 100. In some embodiments there may be more than one control center 20 (e.g., located in different geographic areas, such as different states or cities, or located in the same area) and more than one control center operator. In the example embodiment shown in FIG. 2, there is one control center 20, and three affiliate networks 100, although there can be additional control centers and fewer or more affiliate networks 100. An affiliate network 100 is associated with one or more advertisers (which in turn are associated with one or more advertiser systems 300) and affiliates (which in turn are associated with one or more affiliate systems 200). In the embodiment shown in FIG. 2, several advertisers and affiliates are registered with more than one affiliate networks (which in turn are associated with one or more affiliate network systems 100).

The Add New Campaign Module

As shown in FIG. 5, the advertiser has the ability to add a new advertising/affiliate campaign using the add new campaign module or button/control 23. As shown in FIG. 10, in an example embodiment of the new campaign software module 23, the advertiser 300 is presented with a form or a help wizard tool which provides the advertiser 300 with the following submodules: overview 110, call pricing 120, target regions 130, call treatment 140, hours 150, target profile 160, keywords 170, and creatives 180. FIGS. 10-20 illustrate example user interface corresponding to these submodules). Fewer, additional or different submodules may be used.

With reference to FIG. 10, in the overview submodule 110, the advertiser can enter information such as campaign name in a campaign name field 111, network information in a network information field 112, product, services, or category information in a product, services, or category field 113, and campaign description in a campaign description field 114. A campaign name may be used to identify the campaign. Product, services, or categories enables affiliates to look for campaigns by their type (handbags, computers, legal service, etc.) Campaign description provides information to affiliate such as information concerning the advertiser, the terms and conditions of the advertisement, and details about the campaign requested.

Figure 11:
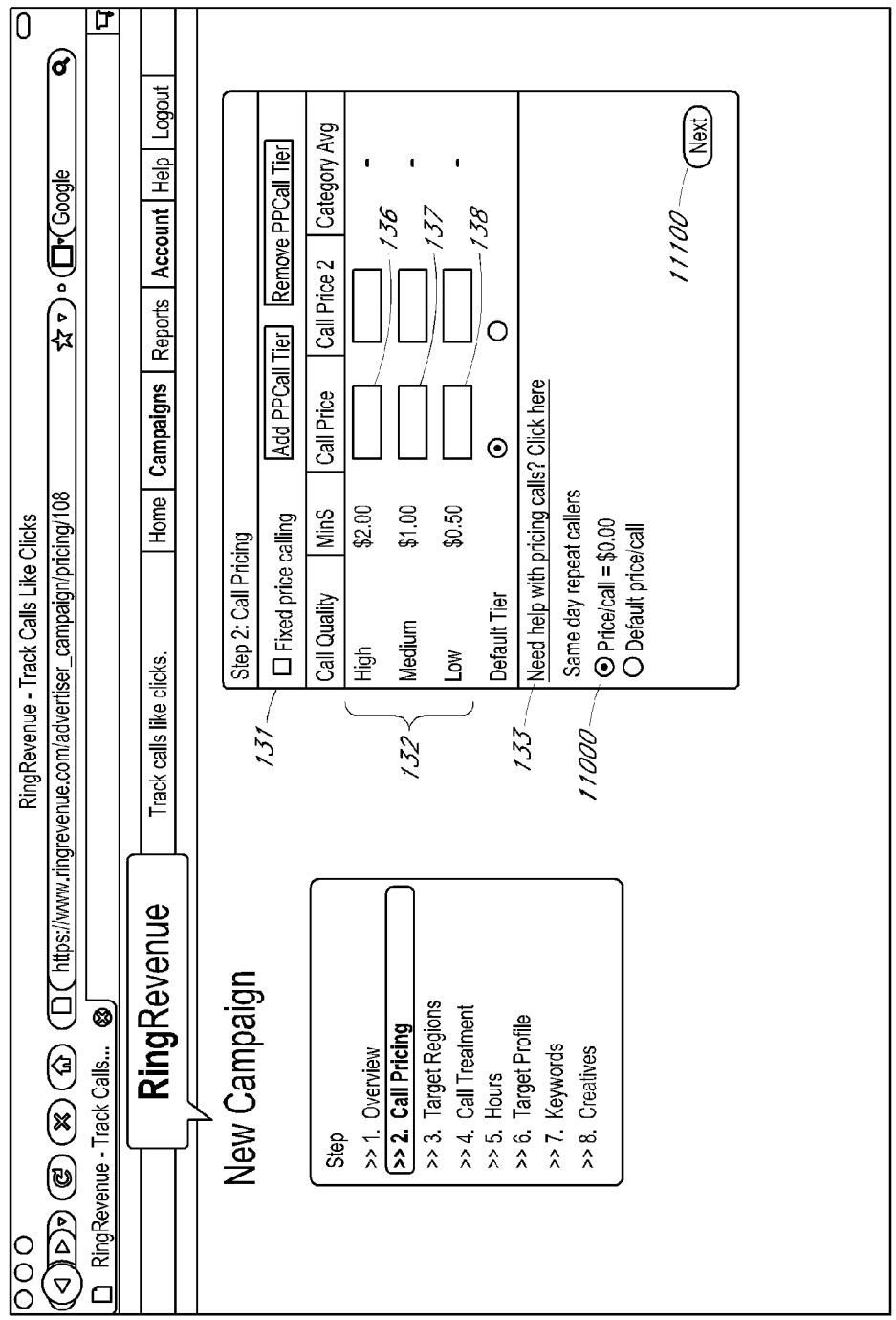
FIG. 11: is an illustration of an example embodiment for creating a new campaign which illustrates a call pricing submodule.

In the call pricing submodule 120, the advertiser 300 has the ability to choose either fixed call pricing 131, or a dynamic call pricing 132 (e.g., based on call quality). As shown in the embodiment of FIG. 11, the advertiser 300 can choose separate prices for high 136, medium 137, and low 138 quality calls. (While the specification describes three levels of quality, high, medium, and low, different quality labels can be used wherein each label is optionally priced differently. For example, quality labels 1-100 can be assigned based on different call criteria. Optionally, call quality labels are not assigned. For example, the call quality and price can be determined by certain call criteria being achieved during a call.) The backend or processing section 12 of the website running on the affiliate network server or the control center 20 server uses a novel method of determining call quality which is discussed in the section relating to submodule 160, FIG. 10. Dynamic call pricing enables advertisers to price calls differently based on specific call criteria (e.g., the time of day of the call, call length, caller responses to interactive voice response menus, caller gestures (e.g., selection of a specific advertisement), spoken keywords, etc.) Calls can optionally be priced the same or differently for different publishers even if the call criteria is the same. Optionally, fixed call pricing is established at a base price per call and bonuses are added on top of the fixed per call price if certain call criteria are met. The call pricing submodule 120, also may comprise a call price calculator 133 which aids the advertiser in determining the call price. By asking the advertiser 300 what percentage of calls are converted into sales 134, and what is the maximum amount of compensation the advertiser is willing to pay 135, see FIG. 12, the call price calculator, which receives and provides data for display via price calculator user interface 133 can use this information to suggest high 136, medium 137, and low 138 call pricing. Other call price distribution systems such as 1 star-5 star rating are also contemplated. The calculator can use a variety of algorithms to perform this calculation. For example, the calculator might set the high call price 136 to be equal to maximum the advertiser is willing to pay 135. The calculator may determine the medium call price 137 by multiplying the percentage of calls converted into sales 134 by the maximum the advertiser is willing to pay 135. The calculator may further determine the low call price 138 by halving the medium call price 137. The determinations can be displayed by the calculator via calculator user interface 133. Other techniques may be used.

In the target regions submodule 130, the advertiser 300 can restrict the geographic regions from which it wishes to receive calls. Additionally, in certain embodiments, particular regions within the country(ies) can be chosen as well. In the embodiment shown in FIG. 13, the advertiser 300 can restrict calls to specific regions 131 such as states or specific cities in states, time zones 132. As will be discussed in call treatment submodule 140, the advertiser 300 enters a destination phone number 1141. As described in the campaign application module 47, see FIG. 21, the affiliate 200 requests a promotional phone number (in some embodiments a toll free phone number) from the affiliate network 100 or from the control center 20. The phone number mapping routine 13 (FIG. 1) maps the promotional phone number to the destination phone number 141 using the phone number mapping routine 13 (in some embodiments, the control center's server may include the phone number mapping routine.) This routine causes the server 9 to route calls coming into the promotional phone number to the destination phone number 1141. Through this optional mechanism, the affiliate network 100 or the control center 20 never actually transfers ownership or control of the origination phone number to the advertiser 300 or affiliate 200, but rather it provides the affiliate 200 with a revocable ability to use the promotional phone number for advertising. In some embodiment the control center 20 may transfer a group of promotion numbers to the affiliate network 100. Through this mechanism a promotional phone number may be assigned on the internet (e.g., to an advertising campaign for a product or service). In some embodiments, the promotional phone number can be assigned immediately, without intervention by personnel working for the affiliate network 100 or the control center 20. Optionally, the phone number is also activated and ready to receive calls substantially immediately (e.g., with 5 minutes, 30 minutes, 1 hour, 2 hours). The affiliate network 100 or control center 20 can maintain control over the promotional phone number at all times and can terminate routing the promotional phone number to the destination phone number for whatever reason the affiliate network 100 or the control center 20 may deem necessary.

In the call treatment submodule 140, the advertiser 300 can set how incoming calls to the destination phone number 141 are treated. See FIG. 14. In the single destination routine 147, advertisers 300 can choose to have calls recorded 142 or have SMS marketing messages 143 transmitted to the consumers 400. An advertiser can setup a promotional code 144 and advertising message 145 to be sent to the consumer's 400 mobile phone, Skype phone, or computerized phone equipment. This method of generating one or more SMS messages and codes which can be sent to a consumer, allows the advertiser to dynamically change the messages sent or codes promoted by simply editing this campaign setting. Additionally, the advertiser can send advertisements at a later time 146 (such as the next day, week, or month) to increase the number of sales generated. Optionally the SMS messages contain a promotional number which may be called by the user. Additionally, in the IVR tree routine 148, an advertiser can set up an IVR system (interactive voice system) which allows an advertiser to provide customers the ability to operate a voice menu system. In an embodiment of the IVR routine 148, as shown in FIG. 15, the advertiser can use the system to route calls made to promotional phone number to different agents. For example, in the embodiment show in FIG. 15, the consumer 400 can press one to speak with Agent 1, or press two to speak with Agent 2. In some embodiments the sound recognition routine 15 of the backend can be designed to recognize the spoken words "one" or "two" in addition to key tones. The text to speech processing routine 14 converts the text shown in text box 149a. Upon pressing "one" in the embodiment shown in FIG. 15, the backend 12 will connect 149b the calling consumer 400 with Agent 1 by bridging the call to Agent 1's telephone number 149c. Pressing "two", will bring up a new menu 149d which allows the calling consumer 400 to call either Agent 2's cell or work phone. The "add new route" button or hyperlink 149e allows additional options to be created such as a third destination to call Agent 3, for example.

Figure 16:
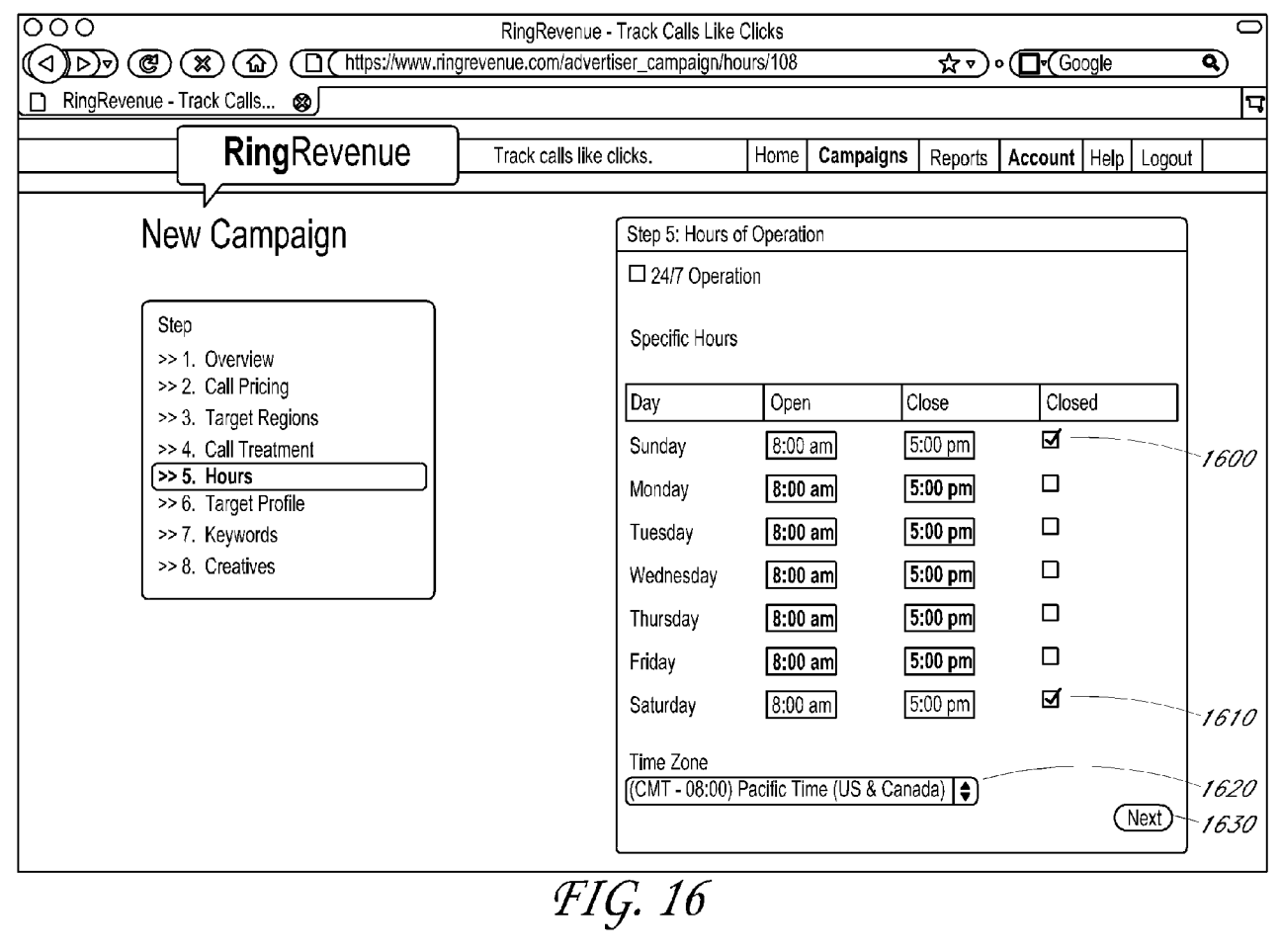

In the hours submodule 150, the advertiser can set the times each day it wishes to receive calls. FIG. 16. Setting the time in this submodule may allow the advertiser 300 to avoid paying affiliate commissions at hours when the advertiser 300 is not in business for example. Moreover, this feature may allow the advertiser to route calls to voicemail or to home telephone numbers when the advertiser is closed.

In the target profile submodule 160, the advertiser 300 can set various criteria to be used in the determining whether a customer is high, medium, or low quality. FIG. 10. The target profile criteria 162 may include subcriteria such as gender, age, household income, marital status, education, ethnicity, and calling from number. Much of the data used to evaluate these subcriteria can be obtained through looking up the consumer phone number against demographic data bases. In the embodiment shown in FIG. 18 clicking on the show all field 161 expands all the fields and display the screen shot shown in FIG. 18. In this example embodiment, clicking on an individual checkbox expands the particular subcriteria selected. As shown in FIG. 18, the advertiser 300 may decide that the gender 163 for example is important in determining whether the particular customer 400 calling is a high, medium, or low quality caller. For example if the advertiser 300 is selling makeup, the advertiser may choose to place the slider high for women and low or none for men. This allows advertisers 300 to communicate to affiliates more effectively about which customers might purchase the advertisers 300 goods and services. In certain embodiments, the advertisers may be able use these subcriteria to filter out certain customers completely. In cases, such as gender, women might be much more likely to purchase an item than men, and the advertiser 300 may be willing to pay more for the sales lead if a woman calls as opposed to a man for example. The subcriteria of age, household income, marital status, education, ethnicity, and calling from may be similarly be used to determine the quality of the consumer.

Advertisers 300 can make use of the call quality of consumers in a variety of ways. First, as previously explained, advertisers 300 optionally set different payment amounts for high, medium, and low quality calls. Second, advertisers 300 optionally route certain quality calls to their stronger salespersons to increase the likelihood of consummating the sale. Moreover, the particular demographic information could be used to pair an appropriate salesperson to the particular customer. For example, using available sales statistics, the advertiser 300 may decide that a single male in the 25-34 age range would more likely buy products from the advertiser 300 if the agent who answers the call is a single female in the 18-34 age range. Third, Advertisers 300 optionally setup their call queuing software to bump higher quality callers up in the queue to reduce the higher quality caller's wait time. Some advertisers 300 use a call queue program to queue customers' calls so that customers do not receive voicemail or a busy signal. Rather they are placed in a call queue, which allows the advertiser 300 to answer the caller as soon as an agent is made available.

In the keywords submodule 170, advertiser 300 can also specify certain keywords that the backend sound recognition routine 15 can identify for the purpose of rating calls. Certain keywords such as competitor names, product names or types can be identified to establish the quality of the caller. Similarly the utterance of certain words by the consumer 400 may establish dissatisfaction with the product, advertiser, or agent. In some embodiments, the sound recognition routine 15 can distinguish between the voice of the consumer and that of the advertiser, either by sound or by receiving information relating to the source of the sound (i.e. from which phone number/call leg the voice is received.) In the embodiment just described, the keywords submodule 170 determines call quality during and after the call from the consumer 400 is made, and the target profile submodule 160 can begin determining call quality once the consumer 400 calls the advertiser 300.

In the creatives submodule 180, the advertiser 300 can upload a creative 180' such as an image or a banner for use by the affiliate 200 in campaigning for the advertiser 300. As explained later in the section discussing the creative module 180, the affiliate may have the option to add the promotional phone number to this creative to improve the affiliate's promotional ability. The done button 181 can be selected to save the entered information into the campaign. Similarly when editing the campaign 24 the done button saves the changes made to the campaign 24.

Measuring and Tracking Call Quality

In certain embodiments, users of the software platform 10 may be able to utilize call quality techniques to improve their advertising experience. Accurately determining call quality may be useful for the advertiser 300 as it may provide the advertiser 300 with a way of rewarding the affiliate 200 with additional compensation for good quality calls, while at the same time allowing the advertiser 300 to avoid paying high commission fees for lower quality calls. Through adjusting the various target profile subcriteria in the target profile submodule 160, the advertiser may enable the software platform 10 to determine demographic information about the customer 400. In the embodiment shown in FIG. 17, the advertiser 300 can adjust sliders to increase the weight associated with the customer having certain demographic subcriteria, but alternate methods of saving this information optionally might be used. Additionally, the advertiser 300 can use the keyword submodule 170 to enable the software platform to determine the quality of the call. When customers/consumers 400 or advertisers 300 use these keywords, the software platform can monitor or record their enunciation and appropriately raise the quality of the call. In some embodiments, the software platform 10 might utilize algorithms to adjust the significance of the utterance of the keyword based upon the syntax (position in the sentence), voice modulation (is the keyword stressed in the sentence), repetition, variants of the keyword (ice skating vs. ice skates for example), or use of synonyms for the keyword. The software platform 10 may also suggest possible keywords, or check the spelling of keywords. Through analyzing the various scores generated through the target profile information and the keyword information, the backend 12 of the software platform 10 can assign a quality rating to the call.

In certain embodiments, affiliates 200 may be informed of the various subcriteria and keywords set in the campaign, and in other embodiments this information may be kept from the affiliate 200. In embodiments where this information is disclosed, the affiliate 200 can use the information to modify how the advertiser's 300 goods and services are marketed. Another benefit of the call quality feature in certain embodiments, is that it may reward those affiliates 200 that provide advertisers 300 with better customer leads or more sales, while placing a disincentive to the affiliate 200 to provide the advertiser 300 with lower quality calls.

Additional Features of the Advertiser Function

Figure 7:
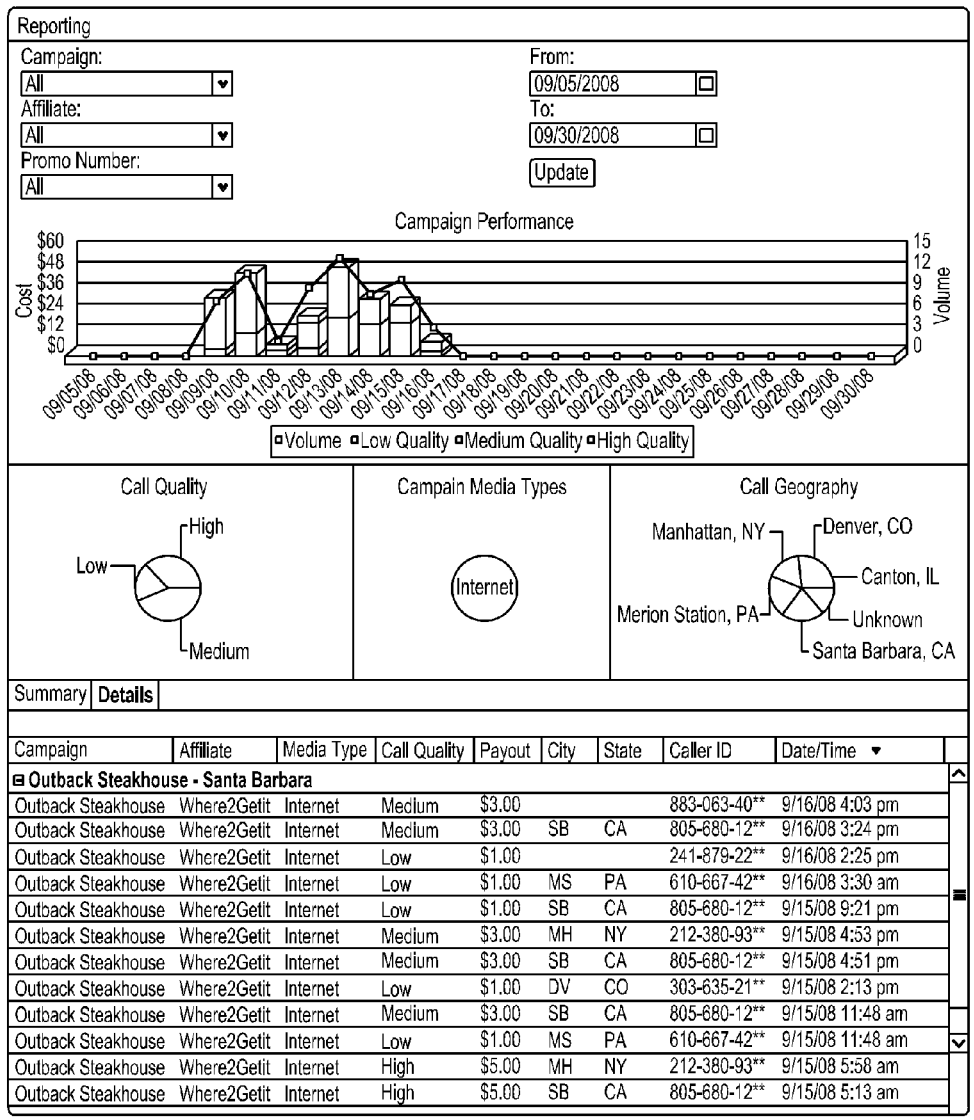
FIG. 7: is an illustration of an example embodiment for viewing alternate advertiser report information.

The advertiser can view an advertising report by clicking on the report button 36, FIG. 4. This brings up the advertiser report module shown in FIG. 6. Through clicking on the details button 36', the advertiser can find additional details about the campaign progress, FIG. 7.

FIG. 5 shows the view campaign module 13' which allows the advertiser 300 to view various campaigns 24.

Figure 8:
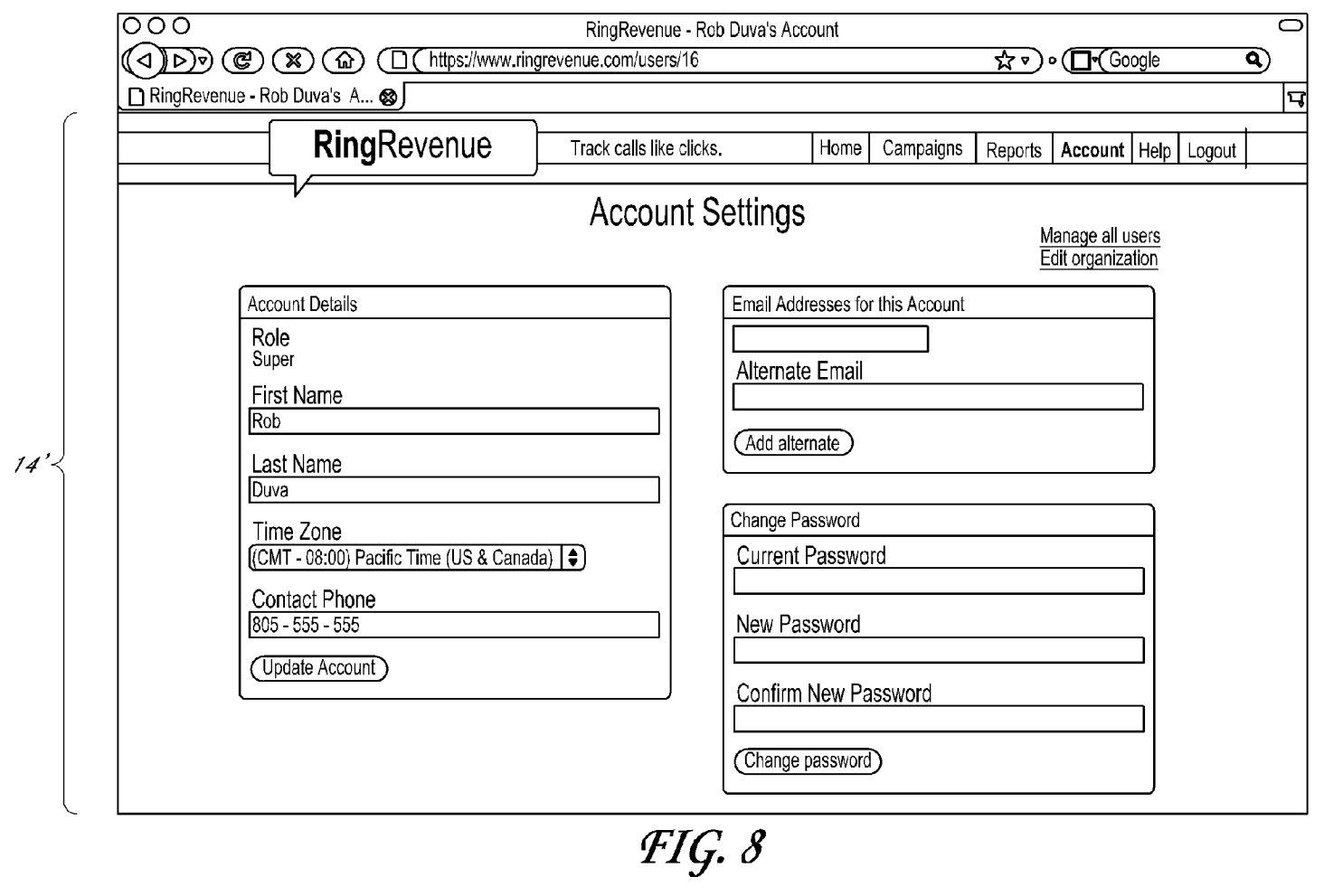

FIG. 8 shows how the advertiser can modify his or her account information. Embodiments of present invention may include the ability to invite additional members or users under a particular advertisers account.

The advertiser optionally is provided with a referral customization module (not shown), which allows the advertiser 300 to specify time of day, particular days, or duration of time in which it will pay referrals. This referral customization module can also be used to specify whether the advertiser would like click-to-call functionality enabled on their website. If so, the click-to-call functionality may be enabled so that an affiliate information object passes the affiliate's information into the click-to-call dialogue box.

Additionally, advertisers may be provided with a self-promote module (not shown), which allows advertiser's to act as their own affiliate or for monitoring the effectiveness of their own advertising techniques which may be managed directly or not through an affiliate 200. Using this self-promote module, the advertiser is provided access to a promotional phone number, promotional email (not shown), etc, which is routed to the advertiser's 300 destination phone number. In such a self-promote module, the advertiser might still be charged fees for the use of data tracking features and call routing features of the affiliate network 100 or the control center 20.

Affiliate Function

Figure 25:
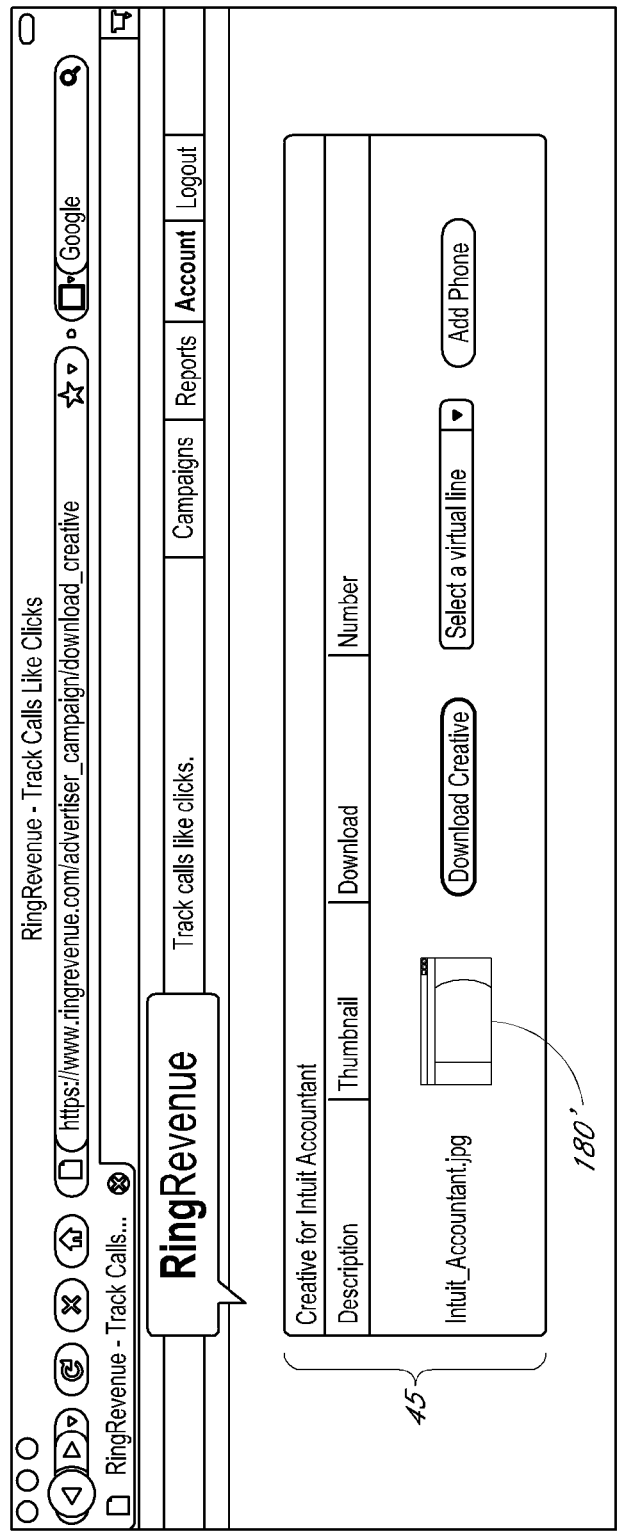
FIG. 25: is an illustration of an example embodiment which illustrates the creative modification submodule.

When the affiliate logs in via system 200, the home screen 200' is presented to the affiliate, an example of which is illustrated in FIG. 21. Here, the affiliate can view pending campaigns, search for new campaigns, view commissions earned, join or link accounts, etc. Submodules may be available to the affiliate 200 through the affiliate function 200', such as the number creation submodule 44, the creative modification submodule 45, the reports submodule 46, and the link customization module, FIG. 25.

Figure 24:
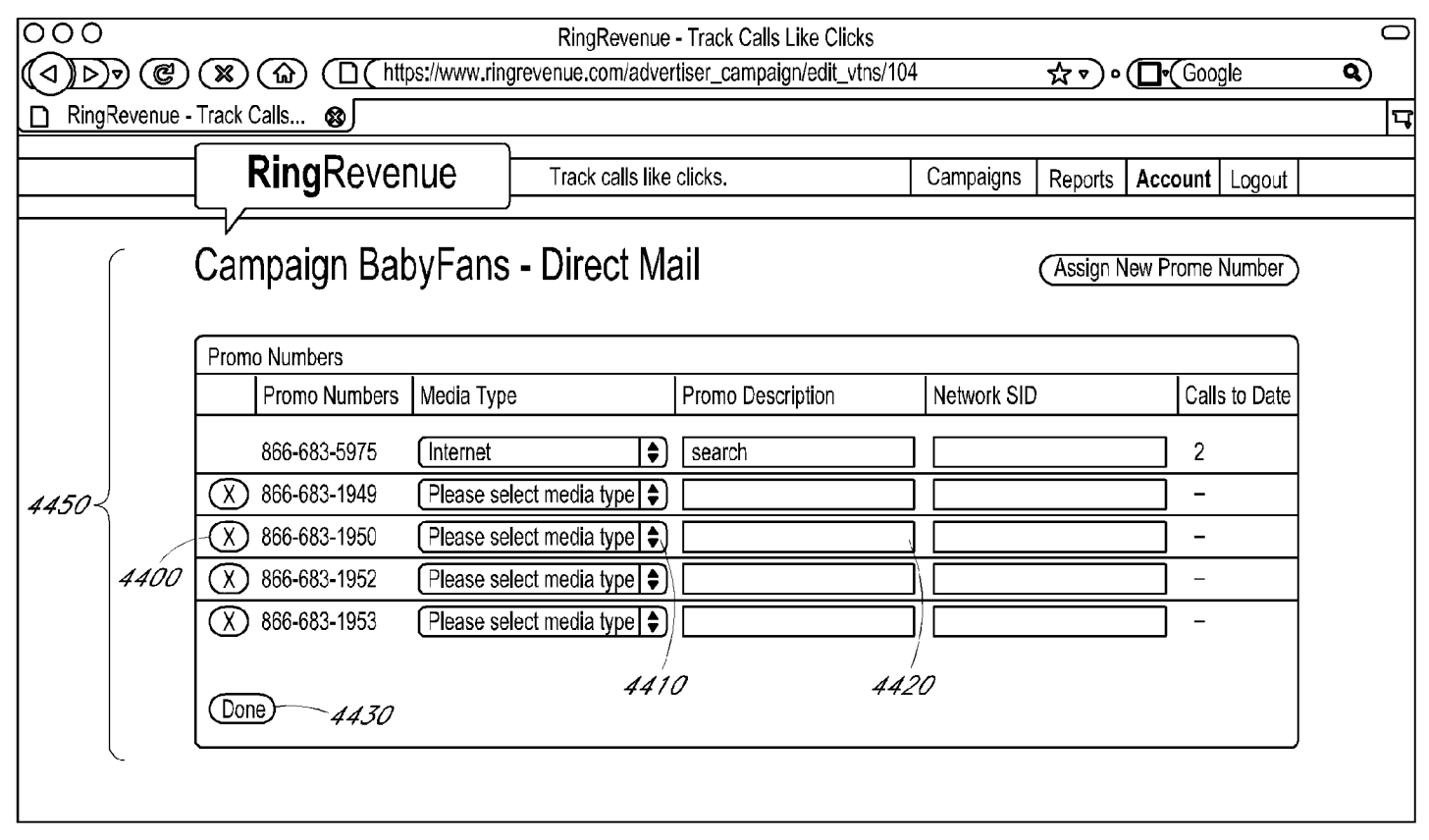

Clicking on the number creation submodule 44 allows the affiliate 200 to assign a promotional phone number so that the affiliate network 100 or the control center 20 routes calls to a promotional phone number to the destination phone number 141 of the advertiser 300. In the embodiment shown in FIG. 24, the affiliate may set the type of advertisement (business publication, direct mail, free standing insert, magazine, radio, television, internet, bulletin board, etc), a description of the promotion, and a network SID (security identifier.) In some embodiments, the affiliate can assign multiple numbers to one campaign in order to determine efficacy of the promotional materials.

Clicking on the creative modification submodule 45 allows the affiliate to add a promotion phone number, email address, or other contact information to the creative 180'. In the embodiment shown in FIG. 25, the creative modification submodule allows the affiliate 200 to embed a particular promotional number into creative 180'.

Figure 26:
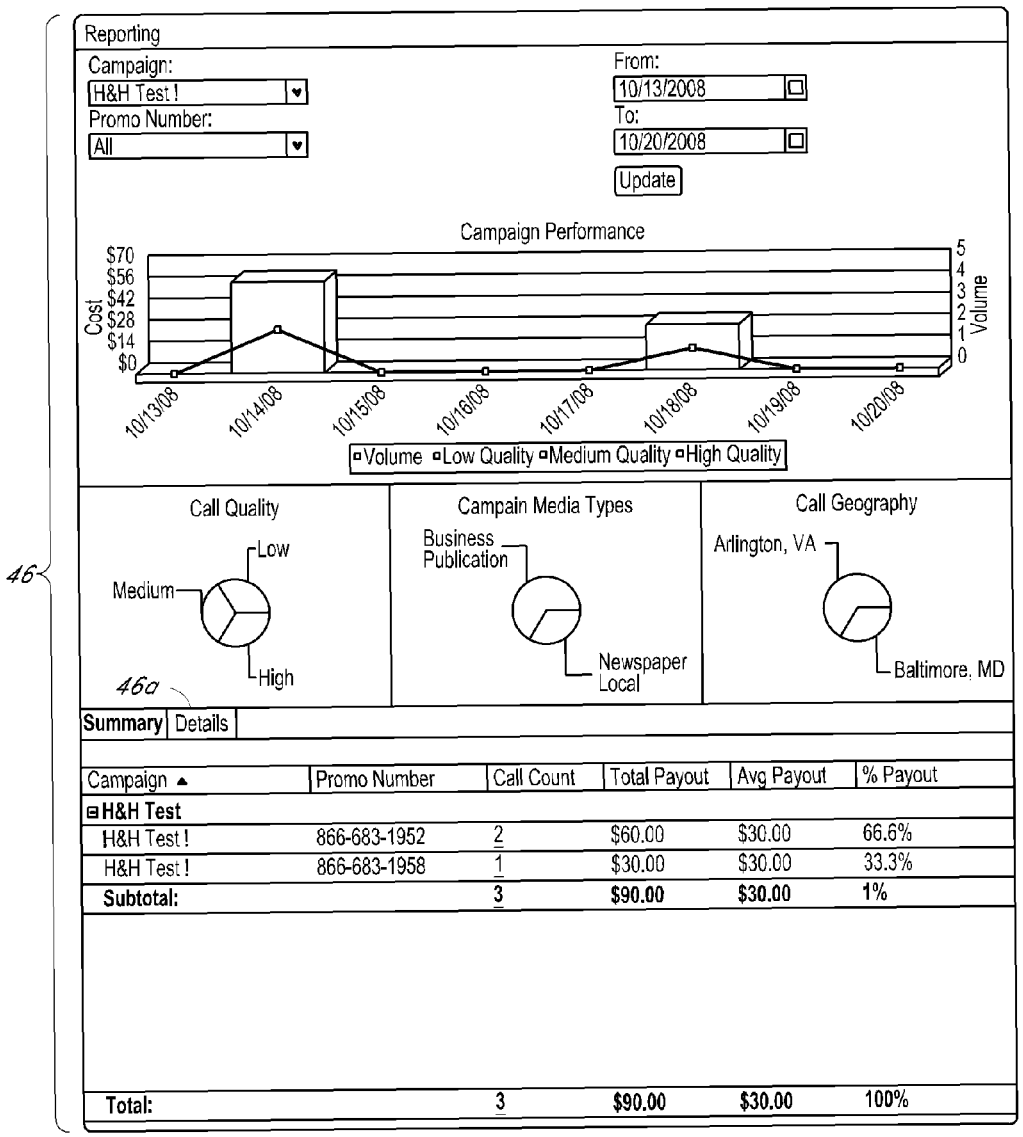
FIG. 26: is an illustration of an example embodiment for viewing report information of the affiliate.
Figure 27:
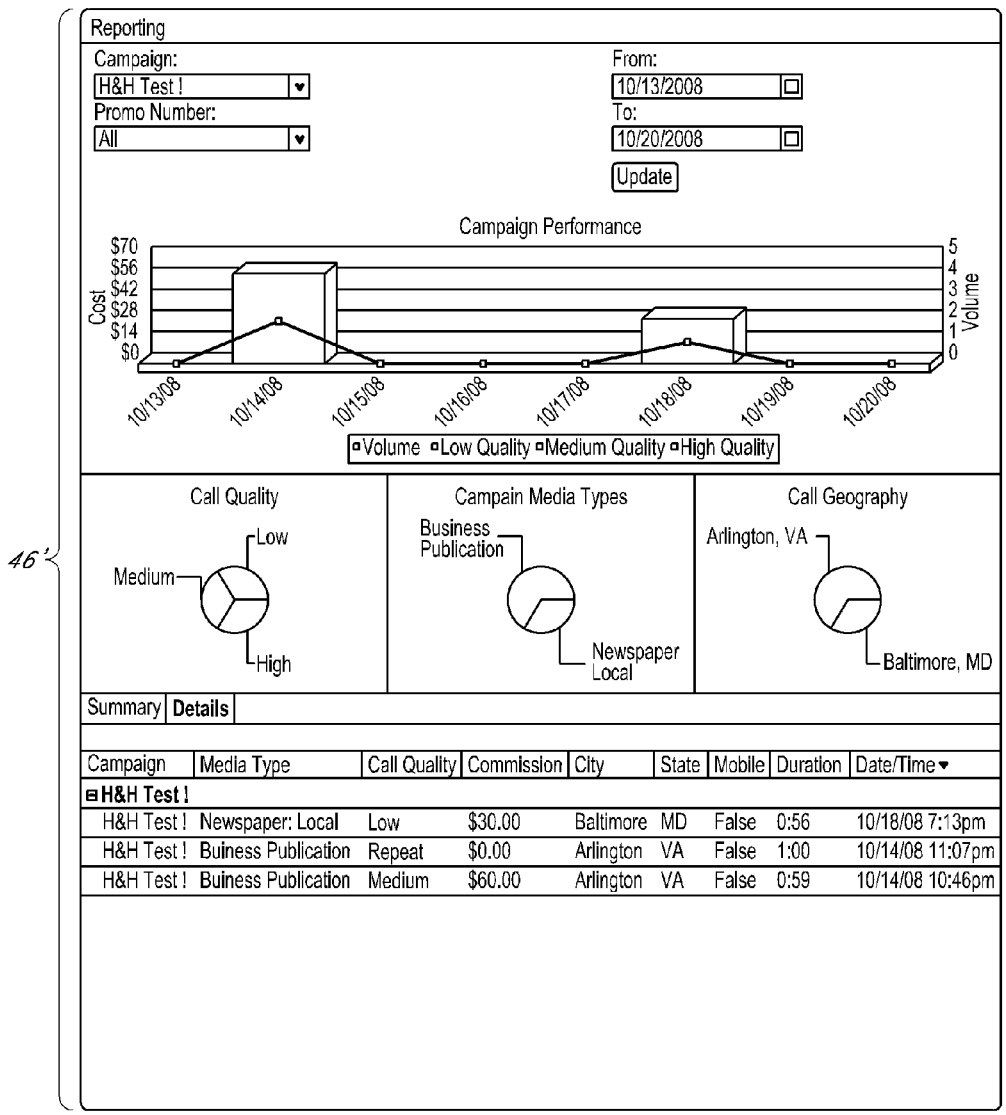
FIG. 27: is an illustration of an example embodiment for viewing alternate report information of the affiliate.

The reporting submodule 46 is illustrated in FIG. 26. Clicking on the details button 46a causes the detailed record submodule 46' to be displayed, FIG. 27.

The link customization module may be used by the affiliate 200 to specify the information contained in the affiliate information object. In some embodiments, the affiliate information object may contain information such as the affiliate's name, ID, the campaign name & ID, the address of the webpage hosting the creative, link, or URL, time & date, promotional phone number, promotional email address, promotional mailing address, and the IP address of the customer 400. The affiliate information object may be used by the advertiser 300 for modifying the displayed contact information on the advertiser's website 302. THE CUSTOMER EXPERIENCE section below provides still additional details.

Affiliate Network Function

The affiliate network function 100' may allow an affiliate network 100 to view and or modify the agreements and campaigns of the advertisers 300 and affiliates 200, see, by way of illustration, the user interface in FIG. 28. For example an affiliate network 100 may have the ability to create or modify a campaign for an advertiser 300. Also, an affiliate network may also be able to apply to campaigns on behalf of an affiliate or setup promotional phone numbers for example. In other cases, an affiliate network 100 may apply and accept the campaigns it creates. In some embodiments of the present invention, the affiliate network participants may have some, all or most of the rights and privileges as both the advertisers and affiliates. When the affiliate network 100 logs in, it is presented with the home screen 100', FIG. 28. The home screen 100' may allow the affiliate network 100 to monitor or modify any of the campaigns and agreements of its affiliates 200 or advertisers 300 by clicking on a particular advertiser 54 or affiliate 55. The affiliate network 100 may also have the ability to use a campaign visibility module 56'. This module 56' may allow the affiliate network 100 to view and or modify the visibility of an advertiser's campaign so that only certain affiliates 200 can view the campaign 24, FIG. 29. Clicking on the affiliate link 25, brings up the change affiliates submodule 26, FIG. 30, which allows the affiliate network 100 to change which affiliates can view the campaign. An advertiser can also view its own campaign visibility module, FIG. 31.

The Campaign Approval and Visibility Process

In an embodiment of the present invention, advertisers 300 can create an advertising campaign 24 using the add new campaign module 23, FIG. 5. Once created, the advertiser 300 may have the option to select which affiliates 200 will be able to view the campaigns 24, FIG. 30. Clicking on the view affiliates hyperlink or button 1125, see FIG. 31, allows the advertiser 300 to change which affiliates 200 can view which campaign. Advertisers may restrict campaign visibility in order to offer certain affiliates 200 special pricing because of the quality or uniqueness of their services. Additionally, advertisers might not want to publish that they pay higher rates to certain affiliates 200, and the change affiliates submodule 26, (see for example, FIG. 30) enables the advertiser 300 to select which affiliates 200 can view their campaigns 24.

Once the campaign 24 is created and the visibility is set, the affiliate, via system 200, may browse and apply to the campaign by selecting a campaign in the campaign application module 47, see FIG. 21. Clicking on one of the campaigns 48 in the campaign application module 47, brings up the affiliate campaign viewing module 48a of FIG. 22. From the affiliate campaign viewing module 48a the affiliate can view various types of information relating to the campaign such as campaign overview, call quality and target profile, campaign pricing, campaign creative, and application terms. In the embodiment shown in FIG. 22, the affiliate can click on the check box 48b and click the agree button 48c to apply to the campaign.

Once the affiliate clicks the agree button 48c, the advertiser 300 will be notified that an affiliate 200 has applied to the campaign 24 via the notification module 31. To accept or reject the application, the advertiser 300 can click on the application notice 35, see for example FIG. 4. Clicking on the notice 35 causes the server of the affiliate network system 100 or the control center 20, to initiate the acceptance module 49', FIG. 23. Through the acceptance module 49', the advertiser can choose to accept or deny the affiliate's application to the campaign 24.

The Customer Experience

In some embodiments of the present invention, an emphasis may be placed on ensuring that customer/consumer 400 (the potential buyer of the advertiser's goods or services) does not need to be at all aware of the entire software platform 10 used to reward the affiliate who brought the customer 400 to the advertiser's corporate website 302. There are several ways an affiliate 200 may induce a customer 300 to visit an advertiser's website 302. In some embodiments, an affiliate might broadcast an email or SMS, place an outbound call, or publish a website, magazine, or newspaper whose subject matter interests the reader. Magazines, newspapers, flyers, or television commercials might list the promotional phone number or email address of the advertiser in the advertisement. Affiliates might provide click through advertisements which also include a copy of the promotional phone number or email address on the advertisement. URL, links, or creatives 180' may also be placed on these websites and publications to an advertiser's web site. A URL is the complete or incomplete website listing, such as http://www.retailer.com. Links can be hypertext or pictures which, when clicked, send a command to the customer's web browser to change the current page the customer's web browser is viewing. Creatives 180', made through the creative module 180, are pictures or images that the advertiser 300 would like the affiliate 200 to use in marketing its products or services. In some embodiments, the affiliate can link the promotional phone number with the creative 180', by using the creative modification submodule 45, see FIG. 25. The promotional phone number may be linked by embedding the number into the meta data or filename of the creative 180', physically editing the image of the creative 180' to display the promotional phone number, or appending the promotional phone number to the top, side, or bottom of the creative 180'. Either the customer dials the promotional phone number from the creative 180', or clicks on the URL, link, or creative which causes the customer's web browser to display the advertiser's website 302 or initiate a call to a promotional number.

Ordinarily, when the customer's web browser switches to the advertiser's website, the advertiser's contact information is displayed prominently on the website 302, so that if the customer decides to call the advertiser instead of buying online, the referral by the affiliate 200 is lost. To overcome this problem, an embodiment may be designed so that the link, URL, or creative passes an affiliate information object to the advertiser's website 302. This affiliate information object may contain a variety of information which can be customized though the link customization submodule described above. When this type of information is passed to the advertiser's website 302, the advertiser's website can determine which affiliate 200 caused the customer 400 to visit the advertiser's website 302. The advertiser's website then executes a contact information modulation routine (optionally downloaded from the system) which causes the website to display the promotional phone number selected by the affiliate 200.

Thus, if the customer 400 calls the promotional phone number listed on the advertiser's website the number is routed through an affiliate network 100 or control center 20 and the affiliate 200 is given proper credit for the referral. The contact information modulation routine may be embodied as a software package (optionally downloaded from the system) that causes the contact information on the advertiser's webpage to change from their default values to a value specified by the affiliate information object.

In some embodiments of the present invention, the contact information modulation routine may also validate the affiliate's 200 account information with the affiliate network 100 or the control center 20. Advertisers may wish to validate the affiliate's account before paying commissions to make sure the campaign is still active and that affiliate is authorized to charge the advertiser 300 for referrals.

Operating Environment and Process Flow

Figure 32:
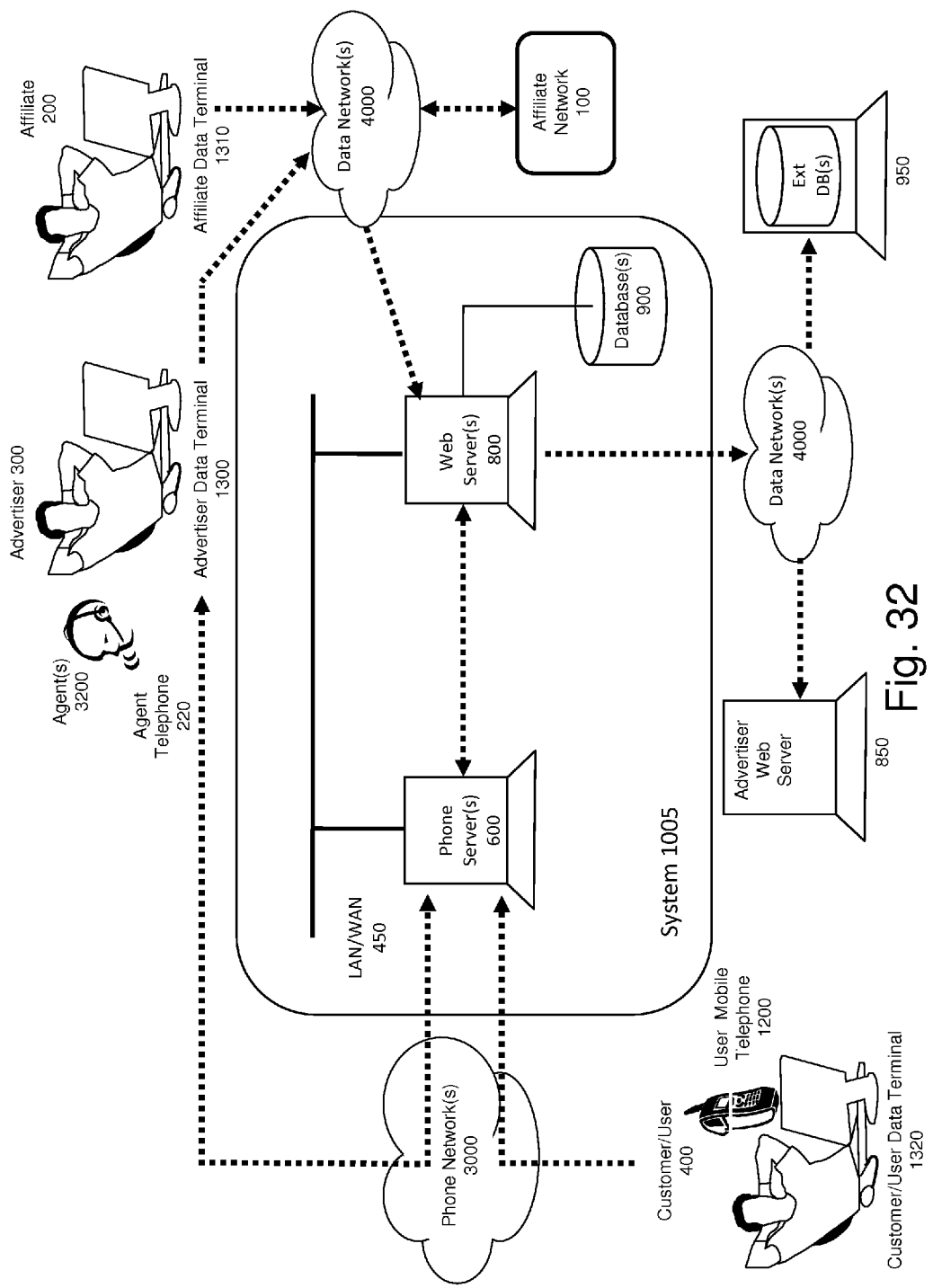
FIG. 32: illustrates an example network operating environment for a network advertising and call bridging communications system.

FIG. 32 illustrates an example Affiliate Network Call Bridging System (ANCB system) 1005. The use of the terms Affiliate Network Call Bridging System and Performance Marketing (PM) system are used interchangeably herein and have the same meaning. As illustrated, the ANCB system is connected or connectable to a plurality of consumers/customers/users 400 and the user's mobile phones 1200. The mobile phones 1200 are connected to a phone (wireless) network 3000 and data network 4000. Optionally, wireline phones (not shown in FIG. 32) are connected to a phone (wireline) network 3000. Optionally, the Customer/User 400 can access one or more data networks 4000 (e.g., web sites and associated web pages, the Internet or a corporate LAN or WAN) using their mobile telephone computing device 1200 and/or their personal computer/user data terminal 1320. The data/computer terminals 1320 can be a personal computer having a monitor, keyboard, memory, and a data communication interface. In addition, the computer terminal 1320 can be an interactive television, a networked-enabled personal digital assistant (PDA) or the like. Optionally, the ANCB system includes the Affiliate Network 100 and Control Center 20, see, for example, FIG. 1.

As further illustrated, the ANCB system 1005 interacts with a plurality of advertiser and affiliate computer/data terminals 1300 and 1310, respectively. The data/computer terminals 1300 and 1310 can be a personal computer having a monitor, keyboard, memory, and a data communication interface. In addition, the computer terminal 1300 and 1310 can be an interactive television, a networked-enabled personal digital assistant (PDA), a smart/wireless phone 1500, or the like. The data/computer terminals 1300 and 1310 are connected to a data network 4000 (e.g., the Internet or a corporate LAN or WAN). The data network 4000 includes wireline data networks (like the public Internet accessed using dialup or DSL/cable modems) and wireless data networks (e.g., wireless mobile and WiFi data networks).

As further illustrated, the ANCB system 1005 integrates with a plurality of customer service and/or sales agents 200 via the phone network 3000 and data network 4000. Optionally, the agents 3200 have a wireline/wireless phone and/or a phone headset 220 used to communicate with customer's/user's 400.

The ANCB system's 1005 servers 600 and 800 are interconnected either through Data Network 4000 or via a private Local Area Network (LAN) or private Wide Area Network (WAN) 450—as shown by the solid line connections in FIG. 32.

The ANCB system 1005 in this example contains centralized databases 900 and/or general-purpose storage area, optionally including, but not limited to, some or all of the following: an advertiser, affiliate, affiliate network account database, configured campaigns and campaign attributes, phone numbers/addresses, call routing rules, call records, call recordings, advertising creatives, etc.

The ANCB system 1005 in this example can optionally access external databases 950 through the data network 4000. For example, the ANCB optionally queries external databases to collect additional information about a caller using the caller's phone address.

The ANCB system 1005 in this example contains a phone server subsystem 600 with call processing and call bridging capabilities. Optionally, the servers bridge calls between users, advertisers (e.g., advertiser's call center), and/or third parties (e.g., an outsourced call center). User calls optionally are received by (inbound) or originated from (outbound) the phone server subsystem 600. Additionally, advertiser/third party calls are received by (inbound) or originated from (outbound) the phone server subsystem 600. For example, a call center agent places a call to the phone server subsystem 600 and the phone server subsystem originates an outbound call to a user who expressed an interest in a product or service, or in response to a gesture on a web-page (e.g., click-to-call). These servers 600 optionally provide interactive voice response, voice messaging, voice recognition, text-to-speech services and voice message transcription to natural-language text. Optionally, the phone server's services (e.g., text-to-speech) utilized in a call are configurable (e.g., a specific interactive voice response tree or sub-menu) and may be determined based on attributes of the caller or called party or other call quality criteria (e.g., time-of-day, terminal device of caller or called party, etc.).

The ANCB system 1005 in this example contains a web server and general purpose server subsystem 800 with web serving and general computing capabilities.

The ANCB system 1005 in this example optionally interfaces with (e.g., over a data network 4000) with one or more external web servers, including an Advertiser Web Server. Optionally, the ANCB web server(s) 800 host one or more web pages of publishers and/or advertisers. Optionally, the system 1005 redirects users to an Advertiser's Web Server 850. Optionally, the system 1005 redirects consumers/users to an Advertiser's Web Server where the redirect includes one or more phone addresses from a phone number pool.

In this example, the ANCB system 1005 servers 600 and 800 are optionally centralized at a given location, or distributed to a number of locations. The ANCB system 1005 can be implemented as a standalone system (e.g., an ANCB system used by a number of service providers) or the ANCB system can be integrated into a service provider's internal systems (e.g., an affiliate network). Optionally, the ANCB system 1005 is connected to a data communication network 4000 and a wireline/wireless network 3000. The ANCB system 1005 interconnects with the wireline/wireless network 3000 using telecommunication interfaces (e.g., SS7) and via data communication networks 4000 using a secure router subsystem and an SMS server subsystem which optionally serves as a mail relay to transmit and receive SMS and MMS messages via a Short Message Service Center (e.g., an SMSC operated by a network carrier).

As discussed above, there is a need to manage and track the sales/leads and conversion-to-purchase associated with advertisements. Certain example embodiments of a performance marketing (PM) system described herein enable a business to track phone-based sales through unique call processing techniques, number allocation, number pooling, web user interfaces, and reporting. In addition, certain embodiments of the PM system can perform certain call enhancements (e.g., interactive voice response, call filtering, etc.), help manage call volumes, and/or calculate affiliate/publisher payments.

Generally, unique promotional telephone numbers (or other types of unique contact addresses) may be used to track performance across multiple media outlets. By utilizing unique phone numbers or other contact addresses, the PM system tracks the potential customer's experience from the initial advertisement, to conversion, (specific to a designated media outlet). For online, offline, and/or mobile advertisements, a deeper level of tracking is available. By associating custom tracking parameter values that distinguish the attributes of the traffic source to the call itself, the user can then easily determine tracking granularity down to the individual advertisement level. This method of online, offline, and/or mobile tracking can be applied to, for example, search engine marketing or any online ad placements. In order to function at a large scale, accommodating thousands of simultaneous users, entire "pools" or groups of numbers, termed "RingPools", are allocated to a specific online, offline, and/or mobile media outlet (e.g., paid search keywords).

The RingPool phone number acts as a "middle man" joining the ad and its attributes to the call. The association of the RingPool phone number and the advertisement (e.g., a paid search ad) occurs dynamically at the time the advertisement is rendered for display to a web surfer/consumer. When a user clicks on an ad, a RingPool phone number is assigned (e.g., dynamically assigned) so that when the number is called, the ad's attributes are collected. Upon completion, the call is reported in association with these attributes.

The performance marketing (PM) system phone number pool, RingPool, optionally includes toll-free numbers, long distance, and local phone numbers. Optionally, the phone number pool includes phone numbers with extensions. Optionally, phone calls to the phone numbers can be domestic or international and can include landline, mobile, and VoIP numbers or other contact addresses. Optionally, phone calls to the numbers within the pool route through the PM system and terminate in various networks including landline, mobile, and VoIP networks. Optionally, the routed calls terminate in businesses (e.g., call centers) and/or to one or more user devices (e.g., wireline or mobile devices).

Tracking a large quantity of phone numbers can be cumbersome, cost ineffective, and inefficient. RingPools are designed to allow for robust tracking over vast quantities of advertisements without requiring a 1:1 ratio of telephone numbers to advertisements. The PM system automatically and efficiently determines lifespan of the association between the ad and the RingPool number by factoring in average number of clicks and the average time a user stays on site (although human intervention may be used as well).

Optionally, phone numbers are only recycled/reused after all of the RingPool numbers have been used in order to maintain the association as long as possible and optionally the PM system only breaks the join/association between the number and the advertisement/keyword after the configurable, specified lifespan has expired. Optionally, the hierarchy of numbers used in the recycling process is determined by the amount of activity. Phone numbers with the least amount of activity (e.g., call activity) are recycled first while the most popular advertisements and number pairings are preserved. Once a certain amount (e.g., all) of the numbers within a pool have been used and the assigned minimum time has not been exceeded, the PM system selects a number, which is designated within the number pool, to serve as an "overflow" number. An aspect of the "overflow" number is that the call still goes through to the correct advertiser, but the fact that it's coming in through the overflow number alerts advertisers (e.g., campaign managers) to the fact that they're out of numbers.

Optionally, phone numbers are not actually allocated to the pool until needed. So, for example, a pool of 250 numbers might only contain 100 actual phone numbers that were assigned for tracking at that instant; the remaining 150 "slots" in the pool of 250 would not be filled with actual phone numbers until later and/or when they are needed. This allows more efficient use of phone numbers in aggregate since not all pools in the system will have reached their full potential size at any given time.

When the number pool is exhausted an alarm and/or notification (e.g., provided via a Web page, an instant message (e.g., SMS, MMS), an email, a phone call, or otherwise) is optionally triggered alerting the user (e.g., a campaign manager) to increase the size of the RingPool. Optionally, the PM system uses other number recycling activity-based techniques including but not limited to: round robin; last in, first out; first in, last out; highest activity; lowest activity; and/or other weighted distribution methods. Optionally, the PM system can be configured to maintain the number association during the life of the campaign, even if the available numbers within a pool exhausts (e.g., by configuring the lifespan of the join to exceed the length of the ad campaign). Optionally, the PM system determines using one or more number usage techniques if a RingPool is provisioned with an excess quantity of numbers (e.g., if one or a group of numbers have never been used over a configurable period of time or if only a certain percentage of numbers within the number pool have been used over a configurable period of time). Excess numbers/phone addresses can be removed from the RingPool and made available to other RingPools. Optionally, numbers from a terminated RingPool are placed in an idle or reserved state for either a configurable period of time (e.g., 30 days), until the number of calls to the idle numbers falls below a configurable threshold, or other idle period management technique. Optionally, the PM system plays a reserved state audible prompt when a call is placed to a reserved state number (e.g., an out-of-service message). Optionally, the PM system delivers the call to a configured call center destination (e.g., as an alternative to and/or in addition to playing an out-of-service message) and a party (e.g., the PM system provider) may receive monetary compensation for delivering the call.

Optionally, the PM system provides a collection of detailed reports on calls for each advertisement and with the specific keyword or other parameters used to track it. Optionally, the PM system also provides the search engine and search string used when keywords are tracked.

The PM system manages the phone number allocation, call enhancements, and affiliate/publisher call tracking over the course of an advertiser's campaign. There are several types of example campaigns and different combination of example campaigns described below. Campaign types may include but are not limited to: direct advertising—a campaign supported by the PM system but not promoted by affiliates/publishers; regular pay-per-call—phone-based ad campaign promoted by affiliates/publishers; Cost-Per-Acquisition (CPA)—phone-based ad campaign promoted by affiliates/publishers in which payouts are based upon whether the call resulted in a sale; RingOut—outbound phone-based ad campaign in which calls are placed to consumers. The PM system also supports pay-per-call campaigns in which a Network manager organizes and manages one or more campaigns on behalf of one or more advertisers. Further, the system supports bundled campaigns in which a user (e.g., a Network manager of multiple campaigns) provides publishers and affiliates access to more than one ad campaign that share a common theme or "vertical" (e.g. insurance) and the user configures the allocation of incoming calls (e.g., calls generated by publishers and affiliates) across the bundle of advertiser campaigns. Optionally, the PM system further supports syndicated campaigns, where calls cascade from one network, advertiser, or publisher to another. The calls may optionally be connected using the public telephone network. In a preferred embodiment, the audio streams are directly routed by the platform between the final end points, thus eliminating telecom costs for the intermediate call legs and also increasing audio quality since there is no additional voice packet delay for the syndicated call legs. The platform can manage payouts and track payout qualifications such as across networks where it would not be feasible or cost effective for disparate systems to do so. Syndicated campaigns include ad campaigns syndicated or made available, to one or more Networks (described in further detail below).

Advertisers can also set up campaigns where certain target budgets are established for a campaign and/or time periods within a campaign. Optionally, an advertiser may restrict the number of calls for a specified budget (e.g., threshold dollar amount) and/or for a given period (e.g., a daily call cap budget). Optionally, specified budget allocations can be reset daily, weekly, monthly, or with budget replenishment. Warning notifications and confirmation notifications are optionally automatically sent to the campaign manager, and calls that exceed threshold caps may get blocked (e.g., with an announcement message) or re-routed until the specified reset/replenishment occurs.

Optionally, a type of RingPool is made available to loyalty providers. Loyalty providers reward their customers who purchase certain goods and services with a currency which can be "cashed in" by calling the provider's call center agents or by a customer accessing the provider's web-site. Conventionally, it is challenging to track and reward loyalty members when they purchase a good or service by placing a phone call.

Loyalty providers use an identifier to track each of their members. The loyalty provider can put the loyalty identifier into a RingPool parameter, and optionally other information of interest for tracking in additional RingPool parameters. When the member calls the RingPool number that has been assigned to them, the PM system is able to track the action so they receive proper credit for it in the loyalty program.

Optionally, the RingPools configuration process (described below) can be simplified by having the PM system automatically (or by default) prompt loyalty member for their loyalty identifier. Optionally, when a caller enters their loyalty identifier, the identifier is stored in association with the caller's caller identification phone address. Subsequent calls to the Loyalty RingPool numbers can be streamlined for the caller; that is, the caller will not have to reenter their loyalty identifier. Optionally, rather than have the loyalty member enter their loyalty identifier, the loyalty provider makes available or uploads to the PM provider a listing of caller IDs/members enrolled in the loyalty program.

The Add New Campaign Module II

The description below describes another example new campaign creation module.

Regular Pay-Per-Call campaigns measure a variety of call characteristics to attempt to predict the conversion of a call. An advertiser selects the characteristics of calls that an affiliate or publisher has to meet in order to qualify for commissions. These include but are not limited to total call duration, call duration spent talking to a call center agent, keys pressed, commands or keywords spoken during the call, time of day of the call, region the caller was calling from, etc.

Cost Per Acquisition (CPA) is another type of sales campaign, also known as Pay-on-Sale Campaigns, which pay out only if there was a sale, and optionally determine payout based on a percentage of the sale price. These campaigns enable advertisers to exclusively reward (e.g., pay compensation for) the calls that drive revenue (although optionally fees can be paid for other calls as well). A CPA campaign utilizes integration between the advertiser's call center and the PM system and further incorporates certain modifications to the campaign creation steps which are described below following the description of the additional embodiment of an example Regular Pay-Per-Call campaign.

As shown in FIG. 5, the advertiser is provided the ability to add a new advertising/affiliate campaign using the "add new campaign" module or button/control 23. The advertiser 300 is presented with a form or a wizard tool which provides the advertiser 300 with eight submodules for provisioning a new campaign beginning with FIG. 39, the overview submodule. FIGS. 39-47 illustrate example user interfaces corresponding to these campaign creation submodules. Fewer, additional or different submodules may be used.

Figure 39:
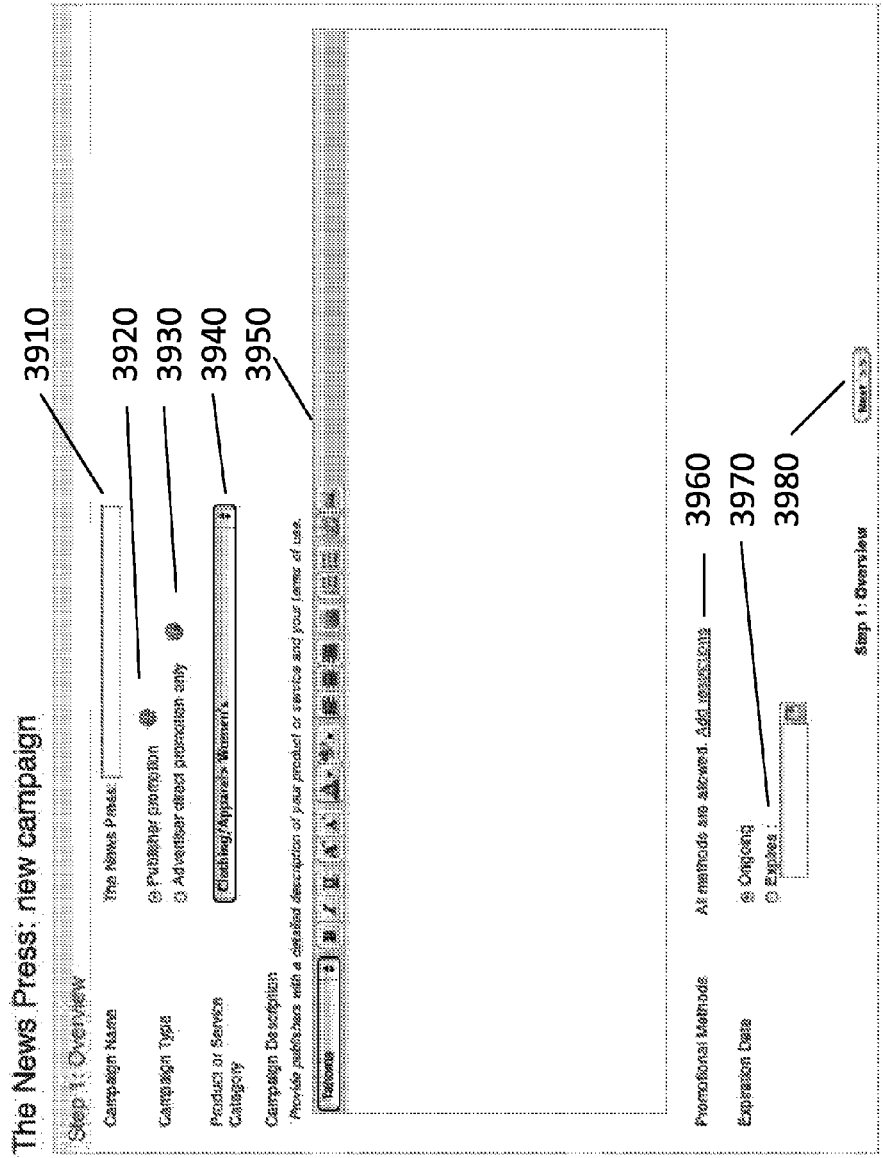
FIG. 39: is an illustration of a portion of a campaign creation process in a second example embodiment.
Figure 41:
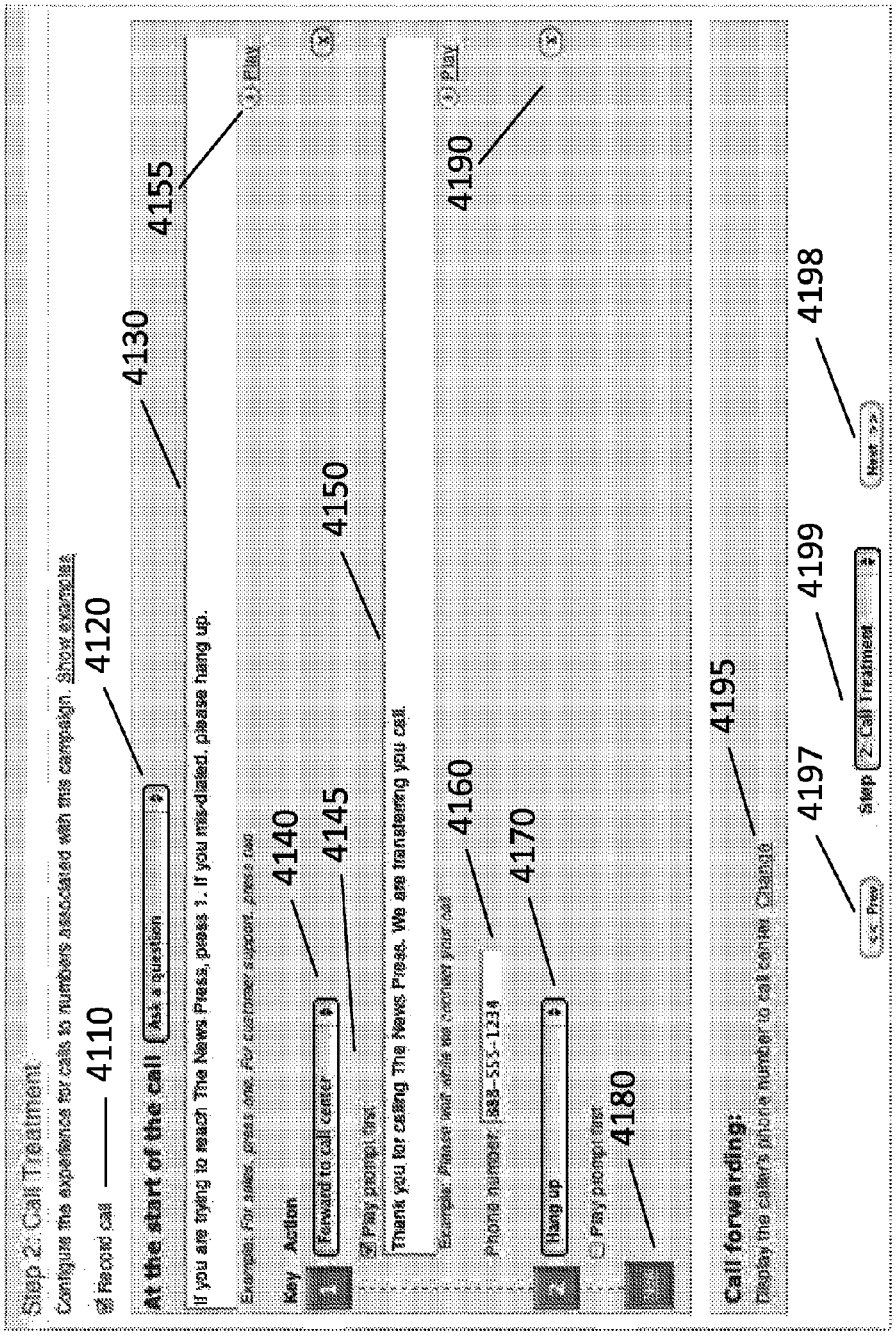
FIG. 41: is an illustration of configuring call treatment in a second example campaign creation embodiment.
Figure 42:
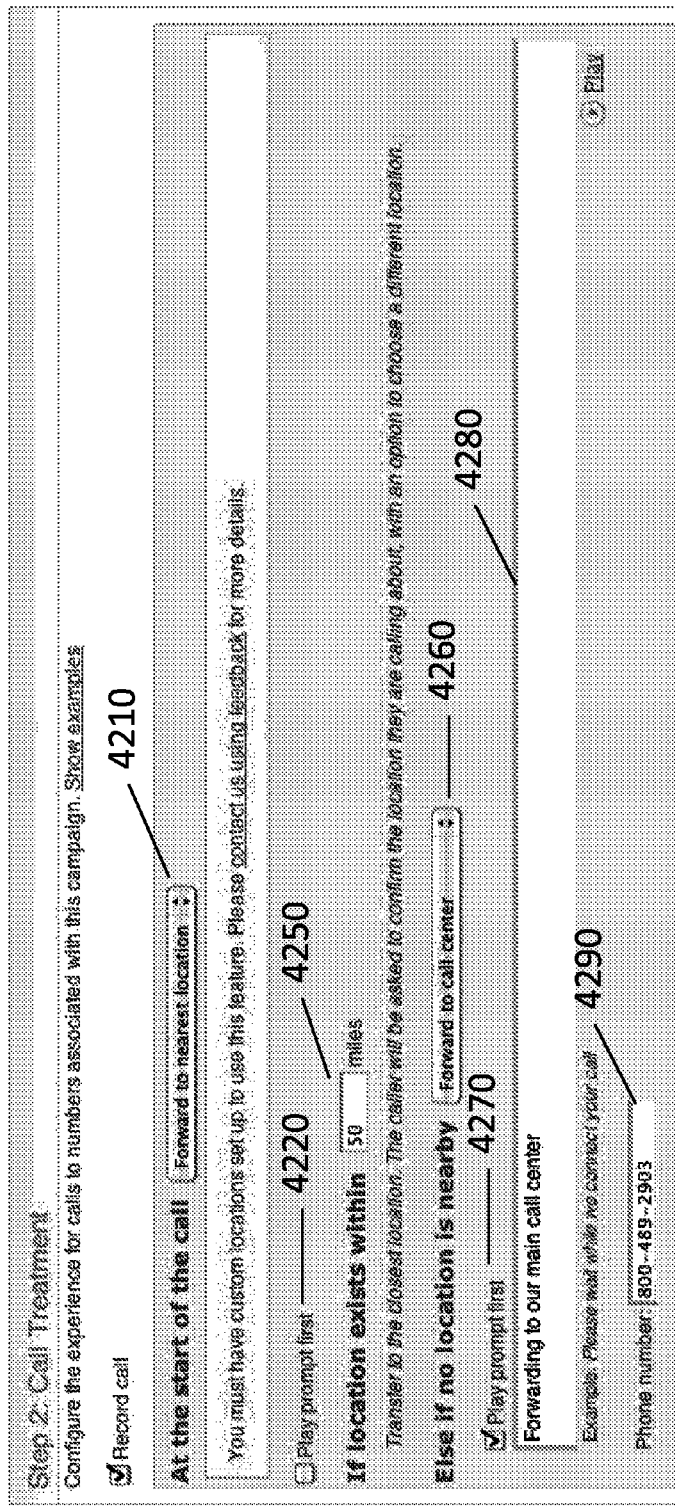
FIG. 42: is an illustration of a second example call treatment configuration in a second example campaign creation embodiment.
Figure 43:
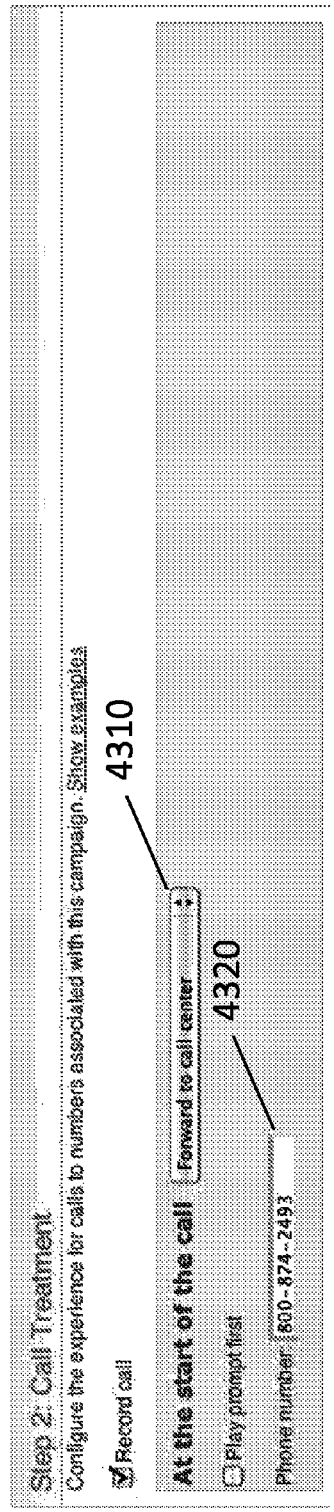
FIG. 43: is an illustration of a third example call treatment configuration in a second example campaign creation embodiment.
Figure 44:
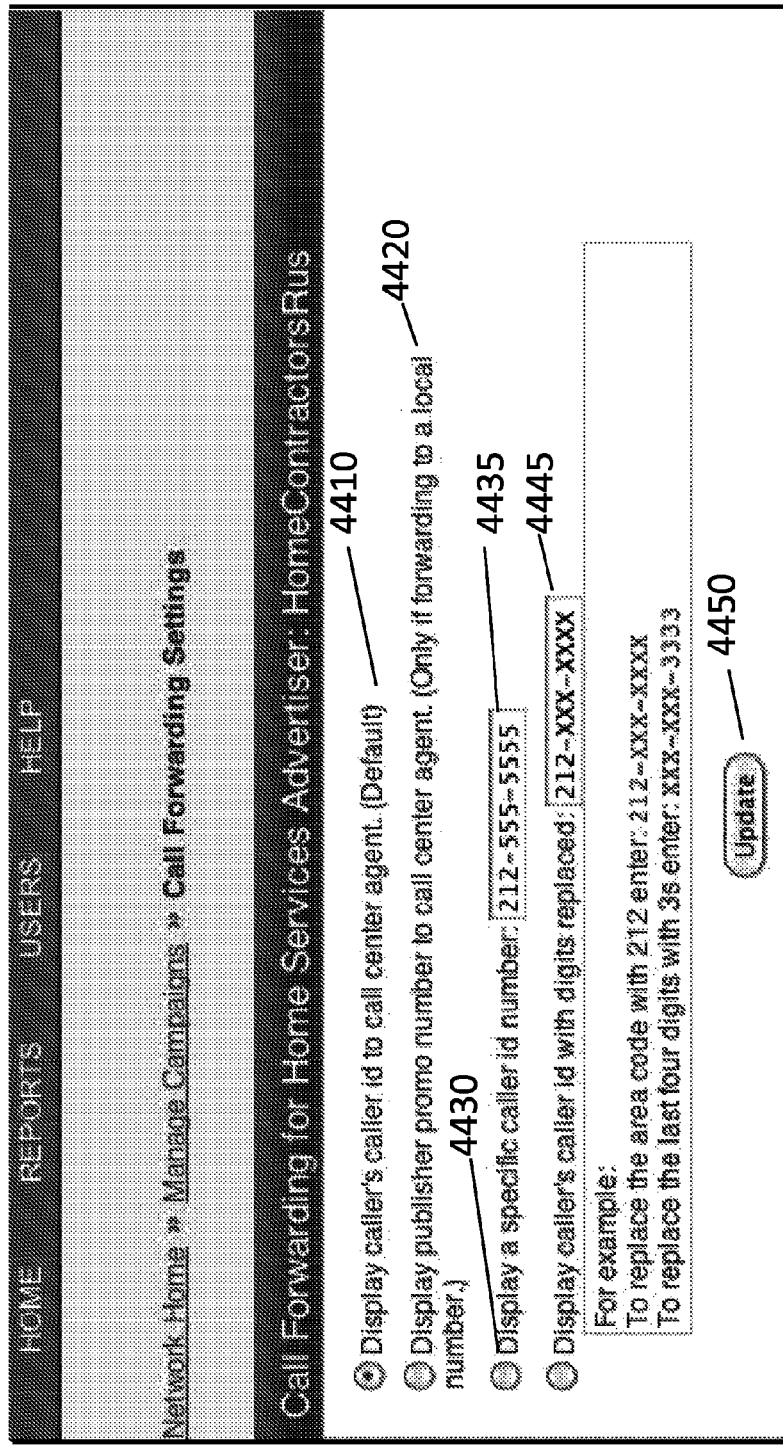
FIG. 44: is an illustration of configuring call forwarding in a second example campaign creation embodiment.

With reference to FIG. 39, in the Overview submodule, the advertiser can enter campaign information such as a campaign name in a campaign name field 3910. A campaign name may be used to identify the campaign for use by the advertiser or publishers. The advertiser can select a campaign type including, for example: Publisher promotion 3920 (or affiliate promotion), advertiser direct (internal) 3930, syndicated (not shown in the figure), and RingOut (not shown in the figure). A campaign type selection control enables an advertiser to restrict the type of campaign. In addition, an advertiser can select a campaign product or services category using a product or services category selection field 3940 and enter a campaign description in a description text field 3950.

A RingOut promotion/campaign type enables an advertiser to create a campaign that will cause the PM system to call a list of targeted subscribers. The phone addresses to be called by the PM system can be uploaded, a data store of the advertiser can be accessed to retrieve a phone number to be called when the call is made, or the targeted list can be inferred by previous caller/user actions and/or associated criteria, for example "callers in the last 30 days who did not make a purchase".

In an example embodiment, an inbound call (or an outbound call generated via a click-to-call instruction), for example, a call from a customer prospect to a RingPool number is placed on a RingOut list and the RingOut list is stored in a data store. Optionally, the RingOut list of phone numbers/addresses is used in one or more subsequent RingOut campaigns. Optionally, the phone address of the customer prospect is only added to the RingOut list if one or more attributes/characteristics of the customer prospect/customer meets certain criteria (e.g., implicit and/or explicit attributes discussed herein with respect to marketing automation). Optionally, the call treatment associated with the outbound call is modified, based at least in part, on the attributes/characteristics of the customer prospect/customer.

For example, if the customer prospect is a VIP (e.g., a significantly more desirable prospect than a typical prospect), the system places a first outcall to an agent before originating a second outcall to the VIP (e.g., to ensure there is no delay when the VIP answers the call). In another example, rules are applied to customer/prospect attributes/characteristics to determine, at least in part, how the call is to be routed or handled (e.g., which agent and/or call/sales center is going to handle the call).

In another example, IVR rules are applied to customer/prospect attributes/characteristics to determine whether an IVR menu is to be played in the outcall, and if so, which IVR menu(s) are to be played. Optionally, in a RingOut campaign, an Interactive Voice Response flow can be configured to branch conditionally based on the attributes/characteristics of the prospect/customer. For example, if a prospect/customer completes a form (e.g., a web form) on a company's web site or accessed via a company phone app, the customer prospect is entered into a RingOut campaign. In the campaign, the system originates an outbound call to the customer prospect and plays a conditional IVR branch (e.g., the system prompts "It appears you're interested in learning more about Product A, press one to transfer to an operator to learn more about Product A"). Optionally, the conditional IVR branch is a parameterized template in which the information entered and/or selected in the form is dynamically inserted into template prompt text at a marked location. For example, the parameterized template may be "It appears you're interested in learning more about [form field data], press one to transfer to an operator". If the user had entered or selected "Product A" via the form, the "Product A" would be inserted into the template at the location marked "form field data." Optionally, the RingOut list is used in one or more subsequent advertiser's marketing programs.

The PM system manages, tracks, records/logs, and/or credits some or all outbound calls in a manner similarly described for inbound calls. For example, the call management, tracking, and crediting process enables an advertiser to associate a commission payout with the publisher that caused and/or is associated with the original call. Further, the call management, tracking, and crediting process enables the publisher to tie any credit/commission payment back to the original call so that the publisher can measure their program(s) effectiveness and use the information to modify, optimize, and/or customize their program(s) to improve their Return On Investment (ROI). Optionally, the PM system provides a fully customizable Interactive Voice Response session to the caller at the beginning of the outbound call to the subscriber/consumer. Optionally, a RingOut or outbound call campaign requires that called parties be presented an option to opt-out of a campaign and if this option is selected by a called party, remove their phone number from the outbound call list. Optionally, this is configured by default in the call treatment campaign configuration step described below. Optionally, the PM system presents one or more voice prompts to the caller and collects responses from the called party and does not connect the call to a call center. Optionally, the PM system initiates a second outbound call to a call center after certain criteria are met including for example: ringing, call answered, voice menu presented, response to voice menu detected, specific response to voice menu detected, etc. Optionally, the PM initiates a call to the subscriber/consumer first, initiates a call to the call center, and then bridges the two outbound calls. Optionally, the calling order is reversed with the outbound call to the call center placed first.

Optionally, a campaign can be restricted to advertiser direct promotions only by selecting the Advertiser direct promotion only control 3930. Selecting Advertiser direct only prevents publishers and affiliates from viewing or accessing ad campaigns created by the advertiser.

Optionally, the product or services categories control 3940 enables publishers/affiliates to search for relevant campaigns by their type (insurance, travel, legal service, etc.). Optionally, the categories control 3940 includes a list of relevant user selectable defined products and/or service categories. Optionally, the list includes an "other product" or "other service" category if the user is unable to find a relevant pre-defined product or service. Optionally, the selection of an "other" category causes a text entry field to be displayed in which a user can enter in their own service category. Optionally, the selection of an "other" service category causes a notification to be sent to the PM system operator. These operator notifications can be used to trigger a campaign review and/or an update to the pre-defined categories. Campaign description text field 3950 enables advertisers to provide information to affiliate/publishers such as general information concerning the campaign, one or more terms and conditions of the campaign, general information regarding the advertiser's products and/or services, general information about the target market for the advertiser's products and/or services, etc. Optionally, the text field 3950 includes a collection of text formatting controls to manage font type, paragraphing, etc.

The Overview submodule optionally also includes a promotional methods control 3960 which defaults to "all methods". Optionally this promotional methods control enables an Advertiser to restrict the promotional methods used by publishers/affiliates for the campaign. Optionally the restrictions are merely informational requests to publishers/affiliates. Optionally, there are web robots, bots, which run automated searches associated with publishers/affiliates to ensure conformance with the specified methods. Optionally, other methods are used involving publisher/affiliate audits using trained operators and third party agents.

Optionally, the promotional method control when selected generates a display listing online promotional methods 4005 (see FIG. 40) including but not limited to:

General Content or Review sites 4010 that provides dynamic information and knowledge;

General display sites 4030 that are similar to General Content sites but content is more static;

Discount or Coupon sites 4020 that provides users with discounts for products and services;

Email sites 4040 that provides users with web-based email;

Rewards or Incentive sites 4050 that provides users with rewards and/or incentives when visiting a site or using a product or service of a business;

Lead Form or Co-Registration sites 4060 that a user registers for a service or landing page related to promotional lead generation;

Search sites 4070 sites that users enter web search queries;

Social Media sites 4080 that users interact in an interpersonal or business networking environment;

Software sites 4090 that software or media is downloaded; and,

Other 4095 general catch all for web sites which do not fall into the categories described above.

Optionally, each category of promotional methods includes an "allow or do not allow" control 4015. Optionally, the advertiser can specify in a note field 4017 next to each promotional method any caveats or special permissions required to promote using the site type.

Optionally, campaign expiration date controls on the web page enable an advertiser to specify an active campaign time period. Optionally, a user selects the expire control 3970 and enters an expected end date for the campaign or by selecting the calendar control and selecting a date on a calendar display. Reaching the expiration date of an ad campaign caused the campaign to be no longer accessible or visible to publishers and affiliates. In addition, when a campaign expires, calls stop routing to the campaign's destination phone number and payouts to publisher and affiliates for calls end. Optionally, selecting the ongoing control 3960 removes any entered expiration data or time period on the campaign. Optionally, the Overview submodule includes a Next control 3980 which when selected by a user transitions control from the Step 1 Overview submodule to the Step 2 Call Treatment submodule.

In the Call Treatment submodule (Step 2), the Advertiser 300 can set how incoming calls are to be routed and the caller experience. Call treatment options help Advertisers filter out calls for improved conversion rates. (See description of FIG. 14 for additional details on how incoming calls are to be managed including entering destination phone number to receive calls and configure SMS promotions.) A call treatment option includes configuring an Interactive Voice Response (IVR) tree, see FIG. 33. Optionally, the Call Treatment submodule includes a record call control 3310 which when selected by a user causes calls routed through the system to be audibly recorded. Optionally, the PM system administrator configures the minimum call recording length. Call recordings below the minimum threshold are deleted. Optionally, the recorded calls are made available to the user by a number of conventional methods including by sending the user emails with attached audio files of the recordings, by an account display of all calls including the time of the call, length of the call, caller information, audio recording, etc., and by accessing the calls by calling the system and reviewing/listening to the recorded calls. Optionally, the recorded calls are transcribed using speech-to-text methods and the text messages are sent to the user via email or as described above in an account display of the calls. Optionally, important keywords (e.g., keywords designated by an advertiser) are detected in the audio and assembled into a "tag cloud" for that call. Optionally, the PM system uses the "tag cloud" for a call to determine the payout.

Optionally, there are several standard options in configuring an IVR tree which include any combination of: asking the caller a single question; asking the caller questions followed by a series of user responses; forwarding the call to a nearest call center (e.g., as determined by the PM system from a list of defined campaign manager call centers wherein the system uses, e.g., signaling information associated with the inbound call, to determine in the nearest call center or the caller's location information from a mobile device of the user to determine the nearest call center); forwarding the call to a single call center (e.g., a phone number); offer a text message (e.g., if the user is calling from a mobile device as determined by the PM system sending a text message to the user device or prompting the user to enter their mobile device number and then sending a text message); hang up; and, check a call condition. A call condition can optionally be checked to invoke an IVR tree or options within an IVR tree (e.g., to allow for multiple tree branches). Optionally, calls can be routed and/or commissioned differently based on the user's responses to the IVR tree.

Optionally, an Interactive Voice Response flow can be configured to branch conditionally based on the keyword search term entered by the user and/or used in the search query. For example, if a customer prospect entered the search query "Product A" and the user originates a call to a RingPool number associated with the displayed search results (e.g., calls or selects a click-to-call option), the system plays a conditional IVR branch (e.g., the system prompts "It appears you're interested in learning more about Product A, press one to transfer to an operator"). Optionally, the conditional IVR branch is a parameterized template in which the search/query term is dynamically inserted into template text. In this example, the parameterized template is "It appears you're interested in learning more about [keyword], press one to transfer to an operator" where the search/query term replaces [keyword].

Other optional call conditions include region (see creating regions, FIG. 46), during business hours (see setting business hours, FIG. 45), phone type (landline or mobile as determined by the PM system), user device (e.g., smartphone, tablet computer, iPhone, iPad, Android device, set top box, interactive television, etc.), general or specific demographics of the caller, general or specific psychographics of the user, holidays, number of call, number of calls within a given period, etc. Optionally, logic operators can be used to create combinations of conditions including, for example, in, out, during, after, and, or, not, greater than, less than, equal to, etc. An example combination of conditions is "in region or during hours".

Optionally, an Interactive Voice Response flow can be configured to branch conditionally based on a resource URL. When that condition is reached during a call, the PM system will access that URL, passing it a set of parameters that describe the campaign that is executing and details about the call and the caller. The response returned from that URL is then used to determine whether to take the branch or not. Optionally, the response may be set to contain the phone number of a call center to connect the call to. This allows the service that is hosting the resource URL to use its own logic, data, and third-party resources such as other resource URLs to determine the best call center to direct that call to. For example, the service hosting the URL could put the call out for real-time bid and the highest bidder will receive the call. Another example is if someone who searches "University of Phoenix Portland Oreg." and then calls the displayed number will optionally have their call routed to the Portland, Oreg. office for the University of Phoenix.

To setup a question/response IVR tree, the campaign manager selects the "Ask a question" option in the scroll menu 4120. In response to the user selection, the PM system prompts the user to enter the text of the question in the text field 4130. The PM system converts the text to speech and the converted text is played to callers. Optionally, the PM system includes a play control 4140 which if selected by the manager plays the text entered in the field 4130. Optionally, for better quality prompts, professional prompt recordings can be uploaded and configured into the IVR tree. Optionally, the PM system displays a list of potential caller keypad entry responses to the question. Alternatively, a new set of controls 4180 is displayed for each possible keypress. In this example, the keypress 1 is a valid response to the question played to the caller at the start of the call. The manager configured the call treatment keypad 1 response by selecting the "forward to call center" option from the scroll menu 4140. The PM system optionally responds to the selection by displaying a play prompt first option check box control 4145 and a destination number or phone address field 4160 of the advertiser's call center.

In this example, the manager selected the "Play prompt first control 4145 which optionally causes the PM system to display a text field 4150. The PM system converts the text to speech and the converted text is played to the caller if the "1" key is entered by a user during a call. Optionally, the PM system includes a play control 4155 which if selected by the manager plays the text entered in the field 4150. In this example, the manager configured the call treatment keypad 2 response by selecting the "hangup" option from the scroll menu 4170. Callers selecting the keypad 2 response cause the PM system to hangup the call. Optionally, the last configured response option becomes the default action for any keypad responses not specified by the user or PM system support staff configure, on behalf of the campaign manager, any unspecified keypad response options. Optionally, a "New" control 4180 is displayed which when selected adds the next sequential keypad IVR response control to be configured. Optionally, the user interface includes a delete control 4190 which deletes the configured IVR response control.

Another standard Call Treatment configuration option is "forward to nearest location". The advertising manager provides the PM system with a list of geographic locations for call center locations (e.g., car dealerships, tax preparation centers, medical offices, etc.). If the "forward to nearest location" is activated, the PM system transfers the call to a location nearest the caller's geographic location. The location is determined by the PM system using, for example, a geographic inference from the caller's caller ID. Optionally, other methods are used. For example, a caller can be prompted to enter their zip code. Or, optionally, a guess can be made about caller location (inferring from their phone number for example) and the caller can be prompted to confirm or correct the region. The PM system can then determine by querying one or more databases the closest location nearest the user entered zip code. In another example, the user may be calling from a mobile device with GPS/location features. If a PM system application is active on the mobile device, the application can optionally be queried by the PM system (e.g., identifying the device using the mobile device caller ID) to determine the user's location. The PM system can then transfer the call to a location nearest the user's location. In another example, the PM system may access the location of the mobile device by accessing a third party system or third party database which is tracking the mobile device's location. As in the previous example, this information can then be used to transfer the call to the location nearest the user. Optionally, the campaign manager configures the IVR tree to interact with the user to, for example, ask permission to obtain the user's location information directly or from a separate data source. To configure this option, the manager selects the "forward to nearest location" using the At Start menu control scroll 4210, see FIG. 42.

Certain embodiments enable a user, such as a campaign manager to specify a "forward to dynamic location" call treatment configuration option. By way of illustration, if the forward to dynamic location is selected, optionally, in response to a call, the system queries one or more internal or external (e.g., accessed via a data network connection where the data store is optionally provided by a third party) data stores to determine a preferred or best available call routing or location to route the call (e.g., via a bridged outbound call). Optionally, information about the call is transmitted in association with the query including, for example, the caller's phone number and/or one or more implicit and/or explicit attributes. Optionally, in response to the query, the data store returns a phone address which is received by the system, or the system determines, based at least in part on the query response from the data store, where to route the call to (e.g., the most available call center or a VIP call center) and/or how to route the call.

Optionally, the manager can configure the PM system to play a voice prompt to the caller before transferring the call or by selecting the Play prompt first check box control 4220. The campaign manager optionally can configure the PM system to transfer to a geographic location with a specified distance in miles (although other measures of distance can be used as well including, for example kilometers). The campaign manager specifies the distance by entering in the number field 4230 the number of miles (e.g., 50). Optionally, the caller is asked to confirm the location they are calling about with an option to choose a different location. Optionally, the call is simply transferred to the system determined geographic location if the location is within the specified geographic radius. Optionally, the system allows the manager to configure an optional action if the caller is not within the specified radius. For example, the manager could configure an IVR sub-tree or branch. Optionally, the call is forwarded to a centralized or regional call center if the caller is not local to the nearest location by selecting the "Forward to call center" menu scroll control 4250. As above, the PM system displays controls which enable the manager to play a prompt before transferring the call 4270, enter the voice prompt text to be played to a caller on transfer 4280, and enter the call center number in the phone address field 4290 (optionally, the phone number address field is pre-populated with the advertiser's call center if for example the call center number is stored in the advertiser's account profile).

Another standard Call Treatment configuration option is "forward to call center". Optionally, the call is transferred without a voice prompt. In this case, the call experience is simply a direct call transfer to the specified phone number. The PM system is transparent to the caller. To configure this call treatment, the campaign manager selects the "forward to call center" option in the menu scroll control 4310 and enters a destination number in the phone address field 5920.

Optionally, the call treatment submodule display includes a Call Forwarding control 4195 which configures the phone number displayed at the destination phone address. The default option is the display of the caller's original caller identification phone address. In response to the user selection of the Call Forwarding control 4195, a Call Forwarding settings pop-up window or new web page is displayed, see FIG. 44. From the Call Forwarding settings a campaign manager can customize several forwarding options. The default forwarding option control 4410 configures the Original Calling Party's phone address to be displayed at the campaign destination number (e.g., call center). A second control 4420 configures the publisher's promotional phone number to be displayed at the destination number (which optionally can include local, long distance, international and toll-free phone addresses).

A third control 4430 configures the PM system to display a campaign manager specified caller identification number for all calls. For example, a campaign manager can optionally replace the caller's caller ID with the number 212-555-5555 by entering the phone address 212-555-5555 in the field 4435. If a customer calls a promotional number associated with the campaign from the number 805-645-1234, the caller ID displayed to the call center agent would be 212-555-5555 and not 805-645-1234. A fourth control 4440 configures the dynamic replacement of digits in the caller's number with one or more fixed numbers. The campaign manager specifies in the field 4445 the fixed numbers and their position in the number string leaving the caller's original numbers in the non-specified positions (marked with an X). For example, if a campaign manager would like to replace the area code in all calls with the fixed area code 212 and otherwise retain the original caller's number, the campaign manager enters 212-XXX-XXXX in the field 4445. If a customer calls a promotional number associated with the campaign from the number 805-645-1234, the caller ID displayed to the call center agent would be 212-645-1234. Optionally this can be a Session Initiation Protocol (SIP) address and/or optional SIP values, rather than a phone number. This feature, for example, enables replacing the caller ID with a unique numeric ID that can be used later to match up call records (such as to determine pay-on-sale) but does not disclose the actual caller ID. Optionally, the call forwarding web page includes an update control 4450, which if selected by the campaign manager updates the manager's selection in the PM system database.

Optionally, the Call Treatment submodule includes a Next control 4198 which when selected by a user transitions control from the Step 2 Call Treatment submodule to the Step 3 Hours submodule. Optionally, the Call Treatment submodule includes a Previous control 4197 which when selected by a user transitions control from the Step 2 Call Treatment submodule to the Step 1 Overview submodule. Optionally, the Call Treatment submodule includes a Jump To control 4199 which when selected by a user transitions control to any of the campaign creation submodules.

Figure 45:
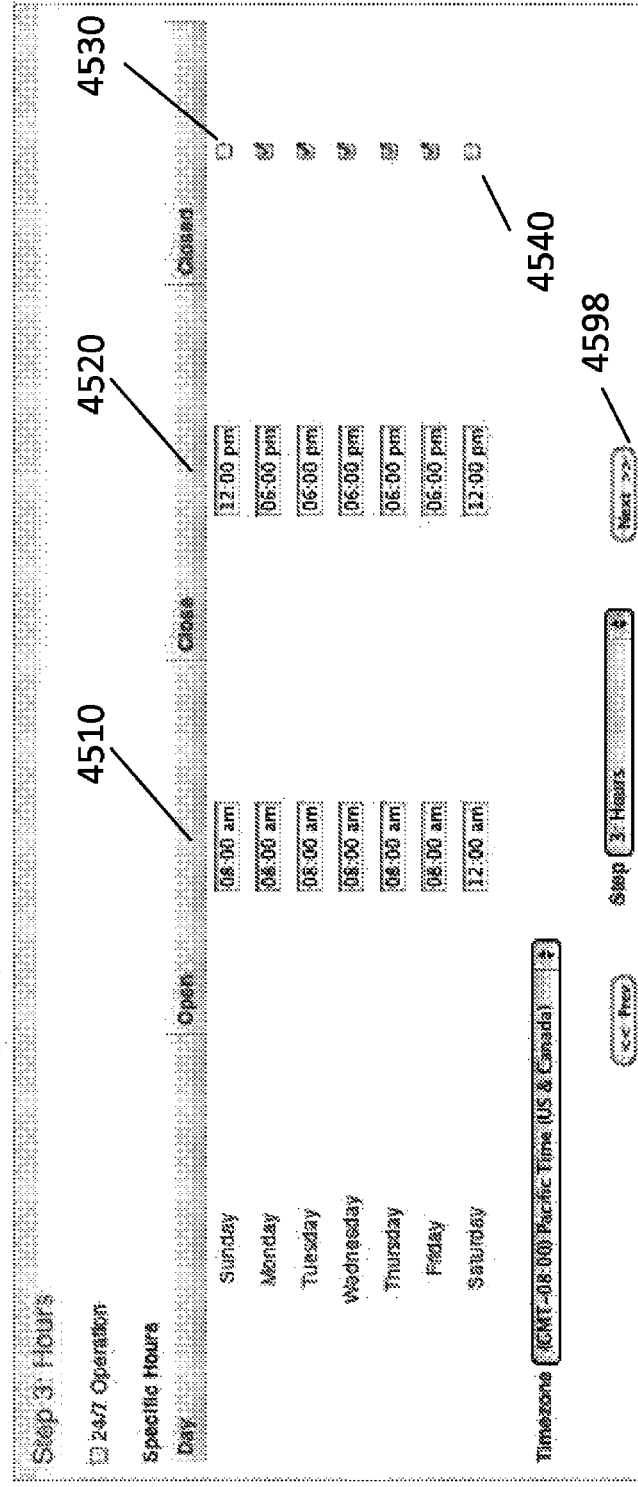
FIG. 45: is an illustration of configuring call center hours of operation in a second example campaign creation embodiment.

From the Hours submodule (Step 3), the user can set the hours of operation when the campaign destination is available to answer calls (e.g., call center hours of operation), see FIG. 45. For a description of the Hours submodule controls see related description of FIG. 16. Optionally, the controls to set hours by day of the week is displayed when the 24/7 default control 1640 is unselected. Optionally, the time zone control 1620 defaults to those of the campaign manager. Optionally, the PM system can dynamically route calls to one or more different call centers depending upon their respective hours of availability, agent availability, conversion rates, call durations, or other feedback from the call center(s) either directly or as inferred by the system and/or system operation staff, etc.

Figure 46:
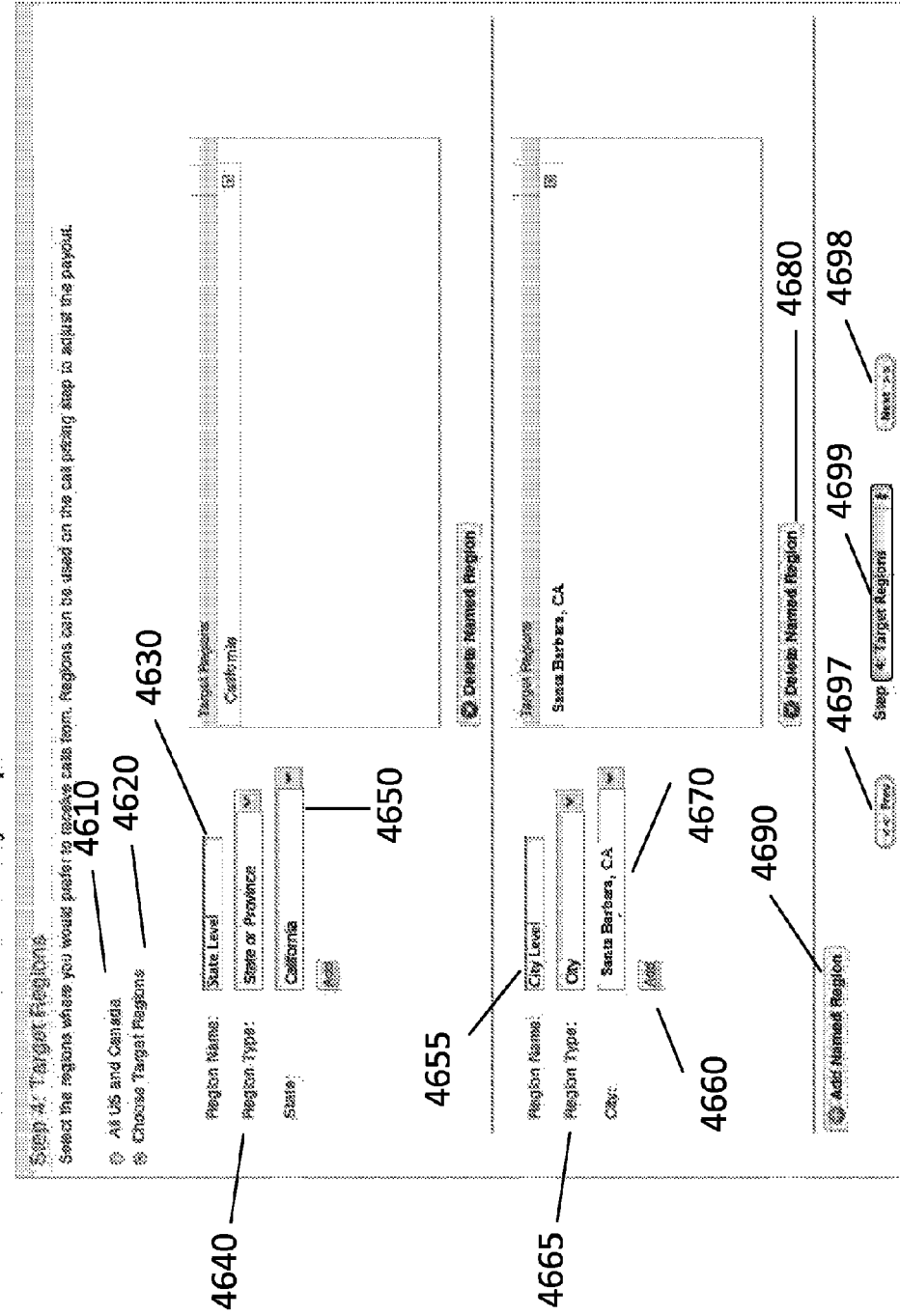
FIG. 46: is an illustration of configuring target regions in a second example campaign creation embodiment.
Figure 47:
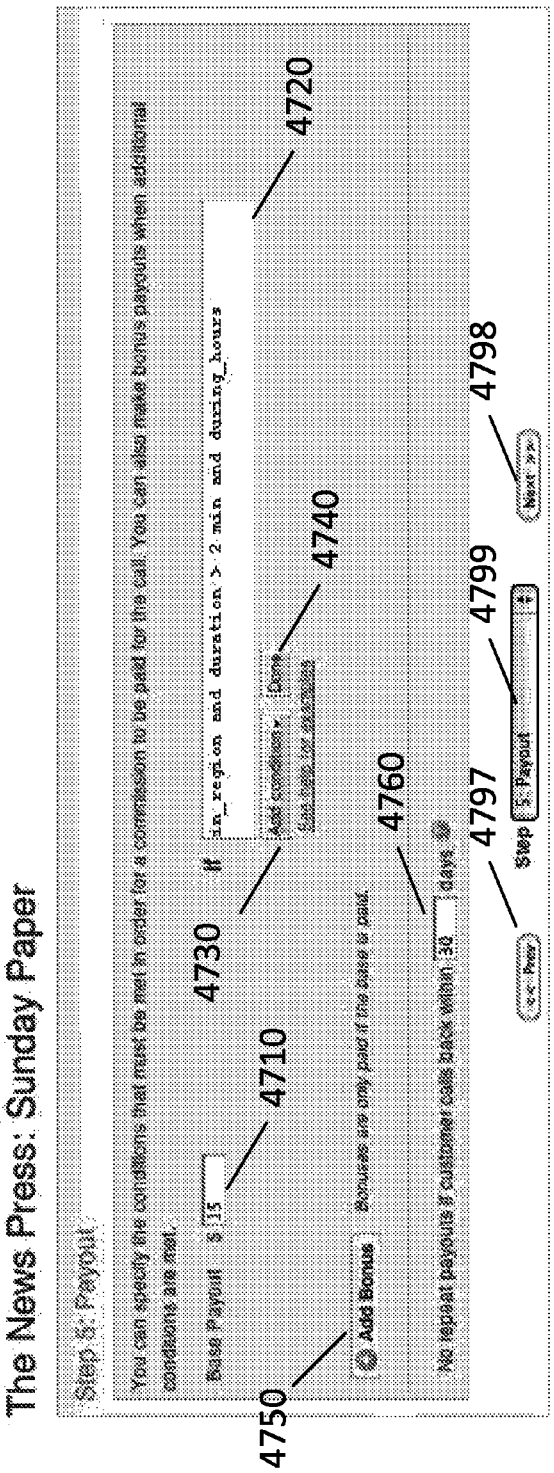
FIG. 47: is an illustration of configuring affiliate/publisher payouts in a second example campaign creation embodiment.

From the Target Regions submodule (Step 4), an advertiser 300 can specify the areas within the geographic region (country, state, city, etc.) from which they prefer to receive calls, see FIG. 46. Optionally, call pricing/payouts can be based at least in part on these regions. Optionally, the Target Regions display includes a control 4610, which does not place any restrictions on inbound calls. All calls within the U.S. and Canada are accepted and routed to the configured destination phone address (although certain specific calling numbers may be blocked). Optionally, the Target Regions displayed include a Choose Target Region control 4620 that if selected displays controls and editable fields. These controls enable a manager to optionally specify preferred regions in which publishers/affiliates payouts are adjusted. Optionally, each target region includes a target region title text field 4630 which enables a user to specify a title for a target region. Optionally, each target region can be narrowed to a state or province or city (or other region subset) by selecting the select Target Region Type control 4640.

Optionally, depending upon the Target Region Type selected, a second control is displayed to the campaign manager in response to the selection. If a State or Province is selected, a select State control 4650 is displayed which includes a predefined list of States. If a City is selected, a select City control 4660 is displayed which includes a predefined list of Cities/States. Optionally, the user interface includes a control 4670 to add additional target regions. Optionally, the user interface includes a control 4680 to delete preferred target regions. Optionally, the user interface includes a control 4690 to add new named regions. Optionally, a campaign manager submits or uploads a list of approved geographic areas (e.g., area codes or zip codes) which are used by the PM system. Optionally, these are submitted to the PM operations personnel for uploading. This uploading eliminates the task of manually entering hundreds or thousands of approved geographic areas. Optionally, the user interface includes submodule navigation controls 4697, 4698, and 4699 as described with respect to FIG. 41.

In the Payout submodule (Step 5), a user/Advertiser 300 can set the pricing for calls. A base payout (e.g., commission paid on a call) can be specified in addition to bonuses if certain criteria are met. Enabling an Advertiser to specify payout criteria allows the Advertiser to pay out only for "good" calls, thereby encouraging more of them. The Payout submodule includes a Base Payout dollar entry field 4710. The amount entered by the user determines the payout to a publisher/affiliate if a condition to the right of the payout field has been met. The Payout submodule also includes a text entry condition field 4720 in which one or more conditions can be specified for an established payout fee. Conditions optionally include but are not limited to: the period of time from receipt of a call to the termination of the call by the calling party; the period of time from receipt of a call to the termination of the call by the called party; the period of time from receipt of a call to the termination of the call by the calling and called party; the period of time from receipt of a call to the termination of the call by the calling or called party; the period of time beginning after call origination from the PM system to a destination number until call termination by the calling party; the period of time beginning after call origination from the PM system to a destination number until call termination by the called party; the period of time beginning after call origination from the PM system to a destination number until call termination by the calling and called party; the period of time beginning after call origination from the PM system to a destination number until call termination by the calling or called party; the period of time beginning after receipt of answer at the destination number until call termination by calling party; the period of time beginning after receipt of answer at the destination number until call termination by called party; the period of time beginning after receipt of answer at the destination number until call termination by calling and called party; the period of time beginning after receipt of answer at the destination number until call termination by calling or called party; the Target Region from which the call originated; the Target Region from which the call terminated; the Target Region from which the call originated and call terminated; the time of day the call was received by the PM system; if the call was received by the PM system during specified business hours; if the call originated from a landline network; if the call originated from a wireless network; the type of device the call originated from (e.g., smart phone, tablet computer, etc.); the application(s) the caller may have originated the call from on their calling device; the application(s) running on the device at the time the calling device originated the call; the GPS location of the calling device at the time the call was originated; if a coupon or discount was associated with the promotion; if the call originated from an area in proximity to a location of the advertiser; if the caller was sent an SMS within a configurable period of time, if the caller allowed access to certain private data (e.g., age, marital status, credit information, etc); payment method of associated transaction (e.g., credit card, bill-to-phone bill, Paypal®, checking account, etc), etc.

Conditions also optionally include call results received from the call center (e.g., if the call converted, sale amount, etc.). Optionally, the payout amount can also be conditioned, for example, as a percentage of a sale amount. Optionally, the conditions described above can be combined in determining the base payout using logical conjunctions (And, Or) and logical disjunction (Not) phrases. Optionally, the user interface includes a condition control 4730 which allows an Advertiser to select from a list of predefined conditions and conjunctions to create the desired payout condition. Optionally, the set of condition controls includes a Done control 4740 which signals to the PM system the user has completed the payout condition statement. Optionally, after a condition has been defined and the Done control selected, the display lists the payouts (regular and bonus) and their associated condition(s). Optionally, the user interface includes an edit option (not shown in FIG. 47) which if selected allows a user to edit their condition and/or payout. Optionally, the user interface includes a delete option (not shown in FIG. 47) which if selected allows a user to delete a bonus payout.

Optionally, the Payout submodule includes a Bonus control 4750. Bonuses are payouts (or commissions) for calls added on top of the base payout if the condition(s) are met. For example, a call which meets a base condition, a first bonus condition, and second bonus condition receives a payout equal to the base amount plus the first bonus condition amount plus the second bonus condition amount. Structurally, the configuration display and controls for bonuses are the same as that described for Payout; there is a bonus dollar field and an associated configurable condition(s). Optionally, the Payout submodule includes a configurable repeat caller time period (e.g. hours, days, weeks, months, etc.) restriction control 4760; a fraud protection mechanism designed to prevent callers from gaming the system by repeatedly calling the advertiser in order to accrue payout revenues. Optionally, the user interface includes submodule navigation controls 4797, 4798, and 4799 as described in FIG. 41.

Figure 48:
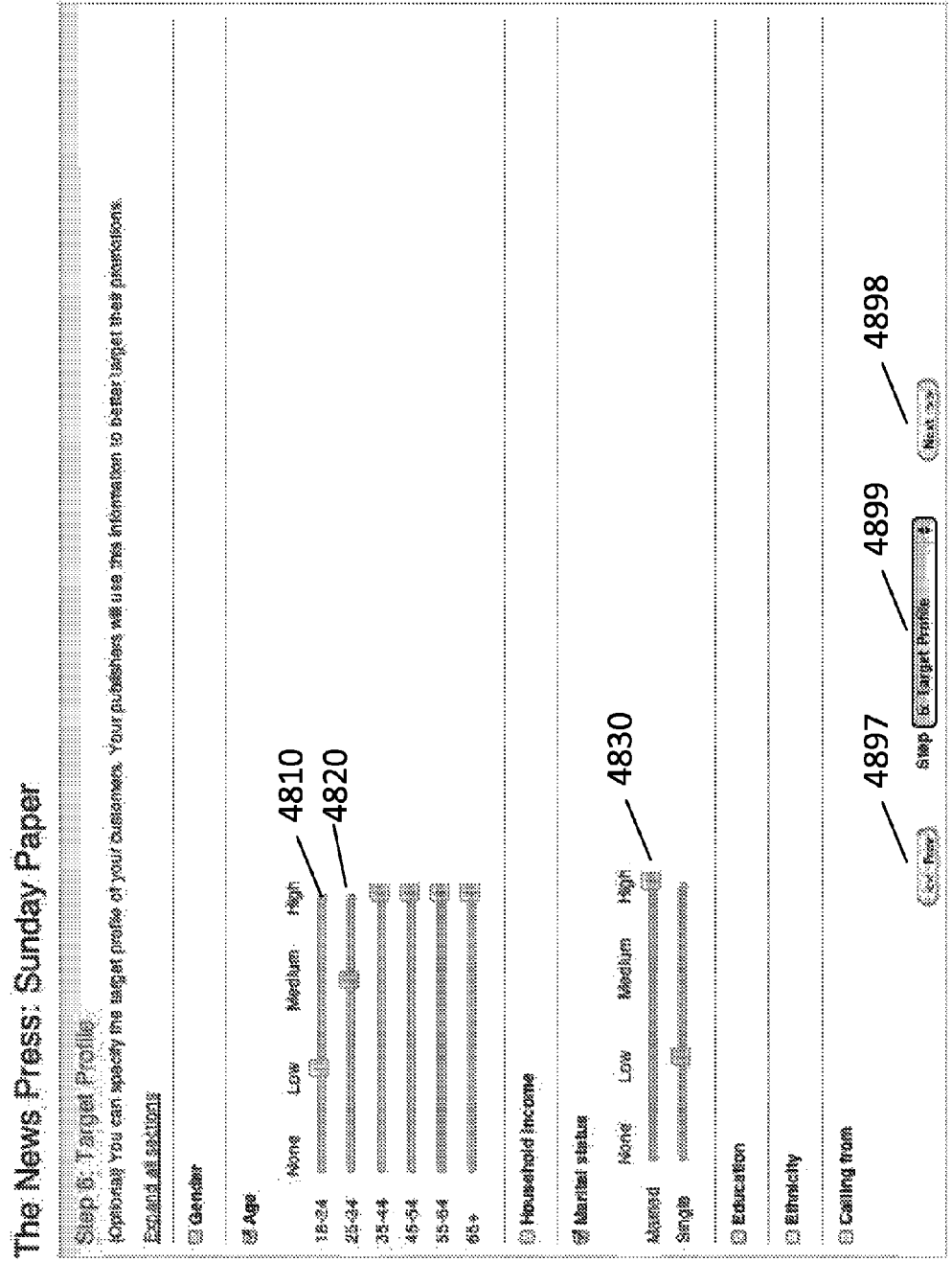
FIG. 48: is an illustration of configuring target profiles in a second example campaign creation embodiment.

From the Target Profile submodule (Step 6), the advertiser can select from a range of caller profile attributes to enable publishers to better target their promotions at a preferred audience, see FIG. 48. Optionally, the Target Profile specified is informational and not enforced by the PM system. Optionally, the Target Profile criteria is considered when deciding whether to transfer a call to the campaign's destination phone address. Optionally, the Target Profile criteria is used in determining payouts/commissions to publishers and affiliates. The Target Profile submodule can be used to target customers by gender, income, marital status, etc. and optionally set a hierarchy within each field. For a description of the Target Profile submodule controls see related description of FIG. 16. Optionally, the user interface includes submodule navigation controls 4897, 4898, and 4899 as described in FIG. 41.

Optionally, advertisers provide creatives (e.g., advertisements, including, for example banner ads) for the ad campaign they create. These creatives are available for use by publishers and affiliates and are uploaded in the Creatives submodule (Step 7). An advertiser can upload one or more creatives and one or more types of creatives. Optionally, any previously uploaded creatives are also displayed and the campaign manager can select them to be included in the campaign. Optionally, the PM system displays a default Ad identifier 4910, for example, established during account creation. Ad identifiers are used, for example, to identify a creative and for tracking/reporting (e.g., to determine which landing page to send the online user to as described below). Optionally, the campaign manager edits the default Ad identifier to create a unique identifier for each uploaded creative. The latter enables an Advertiser to get more refined feedback on the effectiveness of individual creatives.

To add a new creative, the user first selects the type of creative to upload by selecting the creative type control 4920. The creative type control includes a predefined list of creatives including but not limited to: Images (various sized online banners), text, emails (html), print (hi-def images), video and audio files for radio and network television commercials. Optionally, once a creative type has been selected, contextual fields and controls relating to the type of creative to be uploaded are displayed. In the case of uploading a banner, a creative description text field 4930 is displayed. The campaign manager enters a word description for the creative to make it easier to refer to. Optionally, a choose file control 4935 is displayed in the Creatives submodule which enables the manager to choose a file from the memory of the device they are accessing the PM system from. Optionally, a source file upload control 4950 is provided on the web page for a higher quality creative upload. Optionally, the default Ad ID is displayed in an editable text field 4960. The user has the option to modify the Ad ID in order to create a unique Ad ID for the Ad. Once a file has been selected for uploading, the user can optionally select the upload control 4940 which causes the upload of the file to the PM system. Optionally, the Creative Module displays a list of creatives 4970 which have previously been uploaded by the advertiser. If the user selects the check box control 4970, the creative is associated with the campaign. Optionally, the user interface includes submodule navigation controls (not shown) as described with respect to FIG. 41.

[Advertisers can place a "call to action" or phone number on a piece of creative, and the PM system will serve/replace the correct phone number into that piece of creative. Also, with networks that have TV or radio creative, in addition to providing them with a unique phone number per creative we also provide them with a unique URL they can include in those ads which includes the underlying publisher phone number in the URL so the PM system can credit those web-based transactions back to the correct lead source.]

Figure 50:
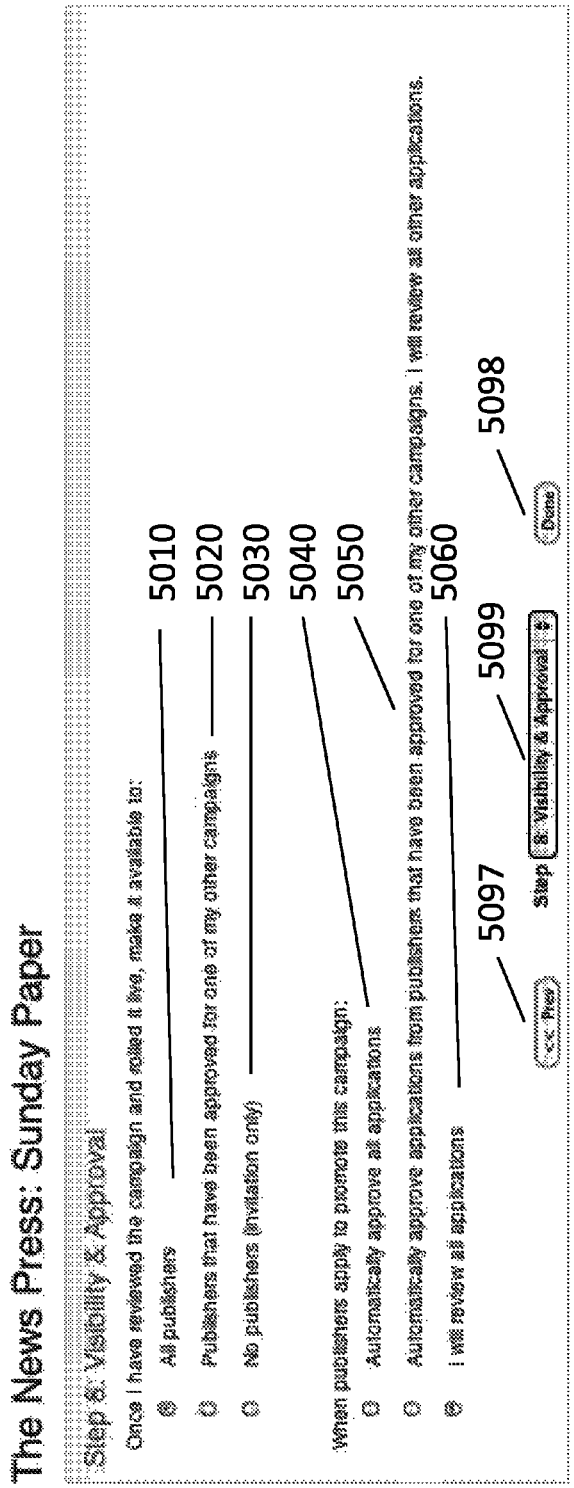
FIG. 50: is an illustration of configuring visibility and approval in a second example campaign creation embodiment.

In the Visibility and Approval (Step 8) submodule, an advertiser can dictate which publishers can view and apply for the campaign, see FIG. 50. In addition, the Visibility and Approval submodule enables a user to configure how each applicant is approved for a campaign. The Visibility and Approval submodule optionally consist of two sets of three controls. The first set of controls is used to configure which publishers and/or affiliates are allowed to access the campaign once it is live. The first control 5010 in the first set of controls makes the campaign available to all publishers and/or affiliates in the PM system. The second control 5020 in the first set of controls makes the campaign available to all publishers and/or affiliates that have been approved by the advertiser in other campaigns. The third control 5030 in the first set of controls makes the campaign only available to publishers and/or affiliates who have been specifically invited by the advertiser. The second set of controls illustrates how campaign applicants are approved. The first control 5040 in the second set of controls configures the system to automatically approve all applicants to the campaign. The second control 5050 in the first set of controls configures the system to automatically approve all applicants that have been previously approved by the advertiser in other campaigns. All other applicants to the campaign must be individually approved by the user/campaign manager. The third control in the second set of controls 5060 configures the system such that all applicants to the campaign must be individually approved by the user/campaign manager. Optionally, the user interface includes submodule navigation controls 5097 and 5099 as described in FIG. 41. Optionally, the user interface includes a Done control 5098 which when selected signifies to the PM system that the manager is finished creating the campaign.

Optionally, the PM system can be configured to integrate with partner click tracking networks, in which case consumer clicks (e.g., ad selection by the user on an affiliate or publisher's site) are directed to the PM system which are then further redirected back to the click tracking network. The click tracking network then determines which advertiser landing page to send the consumer to. Optionally, as described in this specification, the PM system includes a static or RingPool phone number in the redirect.

Optionally, the PM system can be configured as a hosted network, for example, if the affiliate network does not have their own click tracking platform. In this configuration, there is not a click tracking platform to integrate with so consumer clicks (e.g., ad selection by the user on an affiliate or publisher's site) are directed to the PM system which determines which advertiser landing page to send the consumer to.

As described above in the campaign creation Overview submodule, there are different types of ad sales campaigns. In a Cost-Per-Acquisition (CPA) sales campaign, the payout is contingent, for example, on the actual acquisition of a customer and optionally the payout is based upon a percentage of the sales price. In some CPA campaigns, Advertisers conventionally do not close their sales over the phone but in person—or at least not on the first phone call. But they do associate particular transactions on that call (e.g., scheduling an install appointment) with a successful "conversion" and prefer to associate keywords and callers with those conversions in their tracking systems. Therefore, a significant difference in campaign creation is the payout step. In addition, since the payout is based (at least in part) upon customer acquisition, there is a feedback link from the advertiser's call center regarding these customer acquisitions (e.g., a data communication link between the call center and the PM system that is used to return the results of each call). Optionally, the PM system provides an Application Programmatic Interface (API) from which the call center can integrate their computing information systems. With the call center integration to the PM system the PM system pays at least in part on or solely on the outcome of a call. Optionally, other methods are available for reporting order information or revenue generated for each phone call to the PM platform including for example email, file uploads, account screen scrapes, etc.

The following illustrates an example embodiment call center/PM system API. Optionally, the call center API integration involves two steps: 1) PM system personnel provide the advertiser a call center id, username and password credentials; 2) the call center sends over a data communication link (e.g. using http post methods) the details of each call to the PM system during the call or after it has completed. An example post is https://api0.acme.com/api/2010-04-22/calls/23.xml where 2010-04-22 is an API version and 23 at the end is the ID for a call center on the acme PM platform.

Optionally, the call center/PM system API supports the following example parameters:

| Required Parameters | Passed in standard HTML "application/form-url-encoded" format. |
|---|---|
| start_time_t: | start time of the call in UTC seconds since Jan. 1, 1970 -- aka a Unix time_t. |

| Optional Parameters | |
|---|---|
| calling_phone_number: | Calling Phone Number in E.164 format +country national_number; example: +1 8885551212 |
| reason_code: | payout condition that is set in a campaign. This code is free form and left to the advertiser to decide. (For example, 'R' for Referred to customer service, or 'info' for requesting information. Or simply "Y" for a lead was generated and "N" if not.) |
| call_center_call_id: | a unique identifier for each call (unique across this call center's calls). This ID is optionally set the first time the call result is POSTed for a call. To update the call result, the call center uses the same ID. |
| called_phone_number: | Dialed Number (DNIS) in E.164 format +country national_number; example: +1 8885551212. |
| duration_in_seconds: | length of the call in seconds. |
| use_http_status: | 1 or blank will use HTTP status corresponding to success/failure. If set to 0, the HTTP status will always be 200 OK and the actual status and error message will be in the response body. |

| Optional Parameters | Tracking Sales |
|---|---|
| sku_list[ ]: | product SKU (can optionally be repeated for multiple products). Similar to the reason_code, the sku is a free form description of the product or service sold and can optionally be used as a payout condition. |
| quantity_list[ ]: | quantity 1 or greater for the corresponding SKU (can optionally be repeated for multiple products; must appear in same order as SKU) |
| sale_currency: | USD, GBP, EUR, etc. |
| sale_amount: | amount to 2 decimal places, or 0.00 if no sale (optionally does not include shipping) |

| Optional Parameters | Remarketing |
|---|---|
| email_address: | email address in RFC2822 format or empty string |
| name: | first last name of caller |
| address1: | address of caller |
| address2: | additional address line of caller |
| order_city: | city of caller |
| state_or_province: | state of caller |
| country: | country of caller |
| home_phone_number: | home phone in case there are any questions, in E.164 format |
| cell_phone_number: | cell phone in case there are any questions in E.164 format |
| opt_in_SMS: | 1 if authorized to send SMS reply or 0 or empty if not |

Optionally, the call center/PM system API HTTP return status will be 201 Created for a successful POST (or a 200OK for a successful PUT), a 4xx code if one of the parameters is incorrect, or a 5xx code if a server error occurred. In the latter two error cases, a detailed error class and message are optionally returned in XML in the body. Optionally, if &use_http_status=0 is given, the status will always be returned as 200 Ok or 201 Created. This return status is used to see the detailed error message in the body when working with HTTP libraries that discard or conceal the body of the response for non-2XX response codes.

Figure 60:
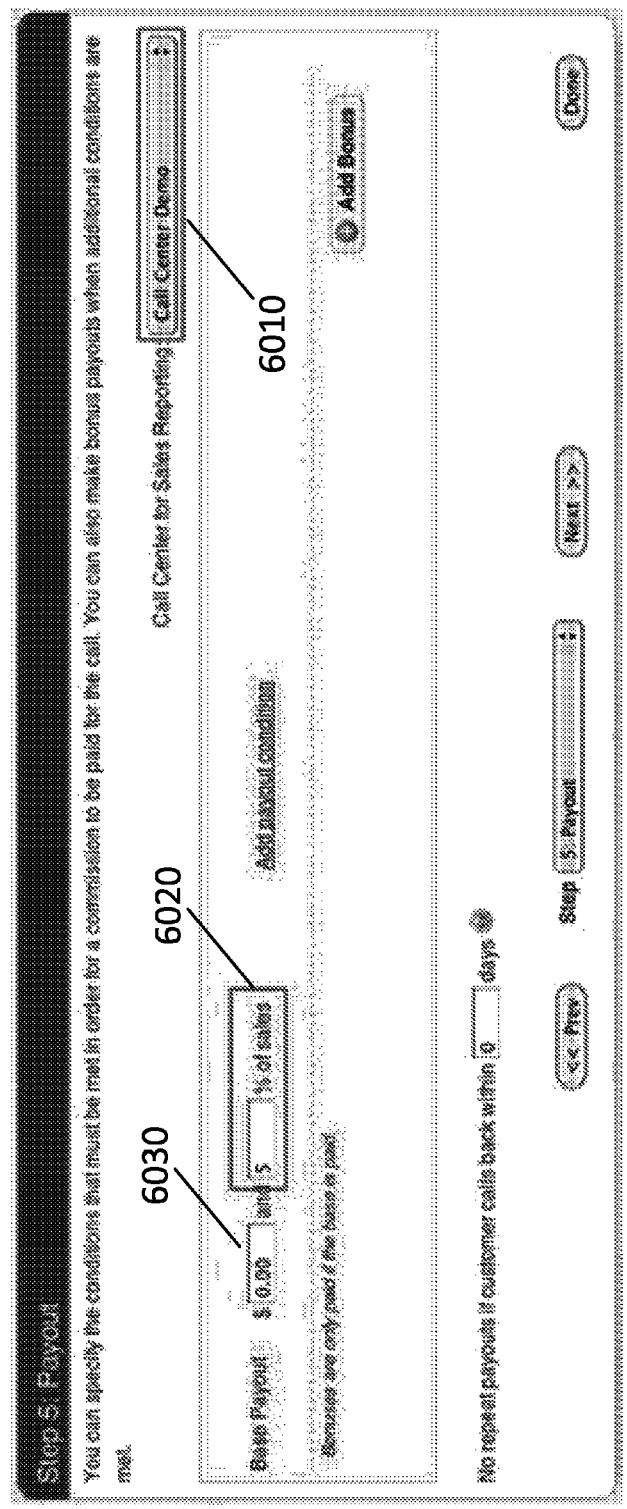
FIG. 60: is an illustration of an example embodiment for configuring a payout in an example embodiment cost-per-acquisition campaign.

We now return to the process of creating a campaign in a Cost-Per-Acquisition (CPA) sales campaign in the PM system. As mentioned above, a significant difference beyond the call center integration is the structure of the payout. In the Payout submodule the user/campaign manager selects the integrated call center from the scroll menu 6010 (optionally, the list of call centers is configured by, for example PM system personnel, when they establish the call center integration with the PM system) and enters a percentage of sales in the percentage of sales condition field 6020 (or optionally enter a flat rate amount by entering an amount in base amount field 6030 and 0 in percentage of sales condition field, or some combination of base amount and percentage of sales). The percentage of sales ranges from 0 to 100 percent. Optionally, there are other conditions beyond a percentage of sales including Sku_list and Reason (see call center/PM API Optional Tracking Sales parameters described above). FIG. 60 illustrates other web page controls and conditions further described with respect to FIG. 47.

Figure 61:
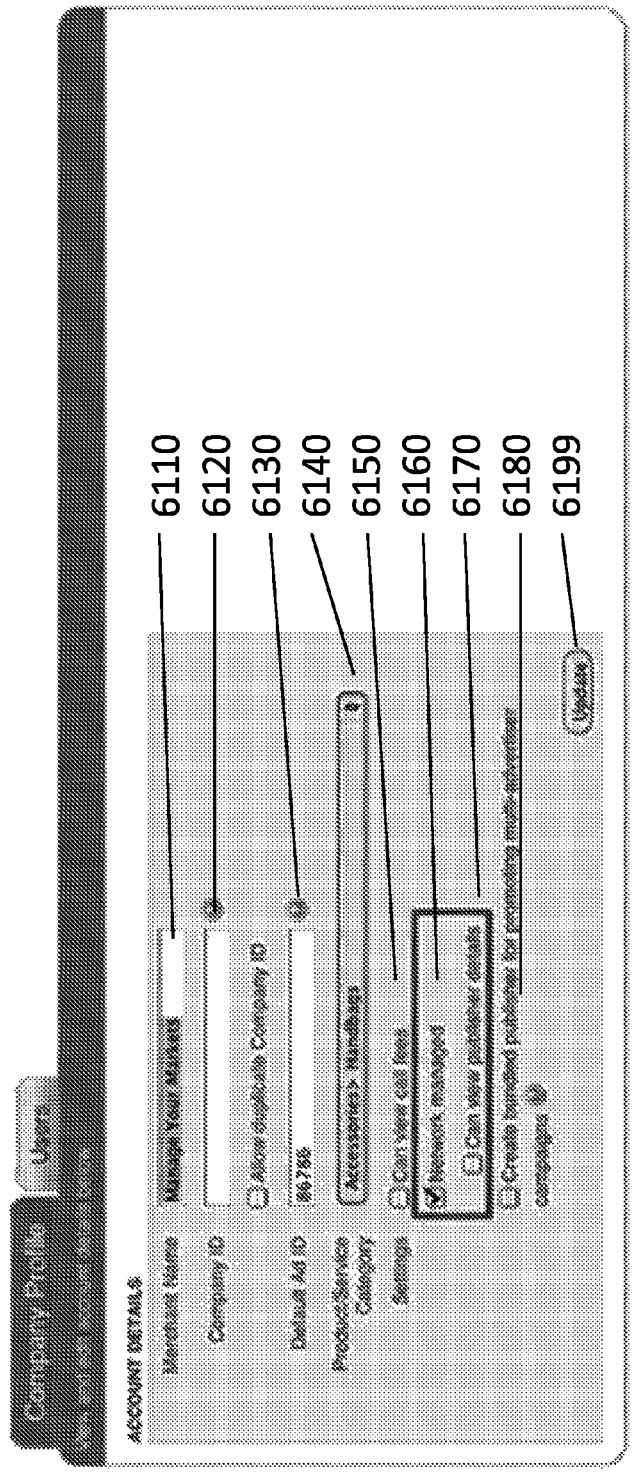
FIG. 61: is an illustration of an example embodiment for configuring in an example embodiment Performance Marketing system account.
Figure 62:
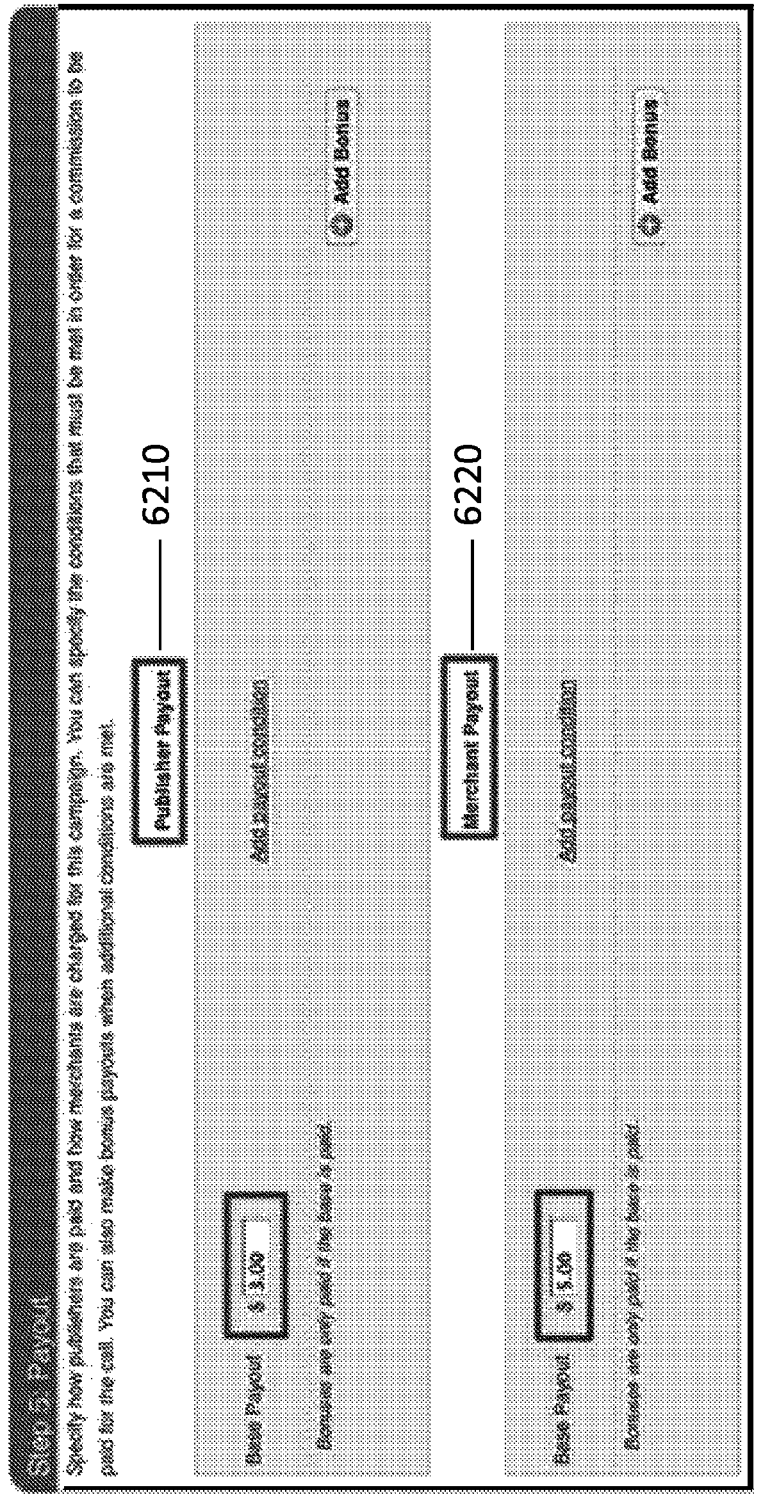
FIG. 62: is an illustration of an example embodiment for configuring payouts in an example embodiment Network managed campaign.

In addition to affiliates, publishers, and advertisers describe above, there are also Network campaign manager entities. Network campaign managers provide campaign management services for those advertisers who would like to use the PM system but want to keep information private from their advertiser clients, or do not have the time or inclination to become trained on the PM system, nor manage campaigns and affiliates/publishers. A managed advertiser does not create campaigns or manage campaign privileges—the network manager performs these tasks. Network campaign creation is similar to that described above except that the advertiser's account is configured as Network managed 6160 as illustrated in FIG. 61. In addition, in the payout submodule, a network manager configures merchant/advertiser payouts 6220 in addition to the publisher/affiliates payouts 6210 as illustrated in FIG. 62. The difference between what is paid out by the merchant/advertiser and what is paid to publisher/affiliates is the network managers' return. FIG. 61 illustrates other web page controls further described with respect to FIG. 47.

Advertisers optionally can create advertiser direct campaigns. In this scenario the advertiser uses the platform for call and conversion tracking without having other parties promoting their product/service. Because there are no affiliates or publishers, the campaign wizard used to create a campaign does not have the payout, the target profile, and the visibility and approval steps.

The third type of campaign is syndication. In this case a publisher or network promotes an offer found on another network. This enables the advertiser to expand the number of affiliates/publishers participating in the advertiser's campaign. This also enables the Network manager to receive commissions associated with the advertiser's campaign and the affiliates/publishers get more opportunities to generate advertising revenues on their sites. The PM system facilitates syndicated networks by simplifying the integration of the advertiser's campaign into the new Network and providing the Network manager various call tracking and payout reports.

Figure 63:
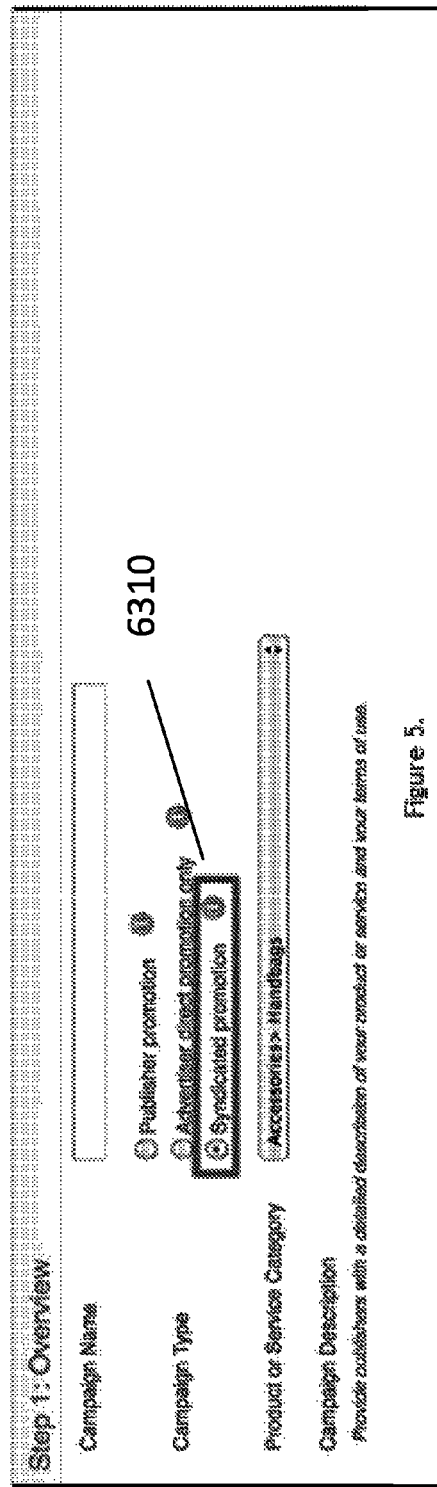
FIG. 63: is an illustration of an example embodiment of a first step in configuring an example embodiment Syndicated campaign.

Certain differences in setting up a syndicated campaign from a regular Pay-per-Call campaign are now described. First, the Network campaign manager applies to the original campaign; the campaign to be syndicated (promoted by the affiliates/publishers of the Network). After the affiliate/publisher sign up and approval process, the Network campaign manager receives a promotional phone number; a number used exclusively by the affiliate/publisher to track calls originated by the affiliate/publisher to the PM system. Next, the Network campaign manager configures the syndicated campaign by first selecting the syndicated promotion check box control 6310, see FIG. 63 in the Overview submodule.

Figure 64:
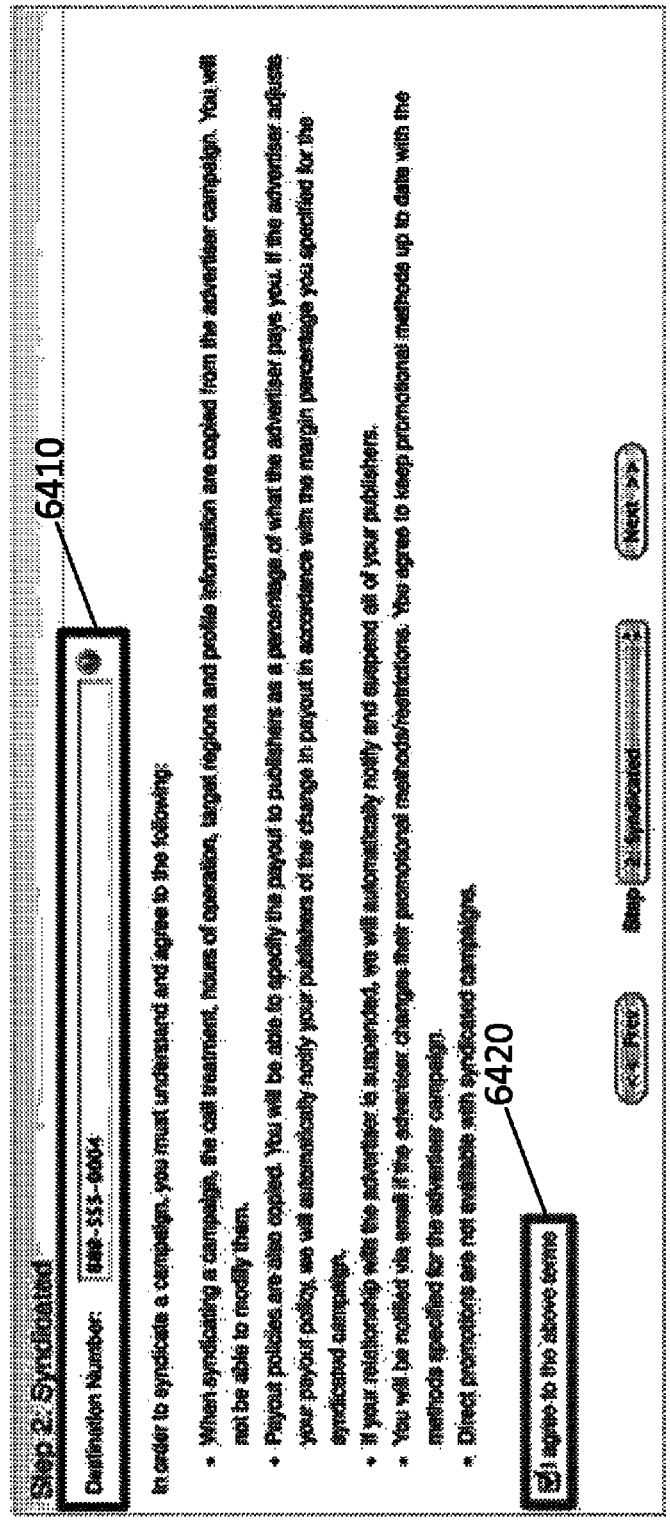
FIG. 64: is an illustration of an example embodiment for configuring a destination number in an example embodiment Syndicated campaign.
Figure 65:
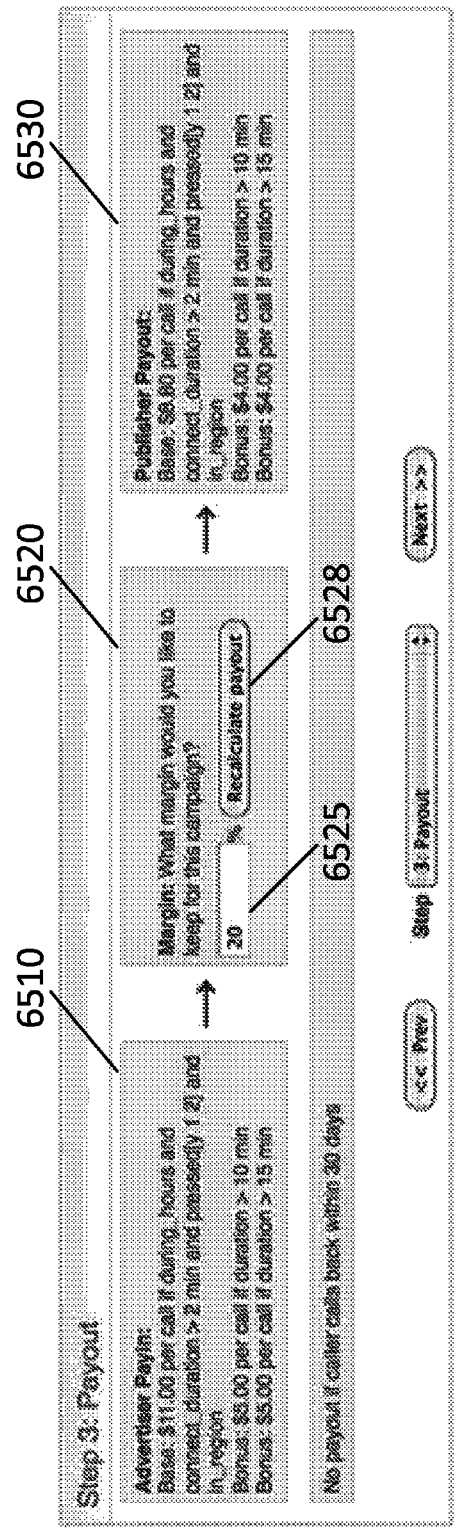
FIG. 65: is an illustration of an example embodiment for configuring payouts in an example embodiment Networked managed campaign.

In the second step, the Network campaign manager enters the promotional number assigned during the affiliate/publisher sign up process in the number field 6410, see FIG. 64. Optionally, the Network campaign manager agrees to certain terms and conditions by selecting the check box control 6420. In the third step of syndicated campaign creation, the Network manager establishes payouts. Since syndication involves Networks, the payout user interface of the PM system is structured to reflect what the advertiser is paying for qualified calls 6510, the margin the Network receives 6520, and the payout to the affiliate/publisher 6530, see FIG. 65. In this syndication payout user interface, the advertiser payin display is determined from and synchronized with the associated advertiser's original campaign. Any changes by the advertiser to the campaign is stored in the PM system and automatically reflected in this user interface including but not limited to: creatives, terms such as payouts, hours, etc. (That is, changes to the master campaign flow to the syndicating campaigns.) The Network campaign manager specifies a percentage in the margin field 6525. If the Network campaign manager selects the Recalculate payout control 6528, the system calculates the affiliates/publishers payout 6530 by subtracting the margin percentage 6525 from the advertiser's payin per qualified call. Optionally, the user interface display of FIG. 65 includes submodule navigation controls as further described with respect to FIG. 41.

Optionally, a syndicated campaign call flow is different than the call flow of the other campaign types discussed above; although this flow difference may be transparent to the caller. In one example embodiment of syndicated calls, the consumer calls the promotional number (the same promotional number entered in the number field 6410) and the call is received by the PM system. The PM system uses the called number to determine which campaign to invoke; in this case the syndicated campaign. The PM system then internally connects to the original campaign promotional number creating an internal system call leg. Optionally, the PM system receives the internal call to the original campaign promotional number and connects to the original campaign. The PM system performs the call treatment steps of the original campaign (e.g., IVR tree) and then transfers the call to the original campaign destination call center (e.g., advertiser call center). The internal call leg is maintained for the duration of the call. The call legs, including the internal call leg, are used by the PM system to simplify reporting and internally track publisher/affiliate and Network manager payouts. In summary, the benefits of syndication include, for example: campaigns stay in sync, sub-ids to provide customization without revealing sources, payouts stay in sync and margins are fixed so they are never upside-down (e.g., payouts exceed budget); elimination of double charges on telecom; the original advertiser pays telecom fees; better call quality by not cascading calls through the phone network hence no audio degradation such as additional packet delay in VOIP.

The PM system provides for the capabilities of a "Network Manager" to configure and manage ad sales campaigns on behalf of an advertiser. FIG. 61 illustrates an example embodiment view and edit company profile web page for the PM system that can be used by an advertiser to setup a "Networked Managed" account. Optionally, a manager creates accounts and/or a company profile which then can be used by the Network manager or others within the organization. Optionally, the manager creates an account by entering a Merchant name in the text field 6110. Optionally, the manager can assign a company identifier to the account. A company identifier 6120 can be used, for example, in cases in which the manager intends to keep the company name anonymous and/or if there are multiple accounts within the company.

Optionally, an Ad identifier is assigned by the PM system and displayed in an Ad identifier display 6130. Optionally, an Ad identifier is obtained from the Network Partner and entered into the Ad identifier field 6130. An Ad identifier is used to create an association between an Ad and an advertiser (see also creative submodule above). Optionally, the manager can select a product or service category from a scroll menu 6140 (see description of scroll menu 3940, FIG. 39). Optionally, the manager can configure one or more account settings. Optionally, the manager can select the Can view call fees setting 6150 which causes network charges associated with calls to be visible to the personnel viewing the reports.

Optionally, the manager can select the Network managed setting to configure the account to be Network managed 6160, as described above. The manager can also configure the view publisher setting 6170 which enables personnel to view details associated with publisher including for example, the profile information associated with the publisher/affiliates and publisher/affiliate reports (e.g., affiliate/publisher payout reports). If the account is Network managed, the manager optionally can also create a bundled advertising campaign by selecting the Create bundled publisher setting 6180 which is described below. Optionally, the web page includes an update control 6199 which when selected updates the company profile/account with the data entered by the manager in the PM system database.

Optionally, the PM system provides tools for Network managers or advertisers or publishers to bundle campaigns together which are promoting similar products or services. The bundling campaign feature simplifies campaign management for a Network manager. For example, if two beverage advertisers are promoting soft drinks, where advertiser 1 is promoting orange soda and advertiser 2 is promoting grape soda, a Network manager can bundle the two campaigns into a single campaign. An advertiser makes a request to a Network to manage their advertising campaigns and the Network manager configures the two campaigns together to streamline the campaign creation steps and manage the allocation of calls from affiliates/publishers fairly across the bundled campaigns. Creating a bundled campaign is similar to the process for creating a regular campaign, however, the Call treatment step differs.

In creating a bundled campaign, the Network manager first selects the bundle control 6180 in the Company Profile web page within the advertiser's account, for example advertiser 1, see FIG. 61. In the Call treatment step 2 of campaign creation, the Network manager selects the round robin option from the menu scroll control 6610, see FIG. 66. Round Robin Transfer in a bundled campaign ensures each campaign within the bundle is treated fairly, resulting in substantially the same amount of calls being routed to all campaigns in the bundle. For example in the bundled beverage campaign, configuring round robin causes half of the call traffic to be directed to the orange soda call center with the other half directed to the grape soda call center. Optionally, different call distribution methods can be used including but not limited to: round robin; last in, first out; first in, last out; highest activity; lowest activity. Optionally the round-robin probabilities can be weighted based on other criteria such as payouts, conversion rates, geographic proximity, budgets/call caps, etc. In an example embodiment, a "choose best" option is selected that causes, at least in part, the system to route inbound calls based on financial consideration. For example, when the network manager selects the choose best option, the system may route the call to the advertiser who pays the most for the call. By way of further example, the choose best option may be configured so that when the network manager selects the choose best option, the system may route the call to enhance or maximize the yield for the network and/or the publisher/media partner whose advertisement caused the call.

Figure 66:
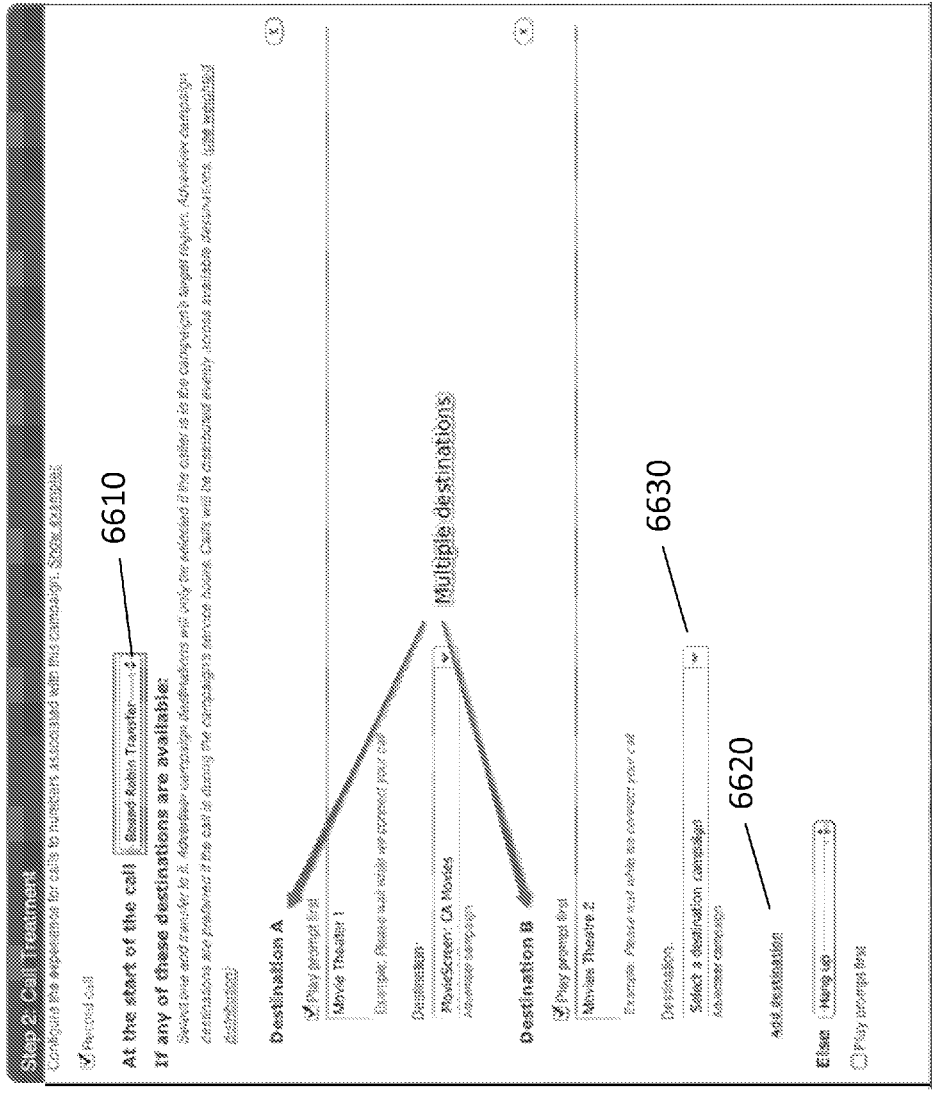
FIG. 66: is an illustration of an example embodiment for configuring call treatment in an example embodiment bundled campaign.

After selecting round robin call distribution, the Network manager adds one or more destination campaigns by selecting the add destination control 6620. For each destination, the Network manager selects a named advertising campaign from the pull down menu control 6630. The pull down menu control includes a listing of the campaigns directly managed by the Network manager and included in the bundle. The other web controls of FIG. 66 are described with respect to FIG. 43. After the bundled campaigns are created, affiliates/publishers access the campaigns and begin promoting the goods and/or services of the campaigns. In bundled campaigns, the affiliates/publishers may promote goods and/or services in a manner which does not distinguish the specifics of the underlying good and/or service to avoid caller confusion (since calls are distributed across the bundled campaigns). In our beverage example, affiliates/publishers would promote soda, not grape soda or orange soda.

Configuring Custom Ring Pools

Custom RingPools enable a campaign manager/user and publishers to track online sources that are driving traffic to their campaigns. With Custom RingPools multiple text string (for example, the use of three text strings is described with respect to an example embodiment below) are passed to the PM system in a web transaction that can be used to identify the traffic source driving a specific call. The Publisher/Affiliate configures certain parameters and significant values as described in the example embodiment web pages below.

Figure 51:
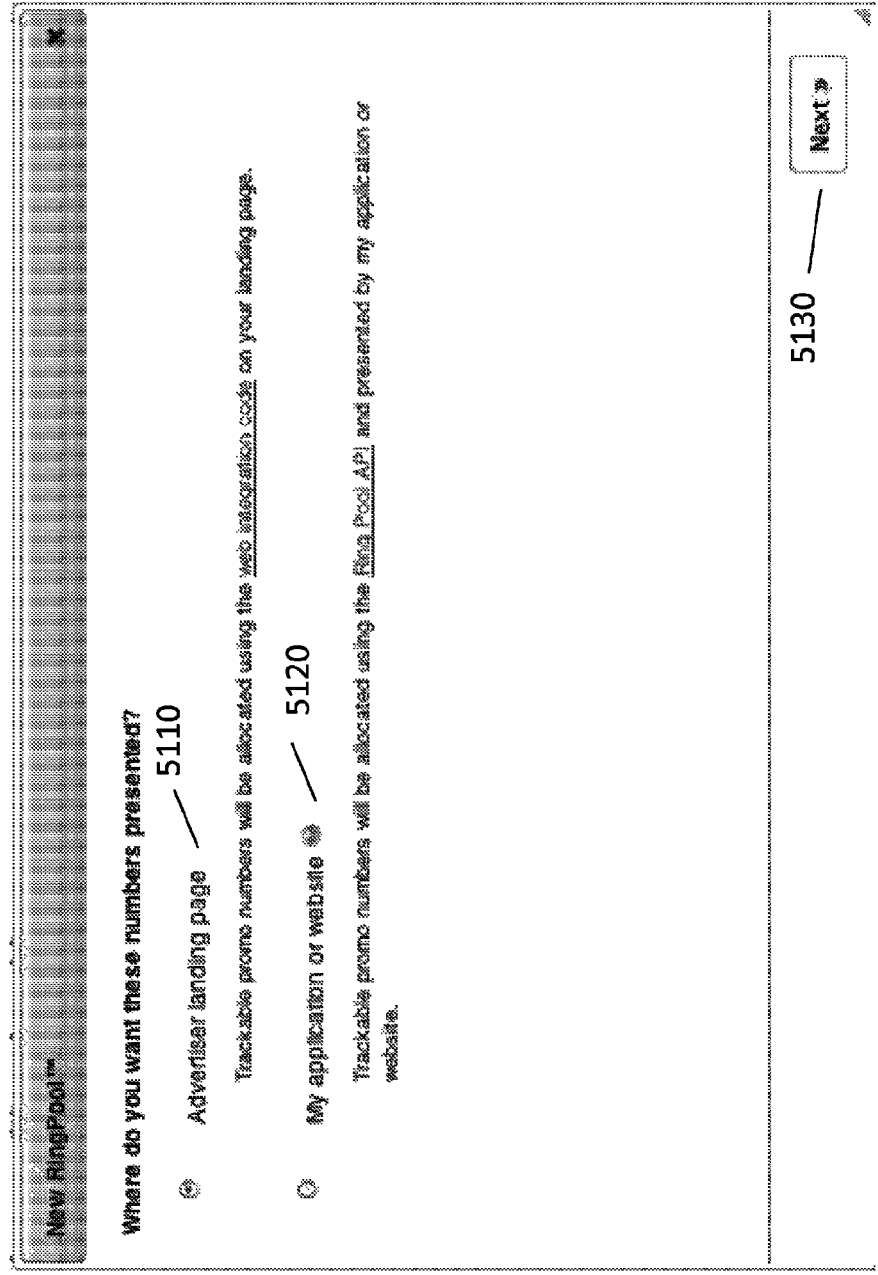
FIG. 51: is an illustration of an example embodiment for configuring a RingPool in a campaign.

In configuring RingPools for the web, the campaign manager first decides where web traffic is to land in response to an ad selection by a consumer using different options. For example, the traffic can be sent to an advertiser's landing page or the traffic can be directed to an affiliate's/publisher's landing page. The landing page optionally provides additional information on the advertisement of interest to the consumer. With RingPools, the landing page displays a dynamically allocated RingPool phone address. As shown in FIG. 51, the affiliate/publisher/advertiser can optionally configure RingPool phone addresses to be displayed on an advertiser's landing web page by selecting the Advertiser landing page control 5110. Optionally, advertisers, affiliates, or publishers can use the RingPool API (discussed below) by selecting the "My application" or website control 5120. Optionally, the user interface includes website setting navigation controls 5130 which enable the user to advance to the next configuration step/web page.

Figure 52:
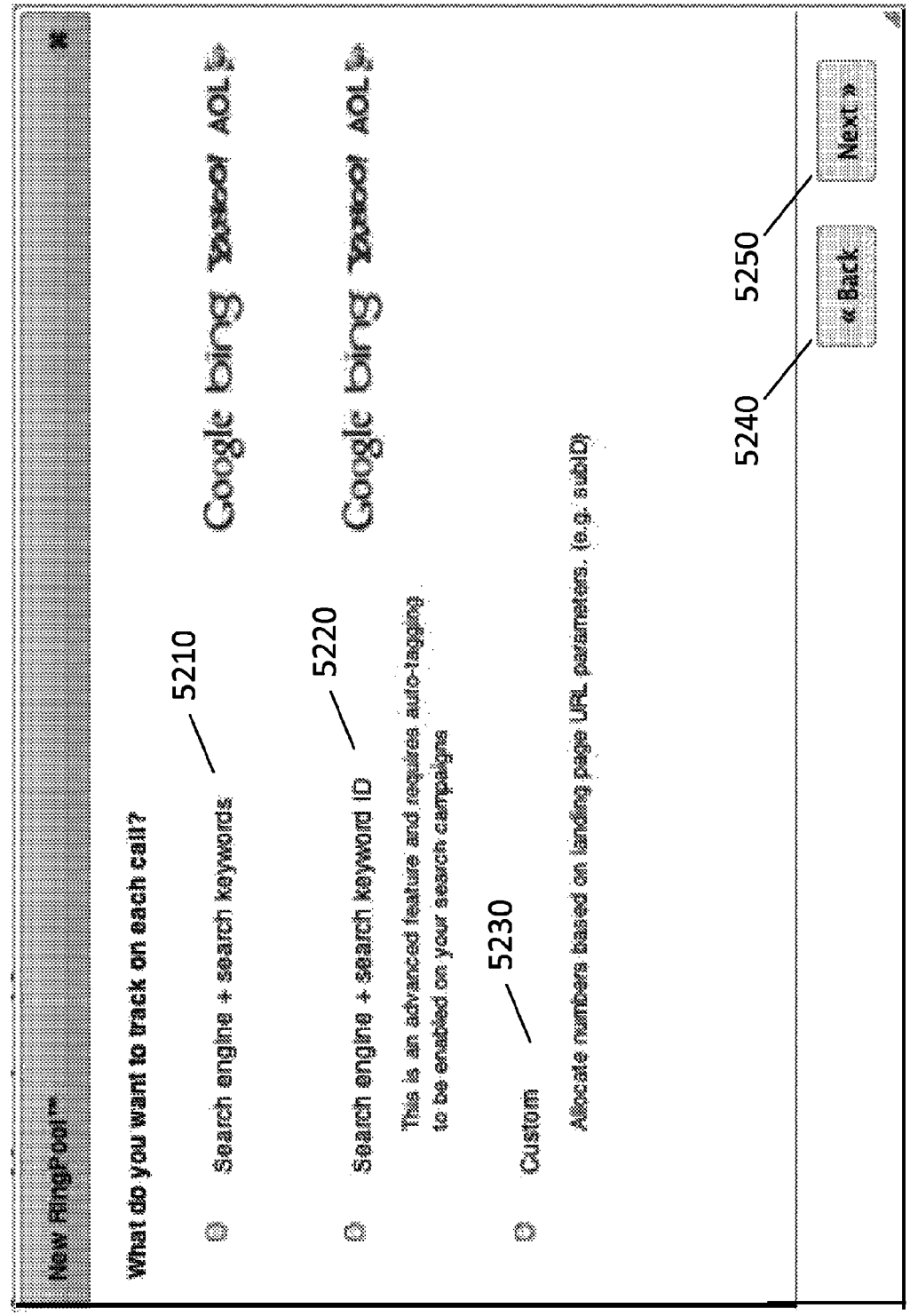
FIG. 52: is an illustration of an example embodiment for configuring the type of RingPool in a campaign.

As shown in FIG. 52, affiliates/publishers/advertisers can optionally configure RingPool phone addresses to be used in paid search ad campaigns or in a traditional online advertising campaign. In the case of paid search, the affiliate or publisher selects the control 5210 or 5220 depending upon whether a Search RingPool or Keyword ID Search RingPool is to be used. A Keyword ID Search is used in paid search where the media buyer (affiliates/publishers/advertisers) assigns a single identifier to a group of similar keywords. This is also referred to as an ad group. In this case, the PM system tracks and reports at the group level rather than at the individual keyword level. The affiliate or publisher can choose any combination of parameters known to the PM system at that point, including any parameters in the referring URL (e.g., search engine, query string, Sub affiliate identifiers, traffic source identifiers), and parameters passed to the landing page (including keyword id) and any browser cookies. If the ad campaign is not search related, the campaign manager selects the Custom RingPools option 5230. Optionally, the user interface includes website setting navigation controls 5240 and 5250 which enable the user to return to the previous page or advance to the next page, respectively.

Figure 53:
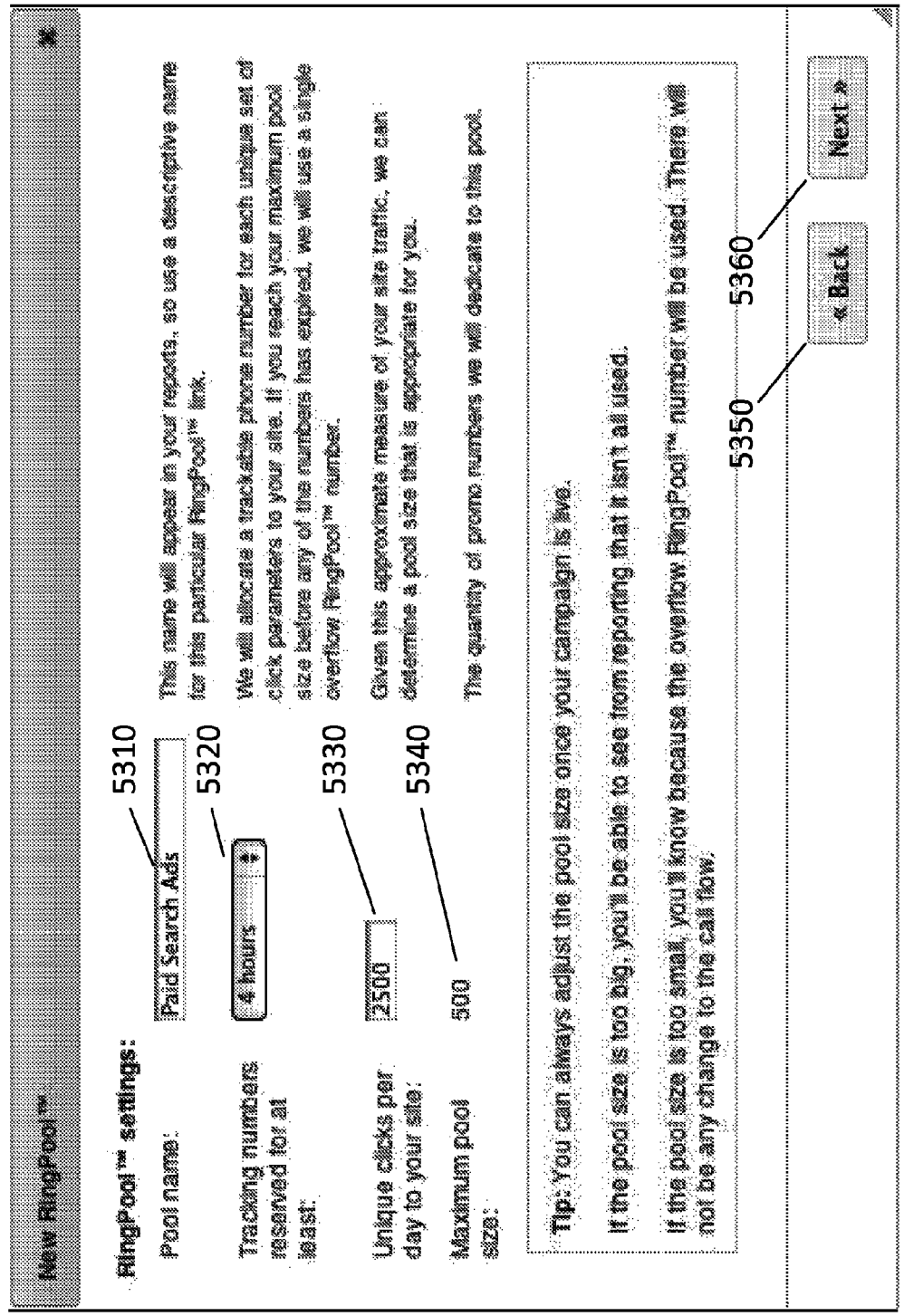
FIG. 53: is an illustration of an example embodiment for configuring RingPool settings in a campaign.

For both Custom and Search RingPools, the campaign manager configures RingPool settings as shown in FIG. 53. Optionally, the campaign manager assigns a name to the RingPool by entering a descriptive name into the text field 5310. The RingPool name is used in reporting, and may be used to distinguish multiple RingPools within a given campaign. Next, the campaign manager optionally assigns a RingPool minimum duration threshold in the pull down menu 5320 (e.g., 10 minutes, 2 days, etc.). A phone address assigned from a RingPool is not reassigned/reused until the minimum duration time period has been exceeded and the phone addresses within the number pool have been exhausted. If a phone address pool is exhausted and all phone address assignments have occurred within the minimum duration time period, an overflow number is assigned by the PM system.

The campaign manager estimates the number of click-throughs the campaign generates and enters the value in the number field 5330. The PM system uses this estimate to determine the number of RingPool numbers to allocate to the campaign and displays the allocation in the display field 5340. For example, the PM system can assign the number of RingPool numbers to equal the number of click-throughs in a day or week. Optionally, the PM system can assign a number of RingPool numbers using a percentage of click-throughs and further based upon historical estimates and comparative actual usage. Optionally, the system allocates a fixed number of RingPools to a campaign and the user adjusts the number of phone addresses required based upon reporting feedback (as shown in the example FIG. 53). Other assignment and allocation techniques are also described above. Optionally, the user interface includes website setting navigation controls 5350 and 5360 which enable the user to return to the previous page or advance to the next page, respectively.

In order for the PM system to track each ad placement on an affiliate's or publisher's web site(s), the campaign manager uniquely identifies each ad. This identification is accomplished by the campaign manager assigning one or more parameters or identifiers to each ad. For example, these identifiers are passed to the PM system when a user selects the ad and a corresponding RingPool phone address is assigned. Because each ad is uniquely identified in this example, each ad can be tracked individually. Optionally, the campaign manager can aggregate tracking (and use the same RingPool phone address) across multiple ads by using the same parameters on certain ads. Although the number of parameters used in this example embodiment is limited to three, additional parameters (e.g., 10 parameters) can be used.

Figure 54:
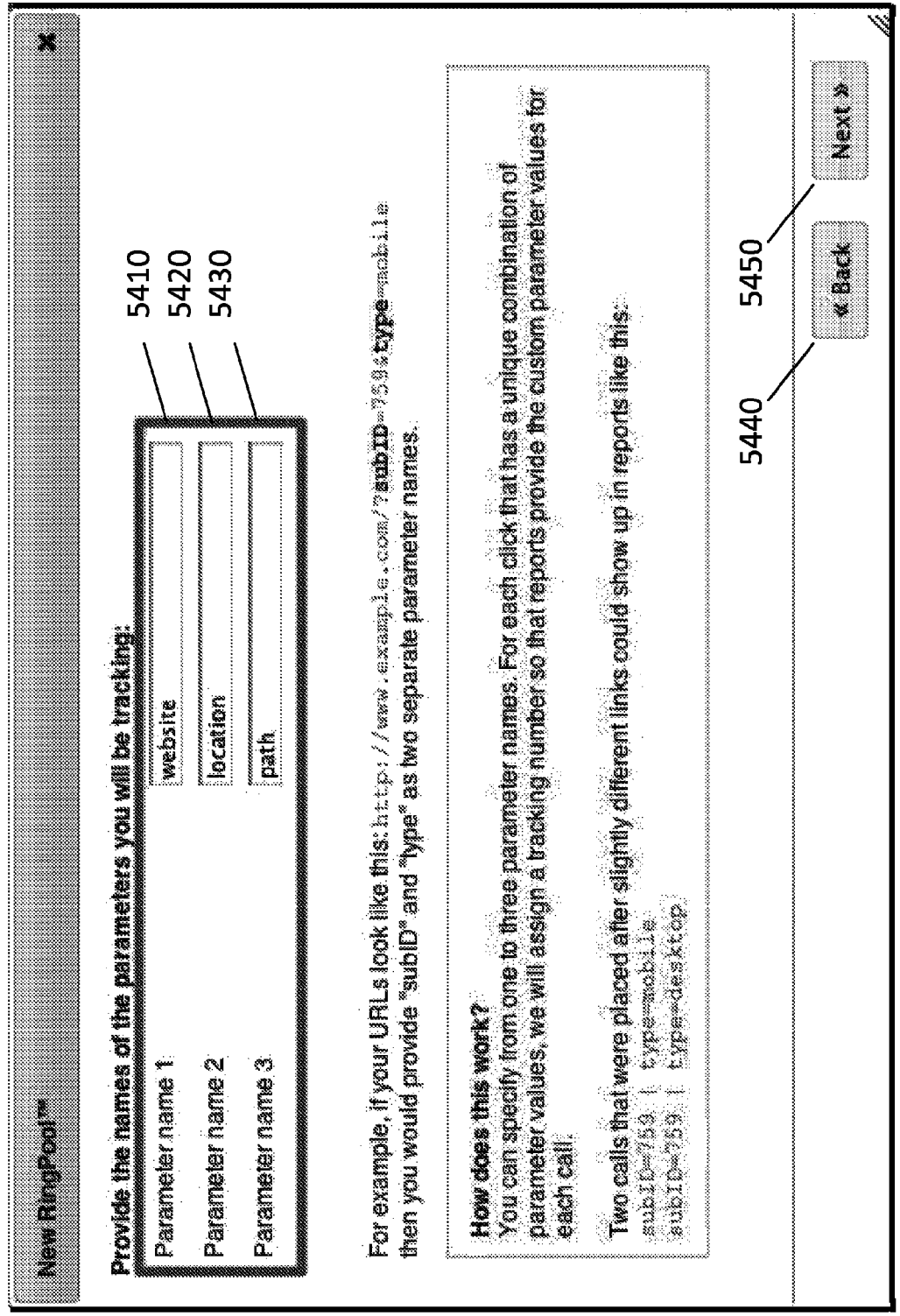
FIG. 54: is an illustration of an example embodiment for configuring RingPool parameters in a campaign.

For Custom RingPools, the campaign manager specifies from one to three unique names in the parameter fields 5410-5430, see FIG. 54. Optionally, the user interface includes website setting navigation controls 5440 and 5450 which enable the user to return to the previous page or advance to the next page, respectively.

Figure 55:
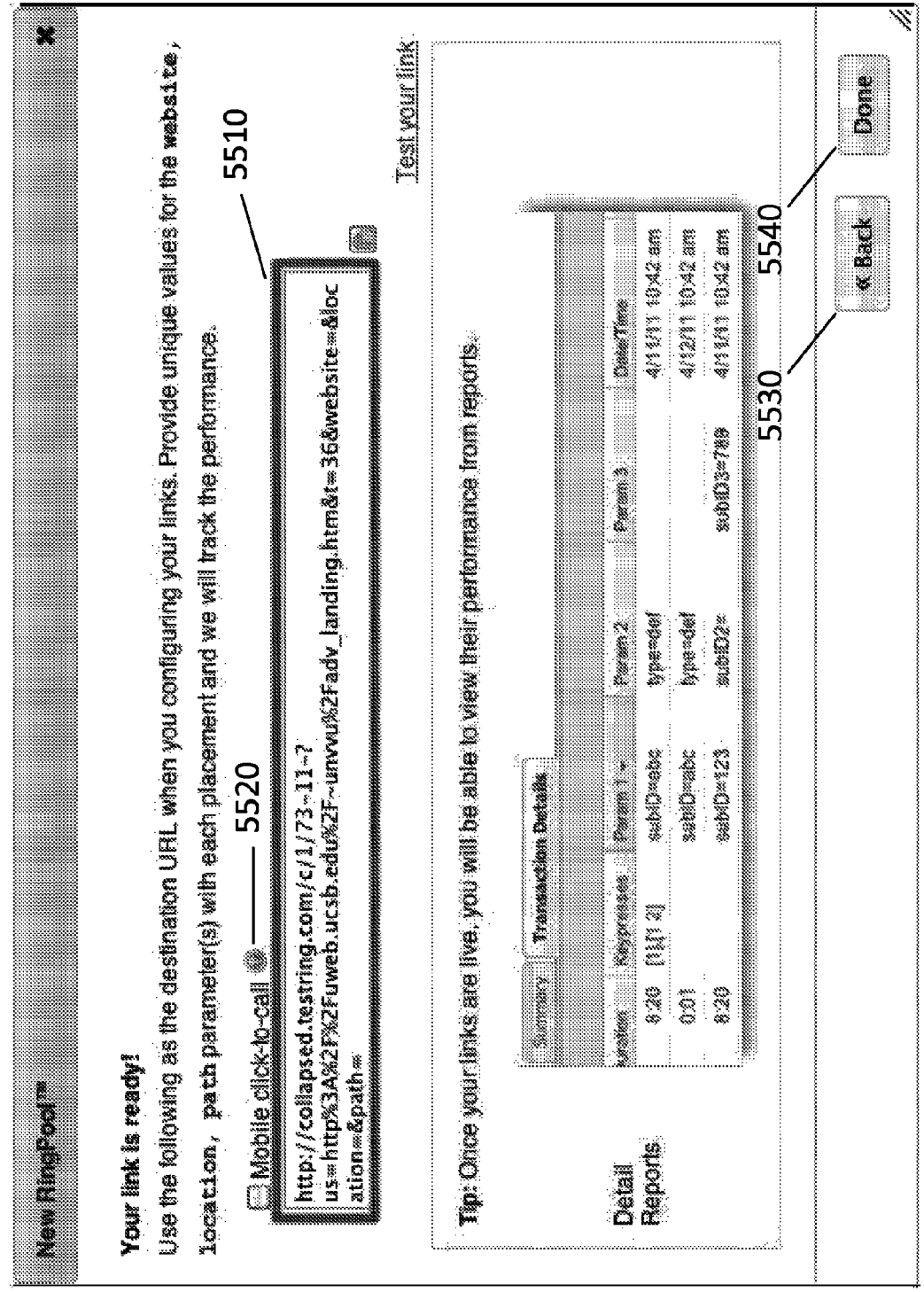
FIG. 55: is an illustration of an example embodiment of a display of a URL used in association with a RingPool in a campaign.

After configuring Custom RingPools, the PM system displays a general tracking link to be used by the publisher and/or affiliate as shown in FIG. 55. The campaign manager/user can replace each click-through URL with the general tracking link 5510 and set the parameters to unique values (see FIG. 54). Or optionally, they can keep their existing tracking URL and web integration code which runs on the page which can extract the parameters. With the parameters configured to unique values the PM system tracks and reports on the click-throughs and RingPool phone address associations (see also example embodiment State 63 below for an example use of parameters). RingPool parameters can be anything available to the call tracking system including: parameters in the URL like keywords or keyword ids, parameters in the referring URL like search engine and search query, parameters from cookies set on the consumer's browser earlier, or parameters passed from a partner through the RingPool API (described below) including for example a loyalty id or mobile phone info (phone device, carrier, geo-location etc.). The advertiser/publisher/affiliate can use this information to determine the effectiveness of each ad placement.

Optionally, the system presents a Mobile Click-to-Call selection control 5520. If the user selects this option the consumer experience is slightly modified if the consumer is viewing the ad on a smartphone device. In this case, the PM system causes a pop up dialer to appear on the smartphone with the RingPool number pre-populated, captures associated mobile browser and/or user information (e.g., cookies or their equivalent), and the mobile browser redirects to the advertiser's landing page in the background. This Mobile Click-to-Call configuration does not alter the consumer experience if the click through is performed using a conventional computer. Optionally, the user interface includes website setting navigation controls 5530 and 5540 which enable the user to return to the previous page or exit RingPool configuration steps, respectively. Optionally, independent of the "mobile click-to-call" selection here, the advertiser or publisher who controls the landing page may choose to have that page display phone numbers using mobile click-to-call.

Optionally, no phone numbers are required in the case of click-to-call on a mobile phone as the tracking data can be passed over the data network to the PM system. The consumer's phone number may not be readily available, but can be inferred by correlating other data (e.g., identify data receive from an application running on the mobile device of the user). Another option is to direct the mobile phone to call a network-based server of the PM system which can analyze the call signaling information to correlate a mobile phone ID to the user's actual phone number; this server does not have to even answer the call because signaling data is presented to the server when the call is received.

Figure 56:
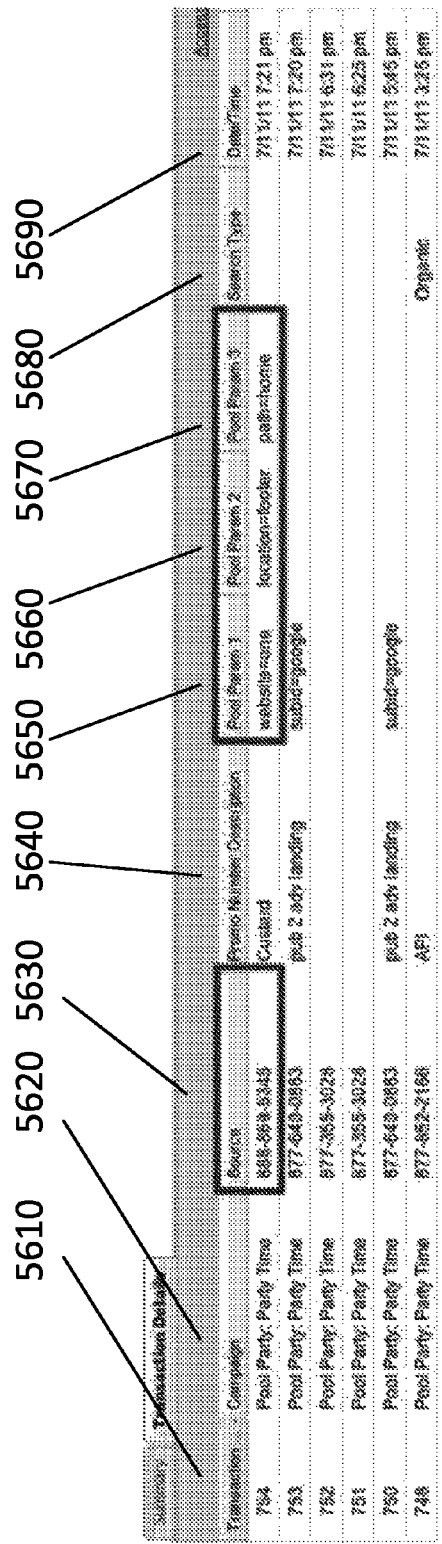
FIG. 56: is an illustration of an example embodiment of a RingPool report.

FIG. 56 illustrates an example RingPool report listing a series of RingPool click-through transactions which caused a RingPool to be displayed. The first column, 5610 lists a transaction identifier. The second column, 5620 lists the campaign name (see also 3910, FIG. 39). The third column, Source 5630, lists the RingPool phone address that was displayed to a consumer in response to a click-through. The fourth column, Promo Number Description 5640, lists the RingPool descriptive name set by the campaign manager (see also 5310, FIG. 53). The fifth column, Pool Param 1 5650, lists the first parameter passed to the PM system in response to a consumer click-through (see also 5410, FIG. 54). The sixth column, Pool Param 2 5660, lists the second parameter passed to the PM system if configured in response to a consumer click-through (see also 5420, FIG. 54). The seventh column, Pool Param 3 5670, lists the third parameter passed to the PM system if configured in response to a consumer click-through (see also 5430, FIG. 54). The eighth column, Search Type 5680, controls the selection of paid search versus organic. The ninth and last column 5690, Date/Time, is the date and time the consumer clicked on a link which caused a RingPool number to be displayed.

Configuring Search Ringpools

Search RingPools enable a campaign manager/user to track online, offline, and/or mobile sources that are driving traffic to their campaigns. With Search RingPools a text string is passed to the PM system in response to a click-through on a paid search ad. The text string is used to identify the traffic source. The campaign manager (advertiser, publisher, or affiliate) configures certain parameters and significant values as described in the example embodiment web pages below.

For Search RingPools, the configuration process is similar to that described for Custom ring pools. The campaign manager selects where the RingPool numbers are to be displayed including, for example, the advertiser's landing page or a publisher's website (see description of FIG. 60 above). Next, the campaign manager selects which RingPool type search 5210, keyword ID search 5220, or custom 5230 (see description of FIG. 52 above). Next, the campaign manager selects RingPool settings (see description of FIG. 53 above). Unlike the configuration setting for Custom RingPools, Search RingPools do not need the campaign manager to define parameters. In effect, "search" is a simplified method to automatically obtain parameters from the referring URL. Optionally, the PM system creates one or more default parameters. For example, a parameter 1 may be set to the purchased keyword/phrase and a parameter 2 may be set to the search engine used.

After establishing RingPool settings, the system responds to the manager's configuration settings by displaying a general tracking link the campaign manager uses in any paid search ads. Similar to Custom Ring Pools, if the click-through URL is replaced with the general tracking link, consumers clicking on the paid search Ad are directed to the defined landing page with a RingPool phone address displayed on the website. Optionally, the campaign manager uses web integration code (described below) as an alternative to URL replacement.

Configuring Ringpool API

The configuration process for an example RingPool Application Programming Interface is now described. Custom and Search RingPools described above enable advertisers, affiliates, and publishers to use web integration code to transit/redirect through the PM system where a phone address is received prior to displaying a landing page. With the use of the RingPool API, advertisers, affiliates, and publishers can make a direct programmatic request for a RingPool phone address without having to redirect through the PM system. The RingPool API optionally supports custom, search, and Keyword ID search RingPools. The process of configuring RingPool API's is very similar to the steps described above for the three types of RingPools.

The steps of configuring a RingPool API are similar to that described above for Custom and Search (see Figure descriptions 51-54 above). After configuring RingPools through the parameter steps, the system responds to the manager's configuration settings by displaying a unique RingPool key which is used by the campaign manager in configuring the RingPool API (see input parameters below).

Advertisers also can allocate RingPool phone addresses on behalf of affiliates and publishers in order to credit them for calls. In this case, advertisers include an affiliate or publisher ID in the RingPool API in addition to the key described above.

Optionally, the RingPool API supports the following input parameters:

RingPool Key: An authentication key required for each RingPool.

Param1: The first parameter of a Custom RingPool. Used only in Custom RingPool configurations.

ParamN: The nth parameter of a Custom RingPool. Used only in Custom RingPool configurations.

SearchEngine: The search engine used to process a search query. Used in either Search RingPool type.

SearchKeywords: The search query the user searched for. Used in either Search RingPool type.

SearchKeyword_id: The keyword ID that is associated with the query string. Used only in the Keyword ID Search RingPool type.

landing_page: The landing page URL to be displayed in reporting. This is an optional parameter.

referrer: Can be used instead of the two parameters "Search_engine" and "SearchKeywords". The PM system determines the two parameter values by parsing the referrer URL. This is an optional parameter.

mobile_click_to_call: If enabled, returns mobile enabled links that populate smartphone's dialers when clicked while not affecting conventional personal computers. This is an optional parameter.

Affiliate_ID An affiliate or publisher account ID (or other identifier that is unique to the advertiser and associated with affiliate or publisher) and is used to allocate a RingPool number on behalf of the publisher or affiliate.

Optionally the RingPool API returns a RingPool phone address and a formatted click-through URL. The response can be in any number of formats including for example, xml (EXtensible Markup Language), json (JavaScript Object Notation), or csv (Comma Separated Values).

Optionally, the PM system supports pixel tracking whereby a pixel can be configured to "fire" when certain criteria have been met in association with a call. Optionally, "Firing" a pixel means to retrieve the pixel from its URL as if a browser had rendered a page that contained that pixel in its content. The parameters to be tracked are contained in the URL. Many conventional systems use the approach for tracking online user actions. This enables users of the system (e.g., publishers and advertisers) to integrate conversion performance and reporting into their existing ad serving infrastructure. Pixel tracking is configured via one or more user interface display screens in which a user associates a campaign to a set of criteria including, for example: all transactions, all calls, paid calls, sales from web, sales from calls, etc. In addition, the user specifies the specific pixel URL to be fired when a transaction and/or call meets the defined criteria. Optionally, the system substitutes one or more parameters into the pixel URL as specified by the user including, for example:

| | |
|---|---|
| transaction_id | Globally unique identifier for a transaction. For example, an 11-character string like "29810-95701". Optionally, this is the Primary Key of the results. |
| corrects_transaction_id | [Correction only] Id of the original transaction that this transaction updates. Values in this row are the corrected ones and should replace the original values. Same format as transaction_id. |
| transaction_type | A type of transaction - For example: Call, Sale, WebSale, etc. |
| original_order_id | [Optionally only used in Sales reporting] Id of the original transaction that this row is in reference to. Same format as transaction_id of the call. |
| advertiser_id | The PM system assigned identifier of the advertiser |
| advertiser_id_from_network | Advertiser ID from the network as set on the PM system by the advertiser. |
| advertiser_name | Name configured on the advertiser account |
| advertiser_campaign_id | The PM system assigned identifier of the campaign. |
| advertiser_campaign_id_from_network | The corresponding campaign on the network's click tracking platform. This id determines which advertiser landing page to send the user to. |
| advertiser_campaign_name | Campaign name |
| affiliate_id | The PM system assigned identifier of the affiliate |
| affiliate_id_from_network | The click tracking id of the affiliate. This is also used for redirecting to a landing page. It is also used by the network to credit the affiliate for online conversion (e.g., no phone call occurs) |
| affiliate_name | Affiliate name |
| affiliate_commissions_ranking | Network wide ranking of commission earned by the affiliate |
| affiliate_call_volume_ranking | Network wide ranking of call volume driven by the affiliate |
| affiliate_conversion_rate_ranking | Network wide ranking of the affiliate's conversion rate |
| media_type | Media type of the transaction source |
| call_source_description | The description of the promotional number set by the affiliate or advertiser |
| call_result_description_detail | Status of the transaction |
| advertiser_payin_localized | Amount paid in by advertiser |
| affiliate_payout_localized | Amount paid out to the publisher |
| margin_localized | Difference between advertiser_payin_localized and affiliate_payout_localized |
| call_fee_localized | Telecommunications fee associated with transaction |
| advertiser_call_fee_localized | Advertiser Telecommunications fee associated with transaction |
| matching_advertiser_payin_policies | List of advertiser policies that matched (base, bonus1, bonus2, etc.) to determine the advertiser payin, separated by +. For example, base + bonus1 + bonus3. Note that if there was any advertiser payin, this field is guaranteed to start with base. |
| matching_affiliate_payout_policies | List of affiliate policies that matched (base, bonus1, bonus2, etc.) to determine the affiliate payout, separated by +. For example, base + bonus2. Note that if there was any affiliate payout, this field guaranteed to start with base. |
| payout_conditions | Base condition with {highlighting} around the term(s) that disqualified affiliate payout. For example: duration >1 min and {in_region} |
| payin_conditions | Base condition with {highlighting} around the term(s) that disqualified advertiser payin. For example: duration >1 min and {in_region} |
| city | City where the calling phone number is from |
| region | State (or country if international call) where the calling phone number is from |
| qualified_regions | The list of regions that that the caller matched |
| calling_phone_number | Caller ID. Formatted as 10 digits like "8665551234" |
| mobile | "Landline" or "Mobile" or empty string if type is unknown |
| duration | Duration of the call in seconds. Optionally includes any time spent in an IVR tree before transferring to the call center. |
| connect_duration | Duration in seconds that the call that was connected to the call center. |
| ivr_duration | Duration in seconds that the call spent in the IVR tree. |
| keypresses | List of unique keynames that were pressed during the call |

| | |
|---|---|
| keypress_1 | Name of the first key that was pressed |
| keypress_2 | Name of the second key that was pressed |
| keypress_3 | Name of the third key that was pressed |
| keypress_4 | Name of the fourth key that was pressed |
| start_time_local | Start of the call in the API user's time zone, followed by offset from GMT. |
| start_time_utc | Start of the call in milliseconds since Jan 1, 1970. Divide by 1000 to get Unix epoch time. |
| recording | URL to the call recording, if available |
| corrected_at | [Correction only] Date and time the transaction was corrected, in user's time zone, followed by offset from GMT. |
| opt_in_SMS | Whether the caller opted in to receive an SMS promotion during the call. |

Hosted Landing Pages

In the description above, the advertisers/publishers/affiliates are responsible for embedding/integrating code which maps trackable phone numbers from the PM system provider into their landing pages/home pages. Optionally, the PM system hosts the landing pages/home pages. This PM hosting approach provides certain advantages to the advertisers/publishers/affiliates including, for example, removing the need for advertisers/publishers/affiliates to embed/integrate code on their web site, alleviating technical issues related to web site compatibility, etc. Optionally, the PM system utilizes cloud computing-based services to host the advertisers/publishers/affiliates landing/home page. Optionally, the PM system utilizes a web proxy layer (similar to Amazon Silk) that precomputes/caches web pages to further improve the consumer/web surfer response experience. These precomputed/cached landing pages, loaded in the background before the consumer/web surfer clicks on the link to the page, optionally, include trackable phone numbers.

More specifically, the Web Integration Code is optionally Javascript which an Advertiser or Publisher includes on their web page(s) that receive traffic. It has one required parameter that identifies the Advertiser or Publisher who is hosting it. It also has optional parameters for them to set preferences, for example, how they like to see phone numbers formatted. It is designed to run unobtrusively, gathering the pertinent browser-visible information such as current URL, referring URL, cookies, mobile settings, etc., and passing this information asynchronously to the PM system. The PM system uses that information to decide which tracking number, if any, should be shown on their web page. The PM system returns this tracking number and the Web Integration Code optionally inserts and/or replaces existing phone numbers on their web page with the tracking phone number. Optionally, other page elements can be shown or hidden to facilitate a different look or a different call to action like "Call now!" when a tracking phone number is present.

Conventionally, web browsers limit such asynchronous access to have a URL with the same domain as the current page URL. This would be inconvenient, as it would require the Advertiser to host the PM code or proxy it through the Advertiser's servers. To address this, the Web Integration Code sends its request to the PM system and receives its response by rewriting the page using a convention like JSON-P.

Marketing Automation & Telephony Integration

The marketing of goods and services via the Internet continues to evolve. An early Internet marketing channel included direct email marketing. Today there are various marketing channels that can be used to promote goods and services including, for example, blogs, social networking, web page visits, search, etc. Coincident with online marketing channel evolution is the emergence of software-based tools that are focused on automating the marketing process within these various channels. This automation includes marketing campaign creation, launch, tracking, and reporting. While early, and generally rudimentary, marketing automation tools were initially developed by a company internally to facilitate marketing of the products they developed, more recently an industry of third party/outsourced marketing automation tools has emerged including for example companies such as NetSuite, Salesforce, Eloqua, etc. that provide more sophisticated tools, that may be used in conjunction with certain online marketing channels, and are capable of providing tracking and reporting. Disadvantageously, the conventional marketing automation tools provided by these third-parties are generally limited to the online/Internet medium, have not been able to address the challenges posed by telephony integration, and provide limited or no telephony integration.

What is needed is user and system friendly integration of telephony into marketing automation software/computing platforms. Conventionally, for example, a product manufacturer might use a marketing automation system to create an email marketing campaign. To add telephony features to the campaign, the manufacturer must manually create a parallel and separate telephony campaign to work in conjunction with the defined email marketing campaign. The lack of an integrated campaign generally results in campaign errors, cumbersome reporting and account access, difficulties in monitoring and adapting active campaigns, wasted effort and expense, etc.

Systems and methods for a marketing automation system which includes integrated telephony are described. Optionally, the marketing automation system is provided by a single provider to an end user. Optionally, the marketing automation system is provided by a conventional marketing automation platform provider and the telephony features are provided by a separate applications provider which may be configured to integrate with the marketing automation platform. In the latter case, the application, optionally purchased or licensed separately, is hosted and operates within the database and infrastructure of the conventional marketing automation platform.

Marketing Campaign

The creation, launch, tracking, and analysis/reporting of a marketing campaign involve a number of states. Examples of such states in the creation of an example marketing campaign/program are discussed below, with reference to example aspects of telephony integration.

Campaign Design

Before a sales campaign can be launched it needs to be designed by, for example, a marketing manager. Campaign design includes but is not limited to establishing target sales objectives, choosing campaign offline/online media and channels, defining campaign elements, campaign messages, etc. Optionally, the defined campaign elements include, for example, direct mail templates, email templates, web landing pages, web forms, web ads, search, video programs, mobile ads, social media, microblogging, social network account, virtual events, etc. Optionally, in the campaign design stage, the user also defines and/or configures dashboards and reports to be used during the campaign. Optionally, the user also plans for one or more test offers, optionally including A/B testing. Optionally, at this stage (or at another stage), the integration of telephony services is included in the campaign definition. For example, at this stage of the marketing funnel, phone addresses are presented/placed in the online and/or offline media (e.g., television advertisements, radio advertisements, newspapers, etc.). Optionally, phone services are included in initial emails to the target customers. Optionally, phone services are used later in the funnel, for example, on a web landing page after the customer prospect has clicked on a link in one or more emails that causes the landing page to be presented to the user via a user browser hosted on a user terminal. Optionally inbound calls to displayed phone numbers/addresses are routed to a call center or an inbound sales center through a call processing platform.

Campaign Management

Once a campaign is designed, one or more campaigns can be created or defined. A user, for example a marketing manager, accesses over a data network an automated marketing system using, for example, a web-browser, a dedicated application, or otherwise. The user is assigned a unique identity within one or more accounts of the automated marketing system. The user enters a unique identifier and/or password to gain access to the automated marketing system.

After authentication by the system, optionally the automation system presents a user interface, for example a dashboard or home page, enabling the user to, among other things, create a marketing campaign by selecting, for example, an account marketing module user interface tab or control. The user identifies the campaign, for example by entering an identifier for the campaign (although the identifier may be entered or edited later in the process).

The marketing manager configures the campaign into the system. The following example embodiments of a marketing automation system illustrate various example types of marketing campaigns, campaign tactics, campaign metrics, and associated system features in various marketing channels, in conjunction with discussions regarding telephony integration.

Campaign Management—Email

An example embodiment of an automated marketing campaign is now described. In this example embodiment, the campaign is based at least in part upon demand generation using outbound email.

A user, for example a marketing manager, logs into the system and is authenticated as described above. The user selects or enters an identifier for the campaign via the marketing automation system (e.g., one or more servers and associated marketing automation application software). Optionally, the user configures the marketing campaign by, for example, selecting a navigation control, such as campaign creation tab. Optionally, the user interface includes a number features including, for example, drag and drop, menu selections, short cut keys, auto fill, etc. to, for example, simplify campaign management and editing.

Optionally, the user configures into the campaign one or more email campaign lists from a data store of lists. Optionally, the user associates one or more emails (e.g., email templates) with the one or more email campaign lists. Optionally, the user configures (e.g., via a user interface control) a phone number into the one or more email templates with the one or more email campaign lists. With respect to number configuration, a number (e.g., a single number) is, for example, configured or assigned by the marketing automation software in response to a user request. Alternatively, a user configures or selects a single number from a list of numbers (e.g., vanity numbers or easy to remember phone numbers) to be used in the campaign. Alternatively, a different number, selected from a pool of numbers (e.g. a Ring Pool) is used for each template with the one or more email campaign lists. Optionally, a different number, selected from a pool of numbers (e.g. a Ring Pool) is used for each template and for each email campaign list. Optionally, a different number, selected from a pool of numbers (e.g. a Ring Pool) is used for each template and for each email campaign list or sub-campaign list where a sub-campaign list includes certain attributes (e.g., sub-campaign lists relating to unique user demographics, user behavior, funnel stage, etc.). In the marketing automation system, each phone number may act as a unique identifier, enabling the marketing automation system to track, manage, and record phone-based customer interactions (offline interactions) throughout the campaign based on calls involving the phone number. Optionally, the phone number and other attributes, for example, the calling party's number, together form the unique identifier to facilitate tracking and campaign management.

Optionally, the marketing automation system includes libraries of historical or pre-built marketing programs (e.g., best practice marketing programs) including, by way of example attached email and landing page templates. Optionally, these program libraries include integrated telephony features and number assignments as described elsewhere herein. Optionally, selected portions of, or entire marketing programs, optionally including multiple email campaigns and multiple landing pages can be cloned and edited, and new and/or unique numbers are automatically assigned to the cloned marketing program.

Optionally, different phone numbers and/or different phone number pools can be associated with different date and time triggers within the same marketing program. For example, a phone number can be modified or selected for insertion in an email template based on a send date and time.

Optionally, phone number assignments, tracking, and/or reporting can be modified during the execution of the marketing program without disrupting the campaign itself. Optionally, call management and call treatment, as discussed elsewhere herein (e.g., dynamic call routing to a backup call center) may also be performed without campaign disruption.

Many or most sales do not occur in response to a customer prospect's first interaction with a company. Generally, there are multiple customer prospect interactions before a customer decides to purchase a product or service. Conventionally, marketing campaigns include a series of one or more actions to build a relationship with a customer prospect in order to get the customer prospect to actually purchase the product or service. Certain example embodiments described herein perform relationship building by providing high quality, personalized information in a timely manner through a set of stages in a campaign. Optionally, unique phone numbers are used in the presentation of information to the customer prospect in association with the customized/personalized information at a given campaign stage.

An example embodiment of automated marketing lead nurturing with integrated telephony is now described. In the lead nurturing example embodiment, a series of actions occur in response to triggering events and/or time period transitions. Optionally, a customer prospect becomes a customer and exits the particular nurturing campaign once the customer prospect has purchased a product or service.

In a first stage (e.g., day 1), an introductory email is generated by the marketing automation system (or a system integrated with the marketing automation system) and sent to a customer prospect. It is understood, that while the following example may refer to an email communication, the communication may be instead or in addition be an instant message, a short messaging service message (e.g., an SMS or MMS message), etc. Optionally, the introductory email has a first phone number (optionally selected from a RingPool). Optionally, calls originated to the first phone number transition through a call bridging system which places a second call, to a call/sales center by way of example. Optionally, the calls terminate on a call processing/switching center directly within the call/sales organization. Optionally, in either example call processing scenario, data about the caller, the call, and/or the call results is stored in one or more data stores (e.g., a database).

At a later date, for example within 10 days, a follow-up email is generated by the marketing automation system (or a system integrated with the marketing automation system) and sent to the customer prospect. Optionally, the follow-up email is personalized with respect to certain activity associated with the customer prospect including, for examples, web-site activity, a download, any internal or external data store mined demographic, psychographic, personal data, etc., since the introductory email was transmitted to the customer prospect, any state change in the customer prospects demographic, psychographic, personal data, etc., since the introductory email (e.g., birth date, credit card purchases, credit change, announcements, social media postings, tweets, etc.). Optionally, the personalized/dynamic email is generated from one or more templates (and/or template paragraphs) based at least in part on the detected activity, user profile, and/or state changes. Optionally, the personalization is applied to some or all elements of an email including for example, sender name, subject, body text, body images, signature, and/or post script. Optionally, the follow-up email includes a second phone number (optionally selected from a RingPool). Optionally, calls are processed and tracked as described above with respect to the first stage (day 1).

At yet a later date, for example within 15 days, a personal email is generated by the marketing automation system (or a system integrated with the marketing automation system) and sent to the customer prospect where the sender field is configured with a specific sales or call center agent. Optionally, the email is personalized as described above. Optionally, the personal email includes a third phone number (optionally selected from a RingPool). Optionally, calls are processed and tracked as described above with respect to day 1. Optionally, inbound calls to the third number route to a specific sales or call center agent. Optionally, for example, the call bridging system places the second call to an agent by calling a support center and entering an agent's extension (e.g. by generating one or more dtmf tones).

At yet a later date, for example within 30 days, an email is generated by the marketing automation system (or a system integrated with the marketing automation system) and sent from the sales department in which the email includes, for example an item of interest, such as a whitepaper of best practices and/or a product/service discount (e.g., included as an attachment). Similar to the 10 day and 15 day emails, the communication, including the attachment, is context aware of and/or reflects the customer prospect's state and position within the funnel as described above. Optionally, the communication includes a fourth phone number (optionally selected from a RingPool). Optionally, calls to the fourth number are processed and tracked as described above with respect to day 1. Optionally, inbound calls to the fourth number route to a specific sales or call center agent.

At yet a later date, for example within 45 days, a text "check in" message is generated by the marketing automation system (or a system integrated with the marketing automation system) and sent to the customer prospect. Optionally, the text communication body includes a fifth phone number (optionally selected from a RingPool). Optionally, calls to the fifth number are processed, tracked, and recorded as described above with respect to day 1. Optionally, inbound calls to the fifth number route to a specific sales or call center agent. Optionally, the text communication is sent with the sender address configured with the fifth phone number enabling replies to the text communication to be tracked and recorded. In this latter case, optionally, the fifth number is not included in the text communication body.

At day 45, as an alternative to or in addition to the text communication, a "check-in" call is originated from a sales agent to the customer prospect. Optionally, the outbound call routes through the call bridging system so that the call can be processed, tracked and/or recorded as described above (e.g., as described with respect to inbound calls in the day 1 case above). For example, the system can generate a sixth number presented to the agent which is associated with the customer prospect. Optionally, the agent can call a number of the bridging system and enter the phone number of the customer prospect in response to an IVR interface. Optionally, calls originated to the customer prospect include as the calling number the sixth phone number (optionally selected from a RingPool). Thereby any calls returned by the customer prospect to the calling number route through the call processing systems and can be processed, tracked, and recorded as described above.

At yet a later date, for example within 60 days, an email communication is generated by the marketing automation system (or a system integrated with the marketing automation system) and is sent to the customer prospect regarding a webinar. Similar to the 10 day, 15 day, and 30 day email, the text communication with the customer prospect is context aware as described above. Optionally, the email communication includes a seventh phone number (optionally selected from a RingPool). Optionally, calls to the seventh number are processed and tracked as described above with respect to day 1. Optionally, inbound calls to the seventh number route to a specific sales or call center agent.

At yet a later date, for example within day 75, another text communication or "check-in" call is originated from a sales agent to the customer prospect in which the text communication is generated by the marketing automation system (or a system integrated with the marketing automation system). Optionally, the outbound call and/or text communication is processed, tracked, and recorded as similarly described above with respect to the Day 45 communications. Optionally, the text communication includes an eighth phone number (optionally selected from a RingPool). Optionally, calls to the eighth phone number are processed and tracked as described above with respect to day 1. Optionally, inbound calls to the eight number route to a specific sales or call center agent.

At yet a later date, for example within day 90, another text communication or call is originated from a sales agent to the customer prospect in which the text communication is generated by the marketing automation system (or a system integrated with the marketing automation system). Optionally, if the products and/or services warrant an in-person meeting, the communication is oriented around scheduling such an in-person meeting or a free trial. Optionally, the outbound call and/or text communication is processed, tracked, and recorded as described above with respect to the Day 45 communications. Optionally, the text communication includes a ninth phone number (optionally selected from a RingPool). Optionally, calls to the ninth number are processed and tracked as described above with respect to day 1. Optionally, inbound calls to the ninth number route to a specific sales or call center agent.

Optionally, one or more unique numbers (e.g., numbers one through nine) are assigned to different stages in the customer prospect nurturing campaign as described above. Optionally, the same number is used at one or more of the different stages. In the example above, customer prospect's communications followed a generalized timeline. Optionally, the timeline is accelerated for those leads that exhibit certain behavior (e.g., active participation greater than the norm). Optionally, A/B testing (e.g., modifying the order of communications) is applied to the nurturing funnel described above. The unique tracking phone numbers facilitate the A/B comparison by enabling the monitoring/tracking of phone calls originated by the customer prospects in response to the program.

Lead Scoring

A feature of marketing automation is lead or prospect scoring. Lead scoring is a method of assigning a value (e.g., a numerical value) to leads in order to determine their willingness to purchase a company's product or service. Lead scoring is often used in conjunction with customer prospect nurturing. Leads with high scores can be accelerated through the nurturing funnel or fast-tracked to sales and, correspondingly, leads with low scores can be lead nurtured. In addition, lead scoring improves the efficiency of the sales and marketing process by enabling the organization to focus more attention on the higher quality leads.

The method of assigning or calculating a value (which may be calculated by the marketing automation system) is based at least in part upon a determined collection of attributes associated with the customer prospect. The attributes may include some or all of the following: demographic attributes (e.g., gender, age, ethnicity, language, disabilities, mobility, homeownership, employment status, credit status, geographic location, computing devices, mobile devices, telephony, etc.), psychographic attributes (e.g., personality traits, interests, lifestyles, values, attitudes, etc.), behavioral attributes (e.g., online usage (e.g., read emails, clicks, web visits, keywords, webinar participation, online social media participation, etc.), loyalty, etc.), and/or organization/firm demographics (e.g., company size, industry, job function, job title, etc.).

Lead/prospect scoring may be performed by the marketing automation system or otherwise, optionally combining explicit scoring and implicit scoring. Explicit scoring may be based at least in part on information the prospect declares (e.g., via an online registration form) and implicit scoring may be based at least in part upon information observed or inferred about the prospect (e.g., a link selection on a web page).

With respect to explicit scoring, for example, a value, such as a numerical value, is assigned to information declared by the prospect. Optionally, one or more internal or external data stores (e.g., a data service operated by a separate company) are queried to determine additional facts about the prospect based upon their declared data. Optionally, the marketing automation supports auto-fill forms linked to a user's social media site. Optionally, certain declared data is weighted by importance, for example, a prospects job title can be weighted heavier than his/her age.

With respect to implicit scoring, for example, a value, such as a numerical value, is assigned to information inferred about the prospect. Optionally, one or more external databases are queried to determine additional facts about the prospect based upon the inferred data. Optionally, certain inferred data is weighted by importance, for example, a website selection on a product associated link can be weighted heavier than a website selection on a corporate information associated link.

Optionally, the lead's score is determined at least in part by summing the weighted numerical values assigned to the lead across the explicit and implicit attributes. Optionally, the lead's score is further modified by adding or subtracting values, such as numerical points. For example, points might be subtracted from a lead score if some or all of the data is determined to be of low quality/relevance based upon, for example, additional information acquired using a prospect's phone number. If a company is selling year round active wear and it is determined the prospect's phone number is based in California, additional points might be added to the lead's score, as it is more likely that a California resident will be more interested in such type of clothing due to its moderate weather. In the same example, if the prospect's phone number is based in Michigan, additional points might be deducted from the lead's score, as it is less likely that a Michigan resident will be interested in such type of clothing due to its more extreme weather.

Optionally, lead scoring from online interactions is combined with offline interactions, and in particular, lead scoring associated with telephony/call processing. The combined lead scoring provides a deeper and more valuable lead scoring methodology than conventional marketing automation lead scoring. Optionally, attributes associated with, for example, the length of the call and/or the disposition of the call are included in the lead's score and/or the weighting of the lead's score as further described below. Optionally, the placement of phone calls to designated numbers may route calls directly to an operator (e.g. sales and/or customer support) or calls to such numbers be configured to terminate in an IVR interface to provide data to and/or collect data from a user. Optionally, in both lead scoring and lead nurturing, information about a customer prospect and/or a customer is progressively assembled through a campaign and/or previous campaigns and stored (e.g., in a data store) in association with the customer prospect and/or customer (e.g., in a lead record). This information is used repeatedly to improve targeting of an existing campaign and/or for future campaigns.

In certain embodiments of marketing automation lead scoring there may be hundreds or thousands of possible behavior, psychographic, demographic, and/or firmographic attributes that can contribute to a lead score. The following discussion describes example attributes that can be used in telephony service environments, although additional, fewer, or different attributes may be used.

Optionally, explicit data can be collected from a customer prospect using a combination of menu selections, voice recognition, and/or voice forms. For example, a prospect may be prompted to enter their age using the telephone key pad (e.g., press keys corresponding to the customer's age or age range). In another example, a prospect may be prompted to audibly state the prospect's years of experience in a particular field, or with a particular product or service. In another example, the prospect may be prompted to audibly state the prospect's company or employer name. The information audibly provided by the prospect may be recorded by the system and/or translated into text using, for example, an automated voice-to-text conversion system (which may optionally be limited to converting names and number to text) and/or by a human operator. The system may be further configured to determine additional information about the customer prospect using, for example, call signaling information including calling party identification. For example, one or more internal and/or external databases (e.g., the Edgar database providing access to SEC filings, Dun and Bradstreet database, etc.), web sites, social media sites, microblogs, etc., can be queried/searched to determine additional information about the caller using the phone number of the caller (e.g., as a search query term). Optionally, the calling party identification or other attributes/characteristics of the customer prospect/customer can be used to route inbound calls to the appropriate agent (e.g., an agent responsible for the customer/prospect), call/sales center, etc. If the calling phone number is not recognized by the system, or not recognized by the system as owned by a corporate entity the caller may be asked to declare (for example via an IVR user interface) a work number and/or work extension. Optionally, in performing lead scoring and lead nurturing, portions (e.g., 10 seconds of the beginning of the call, 10 seconds of the end of the call, the entire call, etc.) of a call interaction with a customer prospect/customer may be recorded by the system. Optionally, the recorded portions are made available to personnel, (e.g., marketing personnel) for analysis to determine attributes/characteristics of the customer prospect/customer, optionally including attributes not listed below, including, for example, the emotional state/reaction of the prospect during the call. Optionally, the analysis impacts the prospect's lead score and/or nurturing state. Optionally, the analysis causes, at least in part, a one or more marketing programs to be modified. Optionally, the recorded portion(s) are converted to text (e.g., using speech-to-text processing). Optionally, analysis of the text is automatically performed in whole or in part via the system.

The following table is a list of example explicit individual attributes of the prospect, some or all of which may be used in lead scoring:

TABLE 1

Corporate Title (e.g.'s, manager, director, vice-president, president, chief, etc.)
Organization Role
Purchasing thresholds
Count of staff reports
Years of experience within field
Unique skills including certifications
Number of web email accounts
Number of corporate email accounts
Years with company
Years in current role
Honors and awards received outside of present job
Social network accounts
Social network activity
Social network connections
Social network influence
Public recommendations
Microblogging accounts
Microblogging participation
Blogs
Affiliations - groups and associations
Career aspirations
Personal interests and aspirations
Degrees received
Educational institutions attended
Calling device type (e.g., cell phone, landline phone)
Calling carrier (e.g., skype, wireline, wireless)
Connection speeds
Camera capabilities TABLE 1-continued Privacy settings
Values The following table is a list of example explicit attributes of prospect's employer, some or all of which may be used in lead scoring:

TABLE 2

Rankings/Stock Indexes: Fortune 500/Inc 500, etc
Public/Private status
Number of employees
Company revenue
Revenue growth (growing, declining, etc)
Company financial status
Number of divisions
Number of products sold (SKUs)
Locations (U.S. and non-U.S.)
City
State
Zip
Country
Phone area code
Headquarters or satellite
Location of branches
Size of branches
Number of web sites
Number of patents and patent applications
Website traffic
Website plug-ins
Applications (e.g., widgets, gadgets, smartphone apps, etc.)
Year founded
Organizational structure (proprietorship, partnership, corporation)
Geographic markets served
Competitors
Partners
Fiscal year end
Industry served (e.g., consumer, defense) Typical customer
Target marketing programs
Declared Mission
Declared Vision
Declared Values
Declared Strategy
Press release counts historic average
Press release trends Following table is a list of example explicit relationship attributes, some or all of which may be used in scoring:

TABLE 3

Prospective:

Customer
Partner
Competitor
Prospect
Investor
Current:

Customer
Partner
Competitor
Prospect
Investor
Ex-customer
Lost opportunity
Product(s) purchased from company or other companies
Complimentary marketing platforms used (e.g., Customer Relationship Management)
Recycled count
Lead source Website
Sponsorship
PPC TABLE 3-continued Content syndication
Online ad
Offline media (e.g., radio, television, newspapers, etc.)
Marketing budgets (Monthly, Quarterly, Annually) corporate and by division
Project milestones The above tables list example explicit data used in scoring. As discussed above, behavior (implicit) data and other types of data (e.g., psychographic) may also be used in scoring. Below is a list of example behavior-based attributes (which may be detected by the marketing system) that can be used in telephony integrated lead scoring (e.g., where the marketing system may calculate the score), although fewer, additional, or different attributes may be used. As discussed below, optionally a number (e.g. a phone number, such as a RingPool number) is associated with marketing media (e.g., a landing page, such as a specified landing page). Optionally, code (e.g., the web integration code described above) is embedded in the marketing media to dynamically display phone numbers based on known/customized parameters (e.g., passed in the URL and/or via accessible cookies).

An example behavior attribute is a prospect's viewing of an online demonstration, images, or a video. Optionally, a unique phone number (e.g., a RingPool number) is included in association with or embedded in the viewable material. Optionally, a call to the number associated with the viewed material causes a positive change in the prospect's score (indicating that the prospect is more likely to be a good prospect). Optionally, the same phone number, unique to the individual during the tracked online session(s) (e.g., using browser cookies) can be used if the prospect views multiple demonstrations, images, or videos. Optionally, multiple different phone numbers (e.g., one or more RingPool numbers) can be used within the viewable material where the numbers are displayed at different physical or temporal points within the material. Optionally, if a demonstration is viewed multiple times by the same prospect, the same or a different phone number (e.g., a RingPool number) is displayed in each viewing.

Another example behavior attribute is a prospect's participation in a free trial of a product or service. Optionally, a unique phone number (e.g., a RingPool number) is included in association with the free trial. Optionally, if the prospect, which received the free trial, places a call to the number associated with the free trial causes a positive change in the prospect's score.

Another example behavior attribute is a prospect's participation in a download of content, for example, a download of an application, article, presentation, etc. Optionally, a unique phone number (e.g., a RingPool number) is included in association with the download screens/presentation. Optionally, if the prospect, which downloaded the content, places call to the number associated with download causes a positive change in the prospect's score.

Another example behavior attribute is a prospect's use of free software. Optionally, a unique phone number (e.g., a RingPool number) is included in in association with the free software acquisition process, post-acquisition/utilization screens/presentation, etc. Optionally, if the prospect places a call to the number associated with free software acquisition and/or use causes a positive change in the prospect's score.

Another example behavior attribute is a prospect's access/search/perusal of an integrated or public application directory (e.g., Apple AppStore, Microsoft Gadget Gallery, etc.). Optionally, a unique phone number (e.g., a RingPool number) is included in association with the application directory. Optionally, a call to the number associated with the application directory causes a positive change in the prospect's score.

Another example behavior attribute is a prospect's use of a widget/gadget. Optionally, a unique phone number (e.g., a RingPool number) is included in association with the widget/gadget. Optionally, if the prospect, which used the widget/gadget, places a call to the number associated with the widget/gadget causes a positive change in the prospect's score. Optionally, a different unique phone number (e.g., a RingPool number) is used in different uses of the widget/gadget, including for example, the hosting of a version of the widget/gadget on the prospect's web site.

Another example behavior attribute is a prospect's viewing of a document authored and/or posted on a web site in which the document includes, for example, an article, presentation, press release, book/ebooks, product data sheet, brochure, manuals, reference guides, workbooks, etc. Optionally, a unique phone number (e.g., a RingPool number) is included in association with the document. Optionally, if the prospect, which received and/or viewed the document, places a call to the number associated with the document causes a positive change in the prospect's score. Optionally, the same phone number, unique to the prospect during the tracked online session(s) (e.g., using a browser cookies) can be used if the prospect receives and/or views the document multiple times. Optionally, the same phone number or multiple different phone numbers (e.g., one or more RingPool numbers) can be used within the viewed document where the numbers are displayed at different points within the document. Optionally, a unique phone number (e.g., a RingPool number) is displayed if the prospect is intending to reference one or more of the documents.

Another example behavior attribute is a prospect's viewing of a blog post. Optionally, a unique phone number (e.g., a RingPool number) is included in association with the blog post. Optionally, if a prospect, which viewed the blog post, places a call to the number associated with the blog post causes a positive change in the prospect's score. Optionally, the same phone number, unique to the individual during the tracked online session(s) (e.g., using a browser cookies) can be used if the prospect views the blog post multiple times. Optionally, different phone numbers (e.g., one or more RingPool numbers) can be used within the viewed blog post where the numbers are displayed at different points within the blog post. Optionally, if the blog post is viewed multiple times by the same prospect, the same phone number or a different number (e.g., one or more RingPool number) is displayed in each viewing. Optionally, the same phone number or a different phone number (e.g., one or more RingPool numbers) is included in association with the blog post if the prospect rates and/or shares via a social sharing button the post.

Another example behavior attribute is a prospect's subscription to an RSS/XML feed. Optionally, a unique phone number (e.g., a RingPool number) is included in association with the application directory. Optionally, if the prospect, which subscribed and/or viewed the feed, places a call to the number associated with the application directory causes a positive change in the prospect's score. Optionally, if a prospect subscribes to multiple feeds, the same phone number or a different phone number (e.g., one or more RingPool numbers) is included in association with the RSS/XML feeds.

Another example behavior attribute is a prospect's viewing of a webinars or webcasts (including, for example, an online course). Optionally, a unique phone number (e.g., a RingPool number) is included in association with the webinars or webcasts. Optionally, if the prospect, which viewed the webinar or webcast, places a call to the number associated with the webinars or webcasts causes a positive change in the prospect's score. Optionally, the same phone number, unique to the prospect during the tracked online session(s) (e.g., using a browser cookies) can be used if the prospect views the webinars or webcasts multiple times. Optionally, the same phone number or multiple different phone numbers (e.g., one or more RingPool numbers) can be used within the viewed webinars or webcasts where the numbers are displayed at different physical and/or temporal points within the webinars or webcasts. Optionally, some or all of the following additional conditions, as monitored and determined by the system, cause a positive change in prospect scoring calculated by the system and/or the assignment and display on the prospect's terminal of the same or a new phone number (e.g., a RingPool number): the prospect asking a questions during a live webinar or webcast; the prospect viewing the webinar or webcast live and then later viewing a recorded version; the prospect posting a comment in association with the webinar or webcast; the prospect registering for the webinars or webcasts; the prospect rating and/or sharing via a the webinar or webcast (e.g., by activating a social network sharing control which causes information regarding the webinar or webcast to be posted on a social network); and/or the prospect viewing the webinars or webcasts (or recordings thereof) multiple times.

Another example behavior attribute is a prospect's filling out a survey. Optionally, a unique phone number (e.g., a RingPool number) is included in association with the survey. Optionally, if the prospect, which received and/or filled out the survey, places a call to the number associated with the survey causes a positive change in the prospect's score. Optionally, some or all of the following additional conditions, as monitored and determined by the system, cause a positive change in prospect scoring calculated by the system and/or the assignment and display of the same phone number or a different phone number (e.g., a RingPool number) on the user terminal: the prospect visiting the survey; the prospect beginning filling out the survey; the prospect completing the survey; the prospect viewing survey results; and/ the prospect participating in more than one survey.

Another example behavior attribute is a prospect's attending a tradeshow or roadshow/seminar. Optionally, a unique phone number (e.g., a RingPool number) is included in association with the show/seminar (e.g., placed in brochures/handouts). Optionally, a call by the prospect to the number associated with the tradeshow causes a positive change in the prospect's score.

Another example behavior attribute is a prospect's viewing a microsite (e.g., which is focused on and promotes a single product or product family associated with a single brand. Optionally, a unique phone number (e.g., a RingPool number) is included in association with the microsite. Optionally, if the prospect, which viewed the microsite, places a call to the number associated with the tradeshow causes a positive change in the prospect's score. Optionally, sharing (e.g., via social media) of the website is a condition which causes a positive change in the prospect's score and/or the assignment and display of the same phone number or a different phone number (e.g., a RingPool number).

Another example behavior is a prospect's viewing one or more web pages. Optionally, a unique phone number (e.g., a RingPool number) is included in association with the one or more web pages. Optionally, if the prospect, which viewed the web page(s), places a call to the number associated with the one or more web pages causes a positive change in the prospect's score. Optionally, some or all of the following additional conditions, as monitored and determined by the system, causes a positive change in prospect scoring and/or the assignment and display of a unique phone number (e.g., a RingPool number): browser type used to view the web pages; and/or the prospect: visiting a landing page; completing one or more forms on the landing page; using one or more chat services; viewing a product/service specific web page; viewing a pricing specific web page; viewing a customer page and/or customer review pages; viewing more than one landing page and/or associated web pages within a configurable time period (e.g. one week, one month, etc.); and/or sharing (e.g., via social media) one or more web pages.

Another example behavior is a prospect's search activity. Optionally, a unique phone number (e.g., a RingPool number) is included in association with search activity. Optionally, if the prospect, which viewed the web page(s), places a call to the number associated with the search activity (e.g., presented in the search results) causes a positive change in the prospect's score. Optionally, some or all of the following additional conditions cause a positive change in prospect scoring and/or the assignment and display of a unique phone number (e.g., a RingPool number): a determination by the system that the prospect submitted a query: for the company name; for a specific product or service name/type; for specific terms; via the company's web site; and/or to a particular search engine type.

Another example behavior attribute is a prospect's viewing information about or receiving one or more certifications. Optionally, a unique phone number (e.g., a RingPool number) is included in association with the certification information or certification. Optionally, if the prospect, which viewed the certification or received the certification, places a call to the number associated with the certification information or certification causes a positive change in the prospect's score.

Another example behavior attribute is a prospect's listening to or viewing one or more podcasts. Optionally, a unique phone number (e.g., a RingPool number) is included in association with the podcasts. Optionally, if the prospect, which listened to or viewed the podcast, places a call to the number associated with the podcast causes a positive change in the prospect's score. Optionally, the following additional conditions cause a positive change in prospect scoring and/or the assignment and display of a unique phone number (e.g., a RingPool number), the prospect: listening multiple times to one or more podcasts; downloading a podcast; and/or subscribing to one or more podcasts.

Some purchases, in particular certain Business-to-Business purchases, are often made by a group of individuals or a committee. Optionally, the marketing automation system, for example, infers from certain information (e.g., from prospects' phone numbers, IP addresses, declared company name, etc.) connections between individuals. Optionally, a unique phone number (e.g., a RingPool number) is included in association with the connected/group of individuals/prospects as identified by the system. Optionally, the unique phone number supersedes other marketing number assignments or not. Optionally, the phone numbers assigned change during the marketing funnel but are the same for each member in the identified connected/group of individuals.

As discussed above, some attributes can result in a negative change in the prospect's score. Optionally, a phone number (e.g., a RingPool number) is changed in response to a user action and/or a drop in a lead/prospect score. For example, a prospect subscribing to a "Do-Not-Text" list might have their score lowered, and accordingly henceforth only a phone number which is directed to second or third level sales/customer support is provided for display to the lower scoring prospect. Other example conditions which may (in some embodiments) lead to a negative change in a prospect's score and/or the assignment and display of the same phone number or a different phone number (e.g., a RingPool number) include, for example, a determination of a prospect: unsubscribing from an email list or a bounced email; visiting press, investor, and about web pages; not visiting the website within a configurable time period; changing their purchase timeframe; not advancing in the sales funnel; subscribing to a "Do-Not-Call" list; submitting a spam complaint; posting a negative social media comment; non-renewing a contract/warranty; not residing in a location served by the company; a declared title indicating a low likelihood of purchase (e.g., student); one who doesn't speak English; and/ working in a different industry/market. Additional, fewer or different conditions may cause the system to reduce the score.

Sales Attribution

In many cases, a sale is attributable to one or a number of marketing touch points (where a prospect encounters the marketing campaign, or where the prospect and company engage to exchange information, provide service, or handle transactions), including for example the touch points described above, such as telephony touch points. Optionally, the marketing automation system allocates/attributes a sale across some or all those marketing elements/touch points the prospect interacted with during the course of a marketing program/campaign. This attribution improves Return-On-Investment calculations and provides a clearer view into the actual sales process.

Social Media

Optionally, activity on one or more social media sites is monitored by a social media monitoring system to detect company related interactions. These monitored interactions optionally cause the system to generate an alert to sales/customer support when the system determines that an action should be taken. For example, a prospect might tweet or place a post on a Facebook Fan Page that s/he is looking for reviews on a product or service offered by the company. This may be detected by or on behalf of the marketing system (e.g., by the social media monitoring system). Optionally, based at least in part on such detection of the prospect interaction with a social media platform, the marketing system increases the lead score associated with the prospect. Optionally, an outbound call is manually or automatically originated from a sales group (optionally with a modified calling party ID as discussed above) to the prospect and/or one or a series of textual communications are sent to the prospect that include one or more unique phone numbers (e.g., RingPool numbers) as discussed above to help advance/trigger a sale. Similarly, a detected negative social media interaction by a prospect may cause the social media monitoring system to decrease the lead score associated with the prospect and/or any networked members of the prospect. Optionally, a manually or automatically outbound call is originated from a sales group (optionally with a modified calling party ID as discussed above) to the prospect and/or one or a series of textual communications are sent to the prospect that include unique phone numbers (e.g., RingPool numbers) as discussed above intended to or configured to address the concern/negative issue. Optionally, the social media monitoring system(s) is a part of the marketing automation system platform or is integrated, for example, via a data network connection.

In addition, with respect to scoring and tracking, optionally the amount of social media activity associated with a prospect can be a heavily weighted factor in determining a prospect's lead score. For example, a prospect with a large number of "friends" may be an early adopter/influencer. Consequently, the prospect may be treated as a VIP and provided with special, enhanced treatment and privileges, such as, for example, a free trial of the product and/or service and a hotline phone number that may bypass an IVR system.

Mobile

As described above, there are many elements that may be associated with a marketing program which creates marketing touches/customer interactions which may lead to a sale. Historically, when marketing campaigns included an "online" element, the customer prospect interacted with these elements from a fixed computing environment (e.g., a work or a home personal computer). With the proliferation of smartphones and tablets, it would be advantageous for at least some customer interactions to take place via a prospect's mobile computing device. Optionally, the marketing automation system accounts for the mobile device environment by modifying the display to accommodate smaller screen displays and/or by supporting first party cookies to support tracking on mobile devices such as the iPhone. Optionally, lead nurturing and lead scoring take into account that the interaction is occurring on a mobile device and may change the weighting and scoring. For example, if all interactions with the prospect have been via a mobile device and the prospect switches to a fixed device, the prospect's lead score may be increased and/or interaction with the prospect may be routed to a sale group. Use of a mobile device may afford new and different inference opportunities. For example, dynamic location data of the mobile device, if available, may be used by the marketing automation system to determine how to modify lead scoring and routing. For example, if the marketing automation system determines a prospect is accessing a white paper or presentation from his/her company location, the prospect's lead score may be increased and the white paper/presentation may include a VIP phone number (e.g., which may bypass an IVR system or otherwise provide preferred access to support personnel).

Metrics

The marketing automation system may measure the effectiveness of marketing programs using a set of metrics. For example, a company with one or more email programs may measure the effectiveness of the programs using a set of email metrics including, for examples, the unsubscribe rate, bounce rate, open rate, and click-through rate. Telephony metrics can be measured. For example, the effectiveness of the telephony marketing program may be based at least in part on one or more of the following: the number of callers added to the "Do-Not-Disturb" and "Do-Not-Text" list (e.g., where the relatively higher the number, the less effective the telephony marketing program is determined to be, and the relatively lower the number, the relatively more effective the telephony marketing program is determined to be), number of dropped calls (inbound or outbound) after answer (e.g., where the relatively higher the number, the less effective the telephony marketing program is determined to be, and the relatively lower the number, the relatively more effective the telephony marketing program is determined to be), number of dropped calls (inbound or outbound) after salutation/welcome (e.g., where the relatively higher the number, the less effective the telephony marketing program is determined to be, and the relatively lower the number, the relatively more effective the telephony marketing program is determined to be), call durations (e.g., where the relatively shorted the call, the less effective the telephony marketing program is determined to be, and the relatively longer the call, the relatively more effective the telephony marketing program is determined to be), call (inbound or outbound) closure rates, tele-qualification success rates (e.g., where the relatively higher the rate, the more effective the telephony marketing program is determined to be, and the relatively lower the rate, the relatively less effective the telephony marketing program is determined to be), invalid phone number rates (e.g., where the relatively lower the rate, the more effective the telephony marketing program is determined to be, and the relatively higher the rate, the relatively less effective the telephony marketing program is determined to be), busy or no-answer call rates (e.g., where the relatively lower the rate, the more effective the telephony marketing program is determined to be, and the relatively higher the rate, the relatively less effective the telephony marketing program is determined to be), etc.

Marketing Automation Platform

In an example embodiment, a marketing automation system includes one or more networked computing servers, data stores (e.g., databases), networking infrastructure, telephony capabilities including call routing, switching, and bridging, and a collection of general purpose and specific (e.g. voice recognition) application/system software as described above. In addition to the some or all of the components described above, a marketing automation platform optionally includes a marketing automation software application and centralized marketing data store, software analytics, user interfaces, dashboards, and reporting.

Optionally, the marketing automation platform includes a centralized marketing application which is used to create and manage the marketing programs and associated program stages, tracks each customer prospect and stores (e.g., in a centralized data store) the tracking information and any inferred and declared data associated with each customer prospect. Optionally, the marketing program is integrated with and receives detailed tracking information from numerous internal and external system providing the online and offline (e.g., telephony and call processing subsystems) customer prospect interactions including, for example, but not limited to some or all of the following: email: list storage and generation, sending, monitoring; web-site: corporate, landing pages, and microsites; blogs: postings, monitoring, and management; webinars/webcasts/videos/online courses: invitations, registrations, attendance, viewing, delivery, and posting; free trials: invitations, registrations, activity, termination; downloads: invitations, registrations, delivery status; free software: invitations, registrations, activity, termination; documents: postings, monitoring, and management; integrated or public application directory: invitations, registrations accessing, searching, perusal; widget: gadget; invitations, registrations, delivery status, type, activity/usage, updates; social media: monitoring (including a monitoring service), postings, sharing, liking, modified status; RSS/XML feed: postings, monitoring, and management; survey: invitations, registrations, completion, acknowledgement; search activity: term list management, monitoring; certifications: invitations, registrations, outcome determination, award/denial management; podcasts: invitations, registrations, activity, terminations, streaming, downloads. Optionally, other data may be captured with respect to marketing programs/campaigns includes, for example, program start/end dates, converted prospects, program costs in terms of both expenses and staff. Optionally, historical marketing campaigns and/or best practice campaigns and the associated data/metrics are stored and available for review, comparison, trend analysis, and/or cloning for new campaigns.

Optionally, the marketing automation platform's one or more dashboards/reports provide staff (e.g., marketing and/or sales personnel) real-time and/or near real-time information on customers/prospects interacting with marketing media associated with the company and/or marketing campaigns. Optionally, the platform enables the distribution of these real-time customer engagements to company personnel (e.g., sales agents). Optionally, the marketing automation platform enables the recipients (e.g., sales agents) to view information associated with the customer's/prospect's current engagement and/or other information associated with the customer/prospect including for example, attributes/characteristics, marketing program state, etc.

Optionally, the marketing automation platform generates alerts or notifications to sales/marketing/support/executive staff personnel in response to a condition, including in response to one or more conditions discussed herein. Optionally, the alerts are sent via messaging services such as email. Optionally, the alerts are sent as a text message via SMS/MMS, an instant message, a widget/gadget display, a customized client software application, and/or an outbound phone call. Optionally, the condition is triggered, for example, by an event such as, by way of example, one or more of the following: a time period expiration, a marketing program state transition, an attribute/characteristic of a prospect/customer determined by the system, an attribute/characteristic prospect/customer state change, etc.

Optionally, the marketing automation platform includes one or more sales/marketing/executive-level friendly user interfaces (e.g., reports and/or dashboards) which enable one or more views and/or analysis into the stored data including, for example, trends, program performance, alerts, efficiency, program design, etc. Optionally, the marketing automation platform includes one or more customizable views and/or analysis into the stored data which can be used by business analyst or other technical resources to build custom reports to meet specific needs of the organization and/or to derive particular insights from the data. Optionally, the data stored in the marketing automation platform can be exported to other analytic programs/processing systems.

Optionally, the marketing automation platform provides one or more real-time and/or near real-time information via dashboards/reports to staff (e.g., marketing and/or sales personnel) on customers/prospects interacting with marketing media or media elements associated with the company and/or marketing campaigns. Optionally, the platform enables the distribution of these real-time customer engagements to company personnel (e.g., sales agents). Optionally, the marketing automation platform enables the recipients (e.g., sales agents) to view information associated with the customer's/prospect's current engagement and/or other information associated with the customer/prospect including for example, attributes/characteristics, marketing program state, etc. Optionally, the current information is made available (e.g., via a data network interface) to other applications/systems including, for example, a CRM (customer relationship management) application Optionally, the marketing automation platform supports a collection of user interfaces for creating marketing programs/campaigns and for routing leads out of the funnel to the appropriate organization (e.g., customer care, sales, VIP sales, etc.) and/or individual. Optionally, the user interface is presented by a customized software client. Optionally, the user interface is presented in one or more existing sales force automation client interfaces. Optionally, the user interface is presented via standard clients including, for example, a web browser (e.g., Chrome, Firefox, Safari, Internet Explorer), and/or a mail client application (e.g., Microsoft Outlook).

Example Embodiments of Workflows:

FIGS. 33 through 38 illustrate a first example workflows of operation of the example ANCB system 1005 discussed above. Process states are listed on the left and elements of the operating environment of FIG. 32 are listed across the top.

FIGS. 33-38 depicts an example embodiment of the system where a producer of baby fans, the advertiser 300, enlists an affiliate 200 to promote their fans to consumers 400. The embodiment below describes how the producer/advertiser 300 creates a campaign and makes the campaign available to an affiliate 200. The affiliate then assigns a phone number to the campaign and integrates the phone number into the affiliate's web site. A user/consumer 400 then places a call to the phone number and is connected to the baby fan manufacturer's call center. The call is tracked by the call bridging system and the affiliate 200 is credited for the call.

In the example embodiment below, the advertiser 300 previously registered and created an account in the affiliate network system database 900. In addition, the affiliate 200 created an account in the affiliate network system database 900.

Figure 33:
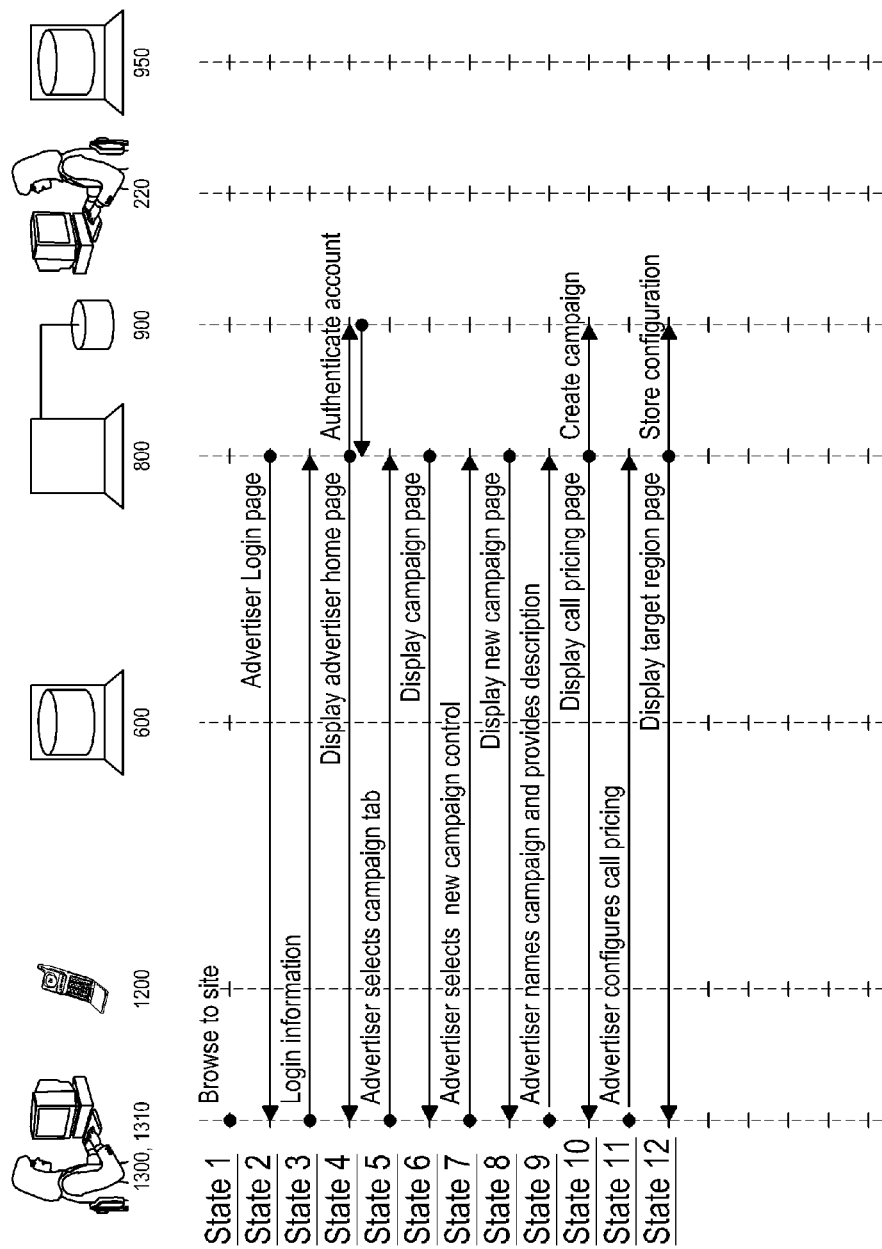
FIGS. 33-38: illustrate an example operating environment/process for a communications system

State 1 of FIG. 33 An advertiser 300, the producer of baby fans in this example, accesses the Affiliate Network (AN) 100 web site/system 1005. In this example, the advertiser browses to the ANCB 100 web site/system 1005 using a PC (personal computer or other type of terminal) 1300 connected to data network 4000. Optionally, any data networking capable device can be used by advertiser 300 including for example, a mobile phone 1500 with data networking capabilities.

State 2. The ANCB web hosting server 800 receives the web page URL request and presents an advertiser login/registration web page, see FIG. 9, to the advertiser 300.

State 3. The advertiser 300 fills in their email address (or user ID) in the email address field 1000 and password in the password field 1001 in the web form FIG. 9 and clicks a Submit control 1002.

State 4. The server 800 receives the login requests. The account information entered by the advertiser 300 is authenticated against registered accounts in the database 900. In this example, the account information is valid and the server 800 responds by logging the advertiser 300 into their account and displaying the advertiser home page, see FIG. 4 for an example advertiser home page.

State 5. The advertiser 300 creates a campaign for Baby Fans. The advertiser 300 creates a new campaign by first selecting the campaign tab control 37 in FIG. 4.

State 6. The server 800 receives the advertiser's request. The server 800 responds by displaying the Campaigns web page, see FIG. 5.

State 7. The advertiser 300 selects the new campaign control 23 in FIG. 5.

State 8. The server 800 receives the advertiser's 300 request and the server 800 responds by displaying the New Campaign web page, see FIG. 10.

State 9. The advertiser 300 enters a campaign name, "Baby Fan Sale", in field 111 and a campaign description, in field 114 of FIG. 10. The advertiser 300 optionally selects a product or service category "Family>Babies" using the pull down menu control 113. The advertiser 300 optionally selects the "ongoing" campaign control 115. In this example, the advertiser 300 did not select a Network AID 112 or enter a Campaign description 114. The advertiser 300 selects the Next control 116, see FIG. 10.

State 10. The server 800 receives the advertiser's request to create a campaign. Optionally, the server 800 ensures the campaign name is unique for the advertiser 300 and then creates a new campaign named "Baby Fan Sale" and stores the entered/selected campaign information in the database 900. The server 800 next responds by displaying the Call Pricing web page, FIG. 11.

State 11. From the call pricing web page the advertiser 300 specifies optionally whether calls are to be managed in a fixed price scheme or to depend upon call quality. In this embodiment, the advertiser 300 selects a fixed price per call of $5 for high quality calls 136 and $1 for low quality calls 138 of FIG. 11. The advertiser 300 optionally selects the $0.00 price for repeat callers control 11000. The advertiser 300 then selects the Next control 11100.

State 12. The server 800 receives the advertiser's 300 campaign configuration data. Optionally, the server 800 stores the entered/selected campaign information in the database 900. The server 800 next responds by displaying the Target Regions web page, FIG. 13.

Figure 34:
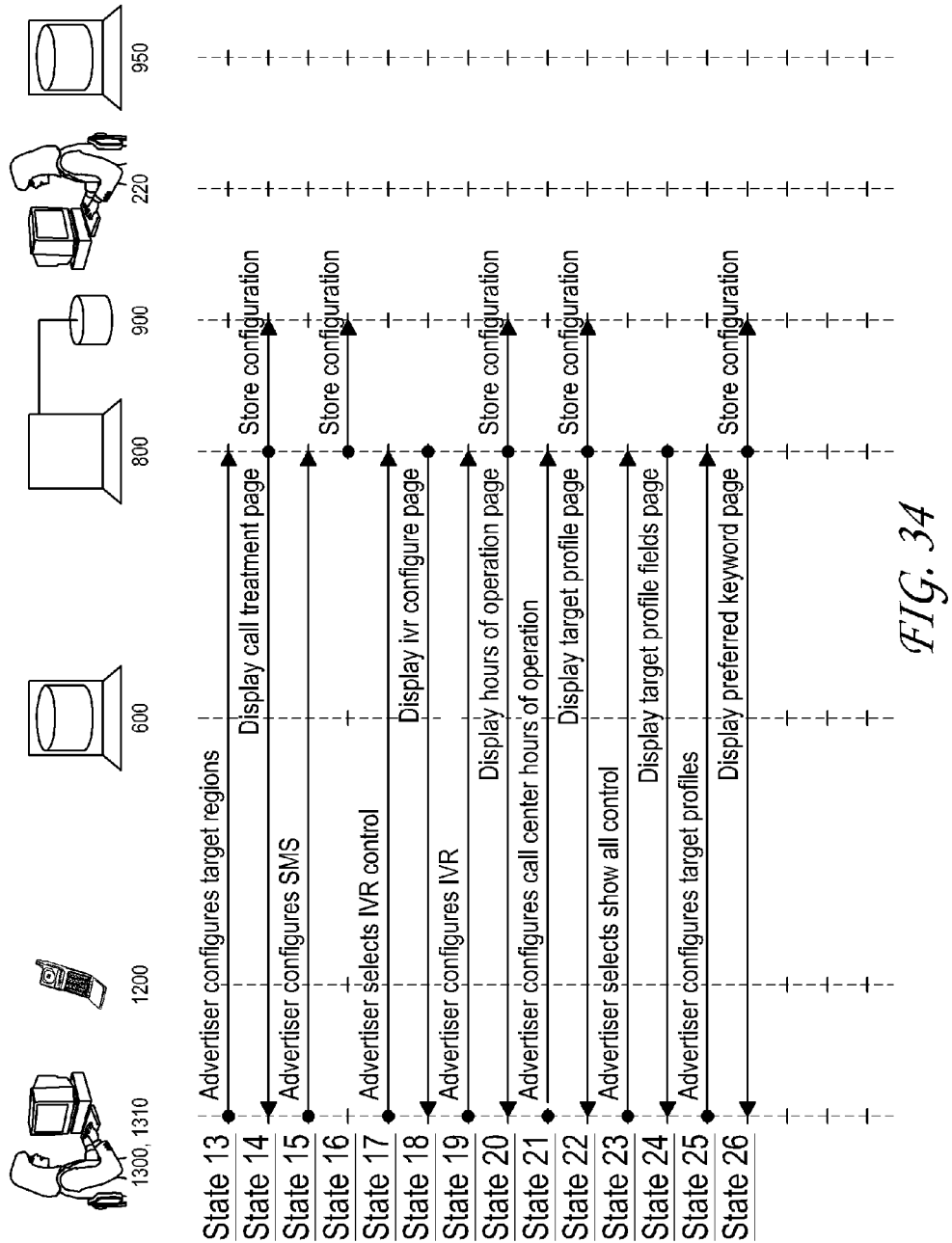

State 13 of FIG. 34. In this example, the advertiser 300 chooses not to designate a different call quality based upon the region a call is originating from. The advertiser 300 selects the All U.S. control 13000 and then selects the Next control 13100, see FIG. 13.

State 14. The server 800 receives the advertiser's 300 campaign configuration data. Optionally, the server 800 stores the entered/selected campaign information in the database 900. The server 800 next responds by displaying the Call Treatment web page, FIG. 14.

State 15. In this example, the advertiser 300 configures two separate call treatments: a text message to be sent to caller's mobile phone after their call; and an Interactive Voice Response (IVR) tree for incoming calls.

Figure 14:
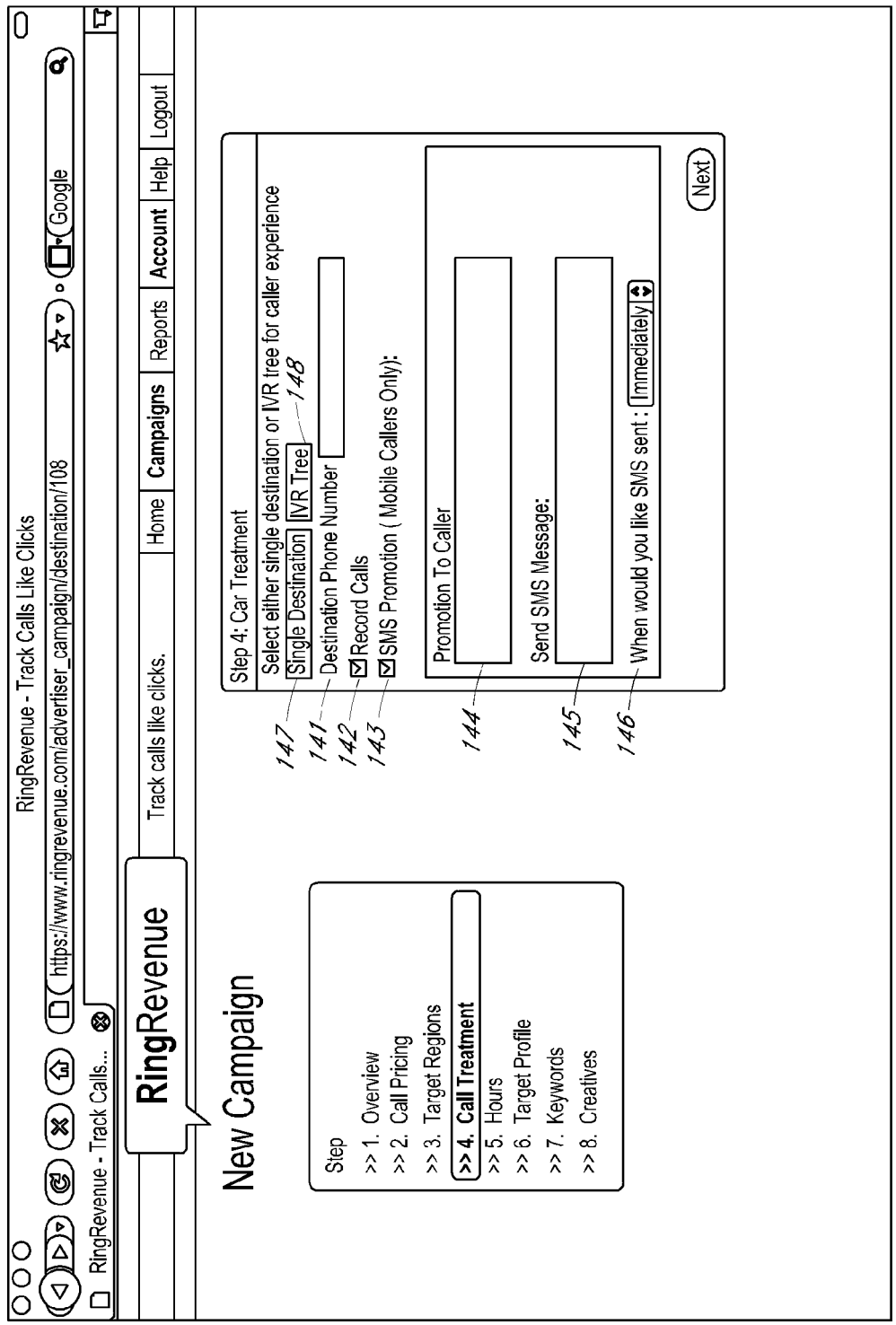
FIG. 14: is an illustration of an example embodiment for creating a new campaign which illustrates the call treatment submodule utilizing the single destination routine.
Figure 15:
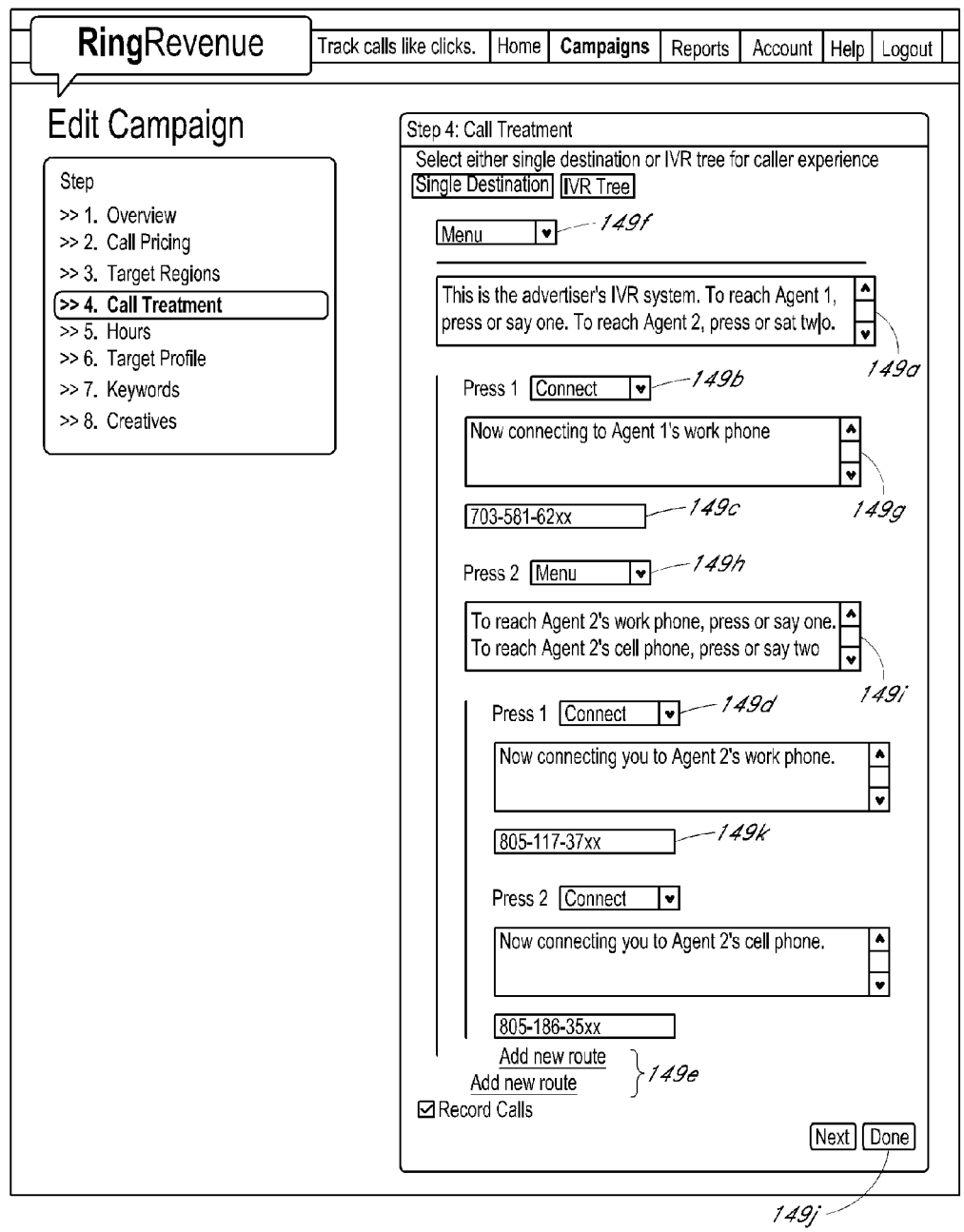
FIG. 15: is an illustration of an example embodiment for creating a new campaign which illustrates the target regions submodule utilizing the IVR routine.
Figure 19:
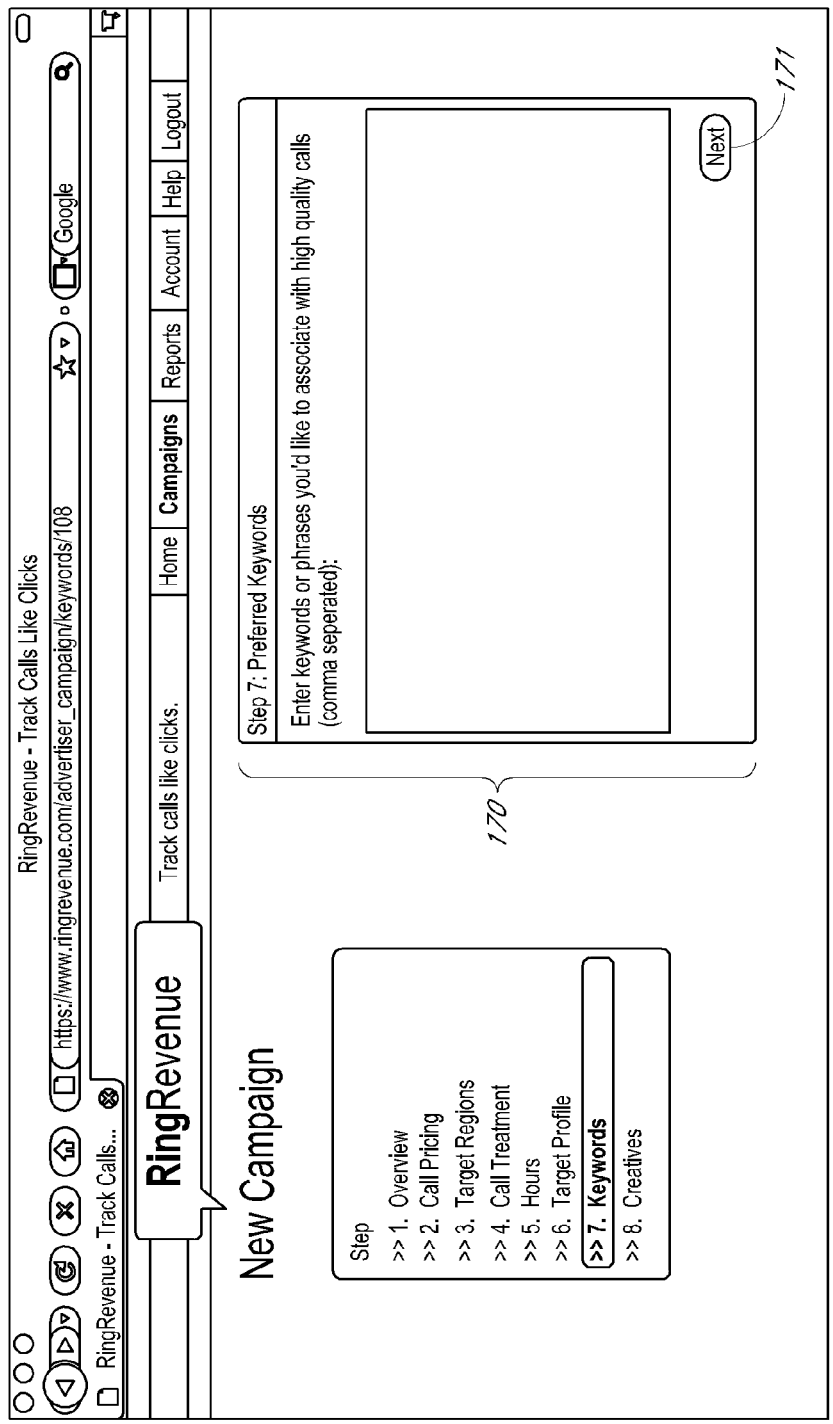
FIG. 19: is an illustration of an example embodiment for creating a new campaign which illustrates a keywords submodule.
Figure 20:
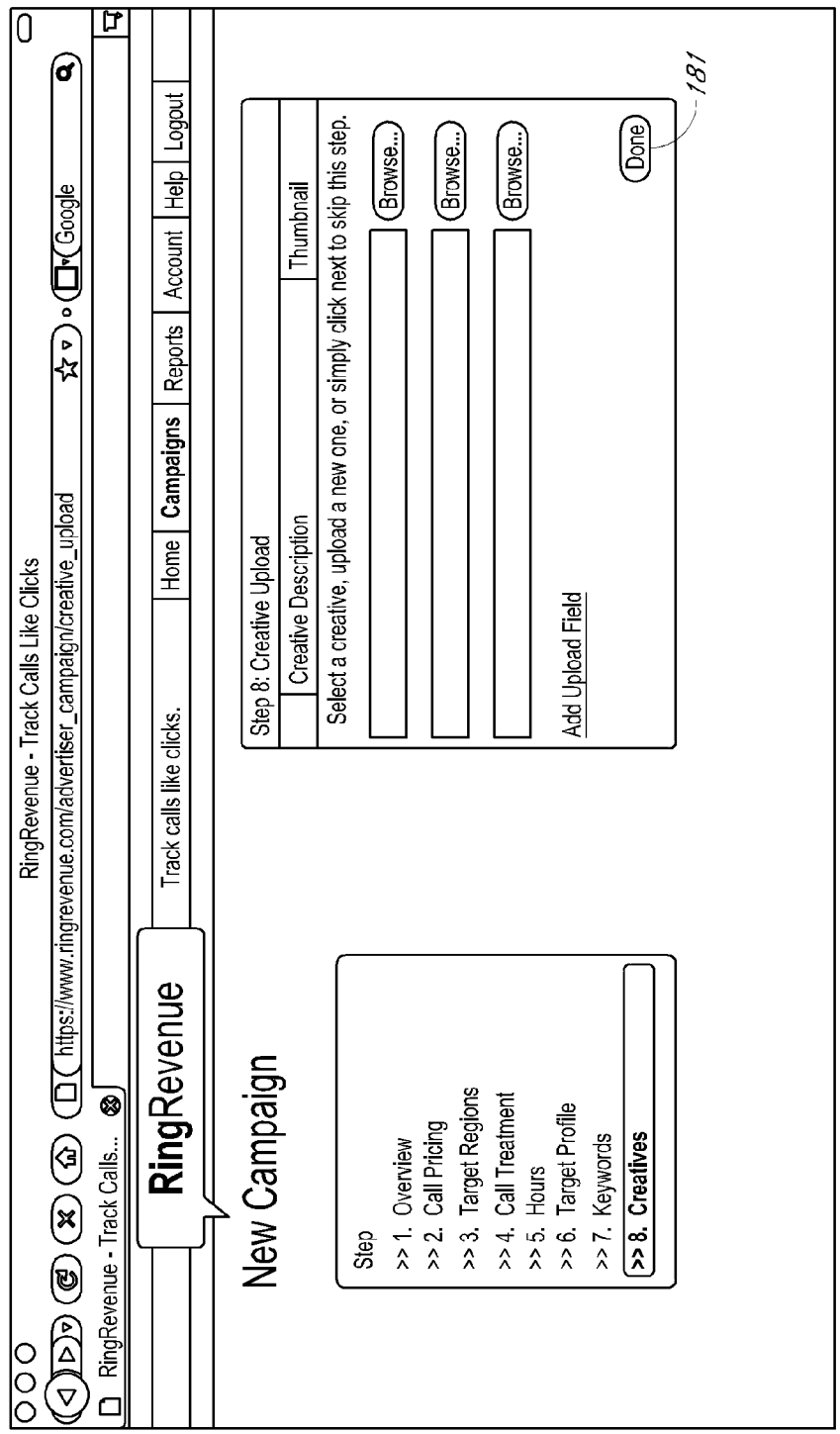
FIG. 20: is an illustration of an example embodiment for creating a new campaign which illustrates a creatives submodule.

To configure text messaging, the advertiser 300 enters the text "Thank you for your interest in baby fans, if you have any further questions please call 800-800-0000 or visit our web site www.acmebabyfans.com" in field 145 and selects the Immediately control from the pull down menu 146, see FIG. 14.

State 16. The server 800 receives the advertiser's campaign configuration data. Optionally, the server 800 stores the entered/selected campaign information in the database 900.

State 17. The advertiser 300 next configures the system to distinguish callers interested in infant baby fans from toddler baby fans. Depending upon the caller's interest, calls are bridged to two different call centers in Phoenix, Ariz.

The advertiser 300 selects the Interactive Voice Response (IVR) Tree control 148, see FIG. 14.

State 18. The server 800 receives the advertiser's request. The server 800 responds by displaying the Call treatment IVR configuration web page, see FIG. 15.

State 19. The advertiser 300 selects "Menu" in the pull down menu control 149f, see FIG. 15; enters the text "You have reached ACME baby fans. If you are interested in infant baby fans, press or say one. If you are interested in toddler baby fans, press or say two." in the text field 149a, see FIG. 15; selects the direct connect configuration response option in the pull down menu control 149b if the user keypresses or speaks "one", see FIG. 15; enters the text "Now connecting to an agent handling infant baby fans, please hold." in the text field 149g which is configured to be played after the caller keypresses the dual tone multi-frequency (DTMF) control one or speaks "one"; enters the destination phone number of the Phoenix call center, infant baby fans department 602-555-1234 in the phone number field 149c, see FIG. 15; selects the direct connect response option in the pull down menu control 149h if the user keypresses the dtmf two or speaks "two", see FIG. 15; enters the text "Now connecting to an agent handling toddler baby fans, please hold." in the text field 149i which is configured to be played after the caller keypresses the dtmf control two or speaks "two", see FIG. 15; enters the destination phone number of the Phoenix call center, toddler baby fans department 602-666-1234 in the phone number field 149k. The advertiser 300 then selects the Done control 149j.

State 20. The server 800 receives the advertiser's 300 IVR configuration data. Optionally, the server 800 stores the entered/selected IVR configuration in the database 900. The server 800 next responds by displaying the Hours of Operation web page, FIG. 16.

State 21. The advertiser's 300 call center is open Monday through Friday, 8:00 AM to 5:00 PM, Pacific Standard Time, and closed on the weekends. The advertiser 300 selects the closed Sunday check box control 1600 and closed Saturday check box control 1610 to signify the call center is closed on Sunday and Saturday, see FIG. 16. The advertiser 300 does not change the default open and close hours fields. The advertiser 300 also selects Mountain Standard time in the time zone scroll control 1620, see FIG. 16. The advertiser 300 then selects the Next control 1630.

State 22. The server 800 receives the advertiser's 300 call center hours of operation configuration data. Optionally, the server 800 stores the entered/selected hours of operation configuration in the database 900. The server 800 next responds by displaying the Target Profile web page, FIG. 17.

State 23. Based on previous market research, the advertiser 300 has determined that if a caller is calling from their cell phone, they are much more likely to purchase baby fans. In this example, the advertiser 300 is willing to pay a premium for these types of calls. The advertiser 300 selects the show all fields control box 161, see FIG. 17.

State 24. The server 800 receives the advertiser's request to show all target profile fields. The server 800 responds by displaying a new web page depicting all of the target profile configurable fields, see FIG. 18.

State 25. The advertiser 300 selects the calling from control box 164 and moves the Mobile slider control 165, see FIG. 18, to High to designate a high premium in this campaign for inbound cell phone calls. The advertiser 300 then selects the Done control 166 in FIG. 18.

State 26. The server 800 receives the advertiser's 300 target profile configuration data. Optionally, the server 800 stores the entered/selected target profile configuration in the database 900. The server 800 next responds by displaying the Preferred Keywords web page, FIG. 19.

Figure 35:
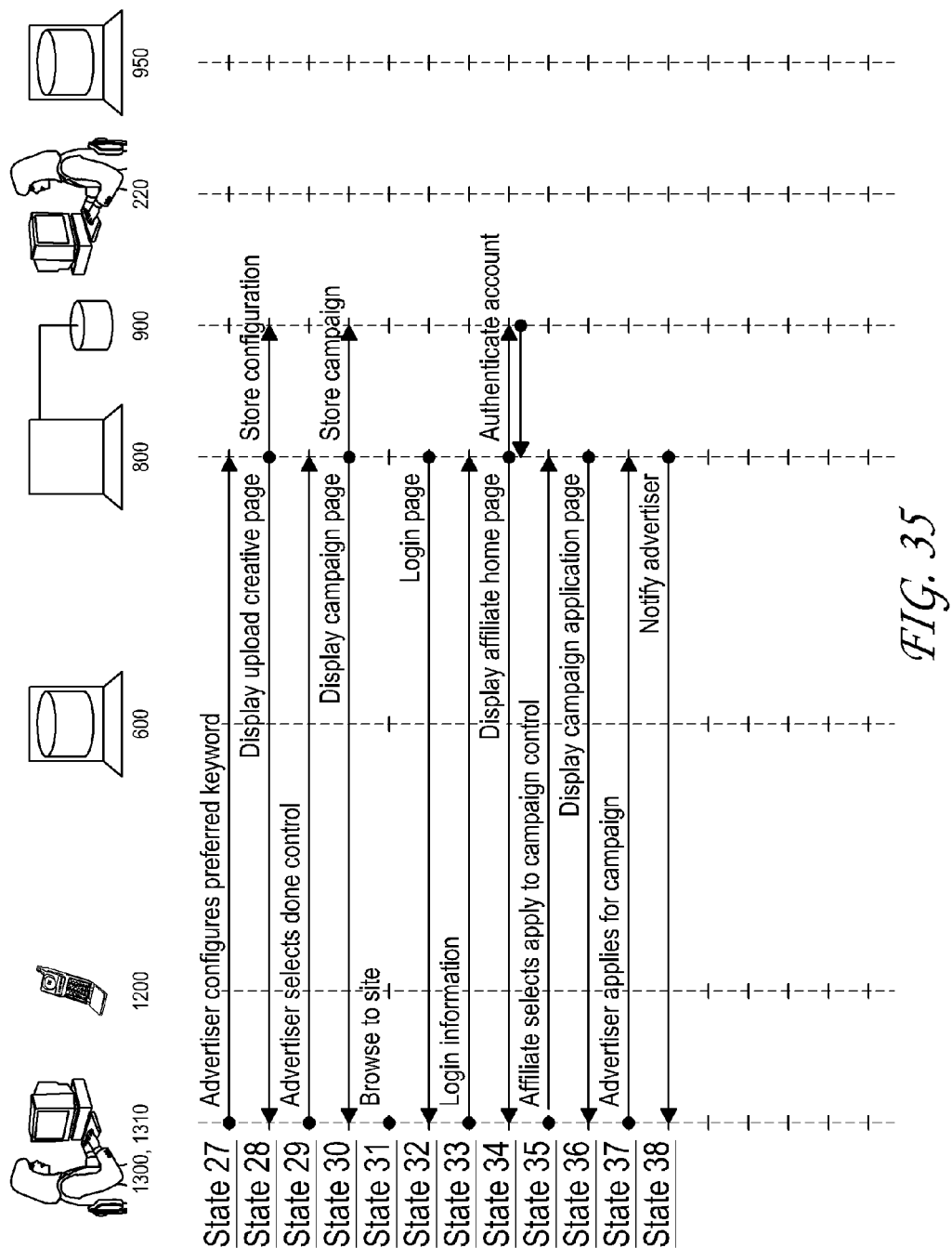

State 27 of FIG. 35. The advertiser 300 has determined that if a caller speaks the keyword "friend" they have a higher probability of purchasing a baby fan. For example, a caller may mention they heard about baby fans on sale from a friend. The advertiser 300 identifies the keyword for the campaign by typing in the word "friend" in the field 170 of FIG. 19. The advertiser 300 then selects the Next control 171.

State 28. The server 800 receives the advertiser's 300 preferred keyword configuration data. Optionally, the server 800 stores the entered/selected preferred keyword configuration in the database 900. The server 800 next responds by displaying the Upload Creative web page, FIG. 20.

State 29. In this example embodiment, the advertiser 300 chooses not to upload any creatives such as a banner ad for use by the affiliate. The advertiser 300 selects the Done control 181 in FIG. 20.

State 30. The server 800 receives the request and optionally updates the database to reflect the advertiser 300 has not selected to upload creative for the campaign and that the campaign is now created. With the campaign created, the server 800 displays the Campaign home web page, see FIG. 5. The newly created campaign is displayed in the campaign summary and is available to one or more affiliates.

Optionally, the server 800 displays a web page similar to that shown in FIG. 30 which allows the advertiser to open or restrict access/visibility of the campaign to certain affiliates. In this example embodiment, the advertiser's 300 campaigns are accessible and visible to all affiliates.

State 31. In this example embodiment, an infant newsletter web site, daycaretoday.com, is interested in becoming an affiliate 200 and promoting baby fans. The affiliate 200 registers and becomes a member of the affiliate network 100 (not shown).

The affiliate 200, daycaretoday.com, accesses the affiliate network (AN) web site. In this example, the user browses to the AN web site using a PC 1310 connected to data network 4000.

State 32. The AN web hosting server 800 receives the web page URL request and presents an affiliate login/registration web page to the affiliate 200, see FIG. 9.

State 33. The affiliate 200 enters their email address in the email field 1000 and password in the password field 1001 and selects the submit control 1002, see FIG. 9.

State 34. The server 800 receives the login requests. The account information entered by the affiliate 200 is authenticated against registered accounts in the database. In this example, the account information is valid and the server 800 responds by logging the affiliate 200 into their account and displaying the affiliate home page, see FIG. 21 for an example affiliate home page.

State 35. The affiliate 200 applies to the Baby Fans campaign by selecting the apply control 48, see FIG. 21.

State 36. The server 800 receives the affiliate's 200 application for the Baby Fans campaign request and displays a new campaign affiliate application web page to the affiliate 200; see FIG. 22 for an example campaign affiliate application web page.

State 37. The affiliate 200 reviews information about the campaign 48a, including some or all of the campaign information established by the advertiser 300 in the campaign creation steps detailed above. After reviewing the campaign details and terms and conditions, the affiliate selects the terms and condition control 48b, and then selects the apply control 48c, see FIG. 22.

State 38. The server 800 receives the affiliate application request. The application request triggers a message notification event to be posted to the advertiser 300 from the notification module.

Figure 36:
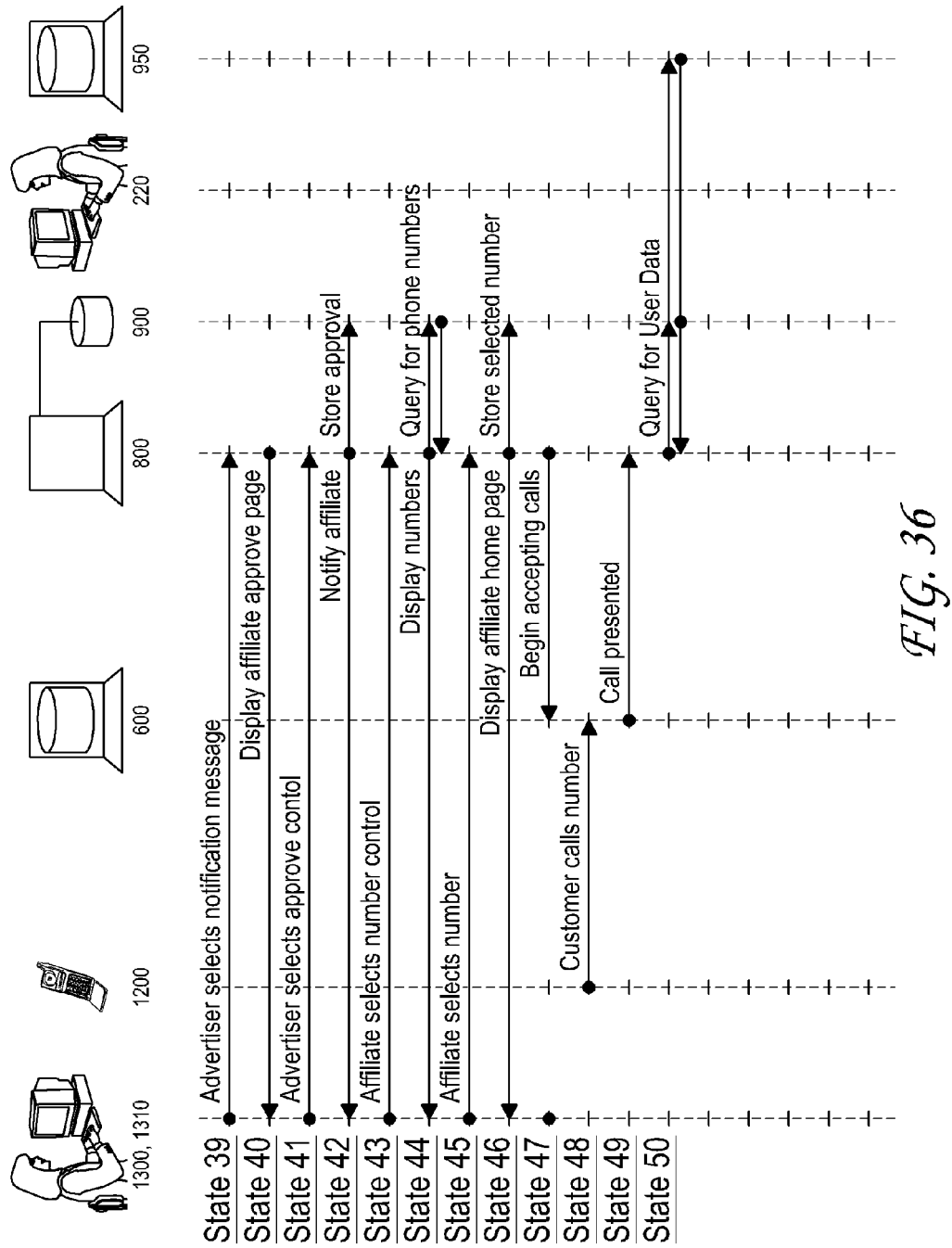

State 39 of FIG. 36. In this example, the advertiser 300 is logged into the server 800 and notices a new notification 35, see FIG. 4. The advertiser 300 selects the notification message which is a link to an affiliate 200 acceptance web page, see FIG. 23.

State 40. The server 800 receives the advertiser 300 selection request and displays to the advertiser an affiliate approval web page, see FIG. 23.

State 41. The advertiser 300 approves the affiliate 200, daycaretoday.com, application by selecting the approve control 48d.

State 42. The server 800 receives the approved application request from the advertiser 300. The server 800 updates the database 900 and optionally posts a notification message 41, see FIG. 21, to the affiliate 200 from the notification module.

State 43. In this example, the affiliate 200, daycaretoday.com, is logged in to the server 800. The affiliate 200 reads the approval message 41, see FIG. 21. Additionally, the campaign status displayed to the affiliate 200 is in the approved/active state 43, see FIG. 21.

The affiliate 200 is now ready to manage the campaign by assigning a phone number to the campaign. The assigned phone number will be used by the affiliate 200 in their creatives/advertisements relating to baby fans. The affiliate 200 selects the numbers control 44, see FIG. 21.

State 44. The server 800 receives the affiliate's 200 numbers request control. The server 800 queries the database 900 for one or more configurable number (e.g., 5 numbers) of available phone numbers and displays a new web page listing these numbers and associated fields, see FIG. 24.

State 45. The affiliate 200 selects a phone number, 866-683-1950, by selecting the control 4400 to the left of the displayed phone number, see FIG. 24. The affiliate 200 selects a media type, Internet, from a pull down menu control 4410. Optionally, the affiliate 200 enters a promotional description, baby fans, in the promo description field 4420. After configuring the phone number associated with the campaign, the affiliate 200 selects the Done control 4430, see FIG. 24.

State 46. The server 800 receives the affiliate 200 phone number configuration request. In response, the server 800 updates the database with the number assignment to the affiliate 200 and stores the media type and promotional description. The server 800 then displays the affiliate 200 home page, see FIG. 21.

State 47. The server 800 configures the phone server 600 (telephony call bridge) to begin accepting calls to the phone number 866-683-1950.

The affiliate modifies their Internet promotion (or offline promotion) of baby fans to include the phone number 866-683-1950.

State 48. A reader of the newsletter (a customer 400) who is interested in purchasing a baby fan notices the affiliate's 200 Internet banner advertisement for baby fans. The customer 400 places a phone call from their cell phone 1200 to the number 866-683-1950. The call is routed through the public switched telephone network 3000 to the ANCB platform 100, phone server 600.

State 49. The phone server 600 notifies the server 800 of the presented call along with the call signaling information associated with the call (e.g., calling and called numbers, direct call, etc.).

State 50. The server 800 queries the database 900 to determine the call handling treatment for the call and optionally external databases 950 to collect additional information about the caller 400 (and calling device/type of device) for call rating and tracking purposes. From the calling number the server 800 determines the caller is calling from a cell phone, thus, the call is noted for lead tracking purposes as a premium call.

Figure 37:
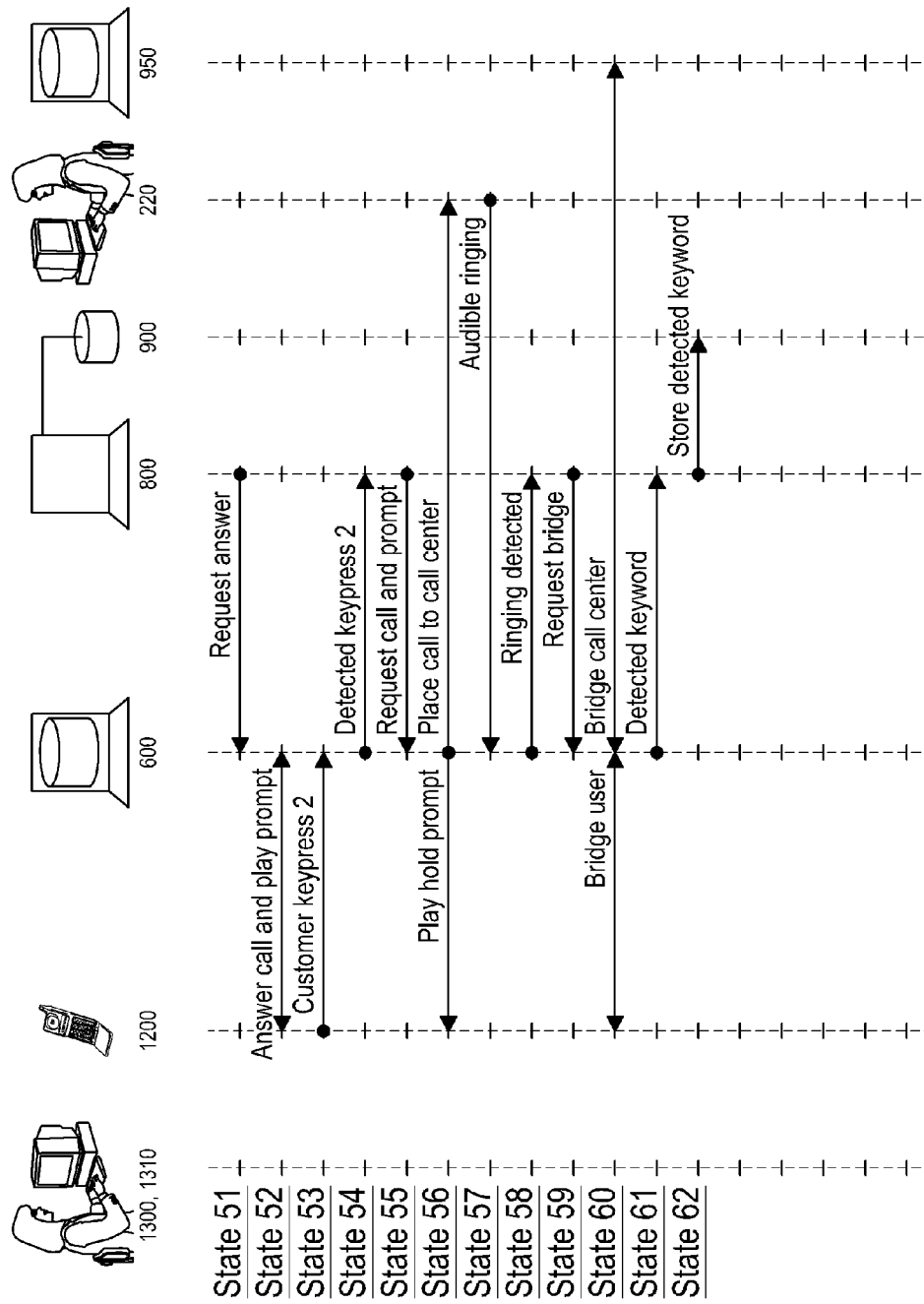

State 51 of FIG. 37. Since the called phone number 866-683-1950 is associated with the baby fans campaign, the call treatment is to initially play an interactive menu to the caller. The server 800 requests the phone server 600 answer the call and play the voice menu configured for this campaign.

State 52. The phone server 600 answers the incoming call and plays the voice prompt to the customer/caller 400 "You have reached ACME baby fans. If you are interested in infant baby fans, press or say one. If you are interested in toddler baby fans, press or say two".

State 53. In this example, the caller presses two on their phone keypad in response to hearing the voice prompt.

State 54. The phone server 600 detects a dual tone multi-frequency tone (dtmf) two. The phone server 600 notifies the server 800 of the dtmf event.

State 55. The server 800 requests the phone server 600 generate an outbound call to the configured phone number/address 602-666-1234 which is the advertiser's 300 destination phone number of the Phoenix call center, toddler baby fans department.

State 56. The phone server 600 generates an outbound call to the phone number/address 602-666-1234.

State 57. The phone server 600 detects audible ringing on the outbound call to the call center.

State 58. The phone server 600 notifies the server 800 of the audible ringing on the outbound call to the call center.

State 59. The server 800 requests the phone server 600 bridge the inbound call from the customer/caller 400 to the outbound call to the call center.

State 60. The phone server 600 bridges the inbound call from the customer/caller 400 to the outbound call to the call center 3200.

Optionally, the phone server 600 continues to monitor both legs of the call. The call center agent asks the caller how the caller heard about ACME baby fans. The caller said they heard about it from a friend and saw the advertisement in a banner advertisement on the daycaretoday.com web site.

State 61. The phone server 600 detects the keyword "friend" spoken by the caller 400. The phone server 600 notifies the server 800 of the keyword.

State 62. The premium keyword occurrence is logged in the database 900 for the call. Optionally, a configurable number of seconds before and after the keyword is recorded by the phone server 600 and stored in the database for advertiser 300 review and auditing purposes. Optionally, the entire phone conversation is recorded and the recording is post-call analyzed for premium keywords.

Figure 38:
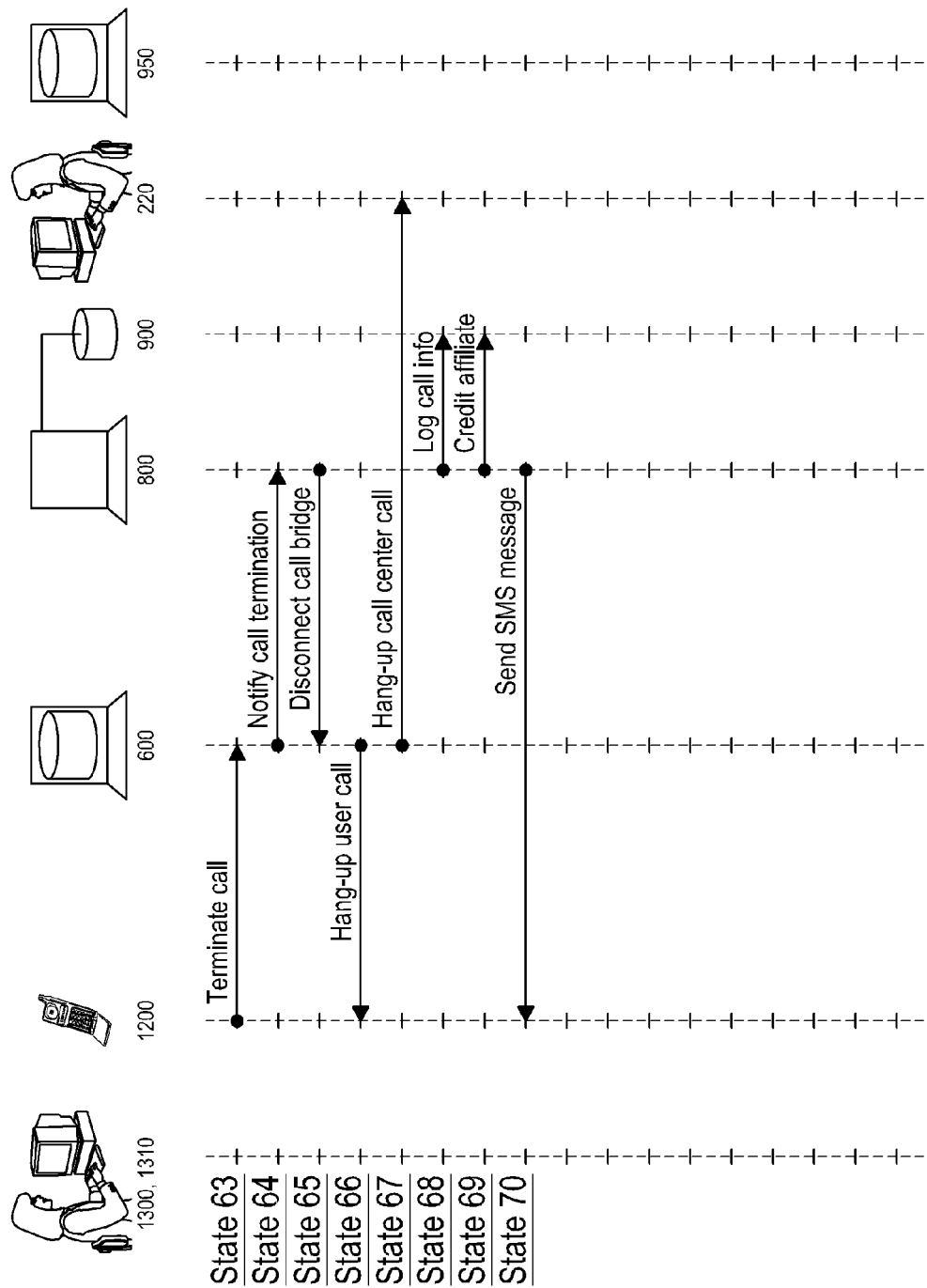

State 63 of FIG. 38. In this example, the phone server 600 detects the termination of the call by the caller (e.g., caller hung up).

State 64. The phone server 600 notifies the server 800 of the call termination by the caller.

State 65. In this example, the server 800 requests the phone server 600 terminate the call bridge between the customer/caller 400 and the call center 220.

State 66. In this example, the phone server 600 terminates the inbound call from the customer/caller 400.

State 67. In this example, the phone server 600 terminates the outbound call to the call center 230.

State 68. The server 800 writes a call detail record to the database, the call detail record including information about the call (e.g., length of the call, calling party ID, etc).

State 69. The call bridging platform calculates the value of the call to the affiliate 200 and credits the affiliate 200 for the call by updating the database 900. In this example, the call was determined to be of high quality because the keyword "friend" was detected in the voice conversation with the call center agent. (In this example, the call was also high quality because the incoming call from the caller/customer originated from a cell phone.) The advertiser configured high quality calls to be of $5 in value. Therefore, the affiliate was credited in the amount of $5 for the call.

State 70. The campaign is configured to send SMS messages if the inbound call is from a cell phone. The server 800 composes a text message, "Thank you for your interest in baby fans, if you have any further questions visit our web site www.acmebabyfans.com" and sends an SMS message to the customer/caller's 400 mobile phone 1200 from the notification module. Optionally, the SMS message is sent at any point in the call including when the caller/customer accepted the offer. Optionally, the text message includes a telephone number.

Second Example Embodiment

FIGS. 67-72 depicts a second example embodiment of the system where a Newspaper, The News Press, is interested in increasing their subscription through an online advertising campaign by driving call traffic to their call center. The example embodiment below describes how the Advertiser 300, The News Press, creates a campaign and makes the campaign available to publishers/affiliates 200. The campaign created in this example is modified from the first example to illustrate a second example embodiment of campaign creation. The advertiser uses Custom RingPools in this embodiment to track the phone calls driven by each advertisement.

FIGS. 67 through 72 illustrate example workflows of operation of the example PM system 1005 discussed above. Process states are listed on the left and elements of the operating environment of FIGS. 67-72 are listed across the top.

In this example below, the Advertiser 300, The News Press, previously registered and created an account in the system database 900. In addition, one or more publishers/affiliates 200/100 created their respective accounts in the system database 900. Further, in the example below, the process steps of the advertiser and/or publishers/affiliates accessing the system and logging in are not shown (see previous example for an embodiment of these steps).

Figure 67:
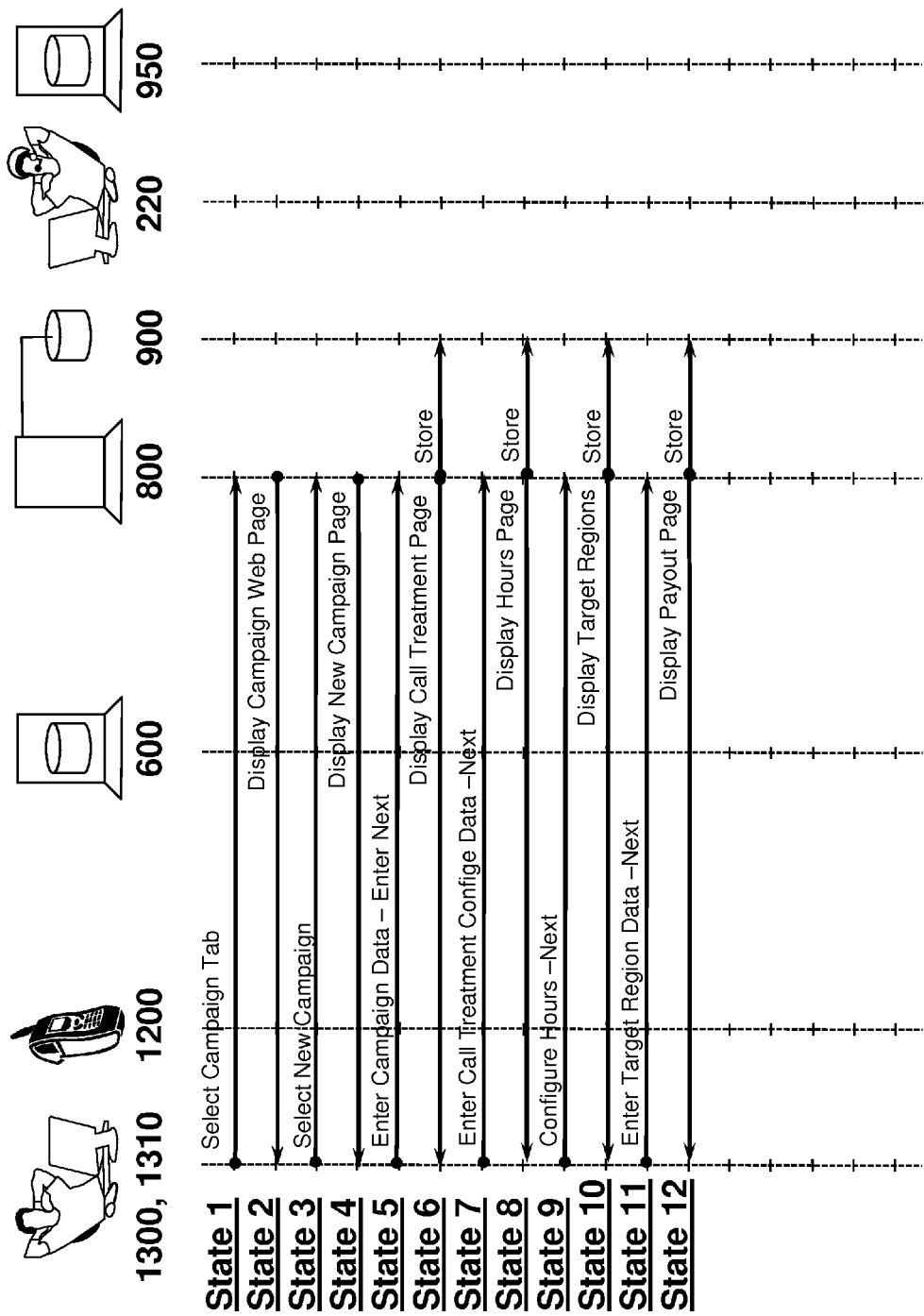
FIGS. 67-72: illustrate another example operating environment/process for a communications system.

State 1 of FIG. 67. The News Press 300 creates a new advertising campaign for their newspaper. The News Press creates a new campaign by first selecting the campaign tab control 37 in FIG. 4.

State 2. The server 800 receives the News Press' request. The server 800 responds by displaying the Campaigns web page, see FIG. 5.

State 3. The News Press 300 selects the new campaign control 23 in FIG. 5.

State 4. The server 800 receives the News Press' 300 request and the server 800 responds by displaying the New Campaign web page, see FIG. 39.

State 5. The first step in creating a campaign is establishing a name/identity for the campaign. An Ad campaign manager for The News Press enters a campaign name, "2011 Sale", in field 3910 and a campaign description, in field 3950 of FIG. 39. The campaign manager enters the following campaign description in field 3950 "Maximize your revenue with The News Press. We specialize in providing comprehensive local Santa Barbara county and national news. Average annual subscriptions are $100." The campaign manager optionally selects the campaign type "Publisher promotion" as the campaign is to be directed to publishers. The campaign manager optionally selects a product or service category using the scroll menu control 3940. The campaign manager optionally selects the "ongoing" campaign control 3970 since there is no planned expiration in the campaign. The campaign manager selects the Next control 3980, see FIG. 39, to advance to the second step in the creation of the campaign.

State 6. The server 800 receives the News Press campaign manager request to create a campaign titled "2011 Sale". Optionally, the server 800 ensures the campaign name is unique to this advertiser and then creates a new campaign named "2011 Sale" and stores the entered/selected campaign information in the database 900. The server 800 next responds by displaying the Step 2 Call Treatment web page, FIG. 41.

State 7. The campaign manager next configures the system to screen inbound calls before speaking with a News Press call center agent. In this example, the campaign manager wants all calls to be recorded, and so selects the record calls control 4110. Next, the campaign manager would like the PM system to screen inbound calls by asking a filtering question. The manager selects the "Ask a question" option from the scroll menu control 4120 and enters the text "If you are trying to reach The News Press, press 1. If you misdialed, please hang up." into the text field 4130.

Next, the manager selects the New control 4180 to cause the "1" key response option controls and fields to be displayed. (Optionally, this web page refresh can be illustrated as two separate steps. For brevity, web page refreshes are generally not represented as separate states.) For the Interactive Voice Response (IVR) Menu 1 key, the manager selects the "forward to call center" option from the scroll menu control 4140 and enters "Thank you for calling The News Press. We are transferring your call." into the text field 4150. The manager also enters the phone number of the News Press call center in the phone number field 4160.

The manager selects the New control 4180 to cause the "2" key response option controls and fields to be displayed. For the IVR Menu 2 key, the manager selects the hang up option from the scroll menu control 4170. Optionally, the manager does not need to configure each key press option in the IVR Menu. In this example, the manager does not specify actions in response to keys 3-9, and 0. If these undefined keys are selected by a caller, the PM system replays the prompt entered in the text field 4150 up to 4 invalid key selections before terminating the call. Lastly, the manager would like all inbound calls to the News Press call center to include the calling party ID so the default Call Forwarding configuration is not modified. Having configured Call Treatment, the campaign manager selects the Next control 4198, see FIG. 41, to advance to the third step in the creation of an advertising campaign.

State 8. The server 800 receives the News Press' Call Treatment configuration data. Optionally, the server stores the entered/selected Call Treatment configuration information in the database 900. The server 800 next responds by displaying the Hours (Step 3) web page, FIG. 45.

State 9. The News Press call center is open Monday through Friday, 8:00 AM to 12:00 PM, Pacific Standard Time, and closed on the weekends. The campaign manager edits the open and closing time text fields 4510 and 4520 for Monday through Friday. The manager selects the closed Sunday check box control 4530 and closed Saturday check box control 4540 to signify the call center is closed on Sunday and Saturday, see FIG. 45. The manager also selects Pacific Standard Time in the time zone scroll control 4550. Having configured Hours, the manager selects the Next control 4598, see FIG. 45, to advance to the fourth step in the creation of an advertising campaign.

State 10. The server 800 receives the News Press' call center hours of operation configuration data. Optionally, the server stores the entered/selected hours of operation configuration in the database 900. The server next responds by displaying the Target Regions web page, FIG. 46.

State 11. In this example, the campaign manager chooses to create two targeted regions, California and the city of Santa Barbara. The manager selects the Choose Target Region control 4620 which causes the web page to refresh with a collection of controls and a text field. The manager enters into the Region Name text field 4630 "State Level". The manager selects "State or Province" from the Region Type pull down menu control 4640. This selection causes the web page to refresh with a new State selection field 4650. The manager selects "California" from the pull down menu. The manager selects the Add Named Region control 4690 which causes the web page to refresh with a collection of new controls and a text field. The manager enters into the Region Name text field 4655 "City Level". The manager selects "City" from the Region Type pull down menu control 4665. This selection causes the web page to refresh with a new City selection field

4660. The manager selects "Santa Barbara, Calif." from the pull down menu. The manager selects the Add control 4670 to add the targeted region. Having configured Targeted Regions, the manager selects the Next control 4698, see FIG. 46, to advance to the fifth step in the creation of an advertising campaign.

State 12. The server 800 receives the Targeted Regions campaign configuration data. Optionally, the server stores the entered/selected Targeted Regions campaign information in the database 900. The server next responds by displaying the Payout web page, FIG. 47.

Figure 68:
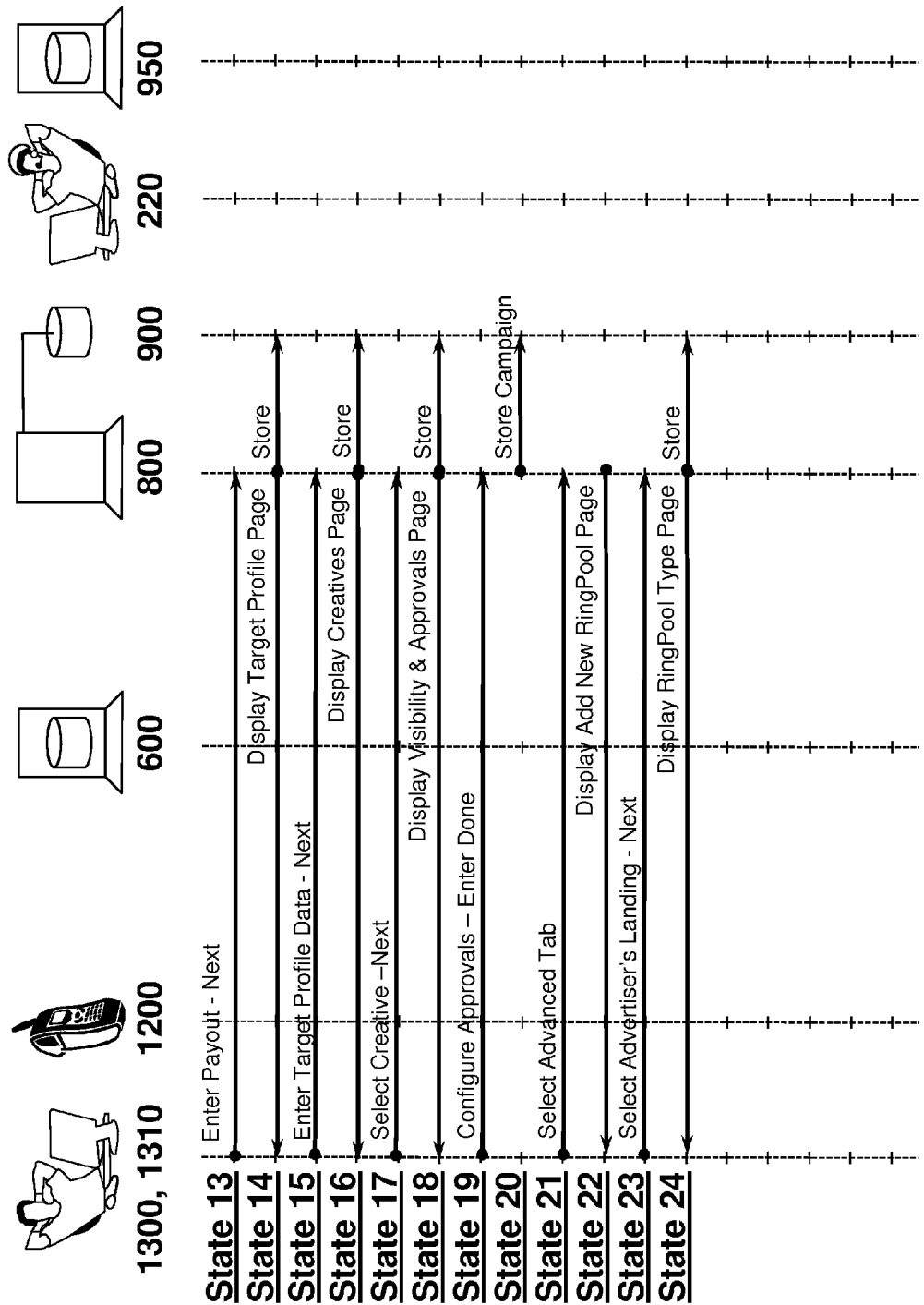

State 13 of FIG. 68. In this example, the campaign manager chooses to create a payout based upon one of the defined targeted regions, California. The manager enters the dollar amount 15 in the base payout text field 4710. The manager selects the add condition control 4730 and selects the condition "in_region State Level" from the pull down menu. The manager selects the add condition control 4730 again and selects the condition "and" from the pull down menu. The manager selects the add condition control 4730 again and selects the condition "duration >2 min". In this example, the duration of the call must exceed two minutes in addition to the call originating from the in_region State. Having configured Payouts, the manager selects the Next control 4798, see FIG. 47, to advance to the sixth step in the creation of an advertising campaign.

State 14. The server 800 receives the manager's campaign Payout configuration data. Optionally, the server stores the entered/selected campaign Payout information in the database 900. The server next responds by displaying the Target Profile web page, see FIG. 48.

State 15. Based on previous market research, the campaign manager has determined the older the caller, the more likely they are to purchase newspaper subscriptions. The manager adjusts the 18-24 age control 4810 to low and the 25-34 age control 4820 to medium. The manager leaves the other age controls in their default position, high. Further, the campaign manager has determined that married couples purchase subscriptions at a higher rate than single individuals. The manager adjusts the Martial Status controls 4830 accordingly. Having configured Targeted Profile, the manager selects the Next control 4898, see FIG. 48, to advance to the seventh step in the creation of an advertising campaign.

Figure 49:
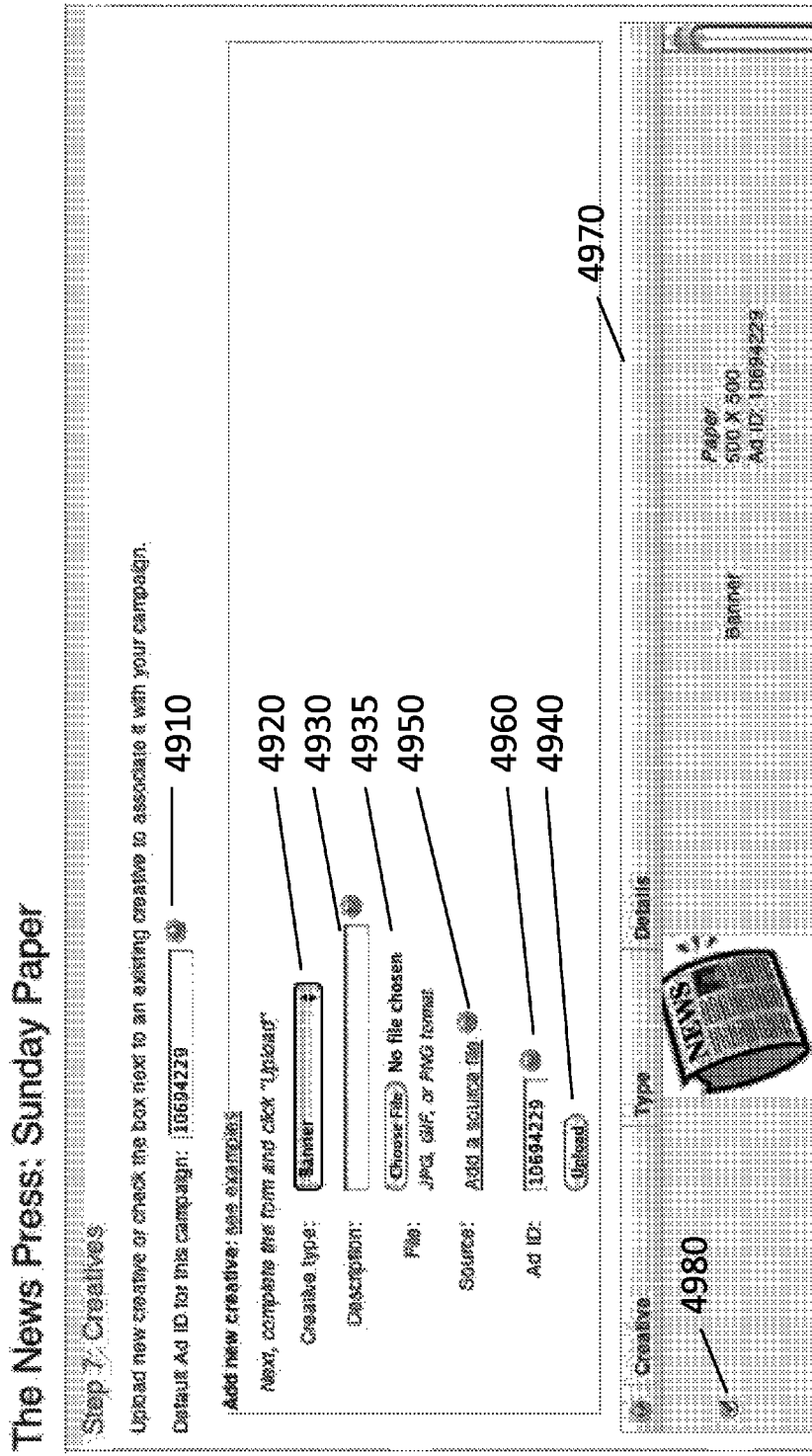
FIG. 49: is an illustration of configuring creatives used in a second example campaign creation embodiment.

State 16. The server 800 receives the manager's Target Profile configuration data. Optionally, the server stores the entered/selected Target Profile configuration in the database 900. The server next responds by displaying the Creatives web page, FIG. 49.

State 17. In this example embodiment, the campaign manager adds a banner ad which has been used in other campaigns with success. The manager selects the check box control 4980 next to the list of banner ads to add the banner ad to the campaign. Having added a creative to the campaign, the manager selects the Next control (not shown) to advance to the next step in the creation of an advertising campaign.

State 18. The server 800 receives the request and updates the database to reflect the manager's selected creative for the campaign and that the campaign is now created. The server next responds by displaying the Visibility and Approvals web page, see FIG. 50.

State 19. The next step (which, in certain embodiments, may be the last step) in creating a campaign is determining which publishers and affiliates can access the Advertising campaign and for those whom access the campaign, how the campaign manager approves their participation. In this example embodiment, the campaign manager makes the campaign available to all publishers (or all publishers within a specified country or geographic area) by selecting the all publishers control 5010. In this campaign the manager decides to review all participant applications by selecting the all applications control 5060. Having completed creating the campaign and establishing campaign visibility/approvals, the manager selects the Done control 5098, see FIG. 50.

State 20. The server 800 receives the visibility/approvals selections and updates the database accordingly. In the states above, the user configured data is stored at each step transition. Optionally, all of the configured data can stored in this last step in campaign creation.

With the campaign created, the server 800 displays the Campaign home web page, see FIG. 5. The newly created campaign is displayed in the campaign summary and is available to one or more publishers/affiliates.

State 21. A publisher who has applied for the campaign and been accepted would like to establish detailed tracking by configuring a RingPool. The RingPool in this example embodiment is used to track phone calls associated with advertisements placed on the publisher's web site(s). The publisher selects a user interface control (not shown in Figures) from within the newly created "2011 Sale" campaign. The manager next selects the "Add New RingPool" control (not shown in Figures).

State 22. The server 800 receives the request to add a new RingPool and responds by displaying the Add New RingPool web page, see FIG. 51.

State 23. In this example embodiment, the publisher decides to send the traffic to the Advertiser's landing page. The publisher selects the Advertiser landing page control 5110, see FIG. 51. The publisher then selects the Next control 5130.

State 24. The server 800 receives the Advertiser landing page selection, stores the publisher selection in the system database 900, and displays the RingPool type web page, see FIG. 52.

Figure 69:
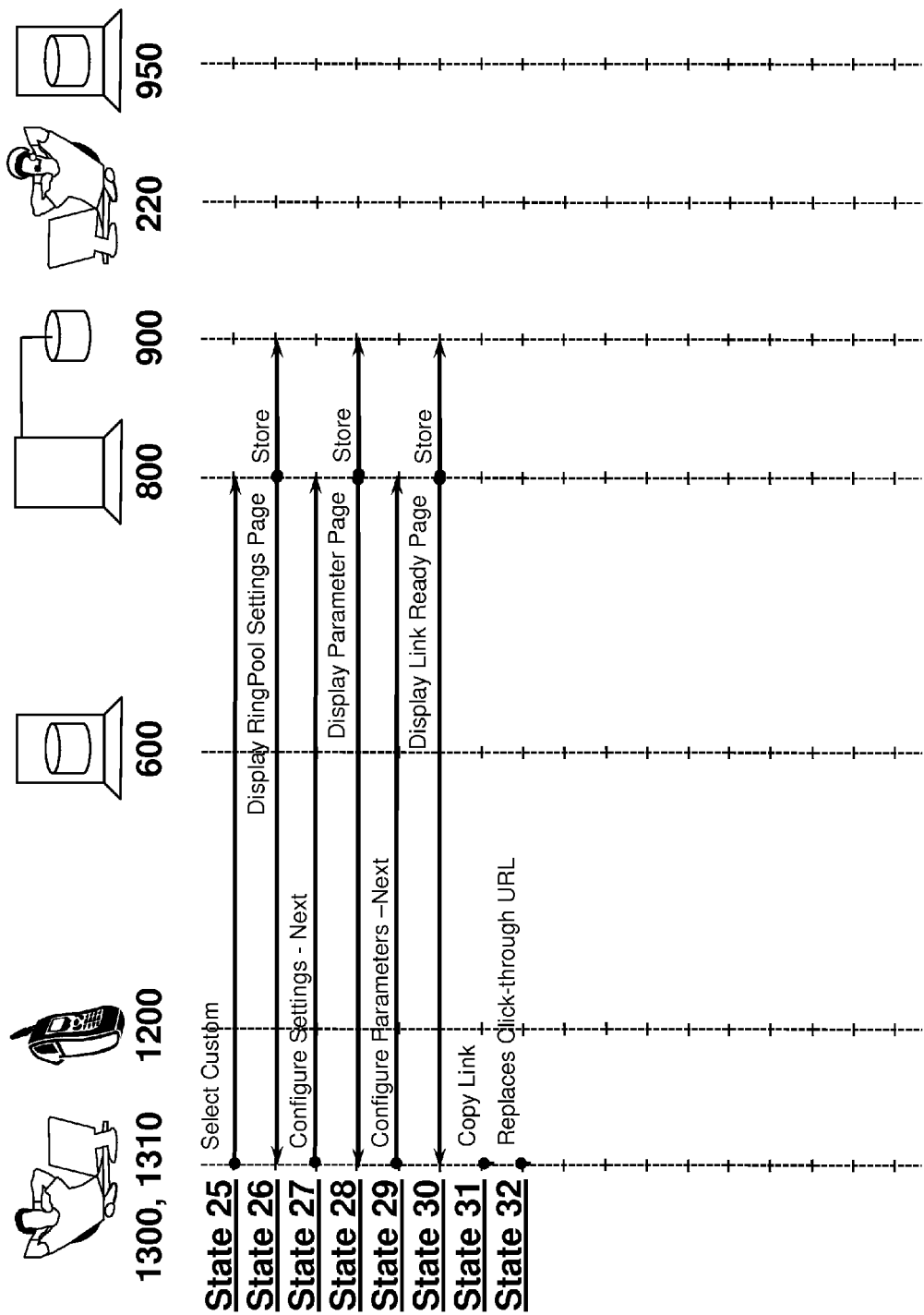

State 25 of FIG. 69. The publisher in this case is tracking ad placements in the publisher's web site(s) and therefore selects the RingPool type "Custom" control 5230. The publisher then selects the Next control 5250.

State 26. The server 800 receives the request to add a custom RingPool, stores the publisher's selection, and responds by displaying the RingPool Settings web page, see FIG. 53.

State 27. The publisher assigns a unique name to the RingPool, by entering "Ad Placement" into the text field 5310. The media buyer next sets a minimum number-to-parameter association lifetime by selecting 10 minutes in the scroll menu control 5320. Next the publisher enters an estimate of the number of clicks per day by entering 2500 in the site visit number entry field 5330. The server 800 receives the clicks per day estimate and displays 5340 a RingPool number allocation of 500 (see FIG. 53). The publisher then selects the Next Control 5360.

State 28. The server 800 receives the RingPool Settings, stores the publisher selections in the system database, and responds by displaying the RingPool Parameters web page, (see FIG. 54).

State 29. In this example embodiment, the publisher has selected three parameters named website, location, and path. The publisher enters "website" into the Parameter name 1 text field 5410. The publisher enters "location" into the Parameter name 2 text field 5420. The publisher enters "path" into the Parameter name 3 text field 5430. When the publisher replaces the click-through URL with the generalized tracking link into the ad placements, the publisher also configures the URL with unique values for website, location, and path. The publisher then selects the Next control 5450.

State 30. The server 800 receives the three parameters, stores the parameters in the system database. The server generates a general tracking URL for the publisher. The URL consists of the following key components: a) a path to the PM system (e.g., so the PM system can track the click-throughs and associate a phone address with the ad placement) b) a unique identifier associated with the publisher (e.g., created during account setup); c) the named parameters. The server responds by displaying the Link Ready web page.

State 31. The publisher copies the displayed URL 5510 from the Link ready web page.

State 32. The publisher replaces each click-through URL on the publishing company's web site with the general tracking link. For each ad placement, the publisher sets the triplet parameters to unique values. In one example, the publisher displays an ad at the footer of the publisher's home page. The publisher replaces the click-through URL with the general tracking URL described in State 30. The publisher also specifies a unique website, location, and path for the home page ad (e.g., website=one&location=footer&path=home). (Note: at some point prior to state 32, in this example the News Press campaign manager inserted javascript code (or its equivalent) in the News Press landing page (optionally, code received from the PM service provider personnel) which performs the task of url parsing, phone address validation, and phone address placement onto the landing page.)

Figure 70:
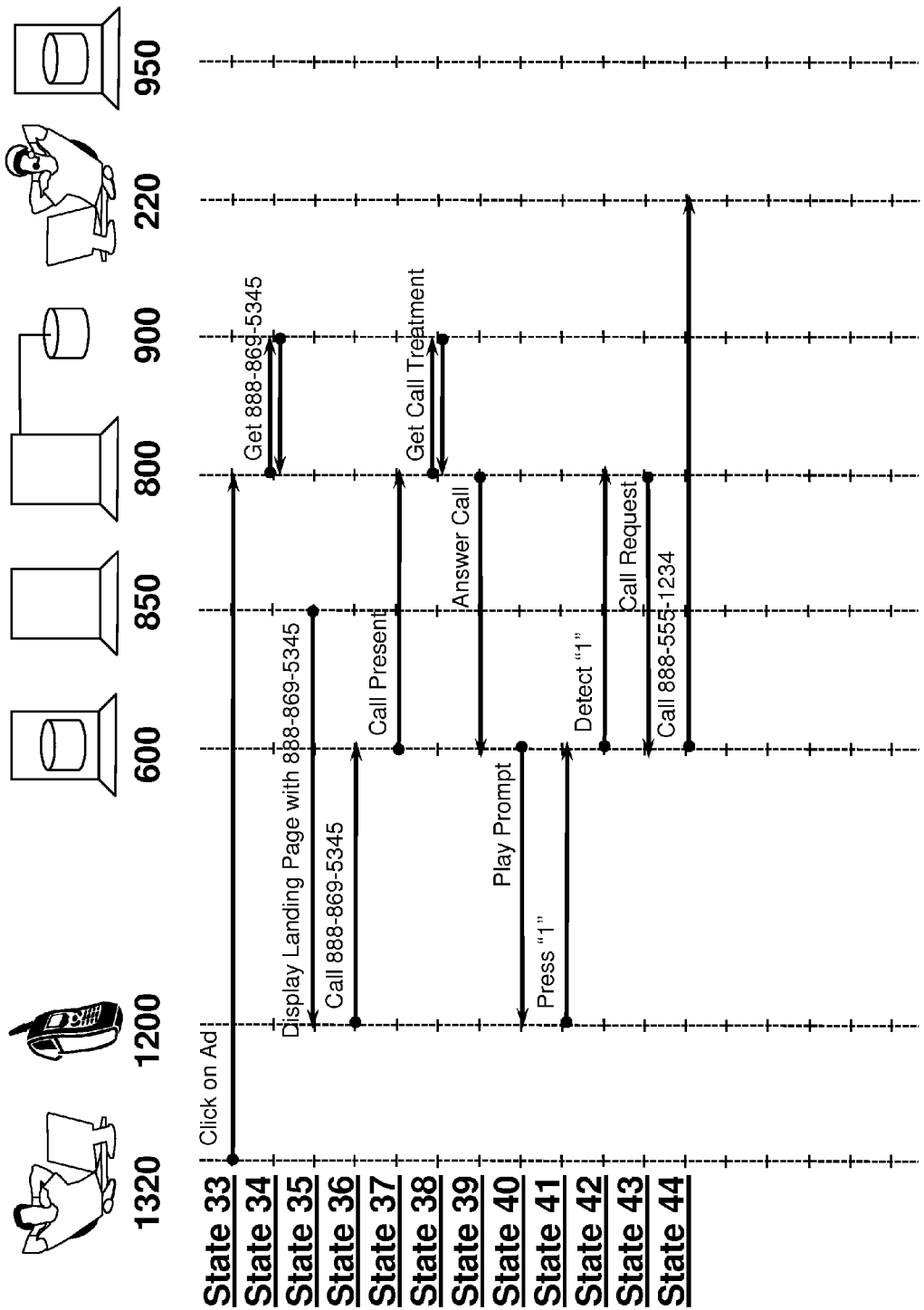

State 33 of FIG. 70. After the publisher completes the update to the publisher's web site and the changes are live, a consumer browses to the publisher's web site and after reading an article notices the News Press ad displayed on the publisher's site. The consumer clicks on the ad using, for example, their data terminal 1320.

State 34. The PM system receives the web request. The PM system parses the URL. The PM system queries the system database using the publisher ID and parameters (website=one, location=footer, path=home). The PM system determines from the query that a phone number has not been assigned to the publisher with parameters website=one, location=footer, and path=home. The PM system allocates a phone address, 888-869-5345 from the pool of numbers assigned to the publisher. The assignment is stored in the system database and, in this example, the web request is redirected to the News Press' landing page with the phone address 888-869-5345 included as a parameter in the redirect.

Figure 57:
FIG. 57: is an illustration of an example embodiment of an advertiser landing page with a RingPool promotional number displayed.

State 35. The News Press' web server 850 receives the web request from the PM system. The News Press' web server 850 renders the landing page. When the landing page is ready, the javascript (e.g., number placement code) inserted by the campaign manager on the landing page (see State 32) parses the url, validates the phone number and maps it onto the page 5710, see FIG. 57.

State 36. The consumer, after reading the information associated with the product decides to call the displayed phone number, 888-869-5345. The consumer enters in the number 888-869-5345 in his mobile device and selects the send control. The call is routed through the public switched telephone network 3000 to the PM platform 1005, phone server 600.

State 37. The phone server 600 notifies the server 800 of the presented call along with the call signaling information associated with the call (e.g., calling and called numbers, direct call, etc.).

State 38. The server 800 queries the database 900 to determine the call handling treatment for the call and optionally external databases 950 to collect additional information about the caller 00 (and calling device/type of device 1200) for call rating and tracking purposes. From the calling number the server 800 determines the caller is calling from a cell phone.

State 39. Since the called phone number 800-123-4567 is associated with the News Press campaign, the call treatment is to record the call so the phone server 600 begins to record the call and play an interactive menu to the caller. The server 800 requests the phone server 600 answer the call, begin recording the call, and play the call recorded warning and voice menu configured for this campaign.

State 40. The phone server 600 answers the incoming call and plays the voice prompt to the customer/caller 400 and/or customer's mobile device 1200 "This call is being recorded. If you are trying to reach The News Press, press 1. If you misdialed, please hang up."

State 41. In this example, the caller presses one on their phone keypad in response to hearing the voice prompt.

State 42. The phone server 600 detects a dual tone multi-frequency tone (dtmf) one. The phone server 600 notifies the server 800 of the dtmf event.

State 43. The server 800 requests the phone server 600 generate an outbound call to the configured phone number/address 888-555-1234 that is the destination phone number of the News Press Santa Barbara call center 220.

State 44. The phone server 600 generates an outbound call to the phone number/address 888-555-1234.

Figure 71:
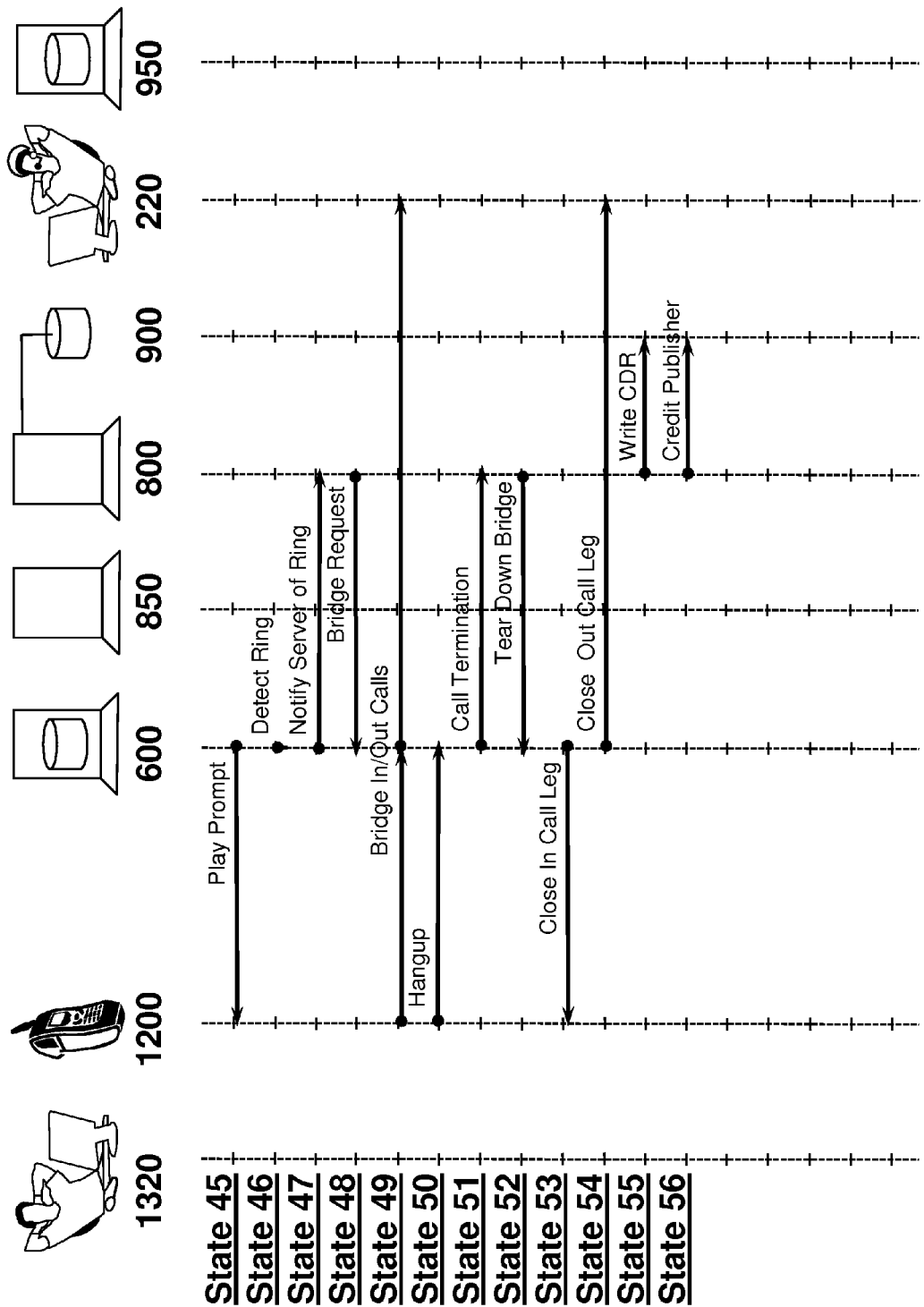

State 45 of FIG. 71. The phone server 600 plays the voice prompt to the customer/caller 400/1200 "Thank you for calling The News Press. We are transferring your call."

State 46. The phone server 600 detects audible ringing on the outbound call to the call center.

State 47. The phone server 600 notifies the server 800 of the audible ringing on the outbound call to the call center.

State 48. The server 800 requests the phone server 600 bridge the inbound call from the customer/caller 400/1200 to the outbound call to the call center 220.

State 49. The phone server 600 bridges the inbound call from the customer/caller 400/1200 to the outbound call to the call center 220.

State 50. After closing the sale, the caller hangs up. In this example, the phone server 600 detects the termination of the call by the caller 400/1200.

State 51. The phone server 600 notifies the server 800 of the call termination by the caller.

State 52. In this example, the server 800 requests the phone server 600 terminate the call bridge between the customer/caller 400/1200 and the call center 220.

State 53. In this example, the phone server 600 terminates the inbound call from the customer/caller 400/1200.

State 54. In this example, the phone server 600 terminates the outbound call to the call center 230. The phone server terminates recording of the call.

State 55. The server 800 writes a call detail record to the database 900, the call detail record including information about the call (e.g., length of the call, calling party ID, etc). The server 800 also stores the recorded call in association with News Press' campaign.

State 56. The call bridging platform calculates the value of the call to the publisher 200 and credits the publisher 200 for the call by updating the database 900. In this example, the call originated in California and was greater than 2 minutes. Therefore, the publisher is credited the amount of $15 for the call.

Figure 72:
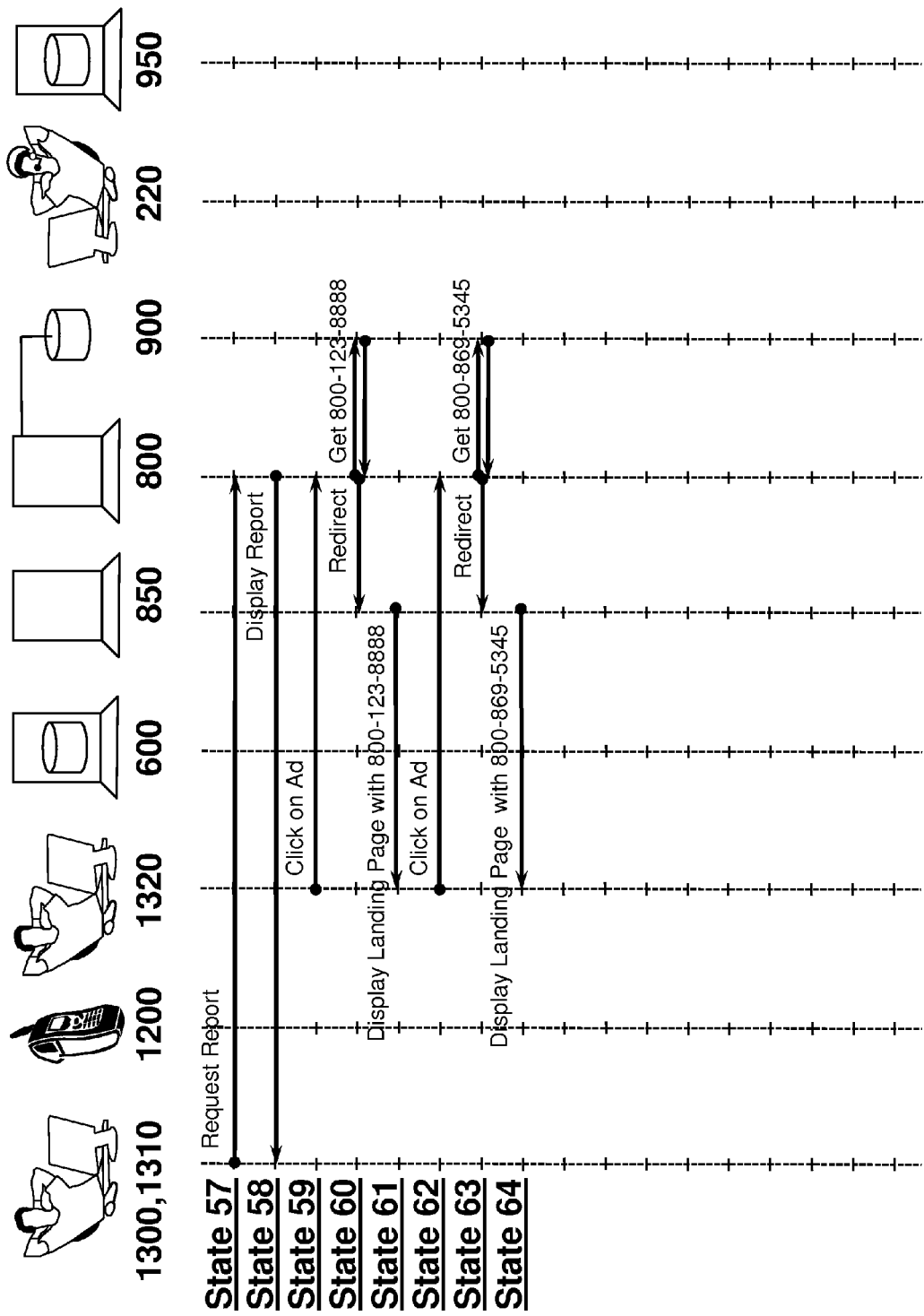

State 57 of FIG. 72. Later that evening, the publisher logged into the system (steps not shown) and requests a transaction detail report by selecting the transaction report control (not shown).

State 58. The server 800 receives the transaction report control selection, and displays a listing of all transactions associated with the publisher. Transaction number 754 details the call described. The RingPool number 888-869-5345 is listed along with the unique tracking parameters which it was associated with in State 34 above; website=one, location=footer, path=home=1, see FIG. 56.

State 59. Sometime later, a second consumer, Sally, browses to the publisher's web site and reads several articles on the publisher's website. On the third page Sally notices the News Press ad displayed on the publisher's site. Sally clicks on the ad displayed (not the same ad clicked on by John).

State 60. The PM system receives the web request. The PM system parses the URL. The PM system queries the system database using the parsed URL including publisher ID and parameters: website=one, location=footer, path=page3. The PM system determines from the query that a phone number has not been assigned to the publisher with parameters website=one, location=footer, and path=page3. The PM system checks the maximum size compared to the current pool size and determines that additional numbers may be allocated. The PM system allocates a phone address, 800-123-8888 to the pool of numbers assigned to the publisher. The assignment is stored in the system database and, in this example, the web request is redirected to the News Press' landing page with the phone address 800-123-8888 included as a parameter in the redirect.

State 61. The News Press' web server receives the web request from the PM system. The News Press' web server parses the web request, extracts the phone address 800-123-8888, and displays the News Press' landing page with the phone address, see FIG. 56 for an example landing page. Sally reads the subscription information displayed on the News Press landing page but decides not to call.

State 62. Sometime later, a third consumer, Dylan, browses to the publisher's web site. Dylan notices the News Press ad displayed on the publisher's homepage. Dylan clicks on the ad.

State 63. The PM system receives the web request. The PM system parses the URL. The PM system queries the system database using the parsed URL including publisher ID and parameters: website=one, location=footer, path=home. The PM system determines from the query that a phone number has been assigned to the publisher with parameters website=one, location=footer, and path=home. The web request is redirected to the News Press' landing page with the phone address 888-869-5345 included as a parameter in the redirect.

State 64. The News Press' web server receives the web request from the PM system. The News Press' web server renders the landing page. When the landing page is ready, the javascript (e.g., number placement code) inserted by the campaign manager on the landing page (see State 32) parses the url, validates the phone number and maps it onto the landing page 5710, see FIG. 57, for example.

Third Example Embodiment

Figure 73:
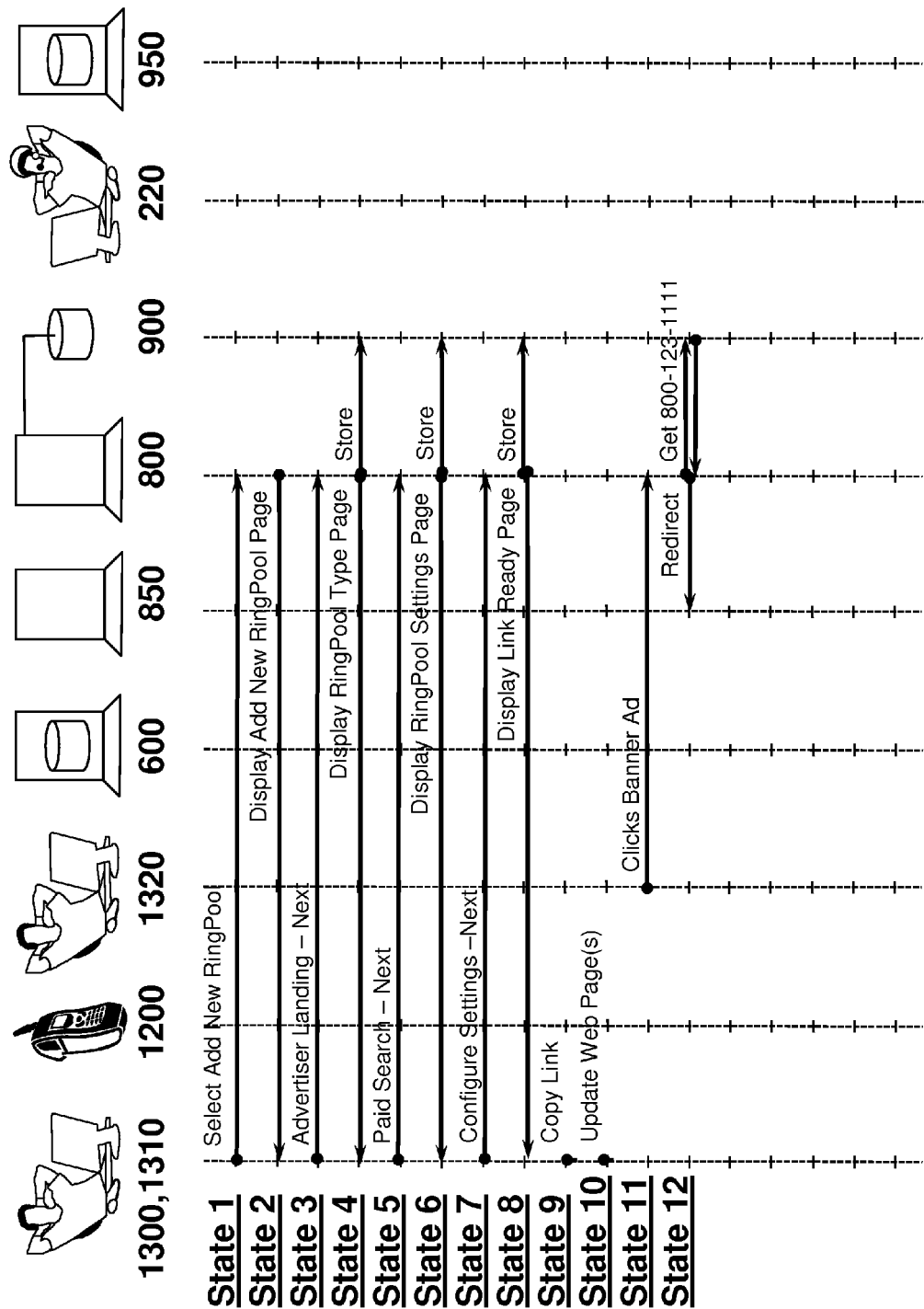
FIGS. 73-74: illustrate another example operating environment/process for a communications system.
Figure 74:
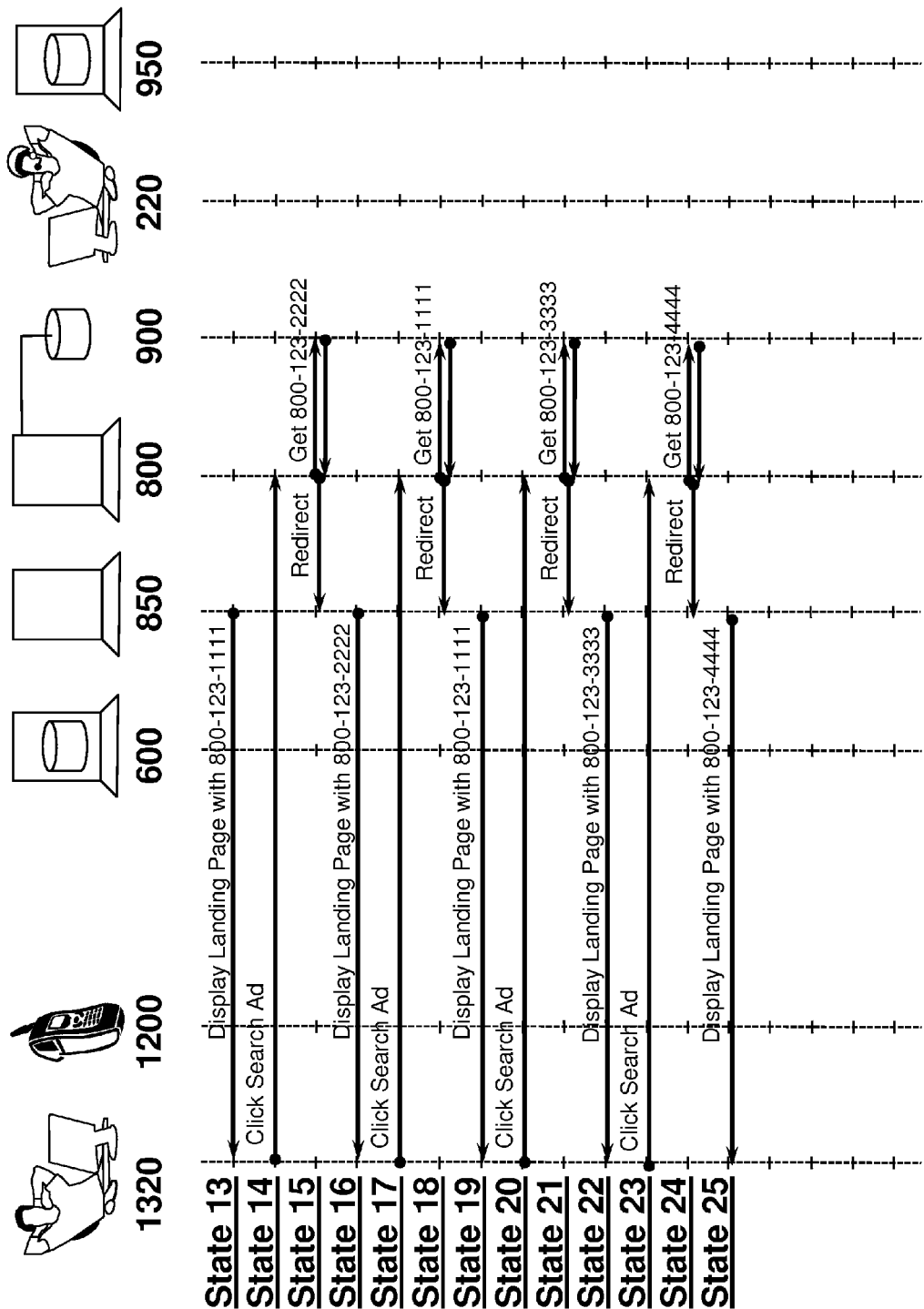

FIGS. 73-74 depicts another example embodiment of the system. This example embodiment builds upon the Newspaper Advertiser, The News Press described above. In that example, a publisher participating in the campaign by displaying ads on their website. In this example embodiment, a media buyer participating in the campaign purchases keywords on search sites and Search RingPool phone numbers are used.

In the example below, the News Press (Advertiser 300) previously registered and created an account in the system database 900. One or more publishers/affiliates 200 created their respective accounts in the system database 900. The News Press created an advertising campaign "2011 Sale" as described above in example two. Further, in the example below, the process steps of the advertiser and/or publishers/affiliates accessing the system and logging in are not shown (see first example for an embodiment of these steps).

State 1 of FIG. 73. A media buyer who has applied for the campaign and been accepted would like to establish detailed tracking by configuring a Search RingPool. The publisher selects the "Advanced" tab a user interface control (not shown in Figures) from within the newly created "2011 Sale" campaign. The manager next selects the "Add New RingPool" control (not shown in Figures).

State 2. The server 800 receives the request to add a new RingPool and responds by displaying the Add New RingPool web page.

State 3. In this example embodiment, the media buyer decides to send the traffic to the Advertiser's landing page. The media buyer selects the Advertiser landing page control 5110, see FIG. 51. The media buyer then selects the Next control 5130.

State 4. The server 800 receives the Advertiser landing page selection, stores the publisher selection in the system database, and displays the RingPool Type web page, see 52.

State 5. The media buyer in this case is tracking paid Search and therefore selects the RingPool type Search Engine+Keywords control 5210. The media buyer then selects the Next control 5210.

State 6. The server 800 receives the RingPool Type page selection, stores the media buyer selection in the system database, and displays the RingPool Settings web page, see FIG. 53.

State 7. The media buyer assigns a unique name to the RingPool, by entering "Paid Search Ads" into the text field 5310. The media buyer next sets a minimum number-to-parameter association period by selecting 10 minutes in the scroll menu control 5320. Next the media buyer specifies an estimate of the number of clicks per day by entering 2500 in the site visit number entry field 5330. The server receives the clicks per day (or other time period) estimate and displays a RingPool number allocation of 500, see FIG. 53. The media buyer then selects the Next control 5360.

State 8. The server 800 receives the RingPool Settings and stores the media buyer selections in the system database. The server generates a general tracking URL for the media buyer. The URL consists of the following key components: a) a path to the PM system (e.g., so the PM system can track the click-throughs and associate a phone address with the ad placement) b) a unique identifier associated with the media buyer (e.g., account ID created during account setup); c) the keyword and search engine. The server responds by displaying the Link Ready web page.

Figure 58:
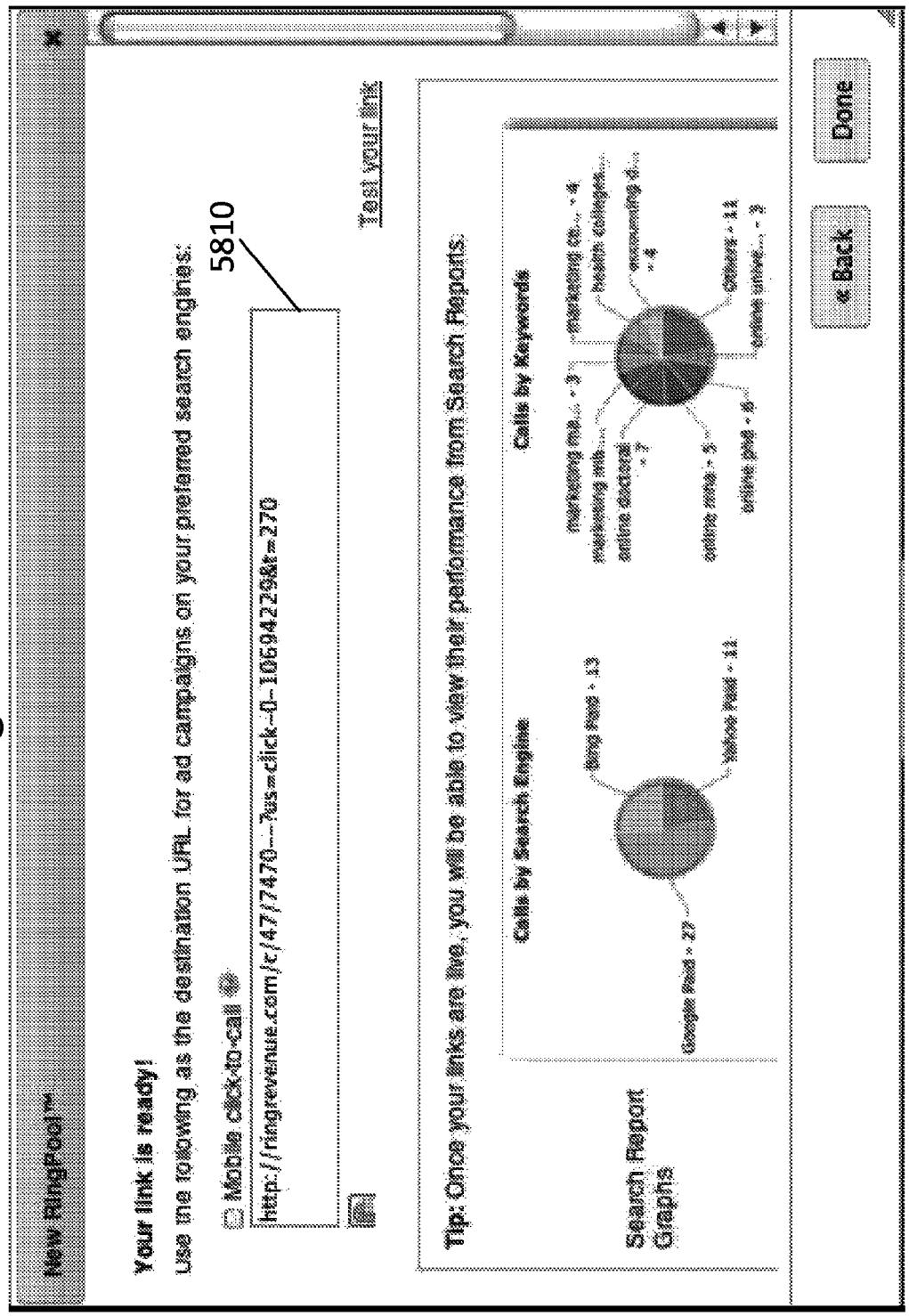
FIG. 58: is an illustration of an example embodiment of a display of a URL used in association with a RingPool in a paid search campaign.
Figure 59:
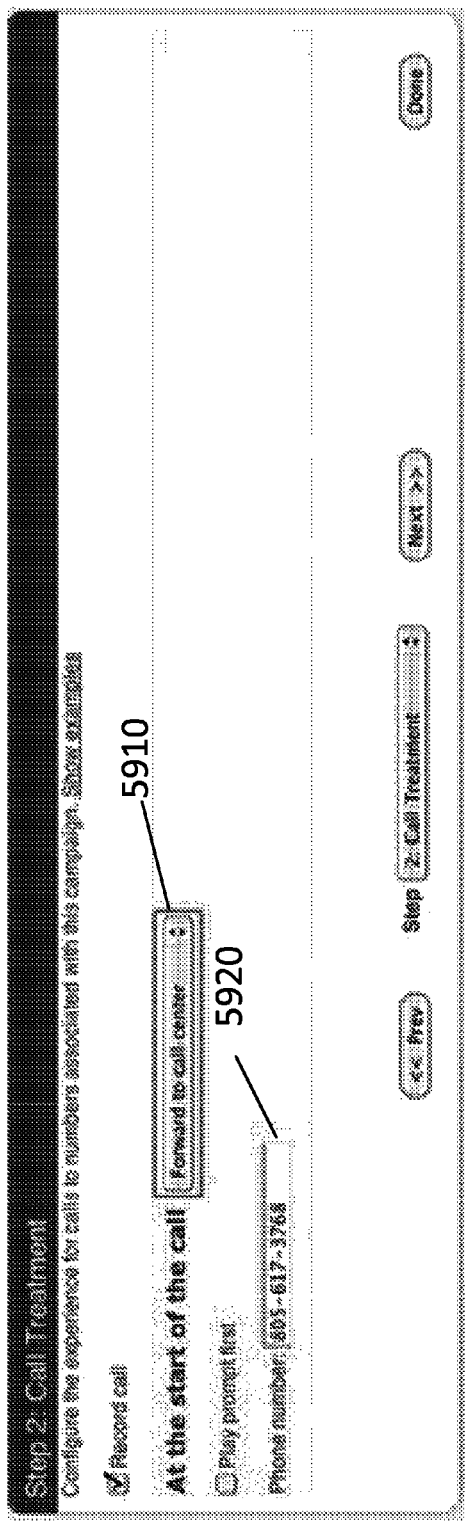
FIG. 59: is an illustration, again of the third example call treatment configuration in the second example campaign creation embodiment.

State 9. The media buyer copies the displayed general tracking link 5810 from the Link ready web page, see FIG. 58.

State 10. The media buyer replaces each click-through URL on the paid search ads with the general tracking link. The media buyer purchases hundreds of search keyword/phrases including "Local Newspaper" and "Santa Barbara News" across multiple search engines.

State 11. A consumer, Jane, enters the search phrase "Local Newspaper" into a search engine query field (e.g., associated with a third party search site, such as Google®). The search engine responds to the search request by displaying a list of results and paid ads including the media buyer's ad. Jane clicks on the media buyer's displayed ad.

State 12. The PM system receives the web request. The PM system parses the received URL. The PM system queries the system database using the parsed URL including media buyer ID and parameters: keyword=Local Newspaper and search engine=Google. The PM system determines from the query that a phone number has not been assigned to the media buyer with parameters keyword=Local Newspaper and search engine=Google. The PM system checks the available pool of numbers and determines there are available numbers to allocate. The PM system allocates a phone address, 800-123-1111 from the pool of numbers assigned to the media buyer. The assignment is stored in the system database and, in this example, the web request is redirected to the News Press' landing page with the phone address 800-123-1111 included as a parameter in the redirect.

State 13 of FIG. 74. The News Press' web server receives the web request from the PM system. The News Press' web server renders the landing page. When the landing page is ready, the javascript (e.g., number placement code) inserted by the campaign manager on the landing page (see State 32) parses the url, validates the phone number and maps it onto the landing page 5710, see FIG. 57, for example (note the phone number displayed in FIG. 57 in this example is 800-123-1111).

State 14. Sometime later, another consumer, Dick, enters the search phrase "Local Newspaper" into a search engine query field of another search site (e.g., Yahoo®) using, for example, his data terminal 1320. Yahoo's search engine responds to the search request by displaying a list of results and paid ads including the media buyer's ad. Dick clicks on the media buyer's displayed ad.

State 15. The PM system receives the web request. The PM system parses the received URL. The PM system queries the system database using the parsed URL including media buyer ID and parameters: keyword=Local Newspaper and search engine=Yahoo. The PM system determines from the query that a phone number has not been assigned to the media buyer with parameters keyword=Local Newspaper and search engine=Yahoo. The PM system checks the available pool of numbers and determines there are available numbers to allocate. The PM system allocates a phone address, 800-123-2222 from the pool of numbers assigned to the media buyer. The assignment is stored in the system database and, in this example, the web request is redirected to the News Press' landing page with the phone address 800-123-2222 included as a parameter in the redirect.

State 16. The News Press' web server receives the web request from the PM system. The News Press' web server renders the landing page. When the landing page is ready, the javascript (e.g., number placement code) inserted by the campaign manager on the landing page (see State 32) parses the url, validates the phone number and maps it onto the landing page 5710, see FIG. 57, for example (note the phone number displayed in FIG. 57 in this example is 800-123-2222).

State 17. Sometime later, another consumer, Jason, enters the search phrase "Local Newspaper" into Google's Search using, for example, his data terminal 1320. Google's search engine responds to the search request by displaying a list of results and paid ads including the media buyer's ad. Jason clicks on the media buyer's displayed ad.

State 18. The PM system receives the web request. The PM system parses the received URL. The PM system queries the system database using the parsed URL including media buyer ID and parameters: keyword=Local Newspaper and search engine=Google. The PM system determines from the query that a phone number has been assigned to the media buyer with parameters keyword=Local Newspaper and search engine=Google. The web request is redirected to the News Press' landing page with the phone address 800-123-1111 included as a parameter in the redirect.

State 19. The News Press' web server receives the web request from the PM system. The News Press' web server renders the landing page. When the landing page is ready, the javascript (e.g., number placement code) inserted by the campaign manager on the landing page (see State 32) parses the url, validates the phone number and maps it onto the landing page 5710, see FIG. 57, for example note the phone number displayed in FIG. 57 in this example is 800-123-1111).

State 20. Sometime later, another consumer, Rob, enters the search phrase "Local Newspaper" into AOL's Search using, for example, their data terminal 1320. AOL's search engine responds to the search request by displaying a list of results and paid ads including the media buyer's ad. Rob clicks on the media buyer's displayed ad.

State 21. The PM system receives the web request. The PM system parses the received URL. The PM system queries the system database using the parsed URL including media buyer ID and parameters: keyword=Local Newspaper and search engine=AOL. The PM system determines from the query that a phone number has not been assigned to the media buyer with parameters keyword=Local Newspaper and search engine=AOL. The PM system checks the available pool of numbers and determines there are no available numbers to allocate. The PM system then checks to see if any of the assigned numbers have exceeded the minute minimum association time period. In this example, there is more than one number that has been assigned to a (keyword, search engine) pair which has exceeded the minimum time. The PM system determines which number of the numbers have exceeded the minimum time has had the least activity. The least active number, 800-123-3333 is assigned to the ("Local Newspaper, AOL) pair, the association is stored in the system database and, in this example, the web request is redirected to the News Press' landing page with the phone address 800-123-3333 included as a parameter in the redirect.

State 22. The News Press' web server receives the web request from the PM system. The News Press' web server parses the web request, extracts the phone address 800-123-3333, displays the News Press' landing page with the phone address 5710, see FIG. 57 for an example landing page display (note the phone number displayed in FIG. 57 in this example is 800-123-3333).

State 23. Sometime later, another consumer, Colin, enters the search phrase "Santa Barbara News" into AOL's Search using, for example, their data terminal 1320. AOL's search engine responds to the search request by displaying a list of results and paid ads including the media buyer's ad. Colin clicks on the media buyer's displayed ad.

State 24. The PM system receives the web request. The PM system parses the received URL. The PM system queries the system database using the parsed URL including media buyer ID and parameters: keyword=Santa Barbara News and search engine=AOL. The PM system determines from the query that a phone number has not been assigned to the media buyer with parameters keyword=Santa Barbara News and search engine=Yahoo. The PM system checks the size of the pool of numbers and determines that it has reached its maximum size. The PM system then checks to see if any of the assigned numbers have exceeded the 10 minute minimum association time period. In this example, there are no numbers that has been assigned to a (keyword, search engine) pair which have exceeded the minimum time. The PM system allocates the overflow number, 800-123-4444 in this example, the web request is redirected to the News Press' landing page with the phone address 800-123-4444 included as a parameter in the redirect.

State 25. The News Press' web server receives the web request from the PM system. The News Press' web server renders the landing page. When the landing page is ready, the javascript (e.g., number placement code) inserted by the campaign manager on the landing page (see State 32) parses the url, validates the phone number and maps it onto the landing page 5710, see FIG. 57, for example (note the phone number displayed in FIG. 57 in this example is 800-123-4444).

Thus, as described above, certain embodiments manage and track the sales/leads and conversion-to-purchase associated with advertisements. Certain example embodiments enable a business to track phone-based sales through unique call processing techniques, number allocation, number pooling, web user interfaces, and reporting. In addition, certain embodiments provide call enhancements (e.g., interactive voice response, call filtering, etc.), help manage call volumes, and/or calculate affiliate/publisher payments.

The methods and processes described above may be embodied in, and fully automated via, software code modules executed by one or more general purpose computers or processors, including mobile phones. The code modules may be stored in any type of computer-readable medium or other computer storage device. Some or all of the methods may alternatively be embodied in specialized computer hardware. Further, components and tasks described herein can be implemented as web services. Data described herein as being received or generated by a computer system may optionally be stored in and accessed from computer readable memory.

The computers described herein (including servers, terminals, phones, interactive televisions, etc.) can include one or more central processing units (CPUs) that execute program code and process data, memory, including volatile memory, such as random access memory (RAM) optionally for temporarily storing data and data structures during program execution, and/or non-volatile memory, such as a hard disc drive, optical drive, or FLASH drive, optionally for storing programs and data, including databases, which may be referred to as a "system database," and a wired and/or wireless network interface for accessing an intranet and/or Internet. The computers can include a display for displaying user interfaces, data, and the like, and one or more user input devices, such as a keyboard, mouse, pointing device, microphone and/or the like, used to navigate, provide commands, enter information, provide search queries, and/or the like.

The terms phone number, telephone number, phone address, mobile device number, etc., as described herein, may refer to phone addresses that are entered/selected by users and used by public (e.g., wireline and wireless using E.164 numbering) and private networks (e.g., using Session Initiation Protocol (SIP) address and attendant parameters) to route calls/communications and create a network path between a called party and calling party. The term phone address is in intended to encompass generally an address identifying a party to whom (or a destination to which) a voice call is being placed (e.g., a phone number, a SIP address, etc.). While the term phone number may be used herein with respect to certain embodiments for illustrative purposes, other types of phone addresses may be used as well.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method of call routing, the method comprising:
   assigning, by a marketing automation computing system, one or more phone numbers to one or more media elements within a marketing campaign for a good or service, wherein a first media element of the marketing campaign comprises a web-based landing page;
   detecting, by the marketing automation computing system, one or more actions by a first customer prospect in association with the one or more media elements within the marketing campaign;
   enhancing a lead score associated with the first customer prospect based at least in part on the detected one or more actions of the first customer prospect with the one or more media elements, wherein enhancing the lead score comprises improving the lead score to reflect a corresponding inferred likelihood of the first customer prospect to be a customer for the good or service;
   receiving, at the marketing automation computing system, a call directed to a first of the one or more assigned phone numbers assigned to the one or more media elements, wherein a caller identification number is included in call signaling information associated with the received call;
   determining, by the marketing automation computing system, based at least in part on the call signaling information associated with the received call that the call is from the first customer prospect; and
   routing the call directed to the first of the one or more assigned phone numbers assigned to the one or more media elements, by the marketing automation computing system, based at least in part on the lead score of the first customer prospect.

2. The method as defined in claim 1, wherein the one or more media elements comprise an email.

3. The method as defined in claim 1, wherein the one or more media elements comprise a web form.

4. The method as defined in claim 1, the method further comprising: dynamically assigning, by the marketing automation computing system, the one or more phone numbers in response to at least a first condition.

5. The method as defined in claim 4, wherein the first condition comprises a display of the web landing page.

6. The method as defined in claim 4, wherein the first condition comprises a display of a video on the web landing page.

7. The method as defined in claim 4, wherein the first condition comprises a download.

8. The method as defined in claim 1, wherein routing the call directed to the first of the one or more assigned phone numbers assigned to the one or more media elements, further comprises generating an outbound call and bridging the received call and the outbound call.

9. The method as defined in claim 1, wherein the call routing is to a call center.

10. The method as defined in claim 1, wherein the customer prospect is an existing customer.

11. The method as defined in claim 1, the method further comprising:
  detecting, by the marketing automation computing system, one or more actions by a second customer prospect in association with the one or more media elements within the marketing campaign;
  enhancing a lead score associated with the second customer prospect based at least in part on the detected one or more actions of the second customer prospect, wherein enhancing the lead score associated with the second customer prospect comprises improving the lead score associated with the second customer prospect to reflect a corresponding inferred likelihood of the second customer prospect to be a customer for the good or service;
  receiving at the marketing automation computing system, a second call directed to the one or more assigned phone numbers wherein a caller identification number is included in call signaling information associated with the received second call;
  determining, by the marketing automation computing system, from the call signaling information associated with the received second call that the second call is from the second customer prospect; and
  routing the second call, by the marketing automation computing system, based at least in part on the lead score associated with the second customer prospect.

12. A method of call routing, the method comprising:
  associating, by a marketing automation computing system, one or more phone numbers with one or more media elements within a marketing campaign for a good or service, wherein a first media element of the marketing campaign comprises a web-based landing page;
  querying a data store to determine one or more attributes associated with a customer prospect;
  enhancing a lead score associated with the customer prospect based at least in part on the one or more determined attributes associated with the customer prospect, wherein enhancing the lead score comprises improving the lead score to reflect a corresponding inferred likelihood of the customer prospect to be a customer for the good or service;
  receiving, at the marketing automation computing system, a call directed to the one or more assigned phone numbers, wherein a caller identification number is included in call signaling information associated with the received call;
  determining by the marketing automation computing system, from the call signaling information associated with the received call that the call is from the customer prospect; and
  routing the call by the marketing automation computing system, based at least in part on the lead score of the customer prospect.

13. The method as defined in claim 12, wherein the data store query is a query over a data network to an external data base.

14. The method as defined in claim 12, wherein a customer prospect attribute is the customer prospect's gender.

15. The method as defined in claim 12, wherein a customer prospect attribute is the customer prospect's corporate title.

16. The method as defined in claim 12, wherein the data store query uses as a query parameter the customer prospect's phone number.

17. The method as defined in claim 12, wherein routing the call further comprises generating an outbound call and bridging the received call and the outbound call.

18. The method as defined in claim 12, wherein the call routing is to a sales agent.

19. The method as defined in claim 12, wherein the customer prospect is an existing customer.

20. A system comprising:
  at least one computer processor; and
  a non-transitory memory embodied with a computer program comprising instructions which when executed by the at least one computer processor performs operations comprising:
  assigning one or more phone numbers to one or more media elements within a marketing campaign for a good or service, wherein a first media element of the marketing campaign comprises a web-based landing page;
  detecting one or more actions by a first customer prospect in association with the one or more media elements within the marketing campaign;
  enhancing a lead score associated with the first customer prospect based at least in part on the detected one or more actions of the first customer prospect with the one or more media elements, wherein enhancing the lead score comprises improving the lead score to reflect a corresponding inferred likelihood of the first customer prospect to be a customer for the good or service;
  receiving a call directed to a first of the one or more assigned phone numbers assigned to the one or more media elements, wherein a caller identification number is included in call signaling information associated with the received call;
  determining based at least in part on the call signaling information associated with the received call that the call is from the first customer prospect; and
  routing the call directed to the first of the one or more assigned phone numbers assigned to the one or more media elements, by the marketing automation computing system, based at least in part on the lead score of the first customer prospect.

* * * * *